US011685589B2

(12) United States Patent
Munie et al.

(10) Patent No.: US 11,685,589 B2
(45) Date of Patent: *Jun. 27, 2023

(54) INSULATING DEVICE BACKPACK

(71) Applicant: YETI Coolers, LLC, Austin, TX (US)

(72) Inventors: Jeffrey Charles Munie, Austin, TX (US); Kyle Edward Rogers, Austin, TX (US); Donald Edward Desroches, Austin, TX (US); John Loudenslager, Austin, TX (US); Derek G. Sullivan, Austin, TX (US); Alex Baires, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,639

(22) Filed: Aug. 9, 2022

(65) Prior Publication Data

US 2022/0388754 A1 Dec. 8, 2022

Related U.S. Application Data

(60) Continuation of application No. 16/934,865, filed on Jul. 21, 2020, now Pat. No. 11,407,579, which is a
(Continued)

(51) Int. Cl.
*B65D 81/38* (2006.01)
*A45C 3/00* (2006.01)
(Continued)

(52) U.S. Cl.
CPC .............. *B65D 81/389* (2013.01); *A45C 3/00* (2013.01); *A45C 3/001* (2013.01); *A45C 11/20* (2013.01);
(Continued)

(58) Field of Classification Search
CPC ......... A45C 11/20; A45C 13/008; A45F 3/02; A45F 3/04; A45F 2003/003; A45F 2003/045; F25D 3/08; F25D 2331/8011
(Continued)

(56) References Cited

U.S. PATENT DOCUMENTS 210,994 A 12/1878 Carnagy
430,944 A 6/1890 Hammerl
(Continued)

FOREIGN PATENT DOCUMENTS

AU 201614228 S 8/2016
AU 201614229 S 8/2016
(Continued)

OTHER PUBLICATIONS

Sep. 22, 2022—(EP) Second Office Action—App. No. 18830667.4.
(Continued)

*Primary Examiner* — Justin M Larson
(74) *Attorney, Agent, or Firm* — Banner & Witcoff, Ltd.

(57) ABSTRACT

An insulating device backpack may include an outer shell, a first sidewall defining a front portion of the insulating device backpack, and a second sidewall and a third sidewall defining side portions of the insulating device backpack, and a fourth sidewall defining a back portion of the insulating device backpack, an inner liner forming a storage compartment, an insulating layer positioned in between the outer shell and the inner liner, the insulating layer providing insulation for the storage compartment, and an opening configured to allow access to the storage compartment, and a closure adapted to seal the opening.

20 Claims, 62 Drawing Sheets

Related U.S. Application Data continuation of application No. 15/845,737, filed on Dec. 18, 2017, now Pat. No. 10,781,028, which is a continuation-in-part of application No. 15/451,064, filed on Mar. 6, 2017, now Pat. No. 10,143,282, which is a continuation-in-part of application No. 15/261,407, filed on Sep. 9, 2016, now Pat. No. 10,384,855, which is a continuation-in-part of application No. 15/154,626, filed on May 13, 2016, now Pat. No. 10,029,842, which is a continuation-in-part of application No. 14/831,641, filed on Aug. 20, 2015, now Pat. No. 9,796,517, which is a division of application No. 14/479,607, filed on Sep. 8, 2014, now Pat. No. 9,139,352.

(60) Provisional application No. 62/299,421, filed on Feb. 24, 2016, provisional application No. 62/299,402, filed on Feb. 24, 2016, provisional application No. 62/292,024, filed on Feb. 5, 2016, provisional application No. 61/937,310, filed on Feb. 7, 2014.

(51) Int. Cl.
| | |
|---|---|
| *B65D 25/20* | (2006.01) |
| *A45C 13/30* | (2006.01) |
| *A45C 13/26* | (2006.01) |
| *A45C 13/10* | (2006.01) |
| *A45C 13/00* | (2006.01) |
| *A45C 11/20* | (2006.01) |
| *B65D 25/18* | (2006.01) |
| *A45F 3/04* | (2006.01) |
| *B32B 37/18* | (2006.01) |
| *B32B 37/14* | (2006.01) |
| *B29C 65/02* | (2006.01) |
| *B29C 65/00* | (2006.01) |
| *B65D 25/28* | (2006.01) |
| *F25D 3/08* | (2006.01) |

(52) U.S. Cl.
CPC ............ *A45C 13/00* (2013.01); *A45C 13/008* (2013.01); *A45C 13/10* (2013.01); *A45C 13/103* (2013.01); *A45C 13/26* (2013.01); *A45C 13/30* (2013.01); *A45F 3/04* (2013.01); *B65D 25/18* (2013.01); *B65D 25/205* (2013.01); *B65D 81/3858* (2013.01); *B29C 65/02* (2013.01); *B29C 66/43* (2013.01); *B32B 37/142* (2013.01); *B32B 37/185* (2013.01); *B65D 25/2873* (2013.01); *F25D 3/08* (2013.01); *F25D 2331/801* (2013.01); *F25D 2331/8011* (2013.01); *Y10T 29/49826* (2015.01); *Y10T 29/49828* (2015.01)

(58) Field of Classification Search
USPC .................. D3/216, 217; 224/628
See application file for complete search history.

(56) References Cited

U.S. PATENT DOCUMENTS

| | | | |
|---|---|---|---|
| 1,512,549 A | 10/1924 | Labadie et al. | |
| 1,587,655 A | 6/1926 | Kidwell | |
| 1,895,278 A | 1/1933 | Crawford | |
| 1,949,677 A | 3/1934 | Crawford | |
| 2,119,621 A | 6/1938 | Ferrone | |
| 2,241,612 A | 5/1941 | Norris | |
| 2,253,598 A | 8/1941 | Africa | |
| 2,289,254 A | 7/1942 | Eagles | |
| 2,429,538 A | 10/1947 | Wood | |
| 2,522,381 A | 9/1950 | Kramer | |
| 2,556,066 A | 6/1951 | Cline | |
| 2,570,300 A | 10/1951 | Acton | |
| 2,575,191 A | 11/1951 | Seipp | |
| 2,575,893 A * | 11/1951 | Seaman | B65D 81/3886 383/110 |
| 2,623,566 A | 12/1952 | Kibler | |
| 2,633,223 A | 3/1953 | Zeamer | |
| 2,651,485 A | 9/1953 | Schutz | |
| 2,661,785 A | 12/1953 | Daust | |
| 2,685,385 A | 8/1954 | Kuss | |
| 2,808,093 A | 10/1957 | Gilman | |
| 2,883,041 A | 4/1959 | Pfeifer et al. | |
| 2,954,891 A | 10/1960 | Imber | |
| 2,960,136 A * | 11/1960 | Ziff | A45C 11/20 383/110 |
| 3,031,121 A | 4/1962 | Chase | |
| 3,035,733 A | 5/1962 | Knapp | |
| 3,066,846 A | 12/1962 | Domigan | |
| 3,157,303 A | 11/1964 | Siegel | |
| 3,203,517 A | 8/1965 | Stein | |
| 3,292,277 A * | 12/1966 | Teschon | A43B 7/14 36/71 |
| 3,454,197 A | 7/1969 | Thompson | |
| 3,455,359 A | 7/1969 | Schweizer | |
| 3,743,522 A | 7/1973 | Nagasawa et al. | |
| 3,801,425 A | 4/1974 | Cook | |
| 3,814,288 A | 6/1974 | Westrich | |
| 3,834,044 A * | 9/1974 | McAusland | A43B 5/0405 36/117.6 |
| 3,903,944 A | 9/1975 | Montgomery et al. | |
| 3,905,511 A | 9/1975 | Groendal | |
| 4,024,731 A | 5/1977 | Branscum | |
| 4,125,212 A | 11/1978 | Courchesne | |
| 4,127,155 A | 11/1978 | Hydom | |
| 4,143,695 A | 3/1979 | Hoehn | |
| 4,194,627 A | 3/1980 | Christensen | |
| 4,196,817 A | 4/1980 | Moser | |
| 4,197,890 A | 4/1980 | Simko | |
| 4,210,186 A | 7/1980 | Belenson | |
| 4,211,091 A | 7/1980 | Campbell | |
| 4,211,267 A | 7/1980 | Skovgaard | |
| 4,248,366 A | 2/1981 | Christiansen | |
| D265,948 S | 8/1982 | Stark | |
| 4,344,303 A | 8/1982 | Kelly, Jr. | |
| 4,372,453 A | 2/1983 | Branscum | |
| 4,375,828 A | 3/1983 | Biddison | |
| D268,879 S | 5/1983 | Outcalt | |
| 4,399,668 A | 8/1983 | Williamson | |
| 4,468,933 A | 9/1984 | Christopher | |
| 4,484,682 A | 11/1984 | Crow | |
| 4,513,895 A | 4/1985 | Leslie | |
| 4,515,421 A | 5/1985 | Steffes | |
| 4,521,910 A | 6/1985 | Keppel et al. | |
| 4,524,493 A | 6/1985 | Inamura | |
| 4,537,313 A | 8/1985 | Workman | |
| 4,541,540 A | 9/1985 | Gretz et al. | |
| D281,122 S | 10/1985 | Bomes et al. | |
| D281,546 S | 12/1985 | Bradshaw | |
| D281,646 S | 12/1985 | Bomes et al. | |
| D282,602 S | 2/1986 | Allen | |
| 4,571,338 A | 2/1986 | Okonogi et al. | |
| 4,595,101 A | 6/1986 | Rivera | |
| 4,596,370 A | 6/1986 | Adkins | |
| D284,620 S * | 7/1986 | Calton | D3/217 |
| 4,598,746 A | 7/1986 | Rabinowitz | |
| 4,637,063 A | 1/1987 | Sullivan et al. | |
| 4,648,121 A | 3/1987 | Lowe | |
| D289,128 S | 4/1987 | Bradshaw | |
| 4,673,117 A * | 6/1987 | Calton | A45F 4/02 224/259 |
| 4,679,242 A | 7/1987 | Brockhaus | |
| 4,708,254 A | 11/1987 | Byrns | |
| 4,746,028 A | 5/1988 | Bagg | |
| 4,759,077 A | 7/1988 | Leslie | |
| 4,765,476 A | 8/1988 | Lee | |
| 4,796,785 A | 1/1989 | Merritt | |
| 4,796,937 A | 1/1989 | Andrea | |
| 4,802,344 A | 2/1989 | Livingston et al. | |
| 4,802,602 A | 2/1989 | Evans et al. | |

(56) References Cited

U.S. PATENT DOCUMENTS

| | | | |
|---|---|---|---|
| 4,805,776 A * | 2/1989 | Namgyal | A45C 3/00 383/110 |
| 4,812,054 A | 3/1989 | Kirkendall | |
| 4,815,999 A | 3/1989 | Ayon et al. | |
| 4,817,769 A | 4/1989 | Saliba | |
| 4,825,514 A | 5/1989 | Akeno | |
| 4,826,060 A | 5/1989 | Hollingsworth | |
| 4,829,603 A | 5/1989 | Schnoor et al. | |
| 4,841,603 A | 6/1989 | Ragni | |
| 4,858,444 A | 8/1989 | Scott | |
| 4,867,214 A | 9/1989 | Fuller | |
| 4,871,069 A | 10/1989 | Guimont | |
| 4,886,183 A | 12/1989 | Fleming | |
| 4,941,603 A | 7/1990 | Creamer et al. | |
| 4,961,522 A | 10/1990 | Weber | |
| 4,966,279 A | 10/1990 | Pearcy | |
| 4,984,906 A | 1/1991 | Little | |
| 4,986,089 A | 1/1991 | Raab | |
| 4,989,418 A | 2/1991 | Hewlett | |
| 5,004,091 A | 4/1991 | Natho et al. | |
| 5,005,679 A | 4/1991 | Hjelle | |
| 5,035,029 A | 7/1991 | Horita et al. | |
| 5,042,664 A | 8/1991 | Shyr et al. | |
| 5,048,734 A | 9/1991 | Long | |
| 5,062,557 A | 11/1991 | Mahvi et al. | |
| 5,095,718 A | 3/1992 | Ormond et al. | |
| D328,550 S | 8/1992 | Mogil et al. | |
| 5,143,188 A | 9/1992 | Robinet | |
| 5,188,266 A | 2/1993 | Loulias | |
| 5,190,376 A | 3/1993 | Book | |
| 5,216,900 A | 6/1993 | Jones | |
| 5,221,016 A | 6/1993 | Karpal | |
| 5,237,838 A | 8/1993 | Merritt-Munson | |
| 5,244,136 A | 9/1993 | Collaso | |
| D339,979 S | 10/1993 | Wehrley | |
| D340,387 S | 10/1993 | Melk | |
| D340,621 S | 10/1993 | Melk | |
| 5,253,395 A | 10/1993 | Yano | |
| D340,840 S | 11/1993 | Melk | |
| 5,269,368 A | 12/1993 | Schneider et al. | |
| D343,992 S | 2/1994 | Melk | |
| 5,295,365 A | 3/1994 | Redford | |
| 5,297,870 A | 3/1994 | Weldon | |
| 5,313,807 A | 5/1994 | Owen | |
| D347,971 S | 6/1994 | Krugman | |
| 5,325,991 A | 7/1994 | Williams | |
| D349,428 S | 8/1994 | Krugman | |
| D351,533 S | 10/1994 | Lynam, Jr. | |
| 5,354,131 A | 10/1994 | Mogil | |
| 5,355,684 A | 10/1994 | Guice | |
| 5,398,848 A | 3/1995 | Padamsee | |
| 5,400,610 A | 3/1995 | Macedo | |
| 5,403,095 A * | 4/1995 | Melk | A45C 11/20 383/110 |
| 5,421,172 A | 6/1995 | Jones | |
| 5,447,764 A | 9/1995 | Langford | |
| 5,472,279 A | 12/1995 | Lin | |
| 5,490,396 A | 2/1996 | Morris | |
| 5,509,279 A * | 4/1996 | Brown | A45C 11/20 62/457.7 |
| 5,509,734 A | 4/1996 | Ausnit | |
| D370,599 S | 6/1996 | Christopher et al. | |
| D371,051 S | 6/1996 | Melk | |
| D371,052 S | 6/1996 | Melk | |
| 5,529,217 A | 6/1996 | Siegel | |
| D373,515 S | 9/1996 | Melk | |
| 5,553,759 A * | 9/1996 | McMaster | A45F 3/08 224/264 |
| D374,979 S | 10/1996 | Roberson et al. | |
| 5,562,228 A | 10/1996 | Ericson | |
| 5,564,568 A | 10/1996 | Rankin, Sr. | |
| 5,569,401 A | 10/1996 | Gilliland et al. | |
| 5,595,320 A | 1/1997 | Aghassipour | |
| 5,620,069 A | 4/1997 | Hurwitz | |
| D382,771 S * | 8/1997 | Mogil | D7/607 |
| D382,772 S | 8/1997 | Mogil | |
| D383,360 S | 9/1997 | Melk | |
| 5,680,944 A | 10/1997 | Rueter | |
| 5,680,958 A | 10/1997 | Mann et al. | |
| D386,310 S | 11/1997 | Smith | |
| 5,687,874 A | 11/1997 | Omori et al. | |
| D387,249 S | 12/1997 | Mogil | |
| D387,626 S | 12/1997 | Melk | |
| 5,706,969 A | 1/1998 | Yamada et al. | |
| 5,732,867 A * | 3/1998 | Perkins | A45F 3/08 224/628 |
| D394,553 S | 5/1998 | Lin | |
| D395,555 S | 6/1998 | Ursitti | |
| 5,758,513 A | 6/1998 | Smith | |
| 5,779,089 A | 7/1998 | West | |
| D397,273 S | 8/1998 | Collie | |
| 5,816,709 A | 10/1998 | Demus | |
| D401,063 S | 11/1998 | Yamamoto et al. | |
| 5,842,571 A | 12/1998 | Rausch | |
| 5,845,514 A | 12/1998 | Clarke et al. | |
| 5,848,734 A | 12/1998 | Melk | |
| 5,857,778 A | 1/1999 | Ells | |
| D409,375 S | 5/1999 | Santoro et al. | |
| D409,376 S * | 5/1999 | Golenz | D3/217 |
| 5,904,230 A | 5/1999 | Peterson | |
| 5,909,821 A | 6/1999 | Guridi | |
| 5,913,448 A | 6/1999 | Mann et al. | |
| 5,915,580 A | 6/1999 | Melk | |
| 5,931,583 A | 8/1999 | Collie | |
| D414,379 S * | 9/1999 | Haberkorn | D7/607 |
| 5,954,253 A * | 9/1999 | Swetish | A45F 3/08 224/628 |
| 5,955,948 A | 9/1999 | Howell | |
| 5,964,384 A | 10/1999 | Young | |
| 5,988,468 A | 11/1999 | Murdoch et al. | |
| 5,988,879 A | 11/1999 | Bredderman et al. | |
| 6,019,245 A | 2/2000 | Foster et al. | |
| 6,027,249 A | 2/2000 | Bielinski | |
| 6,029,847 A | 2/2000 | Mahoney, Jr. et al. | |
| 6,048,099 A * | 4/2000 | Muffett | A45C 11/20 383/110 |
| D424,417 S | 5/2000 | Axelsson | |
| 6,059,140 A | 5/2000 | Hicks | |
| 6,065,873 A | 5/2000 | Fowler | |
| 6,068,402 A | 5/2000 | Freese et al. | |
| 6,070,718 A | 6/2000 | Drabwell | |
| 6,073,796 A | 6/2000 | Mogil | |
| 6,082,589 A | 7/2000 | Ash et al. | |
| 6,082,896 A | 7/2000 | Pulli | |
| 6,089,038 A | 7/2000 | Tattam | |
| 6,092,266 A | 7/2000 | Lee | |
| 6,092,661 A * | 7/2000 | Mogil | A45C 11/20 150/112 |
| 6,105,214 A | 8/2000 | Press | |
| 6,113,268 A | 9/2000 | Thompson | |
| 6,116,045 A * | 9/2000 | Hodosh | F25D 3/08 62/457.7 |
| 6,128,915 A | 10/2000 | Wagner | |
| 6,129,254 A * | 10/2000 | Yu | A45F 3/04 190/110 |
| 6,139,188 A | 10/2000 | Marzano | |
| 6,145,715 A | 11/2000 | Slonim | |
| 6,149,305 A | 11/2000 | Fier | |
| D437,110 S * | 2/2001 | Ivarson | D3/217 |
| 6,193,034 B1 | 2/2001 | Fournier | |
| 6,209,343 B1 | 4/2001 | Owen | |
| 6,220,473 B1 | 4/2001 | Lehman et al. | |
| 6,234,677 B1 | 5/2001 | Mogil | |
| 6,237,776 B1 * | 5/2001 | Mogil | A45F 3/02 150/112 |
| 6,244,458 B1 | 6/2001 | Frysinger et al. | |
| 6,247,328 B1 * | 6/2001 | Mogil | A45C 7/0077 383/110 |
| 6,253,570 B1 | 7/2001 | Lustig | |
| 6,276,579 B1 | 8/2001 | DeLoach | |
| D447,632 S | 9/2001 | Gisser | |
| D447,667 S | 9/2001 | Schneider et al. | |
| 6,286,709 B1 | 9/2001 | Hudson | |

(56) References Cited

U.S. PATENT DOCUMENTS

| | | |
|---|---|---|
| 6,296,134 B1 | 10/2001 | Cardinale |
| 6,296,165 B1 | 10/2001 | Mears |
| 6,298,993 B1 | 10/2001 | Kalozdi |
| 6,336,342 B1 | 1/2002 | Zeddies |
| 6,336,577 B1 * | 1/2002 | Harris .................... A45F 3/04 383/110 |
| 6,347,706 B1 | 2/2002 | D'Ambrosio |
| 6,353,215 B1 | 3/2002 | Revels et al. |
| D455,934 S | 4/2002 | Culp et al. |
| 6,363,739 B1 | 4/2002 | Hodosh et al. |
| D457,307 S * | 5/2002 | Pukall ......................... D3/217 |
| 6,394,325 B1 | 5/2002 | Taylor |
| 6,409,066 B1 | 6/2002 | Schneider et al. |
| 6,422,032 B1 | 7/2002 | Greene |
| 6,427,294 B1 * | 8/2002 | Shibaike ................ A44B 19/32 24/381 |
| 6,439,389 B1 * | 8/2002 | Mogil ..................... A45F 3/02 206/217 |
| D464,235 S | 10/2002 | Jeong |
| D465,134 S | 11/2002 | Joss |
| 6,481,239 B2 | 11/2002 | Hodosh et al. |
| D466,291 S | 12/2002 | Ng |
| 6,495,194 B2 | 12/2002 | Sato et al. |
| 6,505,479 B2 | 1/2003 | Defelice et al. |
| 6,511,695 B1 | 1/2003 | Paquin et al. |
| 6,513,661 B1 | 2/2003 | Mogil |
| D472,431 S | 4/2003 | Spence, Jr. |
| 6,554,155 B1 | 4/2003 | Beggins |
| D474,649 S | 5/2003 | Spence, Jr. |
| 6,582,124 B2 | 6/2003 | Mogil |
| D476,481 S | 7/2003 | Gilbert |
| 6,595,687 B2 | 7/2003 | Godshaw et al. |
| D478,782 S | 8/2003 | Li |
| 6,604,649 B1 | 8/2003 | Campi |
| 6,605,311 B2 | 8/2003 | Villagran et al. |
| 6,619,447 B1 | 9/2003 | Garcia, III et al. |
| 6,626,342 B1 * | 9/2003 | Gleason .................... A45F 3/08 224/652 |
| 6,629,430 B2 | 10/2003 | Mills et al. |
| D482,241 S | 11/2003 | Tyler |
| 6,640,856 B1 | 11/2003 | Tucker |
| 6,652,933 B2 | 11/2003 | Hall |
| 6,655,543 B2 | 12/2003 | Beuke |
| D485,131 S | 1/2004 | Lanman et al. |
| D485,732 S | 1/2004 | Lanman et al. |
| D486,038 S | 2/2004 | Lanman et al. |
| 6,688,470 B2 | 2/2004 | Dege et al. |
| 6,729,758 B1 | 5/2004 | Carter |
| D491,354 S | 6/2004 | Chapelier |
| D492,160 S | 6/2004 | Lanman et al. |
| D497,518 S | 10/2004 | Bellofatto, Jr. et al. |
| 6,799,693 B2 | 10/2004 | Meza |
| D498,924 S | 11/2004 | Karl |
| D501,600 S | 2/2005 | Guyon |
| D502,599 S | 3/2005 | Cabana et al. |
| D503,279 S | 3/2005 | Smith |
| 6,874,356 B2 | 4/2005 | Kornfeldt et al. |
| D506,645 S | 6/2005 | Bellofatto, Jr. et al. |
| 6,925,834 B2 | 8/2005 | Fuchs |
| D512,274 S | 12/2005 | Cabey |
| D515,362 S | 2/2006 | Chan |
| D516,099 S | 2/2006 | Maruyama |
| D516,870 S | 3/2006 | Martinez et al. |
| D517,801 S | 3/2006 | Woo |
| D520,306 S | 5/2006 | Peterson |
| D522,811 S | 6/2006 | Martinez et al. |
| D523,243 S | 6/2006 | Nashmy |
| D527,226 S | 8/2006 | Maldonado |
| D530,089 S | 10/2006 | Silverman |
| 7,153,025 B1 | 12/2006 | Jackson et al. |
| D534,352 S | 1/2007 | Delafontaine |
| D534,771 S | 1/2007 | Zorn |
| D535,099 S * | 1/2007 | Johansson .................. D3/276 |
| D535,820 S | 1/2007 | Kamiya |
| 7,160,028 B1 | 1/2007 | Linday |
| 7,162,890 B2 | 1/2007 | Mogil et al. |
| 7,172,101 B2 | 2/2007 | Find |
| D539,033 S | 3/2007 | Cassegrain |
| D540,037 S | 4/2007 | Newson |
| 7,201,285 B2 | 4/2007 | Beggins |
| 7,207,716 B2 | 4/2007 | Buchanan et al. |
| 7,219,814 B2 | 5/2007 | Lown et al. |
| 7,240,513 B1 | 7/2007 | Conforti |
| D547,941 S * | 8/2007 | Lucena ........................ D3/217 |
| D548,459 S | 8/2007 | Harvey |
| 7,252,213 B1 | 8/2007 | DeSanto |
| D550,448 S | 9/2007 | Boje et al. |
| 7,264,134 B2 | 9/2007 | Tulp |
| D557,667 S | 12/2007 | Kawamura et al. |
| 7,302,810 B2 | 12/2007 | McCrory |
| D560,102 S | 1/2008 | Sumter |
| 7,313,927 B2 | 1/2008 | Barker |
| 7,344,028 B2 | 3/2008 | Hanson |
| D566,484 S | 4/2008 | George |
| 7,353,952 B2 | 4/2008 | Swartz et al. |
| D570,603 S | 6/2008 | Wu et al. |
| D573,422 S | 7/2008 | Tagliati et al. |
| D574,667 S | 8/2008 | Grabijas, III et al. |
| D578,401 S | 10/2008 | Perry et al. |
| D582,151 S | 12/2008 | Gonzalez |
| D583,152 S | 12/2008 | Keeney |
| 7,481,065 B2 | 1/2009 | Krieger |
| D587,010 S | 2/2009 | Deck |
| 7,527,430 B2 | 5/2009 | Suskind |
| D598,194 S | 8/2009 | Turvey et al. |
| D599,550 S | 9/2009 | Turvey et al. |
| 7,581,886 B2 | 9/2009 | Nitti |
| 7,597,478 B2 | 10/2009 | Pruchnicki et al. |
| D603,606 S | 11/2009 | Wang |
| 7,634,919 B2 | 12/2009 | Bernhard, Jr. et al. |
| D607,697 S | 1/2010 | Whitlock et al. |
| D608,095 S | 1/2010 | Turvey et al. |
| D608,096 S | 1/2010 | Noble |
| D608,159 S | 1/2010 | Whitlock et al. |
| D610,795 S | 3/2010 | Dejadon |
| D611,706 S | 3/2010 | Angles et al. |
| D612,605 S | 3/2010 | Turvey et al. |
| 7,669,436 B2 | 3/2010 | Mogil et al. |
| 7,677,406 B2 | 3/2010 | Maxson |
| 7,682,080 B2 | 3/2010 | Mogil |
| D617,560 S | 6/2010 | Wu |
| 7,730,739 B2 | 6/2010 | Fuchs |
| D618,966 S | 7/2010 | Koehler et al. |
| D619,423 S | 7/2010 | Koehler et al. |
| D619,854 S | 7/2010 | Koehler et al. |
| D619,855 S | 7/2010 | Koehler et al. |
| 7,757,878 B2 | 7/2010 | Mogil et al. |
| 7,762,294 B2 | 7/2010 | Wang |
| D620,707 S | 8/2010 | Mogil |
| D620,708 S | 8/2010 | Sanz |
| D621,609 S | 8/2010 | Hasty |
| 7,775,388 B2 | 8/2010 | Murrer, III |
| 7,784,759 B2 | 8/2010 | Farrell |
| 7,791,003 B2 | 9/2010 | Lockhart et al. |
| 7,811,620 B2 | 10/2010 | Merrill et al. |
| 7,815,069 B1 | 10/2010 | Bellofatto et al. |
| D626,329 S | 11/2010 | Chapelier |
| D627,199 S | 11/2010 | Pruchnicki |
| 7,841,207 B2 | 11/2010 | Mogil et al. |
| D629,612 S | 12/2010 | Weldon |
| D630,844 S | 1/2011 | Wang et al. |
| 7,874,177 B2 | 1/2011 | Azamy |
| 7,886,936 B2 | 2/2011 | Helline |
| 7,900,816 B2 | 3/2011 | Kastanek et al. |
| D638,220 S | 5/2011 | Chu et al. |
| D642,870 S | 8/2011 | Whitlock et al. |
| 7,988,006 B2 | 8/2011 | Mogil et al. |
| D645,662 S | 9/2011 | Perez |
| 8,016,090 B2 | 9/2011 | McCoy et al. |
| 3,043,004 A1 | 10/2011 | Mogil |
| D648,532 S | 11/2011 | Sosnovsky |
| 8,061,159 B2 | 11/2011 | Mogil et al. |
| D650,169 S | 12/2011 | Klifa |
| 8,079,451 B2 | 12/2011 | Rothschild et al. |

(56) References Cited

U.S. PATENT DOCUMENTS

| | | |
|---|---|---|
| 8,096,442 B2 | 1/2012 | Ramundi |
| D659,998 S | 5/2012 | Austin |
| 8,176,749 B2 | 5/2012 | LaMere et al. |
| D662,316 S * | 6/2012 | Nitkin .............................. D3/217 |
| 8,191,747 B2 | 6/2012 | Pruchnicki |
| D664,261 S | 7/2012 | Kravitz et al. |
| 8,209,995 B2 | 7/2012 | Kieling et al. |
| D666,896 S | 9/2012 | Pinholster, Jr. et al. |
| D667,043 S | 9/2012 | Couch, III |
| 8,281,950 B2 | 10/2012 | Potts et al. |
| 8,292,119 B2 | 10/2012 | Kenneally |
| 8,302,749 B2 | 11/2012 | Melmon et al. |
| 8,327,659 B2 | 12/2012 | Winkler et al. |
| D673,363 S | 1/2013 | Crandall |
| D673,772 S | 1/2013 | Munson et al. |
| D674,246 S | 1/2013 | Scott et al. |
| D674,664 S | 1/2013 | Collie |
| 8,424,319 B2 | 4/2013 | Whewell, Jr. |
| 8,424,713 B2 | 4/2013 | Bolland |
| 8,430,284 B2 | 4/2013 | Broadbent et al. |
| D682,635 S | 5/2013 | Boroski |
| D684,767 S | 6/2013 | Gerbi |
| 8,453,899 B1 | 6/2013 | Calkin |
| D686,412 S | 7/2013 | Guichot |
| 8,474,640 B2 | 7/2013 | Armstrong |
| 8,516,848 B2 | 8/2013 | White et al. |
| D690,100 S | 9/2013 | Alfaks |
| 8,544,678 B1 | 10/2013 | Hughes |
| 8,573,002 B2 | 11/2013 | Ledoux et al. |
| D695,568 S | 12/2013 | Hayes |
| 8,622,235 B2 | 1/2014 | Suchecki |
| D699,940 S | 2/2014 | Robert |
| D699,941 S | 2/2014 | Robert |
| 8,646,970 B2 | 2/2014 | Mogil |
| D701,041 S | 3/2014 | Burnett |
| D703,946 S | 5/2014 | Tweedie |
| 8,720,681 B1 | 5/2014 | Hancock et al. |
| 8,720,739 B2 | 5/2014 | Bollis |
| 8,777,045 B2 | 7/2014 | Mitchell et al. |
| D710,085 S | 8/2014 | Szewczyk |
| D711,096 S | 8/2014 | Hanna |
| D711,100 S | 8/2014 | Dingizian |
| D712,555 S | 9/2014 | Berg |
| 8,827,109 B1 | 9/2014 | Sheehan |
| 8,844,756 B2 | 9/2014 | Beyburg |
| D715,544 S | 10/2014 | Levine |
| 8,857,654 B2 | 10/2014 | Mogil et al. |
| D717,041 S | 11/2014 | Pulliam |
| D718,053 S | 11/2014 | McFreen |
| 8,875,964 B1 * | 11/2014 | Vanderberg .............. A45C 5/06 |
| | | 220/666 |
| 8,893,940 B2 * | 11/2014 | Green ....................... A45F 3/08 |
| | | 224/604 |
| D718,931 S | 12/2014 | Brundl |
| D719,303 S | 12/2014 | Anderson |
| 8,899,071 B2 | 12/2014 | Mogil et al. |
| D723,804 S | 3/2015 | Coleman |
| D725,908 S | 4/2015 | Zwetzig |
| D728,942 S | 5/2015 | Byham |
| D732,295 S | 6/2015 | Aafjes |
| D732,348 S | 6/2015 | Seiders et al. |
| D732,349 S | 6/2015 | Seiders et al. |
| D732,350 S | 6/2015 | Seiders et al. |
| D732,899 S * | 6/2015 | Seiders .......................... D3/246 |
| D734,643 S | 7/2015 | Boroski |
| D734,992 S | 7/2015 | Boroski |
| 9,084,463 B2 | 7/2015 | Merrill |
| D738,108 S | 9/2015 | Adler et al. |
| D739,654 S | 9/2015 | Brouard |
| 9,138,033 B2 | 9/2015 | Kojima et al. |
| 9,139,352 B2 * | 9/2015 | Seiders .............. B65D 81/3858 |
| 9,146,051 B2 | 9/2015 | Karnin et al. |
| D743,699 S | 11/2015 | Wieden |
| D744,786 S | 12/2015 | Bagwell |
| D747,104 S | 1/2016 | Ford |
| 9,226,558 B2 | 1/2016 | Armstrong |
| D749,653 S | 2/2016 | Carnes |
| D750,140 S | 2/2016 | Cross |
| 9,254,022 B2 | 2/2016 | Meldeau et al. |
| 9,254,023 B2 | 2/2016 | Su et al. |
| 9,265,318 B1 | 2/2016 | Williams et al. |
| D752,347 S | 3/2016 | Seiders et al. |
| 9,271,553 B2 | 3/2016 | Ponx |
| 9,272,475 B2 | 3/2016 | Ranade et al. |
| 9,290,313 B2 | 3/2016 | De Lesseux et al. |
| D752,860 S | 4/2016 | Barilaro et al. |
| 9,307,814 B2 | 4/2016 | Pulliam |
| 9,314,069 B2 | 4/2016 | Takazawa |
| D756,109 S | 5/2016 | Hayashi |
| D756,638 S | 5/2016 | Frisoni |
| 9,366,467 B2 | 6/2016 | Kiedaisch et al. |
| 9,375,061 B2 | 6/2016 | Mosee |
| D760,494 S | 7/2016 | Harvey-Pankey |
| D761,561 S | 7/2016 | Cheng |
| D762,378 S | 8/2016 | Domotor et al. |
| D762,384 S | 8/2016 | Boroski |
| D763,570 S | 8/2016 | Potts |
| D764,791 S | 8/2016 | Patel |
| D764,873 S * | 8/2016 | Collie ............................ D7/607 |
| 9,408,445 B2 | 8/2016 | Mogil et al. |
| D765,395 S | 9/2016 | Sanz |
| D765,967 S | 9/2016 | Boroski |
| D766,571 S | 9/2016 | Boroski |
| D768,981 S * | 10/2016 | Kliot ............................. D3/217 |
| D768,987 S | 10/2016 | Blumenfeld |
| D769,616 S | 10/2016 | Keene |
| D770,761 S | 11/2016 | Deioma et al. |
| D770,763 S | 11/2016 | Joo et al. |
| D771,372 S | 11/2016 | Kelly et al. |
| D772,562 S | 11/2016 | Petre |
| D773,813 S | 12/2016 | Jakubowski |
| 9,521,883 B2 * | 12/2016 | Matsumoto ............ A44B 19/34 |
| 9,545,134 B1 | 1/2017 | Tan |
| D778,045 S | 2/2017 | Ruddis |
| D778,609 S | 2/2017 | Gardner et al. |
| D782,820 S | 4/2017 | Thompson |
| D783,272 S | 4/2017 | Burton et al. |
| D784,010 S | 4/2017 | Dumas |
| 9,630,750 B2 | 4/2017 | Gardner et al. |
| D785,325 S | 5/2017 | Samrelius et al. |
| D785,930 S | 5/2017 | Sassi |
| D786,559 S | 5/2017 | Seiders et al. |
| D786,560 S | 5/2017 | Seiders et al. |
| D786,561 S | 5/2017 | Seiders et al. |
| D786,562 S | 5/2017 | Seiders et al. |
| D787,187 S | 5/2017 | Seiders et al. |
| D789,080 S | 6/2017 | Caffagni |
| D789,081 S | 6/2017 | Sassi |
| D789,082 S | 6/2017 | Barilaro et al. |
| D792,167 S | 7/2017 | Bradley |
| D792,486 S | 7/2017 | Li et al. |
| D793,089 S | 8/2017 | Jackson |
| D796,185 S | 9/2017 | Masten |
| D797,454 S | 9/2017 | Seiders et al. |
| D797,455 S | 9/2017 | Seiders et al. |
| D798,670 S | 10/2017 | Seiders et al. |
| D799,276 S | 10/2017 | Seiders et al. |
| D799,277 S | 10/2017 | Seiders et al. |
| D799,823 S | 10/2017 | Schartle |
| D799,905 S | 10/2017 | Seiders et al. |
| D800,443 S | 10/2017 | Burton et al. |
| D800,444 S | 10/2017 | Burton et al. |
| D801,123 S | 10/2017 | Seiders et al. |
| 9,796,517 B2 * | 10/2017 | Seiders .............. B65D 81/3858 |
| D802,028 S | 11/2017 | Li |
| D802,029 S | 11/2017 | Li |
| D802,373 S | 11/2017 | Seiders et al. |
| D802,630 S | 11/2017 | Li et al. |
| 9,809,376 B2 | 11/2017 | Mitchell et al. |
| D805,851 S | 12/2017 | Sullivan et al. |
| 9,840,178 B2 | 12/2017 | Baker |
| D808,157 S | 1/2018 | Viger et al. |
| D808,173 S | 1/2018 | Seiders et al. |
| D808,175 S | 1/2018 | Seiders et al. |

(56) References Cited

U.S. PATENT DOCUMENTS

| | | | |
|---|---|---|---|
| D808,655 S | 1/2018 | Seiders et al. | |
| D808,730 S | 1/2018 | Sullivan et al. | |
| D809,869 S | 2/2018 | Seiders et al. | |
| D811,082 S | 2/2018 | Lehan | |
| 9,901,153 B2 | 2/2018 | Nash | |
| D811,746 S | 3/2018 | Seiders et al. | |
| D813,539 S | 3/2018 | Van Assche | |
| 9,907,369 B2 * | 3/2018 | Kelly | A45F 4/00 |
| D814,879 S * | 4/2018 | Larson | D7/607 |
| D815,496 S | 4/2018 | Larson et al. | |
| 9,943,150 B2 | 4/2018 | Morrow | |
| D817,106 S * | 5/2018 | Larson | D7/607 |
| D817,107 S * | 5/2018 | Larson | D7/607 |
| D817,722 S | 5/2018 | Bradley | |
| D818,707 S | 5/2018 | Severs et al. | |
| 9,981,780 B2 | 5/2018 | Delasalle | |
| D819,966 S | 6/2018 | Yu | |
| D819,967 S | 6/2018 | Carter et al. | |
| D821,094 S | 6/2018 | Dragicevic | |
| D821,825 S | 7/2018 | Sullivan et al. | |
| D822,987 S | 7/2018 | Seiders et al. | |
| D822,997 S | 7/2018 | Seiders et al. | |
| D822,998 S | 7/2018 | Seiders et al. | |
| D822,999 S | 7/2018 | Seiders et al. | |
| D823,601 S | 7/2018 | Seiders et al. | |
| D823,602 S | 7/2018 | Seiders et al. | |
| 10,010,146 B2 | 7/2018 | Moore | |
| 10,010,162 B1 | 7/2018 | Woods et al. | |
| 10,029,842 B2 | 7/2018 | Seiders et al. | |
| D824,660 S * | 8/2018 | Ross | D3/217 |
| D824,666 S | 8/2018 | Carter et al. | |
| D824,671 S | 8/2018 | Pennington | |
| D824,731 S | 8/2018 | Sullivan et al. | |
| D827,299 S | 9/2018 | Vickery | |
| D828,112 S | 9/2018 | Furneaux et al. | |
| D828,728 S * | 9/2018 | Jacobsen | D7/607 |
| D829,244 S | 9/2018 | Sullivan et al. | |
| D830,048 S | 10/2018 | McQueeny | |
| D830,132 S | 10/2018 | Sullivan et al. | |
| D830,133 S | 10/2018 | Sullivan et al. | |
| D830,134 S | 10/2018 | Sullivan et al. | |
| D832,653 S * | 11/2018 | Waskow | D7/607 |
| 10,138,048 B2 | 11/2018 | Mitchell et al. | |
| D834,815 S | 12/2018 | Barlier | |
| D834,817 S | 12/2018 | Hoppe et al. | |
| D834,895 S * | 12/2018 | Triska | D3/216 |
| D835,473 S | 12/2018 | Jacobsen | |
| D835,949 S | 12/2018 | Triska et al. | |
| D835,950 S | 12/2018 | Jacobsen | |
| 10,143,282 B2 | 12/2018 | Seiders et al. | |
| 10,154,714 B2 | 12/2018 | Wang | |
| D836,996 S | 1/2019 | Jacobsen | |
| D836,997 S | 1/2019 | Jacobsen | |
| D836,998 S * | 1/2019 | Jacobsen | D7/607 |
| D836,999 S | 1/2019 | Jacobsen | |
| D837,000 S | 1/2019 | Jacobsen | |
| D837,001 S | 1/2019 | Jacobsen | |
| D838,978 S | 1/2019 | Lee | |
| D839,682 S | 2/2019 | Jacobsen | |
| D840,194 S * | 2/2019 | Furneaux | D7/607 |
| D840,689 S * | 2/2019 | Seiders | D3/327 |
| D840,761 S | 2/2019 | Seiders et al. | |
| D840,762 S | 2/2019 | Seiders et al. | |
| D840,763 S | 2/2019 | Seiders et al. | |
| D840,764 S | 2/2019 | Seiders et al. | |
| D841,325 S | 2/2019 | Buynar | |
| D842,048 S | 3/2019 | Wells | |
| 10,226,110 B2 | 3/2019 | Hayashi | |
| D844,321 S | 4/2019 | Li | |
| D844,975 S * | 4/2019 | Munie | D3/217 |
| D844,976 S * | 4/2019 | Munie | D3/217 |
| D844,977 S * | 4/2019 | Munie | D3/217 |
| D844,978 S * | 4/2019 | Munie | D3/217 |
| D844,979 S * | 4/2019 | Munie | D3/217 |
| D844,992 S | 4/2019 | Seiders et al. | |
| D845,625 S | 4/2019 | Barlier | |
| D846,275 S | 4/2019 | Barlier | |
| 10,244,841 B2 | 4/2019 | Hayashi | |
| D847,500 S | 5/2019 | Lagerfeld | |
| D847,501 S | 5/2019 | Carter et al. | |
| D848,219 S * | 5/2019 | Munie | D3/216 |
| D848,220 S * | 5/2019 | Munie | D3/216 |
| D848,221 S * | 5/2019 | Munie | D3/216 |
| D848,222 S * | 5/2019 | Munie | D3/216 |
| D848,223 S * | 5/2019 | Munie | D3/216 |
| D848,798 S * | 5/2019 | Munie | D3/216 |
| D849,398 S | 5/2019 | Tan | |
| D849,406 S | 5/2019 | Dehmoubed et al. | |
| D849,486 S * | 5/2019 | Munie | D3/216 |
| 10,279,980 B2 | 5/2019 | James, Jr. | |
| D850,107 S | 6/2019 | Dehmoubed et al. | |
| D851,404 S | 6/2019 | Seiders et al. | |
| D851,937 S | 6/2019 | Fuller | |
| 10,314,377 B2 | 6/2019 | Stephens | |
| 10,322,867 B2 | 6/2019 | Furneaux et al. | |
| D853,201 S | 7/2019 | Collie | |
| D853,728 S | 7/2019 | Seiders et al. | |
| D855,982 S | 8/2019 | McGinn | |
| 10,384,855 B2 | 8/2019 | Seiders et al. | |
| D859,812 S | 9/2019 | Seiders et al. | |
| D859,813 S | 9/2019 | Seiders et al. | |
| D859,814 S | 9/2019 | Seiders et al. | |
| D859,815 S | 9/2019 | Seiders et al. | |
| D859,934 S | 9/2019 | Seiders et al. | |
| D860,634 S | 9/2019 | Seiders et al. | |
| 10,413,030 B1 | 9/2019 | Douglas et al. | |
| D861,335 S | 10/2019 | Barlier | |
| D861,338 S | 10/2019 | Seiders et al. | |
| D862,065 S | 10/2019 | Boys et al. | |
| D862,177 S | 10/2019 | Seiders et al. | |
| D862,528 S | 10/2019 | Sullivan et al. | |
| D866,186 S | 11/2019 | Seiders et al. | |
| D867,823 S | 11/2019 | Jacobsen | |
| D868,544 S | 12/2019 | Lin et al. | |
| D869,146 S | 12/2019 | Jacobsen | |
| D871,074 S | 12/2019 | Seiders et al. | |
| D871,765 S | 1/2020 | Seiders et al. | |
| D872,993 S | 1/2020 | Gu | |
| D873,022 S | 1/2020 | Seip et al. | |
| D877,514 S | 3/2020 | Seiders et al. | |
| 10,575,599 B2 * | 3/2020 | Cheng | A44B 19/26 |
| D880,254 S | 4/2020 | Jacobsen | |
| D880,862 S | 4/2020 | Seiders et al. | |
| D881,561 S | 4/2020 | He | |
| D882,956 S | 5/2020 | Seiders et al. | |
| D886,537 S | 6/2020 | Jacobsen | |
| D886,538 S | 6/2020 | Jacobsen | |
| D886,539 S | 6/2020 | Jacobsen | |
| D887,699 S | 6/2020 | Bullock et al. | |
| 10,736,391 B2 | 8/2020 | Seiders et al. | |
| D894,692 S | 9/2020 | Herold | |
| D896,039 S | 9/2020 | Seiders et al. | |
| D896,510 S | 9/2020 | Wen | |
| D896,591 S | 9/2020 | Seiders et al. | |
| 10,781,028 B2 * | 9/2020 | Munie | A45C 3/001 |
| D897,780 S | 10/2020 | Seiders et al. | |
| D899,197 S | 10/2020 | Seiders et al. | |
| D899,865 S | 10/2020 | Shi | |
| 10,806,225 B2 | 10/2020 | Sitnikova | |
| D902,664 S * | 11/2020 | Munie | D7/605 |
| 10,827,808 B2 | 11/2020 | Seiders et al. | |
| D903,305 S | 12/2020 | Sullivan et al. | |
| D904,011 S | 12/2020 | Sullivan et al. | |
| D904,031 S | 12/2020 | Chandler | |
| D904,758 S | 12/2020 | Bullock et al. | |
| D904,830 S | 12/2020 | Meda et al. | |
| D906,058 S | 12/2020 | Sullivan et al. | |
| D907,968 S | 1/2021 | Sullivan et al. | |
| D907,969 S | 1/2021 | Sullivan et al. | |
| D909,063 S | 2/2021 | Loudenslager et al. | |
| D910,382 S | 2/2021 | Rane et al. | |
| 10,952,522 B2 * | 3/2021 | D'Alessandro | A45F 3/047 |
| 10,981,716 B2 | 4/2021 | Seiders et al. | |
| D918,570 S | 5/2021 | Seiders et al. | |

(56) References Cited

U.S. PATENT DOCUMENTS

| | | | |
|---|---|---|---|
| D918,571 S | 5/2021 | Davis | |
| D919,298 S | 5/2021 | Munie | |
| D919,375 S | 5/2021 | Seiders et al. | |
| D919,376 S | 5/2021 | Seiders et al. | |
| D920,677 S | 6/2021 | Tertoolen | |
| D920,678 S | 6/2021 | Seiders et al. | |
| D921,440 S * | 6/2021 | Munie | D3/216 |
| D922,149 S * | 6/2021 | Munie | D3/216 |
| D922,150 S * | 6/2021 | Munie | D3/216 |
| D922,151 S * | 6/2021 | Munie | D3/216 |
| D922,828 S * | 6/2021 | Munie | D3/216 |
| D923,323 S | 6/2021 | Seiders et al. | |
| D926,532 S * | 8/2021 | Munie | D7/607 |
| D927,262 S * | 8/2021 | Munie | D3/216 |
| D931,614 S | 9/2021 | Seiders et al. | |
| D935,175 S | 11/2021 | Rogers et al. | |
| 11,407,579 B2 * | 8/2022 | Munie | B65D 81/3858 |
| 2002/0012480 A1 | 1/2002 | Konno | |
| 2002/0038811 A1 * | 4/2002 | Vigny | A45F 3/04 224/650 |
| 2002/0197369 A1 | 12/2002 | Modler | |
| 2003/0070447 A1 | 4/2003 | Tanaka | |
| 2003/0080133 A1 | 5/2003 | Butler | |
| 2003/0106895 A1 | 6/2003 | Kalal | |
| 2003/0106910 A1 | 6/2003 | Hicks et al. | |
| 2003/0110599 A1 * | 6/2003 | Wang | A44B 19/40 24/396 |
| 2003/0136702 A1 | 7/2003 | Redzisz et al. | |
| 2003/0149461 A1 * | 8/2003 | Johnson | F25D 3/08 607/108 |
| 2003/0175394 A1 | 9/2003 | Modler | |
| 2004/0004111 A1 | 1/2004 | Cardinale | |
| 2004/0028296 A1 | 2/2004 | Meli | |
| 2004/0035143 A1 * | 2/2004 | Mogil | A45C 13/02 383/110 |
| 2004/0074936 A1 | 4/2004 | McDonald | |
| 2004/0094589 A1 | 5/2004 | Fricano | |
| 2004/0136621 A1 | 7/2004 | Mogil | |
| 2004/0144783 A1 | 7/2004 | Anderson et al. | |
| 2004/0149600 A1 | 8/2004 | Wolter et al. | |
| 2004/0164084 A1 | 8/2004 | Cooper | |
| 2004/0237266 A1 | 12/2004 | Wang | |
| 2005/0016895 A1 | 1/2005 | Glenn | |
| 2005/0034947 A1 | 2/2005 | Nykoluk | |
| 2005/0040199 A1 * | 2/2005 | Lemens | A45F 3/14 224/259 |
| 2005/0045520 A1 | 3/2005 | Johnson | |
| 2005/0045521 A1 | 3/2005 | Johnson et al. | |
| 2005/0056669 A1 | 3/2005 | Lavelle | |
| 2005/0072181 A1 | 4/2005 | Mogil et al. | |
| 2005/0133399 A1 | 6/2005 | Fidrych | |
| 2005/0155891 A1 | 7/2005 | Chen | |
| 2005/0183446 A1 | 8/2005 | Fuchs | |
| 2005/0196510 A1 | 9/2005 | Walters | |
| 2005/0205459 A1 | 9/2005 | Mogil et al. | |
| 2005/0262871 A1 | 12/2005 | Bailey-Weston | |
| 2005/0263528 A1 * | 12/2005 | Maldonado | A45C 11/20 220/592.2 |
| 2005/0279124 A1 * | 12/2005 | Maldonado | F25D 3/08 220/592.2 |
| 2006/0007266 A1 | 1/2006 | Silverbrook | |
| 2006/0010660 A1 | 1/2006 | Stenhall | |
| 2006/0021376 A1 * | 2/2006 | Scroggs | F25D 3/08 62/457.7 |
| 2006/0102497 A1 | 5/2006 | Wulf | |
| 2006/0151533 A1 | 7/2006 | Simunovic et al. | |
| 2006/0201979 A1 | 9/2006 | Achilles | |
| 2006/0239593 A1 | 10/2006 | Fidrych | |
| 2006/0240159 A1 | 10/2006 | Cash et al. | |
| 2006/0248902 A1 | 11/2006 | Hunnell | |
| 2006/0289586 A1 | 12/2006 | Gregory | |
| 2007/0006430 A1 | 1/2007 | Issler | |
| 2007/0012593 A1 | 1/2007 | Kitchens et al. | |
| 2007/0017942 A1 * | 1/2007 | Hubbell | A45F 3/00 224/652 |
| 2007/0148305 A1 | 6/2007 | Sherwood et al. | |
| 2007/0148307 A1 | 6/2007 | Sherwood et al. | |
| 2007/0164063 A1 * | 7/2007 | Concepcion | A45C 15/00 224/650 |
| 2007/0199966 A1 | 8/2007 | Korchmar | |
| 2007/0215663 A1 | 9/2007 | Chongson et al. | |
| 2007/0217187 A1 | 9/2007 | Blakely et al. | |
| 2007/0221693 A1 | 9/2007 | Moore | |
| 2007/0237432 A1 | 10/2007 | Mogil | |
| 2007/0261977 A1 | 11/2007 | Sakai | |
| 2007/0274613 A1 * | 11/2007 | Pruchnicki | A45C 7/0077 383/110 |
| 2007/0278234 A1 | 12/2007 | Mogil | |
| 2007/0290816 A1 | 12/2007 | Bedard | |
| 2008/0038424 A1 | 2/2008 | Krusemann | |
| 2008/0073364 A1 | 3/2008 | Simmons | |
| 2008/0105282 A1 | 5/2008 | Fernholz et al. | |
| 2008/0116697 A1 | 5/2008 | D'Ambrosio | |
| 2008/0128421 A1 | 6/2008 | Ulbrand et al. | |
| 2008/0142518 A1 | 6/2008 | Maistrellis | |
| 2008/0160149 A1 | 7/2008 | Nasrallah et al. | |
| 2008/0164265 A1 | 7/2008 | Conforti | |
| 2008/0178865 A1 | 7/2008 | Retterer | |
| 2008/0189918 A1 | 8/2008 | Kusayama | |
| 2008/0245096 A1 | 10/2008 | Hanson et al. | |
| 2008/0260303 A1 | 10/2008 | De Lesseux et al. | |
| 2008/0264925 A1 | 10/2008 | Lockhart et al. | |
| 2008/0305235 A1 | 12/2008 | Gao et al. | |
| 2009/0029109 A1 | 1/2009 | Seth et al. | |
| 2009/0052809 A1 | 2/2009 | Sampson | |
| 2009/0080808 A1 | 3/2009 | Hagen | |
| 2009/0095757 A1 | 4/2009 | Ramundi | |
| 2009/0242619 A1 | 10/2009 | Blomberg | |
| 2009/0280229 A1 | 11/2009 | Constantine et al. | |
| 2009/0301511 A1 | 12/2009 | Vinci | |
| 2009/0311378 A1 | 12/2009 | Wilaschin et al. | |
| 2009/0317514 A1 | 12/2009 | Sizer | |
| 2010/0005827 A1 | 1/2010 | Winkler | |
| 2010/0047423 A1 | 2/2010 | Kruesemann et al. | |
| 2010/0059199 A1 | 3/2010 | Court | |
| 2010/0071395 A1 | 3/2010 | Ledoux et al. | |
| 2010/0075006 A1 | 3/2010 | Semenza | |
| 2010/0102057 A1 | 4/2010 | Long | |
| 2010/0108694 A1 | 5/2010 | Sedlbauer et al. | |
| 2010/0125982 A1 * | 5/2010 | Chou | A44B 19/32 24/397 |
| 2010/0136203 A1 | 6/2010 | Sakata et al. | |
| 2010/0143567 A1 | 6/2010 | Ye et al. | |
| 2010/0224660 A1 | 9/2010 | Gleason | |
| 2010/0269311 A1 | 10/2010 | Jacobsen | |
| 2010/0284631 A1 | 11/2010 | Lee | |
| 2010/0284634 A1 | 11/2010 | Hadley | |
| 2011/0003975 A1 | 1/2011 | Arase et al. | |
| 2011/0005042 A1 | 1/2011 | Thomas et al. | |
| 2011/0005739 A1 | 1/2011 | Finney et al. | |
| 2011/0030415 A1 | 2/2011 | Breyburg et al. | |
| 2011/0097442 A1 | 4/2011 | Harju et al. | |
| 2011/0108562 A1 | 5/2011 | Lyons | |
| 2011/0155611 A1 | 6/2011 | Armstrong | |
| 2011/0167863 A1 | 7/2011 | Herrbold | |
| 2011/0182532 A1 | 7/2011 | Baltus | |
| 2011/0191933 A1 | 8/2011 | Gregory et al. | |
| 2011/0284601 A1 | 11/2011 | Pullin | |
| 2011/0311166 A1 | 12/2011 | Pascua | |
| 2012/0106130 A1 | 5/2012 | Beaudette | |
| 2012/0137637 A1 | 6/2012 | Gillis | |
| 2012/0180184 A1 | 7/2012 | Crye | |
| 2012/0181211 A1 | 7/2012 | Charlebois | |
| 2012/0187138 A1 | 7/2012 | Vasquez et al. | |
| 2012/0261445 A1 * | 10/2012 | Demskey | A45F 3/14 224/259 |
| 2012/0294550 A1 | 11/2012 | Hassman et al. | |
| 2012/0311828 A1 | 12/2012 | Nir | |
| 2012/0318808 A1 | 12/2012 | McCormick | |
| 2013/0014355 A1 * | 1/2013 | Lee | A44B 19/32 24/389 |
| 2013/0043285 A1 | 2/2013 | Cordray | |

(56) References Cited

U.S. PATENT DOCUMENTS

| | | |
|---|---|---|
| 2013/0174600 A1 | 7/2013 | Sarcinella |
| 2013/0200083 A1 | 8/2013 | Cunningham |
| 2013/0216158 A1 | 8/2013 | Meldeau et al. |
| 2013/0243354 A1 | 9/2013 | Lytle |
| 2013/0264350 A1 | 10/2013 | Handlon et al. |
| 2013/0283845 A1 | 10/2013 | Baumann et al. |
| 2013/0294712 A1 | 11/2013 | Seuk |
| 2013/0341338 A1 | 12/2013 | Mitchell et al. |
| 2014/0023295 A1 | 1/2014 | Wagner |
| 2014/0034543 A1 | 2/2014 | Grubstein |
| 2014/0138378 A1 | 5/2014 | Lequeux |
| 2014/0151172 A1 | 6/2014 | Diaz |
| 2014/0226920 A1 | 8/2014 | Passavia |
| 2014/0248003 A1 | 9/2014 | Mogil et al. |
| 2014/0254956 A1 | 9/2014 | Buell, III |
| 2014/0270590 A1 | 9/2014 | Ostroy |
| 2014/0304954 A1 | 10/2014 | La Rocca et al. |
| 2014/0345314 A1 | 11/2014 | Cox et al. |
| 2014/0353347 A1 | 12/2014 | Fischer |
| 2014/0359978 A1 | 12/2014 | Wang |
| 2014/0366336 A1* | 12/2014 | Chung ............... A44B 19/16 24/389 |
| 2014/0369629 A1 | 12/2014 | De La Fuente Lara |
| 2015/0008242 A1 | 1/2015 | Kpabar, Jr. |
| 2015/0096153 A1 | 4/2015 | Matsumoto et al. |
| 2015/0114024 A1 | 4/2015 | Grepper |
| 2015/0114978 A1 | 4/2015 | James, Jr. |
| 2015/0136796 A1 | 5/2015 | Muehlhauser |
| 2015/0143672 A1 | 5/2015 | Konaka et al. |
| 2015/0164153 A1 | 6/2015 | Tsai |
| 2015/0175338 A1 | 6/2015 | Culp et al. |
| 2015/0201722 A1 | 7/2015 | Brouard |
| 2015/0225164 A1* | 8/2015 | Seiders ............ B65D 25/205 220/592.25 |
| 2015/0296945 A1 | 10/2015 | Douglas |
| 2015/0305402 A1 | 10/2015 | Bourgoin |
| 2015/0335202 A1 | 11/2015 | Wisner et al. |
| 2015/0353263 A1 | 12/2015 | Seiders et al. |
| 2016/0058142 A1 | 3/2016 | Buynar |
| 2016/0066817 A1 | 3/2016 | Hannes |
| 2016/0095405 A1 | 4/2016 | Wang |
| 2016/0100661 A1 | 4/2016 | Redzisz et al. |
| 2016/0100673 A1 | 4/2016 | Demskey |
| 2016/0101924 A1* | 4/2016 | Mitchell ............... A45F 3/02 220/592.2 |
| 2016/0107801 A1 | 4/2016 | Armstrong |
| 2016/0107816 A1 | 4/2016 | Larpenteur et al. |
| 2016/0129292 A1 | 5/2016 | Stroup |
| 2016/0198812 A1 | 7/2016 | Tan |
| 2016/0198901 A1 | 7/2016 | De Lesseux et al. |
| 2016/0221722 A1 | 8/2016 | Burke et al. |
| 2016/0236849 A1 | 8/2016 | Seiders et al. |
| 2016/0255943 A1 | 9/2016 | Houston et al. |
| 2016/0257479 A1 | 9/2016 | Seiders et al. |
| 2016/0338462 A1 | 11/2016 | Hayashi |
| 2016/0338908 A1 | 11/2016 | Rice et al. |
| 2016/0355319 A1 | 12/2016 | Stephens |
| 2017/0036844 A1 | 2/2017 | Seiders et al. |
| 2017/0066559 A1 | 3/2017 | Kim et al. |
| 2017/0071304 A1* | 3/2017 | Wang ............... A45C 13/30 |
| 2017/0071305 A1* | 3/2017 | Wang ............... A45C 13/008 |
| 2017/0099920 A1 | 4/2017 | Bailey |
| 2017/0119116 A1 | 5/2017 | Bradley |
| 2017/0121059 A1 | 5/2017 | Faris |
| 2017/0137205 A1 | 5/2017 | Graf |
| 2017/0208907 A1 | 7/2017 | Chung |
| 2017/0210542 A1 | 7/2017 | Seiders et al. |
| 2017/0225872 A1* | 8/2017 | Collie ............... A45C 11/22 |
| 2017/0265604 A1 | 9/2017 | Martinson et al. |
| 2017/0280937 A1* | 10/2017 | Mogil ............... F25D 3/08 |
| 2018/0016084 A1 | 1/2018 | Xia et al. |
| 2018/0078008 A1 | 3/2018 | Sturm |
| 2018/0087819 A1* | 3/2018 | Triska ............... A45F 3/04 |
| 2018/0098607 A1* | 4/2018 | Seiders ............ A45C 7/0059 |
| 2018/0162626 A1* | 6/2018 | Munie ............... A45C 3/001 |
| 2018/0220760 A1 | 8/2018 | Lin |
| 2018/0229911 A1 | 8/2018 | Luo |
| 2018/0235324 A1 | 8/2018 | Gordon |
| 2018/0242701 A1 | 8/2018 | Seiders et al. |
| 2018/0252458 A1 | 9/2018 | Furneaux et al. |
| 2018/0263346 A1* | 9/2018 | Stephens ............ B65D 81/3853 |
| 2018/0279733 A1 | 10/2018 | Young et al. |
| 2018/0317620 A1 | 11/2018 | Larson et al. |
| 2018/0333603 A1 | 11/2018 | Peyton |
| 2018/0360172 A1 | 12/2018 | Chou |
| 2018/0370710 A1 | 12/2018 | Luo |
| 2019/0008256 A1 | 1/2019 | Basham |
| 2019/0037976 A1 | 2/2019 | Cheng |
| 2019/0071238 A1 | 3/2019 | Seiders et al. |
| 2019/0077577 A1 | 3/2019 | Brandes |
| 2019/0133281 A1 | 5/2019 | Munie et al. |
| 2019/0142116 A1 | 5/2019 | Cheng |
| 2019/0142117 A1 | 5/2019 | Myerscough et al. |
| 2019/0170422 A1* | 6/2019 | Dexter ............... F25D 31/002 |
| 2020/0029658 A1 | 1/2020 | Zhang |
| 2020/0037711 A1 | 2/2020 | Kayahara et al. |
| 2020/0172320 A1 | 6/2020 | Dong |
| 2021/0345740 A1 | 11/2021 | Seiders et al. |

FOREIGN PATENT DOCUMENTS

| | | |
|---|---|---|
| AU | 201614230 S | 8/2016 |
| BE | 1015808 A6 | 9/2005 |
| BR | 302019001991-0001 | 10/2019 |
| CA | 2243820 A1 | 1/2000 |
| CA | 89737 A | 6/2000 |
| CA | 2300014 A1 | 8/2001 |
| CA | 2327764 A1 | 6/2002 |
| CA | 2433251 A1 | 12/2004 |
| CA | 2483802 A1 | 4/2006 |
| CA | 2498796 A1 | 9/2006 |
| CA | 2499291 A1 | 9/2006 |
| CA | 2503473 A1 | 10/2006 |
| CA | 2548064 A1 | 11/2007 |
| CA | 2549327 A1 | 11/2007 |
| CA | 2633223 A1 | 12/2009 |
| CA | 2782668 A1 | 12/2013 |
| CA | 163677 A | 6/2016 |
| CN | 2125339 U | 12/1992 |
| CN | 2188899 Y | 2/1995 |
| CN | 2207742 Y | 9/1995 |
| CN | 2296114 Y | 11/1998 |
| CN | 1832826 A | 9/2006 |
| CN | 1883333 A | 12/2006 |
| CN | 3650531 | 5/2007 |
| CN | 201062136 Y | 5/2008 |
| CN | 201088710 Y | 7/2008 |
| CN | 101284425 A | 10/2008 |
| CN | 201351017 Y | 11/2009 |
| CN | 101733364 A | 6/2010 |
| CN | 201550711 U | 8/2010 |
| CN | 201948200 U | 8/2011 |
| CN | 101500900 A | 9/2011 |
| CN | 102232160 A | 11/2011 |
| CN | 202143500 U | 2/2012 |
| CN | 301956022 | 6/2012 |
| CN | 202304179 U | 7/2012 |
| CN | 302004566 S | 7/2012 |
| CN | 102717977 A | 10/2012 |
| CN | 302137314 | 10/2012 |
| CN | 202619972 U | 12/2012 |
| CN | 102858208 A | 1/2013 |
| CN | 202635944 U | 1/2013 |
| CN | 202807322 U | 3/2013 |
| CN | 202959175 U | 6/2013 |
| CN | 203096977 U | 7/2013 |
| CN | 203096979 U | 7/2013 |
| CN | 302500079 S | 7/2013 |
| CN | 302554919 S | 9/2013 |
| CN | 103385657 A | 11/2013 |
| CN | 203283602 U | 11/2013 |
| CN | 302623771 | 11/2013 |
| CN | 302623775 | 11/2013 |
| CN | 302738897 S | 2/2014 |

(56) References Cited

FOREIGN PATENT DOCUMENTS

| | | |
|---|---|---|
| CN | 302744932 S | 2/2014 |
| CN | 302746176 | 2/2014 |
| CN | 302769710 | 3/2014 |
| CN | 103763994 A | 4/2014 |
| CN | 302868215 | 7/2014 |
| CN | 302877656 | 7/2014 |
| CN | 104085612 A | 10/2014 |
| CN | 302956550 | 10/2014 |
| CN | 204091227 U | 1/2015 |
| CN | 204120419 U | 1/2015 |
| CN | 303100086 | 2/2015 |
| CN | 104709603 A | 6/2015 |
| CN | 204444667 U | 7/2015 |
| CN | 104839947 A | 8/2015 |
| CN | 204548946 U | 8/2015 |
| CN | 204585423 U | 8/2015 |
| CN | 303342902 | 8/2015 |
| CN | 204763894 U | 11/2015 |
| CN | 204802380 U | 11/2015 |
| CN | 303459386 | 11/2015 |
| CN | 105231621 A | 1/2016 |
| CN | 105520325 A | 4/2016 |
| CN | 105819110 A | 8/2016 |
| CN | 105874896 A | 8/2016 |
| CN | 304154180 | 6/2017 |
| CN | 304181831 | 6/2017 |
| CN | 304207295 | 7/2017 |
| CN | 304259949 | 8/2017 |
| CN | 3043425// | 11/2017 |
| CN | 304373532 | 11/2017 |
| CN | 304527075 | 3/2018 |
| CN | 304785791 S | 8/2018 |
| CN | 304906858 | 11/2018 |
| CN | 208259266 U | 12/2018 |
| CN | 305025150 S | 2/2019 |
| CN | 305033965 S | 2/2019 |
| CN | 305272180 S | 7/2019 |
| CN | 209807329 U | 12/2019 |
| CN | 305527294 S | 1/2020 |
| CN | 305770022 S | 5/2020 |
| CN | 305873216 S | 6/2020 |
| CN | 305881796 S | 6/2020 |
| CN | 305916378 S | 7/2020 |
| CN | 306245278 S | 12/2020 |
| CN | 306245283 S | 12/2020 |
| CN | 306264645 S | 1/2021 |
| CN | 306365124 S | 3/2021 |
| CN | 306365279 S | 3/2021 |
| CN | 306765257 S | 5/2021 |
| CN | 306616705 S | 6/2021 |
| CN | 306624319 S | 6/2021 |
| CN | 306657146 S | 7/2021 |
| CN | 306674956 S | 7/2021 |
| DE | 3539626 C2 | 5/1987 |
| DE | 9309197 U1 | 11/1993 |
| DE | 20002689 U1 | 8/2000 |
| DE | 202011050174 U1 | 7/2011 |
| DE | 202013101115 U1 | 3/2013 |
| DE | 402018000462-0021 | 9/2018 |
| EM | 000122668-0002 | 5/2004 |
| EM | 001067250-0003 | 2/2009 |
| EM | 001188460-0003 | 2/2010 |
| EM | 001188460-0004 | 2/2010 |
| EM | 001909490-0001 | 8/2011 |
| EM | 001952722-0008 | 11/2011 |
| EM | 002073452-0001 | 8/2012 |
| EM | 002085308-0003 | 8/2012 |
| EM | 002163527-0017 | 1/2013 |
| EM | 002182642-0001 | 2/2013 |
| EM | 002225706-0001 | 5/2013 |
| EM | 002262436-0001 | 7/2013 |
| EM | 002264697-0002 | 7/2013 |
| EM | 002284729-0004 | 8/2013 |
| EM | 002322552-0001 | 10/2013 |
| EM | 002476853-0001 | 6/2014 |
| EM | 002476853-0002 | 6/2014 |
| EM | 002530519-0001 | 9/2014 |
| EM | 002605345-0004 | 12/2014 |
| EM | 002609404-0001 | 1/2015 |
| EM | 002676536-0001 | 6/2015 |
| EM | 002745190-0001 | 9/2015 |
| EM | 003117324-0009 | 5/2016 |
| EM | 003329929-0001 | 8/2016 |
| EM | 003409044-0008 | 10/2016 |
| EM | 003504331-0027 | 12/2016 |
| EM | 003733021-0001 | 2/2017 |
| EM | 004100048-0001 | 9/2017 |
| EM | 004100048-0002 | 9/2017 |
| EM | 005303559-0001 | 7/2018 |
| EM | 003328608-0009 | 2/2019 |
| EM | 005954534-0001 | 3/2019 |
| EM | 005954534-0002 | 3/2019 |
| EM | 005954534-0003 | 3/2019 |
| EM | 005954534-0004 | 3/2019 |
| EM | 007558580-0001 | 5/2020 |
| EM | 008206833-0014 | 10/2020 |
| EM | 008206833-0015 | 10/2020 |
| EM | 008206833-0016 | 10/2020 |
| EM | 008149702-0001 | 11/2020 |
| EM | 008149702-0002 | 11/2020 |
| EM | 006820619-0001 | 12/2020 |
| EM | 008306195-0001 | 12/2020 |
| EM | 008592307-0001 | 7/2021 |
| EP | 0037545 A2 | 10/1981 |
| EP | 0082131 A2 | 6/1983 |
| EP | 85534 A1 | 8/1983 |
| EP | 0158634 A1 | 10/1985 |
| EP | 0174159 A2 | 3/1986 |
| EP | 0238932 A1 | 9/1987 |
| EP | 1386557 B1 | 4/2007 |
| EP | 2281961 A1 | 2/2011 |
| EP | 003811264-0010 | 3/2017 |
| EP | 003841857-0002 | 4/2017 |
| EP | 004122430-0001 | 8/2017 |
| EP | 004162337-0001 | 9/2017 |
| EP | 004162337-0002 | 9/2017 |
| EP | 004162337-0003 | 9/2017 |
| EP | 004162337-0004 | 9/2017 |
| EP | 004162337-0005 | 9/2017 |
| EP | 004162337-0006 | 9/2017 |
| EP | 004424059-0002 | 10/2017 |
| EP | 004417749-0003 | 11/2017 |
| EP | 004494086-0016 | 11/2017 |
| EP | 004494086-0017 | 11/2017 |
| EP | 002719245-0001 | 1/2018 |
| EP | 005269248-0002 | 5/2018 |
| EP | 005303559-0003 | 7/2018 |
| EP | 008149702-0003 | 11/2020 |
| ES | D0530973-34 | 1/2020 |
| FR | 1269009 A | 8/1961 |
| FR | 2440886 A1 | 6/1980 |
| FR | 20182961-001 | 9/2018 |
| GB | 191415563 A | 6/1915 |
| GB | 1600133 | 10/1981 |
| GB | 2249717 A | 5/1992 |
| GB | 2023549 A | 9/1992 |
| GB | 2282874 A | 4/1995 |
| GB | 2335972 A | 10/1999 |
| GB | 3004135 | 9/2002 |
| GB | 3006367 | 10/2002 |
| GB | 6028395 | 2/2018 |
| GB | 9008149702-0001 | 8/2020 |
| GB | 9008149702-0002 | 8/2020 |
| GB | 9008149702-0003 | 8/2020 |
| GB | 9008306195-0001 | 12/2020 |
| JP | 11051532 | 2/1999 |
| JP | 3059471 U | 7/1999 |
| JP | 2000157335 A | 6/2000 |
| JP | 3275477 B2 | 4/2002 |
| JP | D1160335 | 12/2002 |
| JP | 2003026258 A | 1/2003 |
| JP | 2004238003 A | 8/2004 |
| JP | D1213384 | 8/2004 |
| JP | D1242111 | 6/2005 |

(56) References Cited

FOREIGN PATENT DOCUMENTS

| | | |
|---|---|---|
| JP | 2010023926 A | 2/2010 |
| JP | D1445624 | 7/2012 |
| JP | D1469606 | 5/2013 |
| JP | 2015107825 A | 6/2015 |
| JP | D1531414 | 8/2015 |
| JP | D1543325 | 8/2015 |
| JP | D1658594 | 4/2020 |
| KR | 20020027739 A | 4/2002 |
| KR | 30-0311990 | 11/2002 |
| KR | 20040092730 A | 11/2004 |
| KR | 30-0467684 | 11/2007 |
| KR | 20110124449 A | 11/2011 |
| KR | 101228371 B1 | 1/2013 |
| KR | 101282512 B1 | 7/2013 |
| KR | 300778570.0000 | 1/2015 |
| KR | 300808669.0000 | 8/2015 |
| KR | 300835242.0000 | 1/2016 |
| KR | 300853718.0000 | 5/2016 |
| KR | 300967041.0000 | 8/2018 |
| KR | 300968949.0000 | 8/2018 |
| KR | 300978269.0000 | 10/2018 |
| KR | 300982993.0000 | 11/2018 |
| KR | 300984157.0000 | 12/2018 |
| KR | 200488239 Y1 | 1/2019 |
| KR | 300990517.0000 | 1/2019 |
| KR | 300990523.0000 | 1/2019 |
| KR | 301004401.0000 | 4/2019 |
| KR | 301062695.0000 | 6/2020 |
| KR | 301084294.0000 | 11/2020 |
| KR | 301108516.0000 | 5/2021 |
| KR | 3020210000796 | 7/2021 |
| KR | 301123726.0000 | 8/2021 |
| SG | 93463 A1 | 1/2003 |
| TW | 126351 | 1/1990 |
| TW | M572678 U | 1/2019 |
| WO | 9524146 A2 | 9/1995 |
| WO | 9812954 A1 | 4/1998 |
| WO | 02058500 A1 | 8/2002 |
| WO | 2006007266 A2 | 1/2006 |
| WO | 2006058538 A1 | 6/2006 |
| WO | 2007016092 A2 | 2/2007 |
| WO | 2010106296 A2 | 9/2010 |
| WO | 2010120199 A1 | 10/2010 |
| WO | 2012003543 A1 | 1/2012 |
| WO | 2014033450 A1 | 3/2014 |
| WO | 2014066026 A1 | 5/2014 |
| WO | 2016066817 A1 | 5/2016 |
| WO | 2017091761 A1 | 6/2017 |
| WO | 2017136754 A1 | 8/2017 |
| WO | 17197230 A1 | 11/2017 |
| WO | 2018152402 A1 | 8/2018 |
| WO | 2018165426 A1 | 9/2018 |
| WO | 2019135922 A1 | 7/2019 |

OTHER PUBLICATIONS

Nov. 24, 2022—(CN) Fourth Office Action—App. No. 201880035443.0.
Nov. 1, 2022—(CN) Decision of Rejection—App. No. 201880070523X.
Dec. 6, 2022—(EP) Office Action—App. No. 18813247.6.
United States District Court Western District of Texas Waco Division, "YETI Coolers, LLC's Opposed Motion to intervene", *Ice Rover, Inc. v. YETI Holdings, Inc. and YETI Coolers, LLC*, Case 6:22-cv-00801-ADA-DTG, Document 17, Jury Trial Demanded, filed Jan. 3, 2023, 286 pages.
United States District Court Eastern District of Missouri Eastern Division, "Complaint, 'Complaint for Damages and njunctive Relief'", *YETI Coolers, LLC v. Discover Home Products, LLC*, Case 4:21-cv-00836, Document 1, filed Jul. 9, 2021, 68 pages.
United States District Court for the Western District of Texas, Austin Division, "Defendants' Answer and Counterclaims to YETI's Complaint," *YETI Coolers, LLC, vs. RTIC Soft Sided Coolers, LLC, RTIC Coolers, LLC, RTIC Web Services, LLC, and Corporate Support and Fulfillment, LLC*, Case 1:16-cv-00909-RP, Document 11, Filed Aug. 18, 2016, 44 pages.
United States District Court for the Western District of Texas, Austin Division, "Defendants' Rule 12(B)(6) Motion to Dismiss for Failure to State a Claim," *YETI Coolers, LLC, vs. RTIC Soft Sided Coolers, LLC, RTIC Coolers, LLC, RTIC Web Services, LLC, and Corporate Support and Fulfillment, LLC*, Case 1:16-cv-00909-RP, Document 10, Filed Aug. 18, 2016, 12 pages.
United States District Court for the Western District of Texas, Austin Division, "Joint Rule 26(f) Report and Discovery Plan," *YETI Coolers, LLC, vs. RTIC Soft Sided Coolers, LLC, RTIC Coolers, LLC, RTIC Web Services, LLC, and Corporate Support and Fulfillment, LLC*, Case 1:16-cv-00909-RP, Document 19, Filed Oct. 11, 2016, 9 pages.
United States District Court Southern District of Texas Houston Division, "Plaintiff YETI's Complaint for Patent Infringement", *YETI Coolers, LLC v. Igloo Products Corporation*, Case 4:21-cv-00505, filed Feb. 12, 2021, 98 pages.
United States District Court Western District of Texas Austin Division, "Complaint," *YETI Coolers, LLC v. Glacier Coolers, LLC, and Tecomate Holdings, LLC*, Case 1:17-cv-00586, Document 1, filed Jun. 15, 2017, 161 pages.
United States District Court Western District of Texas, Austin Division, "Answer of Defendants RTIC Outdoors, LLC and Corporate Support & Fulfillment, LLC to YETI's Amended Complaint: (1)-(15) Patent Infringement in Violation of 35 U.S.C. § 271; and (16) Breach of Contract", *YETI Coolers, LLC v. RTIC Outdoors, LLC; and Corporate Support & Fulfillment, LLC*, Case 1:21-cv-00214-RP, Document 16, filed Jun. 17, 2021, 79 pages.
United States District Court Western District of Texas, Austin Division, "Complaint for Damages and Injunctive Relief for: (1)-(12) Patent Infringement in Violation of 35 U.S.C. § 271; and (13) Breach of Contract", *YETI Coolers, LLC v. RTIC Outdoors, LLC; and Corporate Support & Fulfillment, LLC*, Case 1:21-cv-00214, filed Mar. 5, 2021, 338 pages.
United States District Court Western District of Texas, Austin Division, "Complaint for Damages and Injunctive Relief," *YETI Coolers, LLC v. Jennifer Leverne Bootz Evans d/b/a Bling and Burlap Buy In's and Blanks*, Case 1:15-cv-00995, Document 1, Filed Nov. 2, 2015, 128 pages.
United States District Court Western District of Texas, Austin Division, "Complaint for Damages and Injunctive Relief," *YETI Coolers, LLC v. Olympia Tools International, Inc. d/b/a Coho Outdoors*, Case 1:19-cv-00912, Document 1, Filed Sep. 16, 2019, 235 pages.
United States District Court Western District of Texas, Austin Division, "Complaint," *YETI Coolers, LLC, v. RTIC Soft Side Coolers, RTIC Coolers, LLC, RTIC Web Services, LLC, and Corporate Support and Fulfillment, LLC*, Case 1:16-cv-00909, Document 1, Filed Jul. 27, 2016, 66 pages.
United States District Court Western District of Texas, Austin Division, "Defendant Olympia Tools International, Inc. d/b/a Coho Outdoors' Answer and Counterclaims to Plaintiffs Original Complaint," *YETI Coolers, LLC v. Olympia Tools International, Inc. d/b/a Coho Outdoors*, Case 1:19-cv-00912, filed Dec. 18, 2019, 48 pages.
United States District Court Western District of Texas, Austin Division, "Defendant's Reply in Support of Their Rule 12 (B)(6) Motion to Dismiss for Failure to State a Claim" *YETI Coolers, LLC v. RTIC Soft Sided Coolers, LLC, RTIC Coolers, LLC, RTIC Web Services, LLC, and Corporate Support and Fulfillment, LLC*, Case 1:16-cv-00909-RP, Document 15, Filed Sep. 8, 2016, 13 pages.
United States District Court Western District of Texas, Austin Division, "First Amended Complaint, 'Complaint for Damages and Injunctive Relief for: (1)-(15) Patent Infringement in Violation of 35 U.S.C. § 271; and (16) Breach of Contract'", *YETI Coolers, LLC v. RTIC Outdoors, LLC; and Corporate Support & Fulfillment, LLC*, Case 1:21-cv-00214-RP, Document 10, filed Jun. 2, 2021, 39 pages.
United States District Court Western District of Texas, Austin Division, "Order," *YETI Coolers, LLC v. Jennifer Leverne Bootz Evans d/b/a Bling and Burlap Buy In's and Blanks*, Case 1:15-cv-00995-RP, Document 18, Filed Apr. 18, 2016, 1 page.

(56) References Cited

OTHER PUBLICATIONS

United States District Court Western District of Texas, Austin Division, "YETI's Answer to RTIC's Counterclaims," *YETI Coolers, LLC v. RTIC Soft Sided Coolers, LLC, RTIC Coolers, LLC, RTIC Web Services, LLC, and Corporate Support and Fulfillment, LLC*, Case 1:16-cv-00909-RP, Document 14, Filed Sep. 2, 2016, 16 pages.
United States District Court Western District of Texas, Austin Division, "YETI's Opposition to RTIC's Motion to Dismiss," *YETI Coolers, LLC v. RTIC Soft Sided Coolers, LLC, RTIC Coolers, LLC, RTIC Web Services, LLC, and Corporate Support and Fulfillment, LLC*, Case 1:16-cv-00909-RP, Document 13, Filed Sep. 1, 2016, 17 pages.
United States Patent and Trademark Office Before the Patent Trial and Appeal Board, Decisions Joint Motions to Terminate Inter Partes Review, Entered Mar. 22, 2017—(4 pgs).
Vimeo, "Cleaning Your YETI Hopper" uploaded by user YETI Coolers on Nov. 4, 2014, Accessed Sep. 27, 2017.(https://vimeo.com/11 0890075).
YETI Flip Review—YouTube which was published on the website https://www.youtube.com/watch?v=97Vdb3lazdw on Sep. 8, 2016.
Youtube, "YETI Hopper Cooler at ICAST 2014", Uploaded by user TackleDirect on Jul. 17, 2014, Accessed Jan. 31, 2017. (https://www.youtube.com/watch?v=A2rKRdyZcZ4).
YouTube-com: Patagonia Black Hole Duffel 60L. Published Aug. 26, 2013. Retrieved from the internet at <https://www.youtube.com/watch?v=W-PWEmZmVv8>, Dec. 19, 2016. 1 page.
Sep. 3, 2021—(CN) First Office Action—App. No. 201880070523.X.
Jun. 16, 2021—(CN) Evaluation Report of Design Patent—App. No. ZL201630369163.7.
Nov. 16, 2021—(CN) Second Office Action—App. No. 201880035443.0.
United States District Court Western District of Texas, Austin Division, "Second Amended Complaint", *YETI Coolers, LLC v. RTIC Outdoors, LLC; and Corporate Support & Fulfillment, LLC*, Case 1:21-cv-00214-RP, Document 33, filed Dec. 17, 2021, 489 pages.
United Stated District Court Western District of Texas, Austin Division, "Answer of Defendants RTIC Outdoors, LLC and Corporate Support & Fulfillment, LLC to YETI's Second Amended Complaint, Jury Trial Demanded", *YETI Coolers, LLC v. RTIC Outdoors, LLC; and Corporate Support & Fulfillment, LLC*, Case 1:21-cv-00214-RP, Document 34, filed Jan. 3, 2022, 92 pgs.
Jan. 21, 2022—(JP) Office Action—App. No. 2019-566329.
Jan. 26, 2022—(EP) Office Action—App. No. 18830667.4.
United States District Court Western District of Texas Austin Division, "Defendants RTIC Outdoors, LLC's and Corporate Support & Fulfillment, LLC's Invalidity Contentions", *YETI Coolers, LLC v. RTIC Outdoors, LLC and Corporate Support & Fulfillment, LLC*, Case No. 1:21-cv-00214, Jury Trial Demanded, filed Jan. 17, 2022, 3173 pages.
Exhibits C-8, D-6, E-6, and F-6 "Filson Rugged Twill Bucket Bag", U.S. District Court Western District of Texas, "Defendants RTIC Outdoors, LLC's and Corporate Support & Fulfillment, LLC's Invalidity Contentions", *YETI Coolers, LLC v RTIC Outdoors, LLC*, Case No. 1:21-cv-00214, Jan. 17, 2022, pp. 486-491, 568-582, 649-661, and 722-735.
Apr. 13, 2022—(CN) Third Office Action—App. No. 201880035443.0.
Apr. 19, 2022—(CN) Second Office Action—App. No. 201880070523.X.
Jul. 8, 2022—(JP) Decision of Rejection—App. No. 2019566329.
Jul. 15, 2022—(CN) Decision on Rejection—App. No. 201880035443.0.
Jul. 22, 2022—(CN) Third Office Action—App. No. 201880070523.X.
Jul. 27, 2022—(MX) First Office Action—App. No. MX/a/2018/013890.
Jan. 31, 2017—(WO) International Search Report and Written Opinion—App. PCT/US2016/060135.
Mar. 27, 2017—(WO) International Search Report and Written Opinion—App PCT/US2017/016552.
May 30, 2017—(WO) ISR—App. No. PCT/US17/32351.
May 30, 2017—(WO) Written Opinion—App. No. PCT/US17/32351.
Aug. 29, 2018 (WO)—International Search Report and Written Opinion—App. No. PCT/US 18/36608.
Dec. 13, 2019—(CN) First Office Action—App. No. 201780020473.
Feb. 4, 2019—(AU) Examination Report—App. No. 2017263566.
Jul. 3, 2019—(CN) First Office Action—App. No. 201780042659.5.
Jun. 5, 2019—(AU) Notice of Acceptance for Patent Application—App 2017263566.
Jun. 3, 2019—(CN) First Office Action—App. No. 201680076714.8.
Mar. 21, 2019—(WO) International Search Report and Written Opinion—App. No. PCT/US2018/066040.
Oct. 2, 2019—(CN) Examiner's Report—App. No. 2017032351.
Aug. 17, 2020—(CN) Third Office Action (with English Translation)—App. No. 201680076714.8.
Jul. 14, 2020—(CA) Office Action—App. No. 3024101.
Jul. 2, 2020—(AU) First Office Action—App. No. 201712262.
Jul. 2, 2020—(AU) First Office Action—App. No. 201712263.
Jul. 2, 2020—(AU) First Office Action—App. No. 201712264.
Jul. 2, 2020—(AU) First Office Action—App. No. 201712265.
Jul. 31, 2020—(CN) Second Office Action (with English Translation)—App. No. 201780020473.X.
Mar. 20, 2020—(CN) Office Action—App. No. 201680076714.8.
Oct. 19, 2020—(NZ) Patent Examination Report 1—App. No. 759046.
Apr. 26, 2021—(CN) Rejection Decision—App. No. 201680076714.8.
Apr. 6, 2021—(CN) First Office Action—App. No. 201880035443.0.
Apr. 7, 2021—(NZ) Examination Report 2—App. No. 759046.
Feb. 24, 2021—(WO) International Search Report & Written Opinion—PCT/US20/059783.
Feb. 3, 2021—(EP) Extended Search Report—App. No. 18813247.6.
Jan. 12, 2021—(CN) Fourth Office Action—App. No. 201680076714.8.
Jan. 20, 2021—(CN) Third Office Action—App. No. 201780020473.X.
Jun. 28, 2021—(EP) Office Action—App. No. 18830667.4.
May 7, 2021—(CN) Rejection Decision—App. No. 201780020473.X.
amazon.com, "Arctic Zone 2008IL515B42 Thermal Insulated Hot/Cold Food Carrier, Green," visited May 7, 2019 at <https://www.amazon.com/dp/B077T7FZBX/ref=sspa_dk_detail_0?psc=1&pd_rd_i=B077T7FZBX>.
amazon.com, "E-MANIS Insulated Lunch Bag Adult Lunch Box Collapsible Multi-Layers Thermal Insulated Oxford Lunch Tote Cooler Bag for Men, women (grey)," visited May 7, 2019 at <https://www.amazon.com/MANIS-Insulated-Portable-Cooler-School/dp/B07BMT6948/ref=sr_1_23?keywords=soft+sided+cooler+lunch+box&qid= 1557170800&s=home-garden&sr=1-23>.
amazon.com, "Lifewit Insulated Casserole Dish Carrier Thermal Lasagna Lugger for Potluck Parties/Picnic/Beach, Lunch Bag to Keep Food Hot/Cold, 16.3×12.6×4.7", Grey, visited May 7, 2019 at <https://www.amazon.com/dp/B07BFWJPV5/ref-sspa_dk_detail_6?psc=1&pd_rd_i=B07BFWJPV5&pd_rd_w=tr7Ke&pf_rd_p=46cdcfa7-b302-4268-b799-8f7d8cb5008b&pd_rd_wg=jq3TO&pf_rd_r=W7MFCBJR9DR0HV3AKZZB&pd_rd_r=604844a0-70d3-11e9-ad99-d763d3fc76f8>.
amazon.com, "Lille 22oz Stainless Steel Leakproof Lunch Box, Insulated Bento Boxes | Thermal Food Container with Insulated Lunch Bag for Work | 2nd Gen with Durable Handle and Lid | BPA free | Adult, Women, Kid," visited May 7, 2019 at <https://www.amazon.com/Lille-Stainless-Leakproof-Insulated-Container/dp/B07HDTMJ7M/>.
amazon.com, "Meal Prep Lunch Bag/Box for Men, Women+3 Large Food Containers (45oz)+2 Big Reusable Ice Packs+Shoulder

(56) References Cited

OTHER PUBLICATIONS

Strap+Shaker With Storage. Insulated Lunchbox Cooler Tote. Adult Portion Control Set," visited May 7, 2019 at <https://www.amazon.com/Meal-Containers-Reusable-Shoulder-Insulated/dp/B01MU2YS18/>.

amazon.com, "MIER Insulated Double Casserole Carrier Thermal Lunch Tote for Potluck Parties, Picnic, Beach—Fits 9"×13" Casserole Dish, Expandable, Orange," visited May 7, 2019 at <https://www.amazon.com/MIER-Insulated-Casserole-Carrier-Thermal/dp/B01N0PW119/>.

amazon.com, "MIER Portable Thermal Insulated Cooler Bag Mini Lunch Bag for Kids, Black," visited May 7, 2019, at <https://www.amazon.com/MIER-Portable-Thermal-Insulated-Cooler/dp/B01145L2JM/>.

amazon.com, "Srotek Lunch Bag Insulated Lunch Box Tote Bag Cooler Bag Water-resistant Cute Lunch Bag Wide-open Thermal Tote Kit for Women/Girls/Work/Picnic, Grey Flamingo," visited May 7, 2019 at <https://www.amazon.com/dp/B07N57JSJS/ref=sspa_dk_detail_9?psc=1&pd_rd_i=B07N57JSJS>.

amazon.com, "ZUZURO Lunch Bag Insulated Cooler Lunch Box w/ 3 Compartment—Heavy-Duty Fabric, Strong SBS Zippers—Includes 3 Meal Prep Lunch box Containers + 2 Ice Packs. For Men Women Adults (Black)," visited May 7, 2019 at <https://www.amazon com/Zuzuro-Lunch-Insulated-Cooler-Compartment/dp/B079DZ2L1F/ref=sr_1_14?keywords=lunch+box+lid+ice+pack&qid=1557245496&s=gateway&sr=8-14>.

amazon.com, "Lille Home 2nd Gen 22oz Stainless Steel Leakproof Lunch Box, Insulated Bento Box/Food Container with Insulated Lunch Bag | Durable Handles and Lid | Adults, Kids | Men, Women (Green)," visited May 8, 2019 at <https://www.amazon.com/dp/B07MBDD29C/>.

Devonbuy.com: Thule Gauntlet 13" MacBook Pro Attaché. Published on Jul. 28, 2014. Retrieved from the internet at <http://www.devonbuy.com/thule-gauntlet-13-macbook-pro-attache/>, Feb. 24, 2016. 9 pages.

Ebags, Picnic Pack Picnic Pack Large Insulated Cooler Tote, First reviewed on Jul. 20, 2016. Accessed Feb. 7, 2017. (http://www.ebags.com/product/picnic-pack/picnic-pack-large-insulated-cooler-tote/313704?productid=10428840).

First Look: YETI Hopper Flip Soft Cooler Review | GearJunkie which was published on the website; https://gearjunkie.com/review-yeti-hopper-flip-12-soft-cooler on Jul. 12, 2016.

Good Housekeeping, "Lands' End Zip Top Cooler Tote #433786", Reviewed on Apr. 2014, Accessed Nov. 18, 2017. (http://www.goodhousekeeping.com/travel-products/food-cooler-reviews/a33270/lands-end-zip-top-cooler-tote-433786/).

Home Shopping Network, "Built New York Large Welded Cooler Bag", Accessed Nov. 18, 2017. (https://www.hsn.com/products/built-new-york-large-welded-cooler-bag/8561 033).

ICEMULE Classic Cooler—Large (20L), http://www.icemulecooler.com/icemule-classic-cooler-large-20l/, published date unknown, but prior to the filing date of the present application, ICEMULE, United States.

Petition for Inter Partes Review of U.S. Pat. No. 9139352, filed on Dec. 13, 2016, 1616 pages.

Stopper Dry Bag, http://www.seatosummit.com/products/display/181, published date unknown, but prior to the filing date of the present application, Sea to Summit, United States.

TheGadgeteer.com: Tom Bihn Camera I-O Bag Review. Published Jul. 9, 2012. Retrieved from the internet at <http://the-gadgeteer.com/2012/07/09/tom-bihn-camera-i-o-bag-review/>, Jan. 11, 2016. 7 pages.

Translation of FR 1269009A, Jackson, Jr., Jun. 26, 1961, p. 1, Fig. 2 (Year: 1961).

United States District Court Middle District of Florida, Tampa Division, "Complaint for Damages and Injunctive Relief, and Demand for a Jury Trial", *YETI Coolers, LLC* v. *Bote, LLC*, Case 8:23-cv-00370, Document 1, filed Feb. 17, 2023, 125 pages.

Jan. 25, 2023—(JP) Office Action—App. No. 2020531697.

Jan. 20, 2023—(CN) Office Action No. 1—App. No. 2021113198650.

Jan. 20, 2023—(MX) Office Action—App. No. MX/a/2018/013890.

United States District Court Middle District of Florida, Tampa Division, "Defendant's Answer and Affirmative Defenses to Plaintiff's Complaint for Damages and Injunctive Relief (Doc. 1), and Defendant's Demand for a Jury Trial", *YETI Coolers, LLC* v. *Bote, LLC*, Case 8:23-cv-00370-WFJ-MRM, Document 38, filed Apr. 20, 2023, 46 pages.

TIZIP MasterSeal Datasheet, <https://web.archive.org/web/20100808133756/http://www.tizip.com/pdf/Datasheet_MasterSeal.pdf,> retrieved on May 1, 2023, Dec. 2009, 2 pages.

TIZIP MasterSeal 10 Webpage, <https://web.archive.org/web/20100803012209/http://www.tizip.com/index.htm,> retrieved on May 2, 2023, 4 pages.

* cited by examiner

INSULATING DEVICE BACKPACK

CROSS REFERENCE TO RELATED APPLICATIONS

This application is a continuation of U.S. application Ser. No. 16/934,865, filed on Jul. 21, 2020, which is a continuation of U.S. application Ser. No. 15/845,737, filed on Dec. 18, 2017, now U.S. Pat. No. 10,781,028, which is a continuation-in-part of U.S. application Ser. No. 15/451,064, filed on Mar. 6, 2017, now U.S. Pat. No. 10,143,282, which is a continuation-in-part of U.S. application Ser. No. 15/261,407, filed on Sep. 9, 2016, now U.S. Pat. No. 10,384,855, which is a continuation-in-part of U.S. application Ser. No. 15/154,626, filed on May 13, 2016, now U.S. Pat. No. 10,029,842, which is a continuation-in-part of U.S. application Ser. No. 14/831,641, filed on Aug. 20, 2015, now U.S. Pat. No. 9,796,517, which is a divisional application of U.S. application Ser. No. 14/479,607 filed on Sep. 8, 2014, now U.S. Pat. No. 9,139,352, which claims priority to U.S. Application No. 61/937,310 filed on Feb. 7, 2014. U.S. application Ser. No. 15/261,407, filed on Sep. 9, 2016, now U.S. Pat. No. 10,384,855, also claims priority to provisional applications U.S. Application No. 62/292,024 filed on Feb. 5, 2016, U.S. Application No. 62/299,421 filed on Feb. 24, 2016, U.S. Application No. 62/299,402 filed on Feb. 24, 2016. All of the above applications are incorporated fully herein by reference for any and all non-limiting purposes.

FIELD

The present disclosure relates generally to non-rigid, portable, insulated devices or containers useful for keeping food and beverages cool or warm, and, more particularly, an insulating device with a waterproof closure.

BACKGROUND

Coolers are designed to keep food and beverages at lower temperatures. Containers may be composed of rigid materials such as metal or plastics or flexible materials such as fabric or foams. Coolers can be designed to promote portability. For example, rigid containers can be designed to incorporate wheels that facilitate ease of transport or coolers can be designed in smaller shapes to allow individuals to carry the entire device. Non-rigid containers can be provided with straps and/or handles and may in certain instances be made of lighter weight materials to facilitate mobility. Non-rigid coolers that maximize portability can be designed with an aperture on the top that allows access to the interior contents of the cooler. The aperture can also be provided with a closure.

SUMMARY

This Summary provides an introduction to some general concepts relating to this invention in a simplified form that are further described below in the Detailed Description. This Summary is not intended to identify key features or essential features of the invention.

Aspects of the disclosure herein may relate to insulating devices having one or more of (1) a waterproof closure (2) an outer shell, (3) an inner liner, (4) an insulating layer floating freely in between the outer shell and the inner liner, or (5) a waterproof storage compartment.

BRIEF DESCRIPTION OF THE DRAWINGS

The foregoing Summary, as well as the following Detailed Description, will be better understood when considered in conjunction with the accompanying drawings in which like reference numerals refer to the same or similar elements in all of the various views in which that reference number appears.

DETAILED DESCRIPTION

Figure 1A:
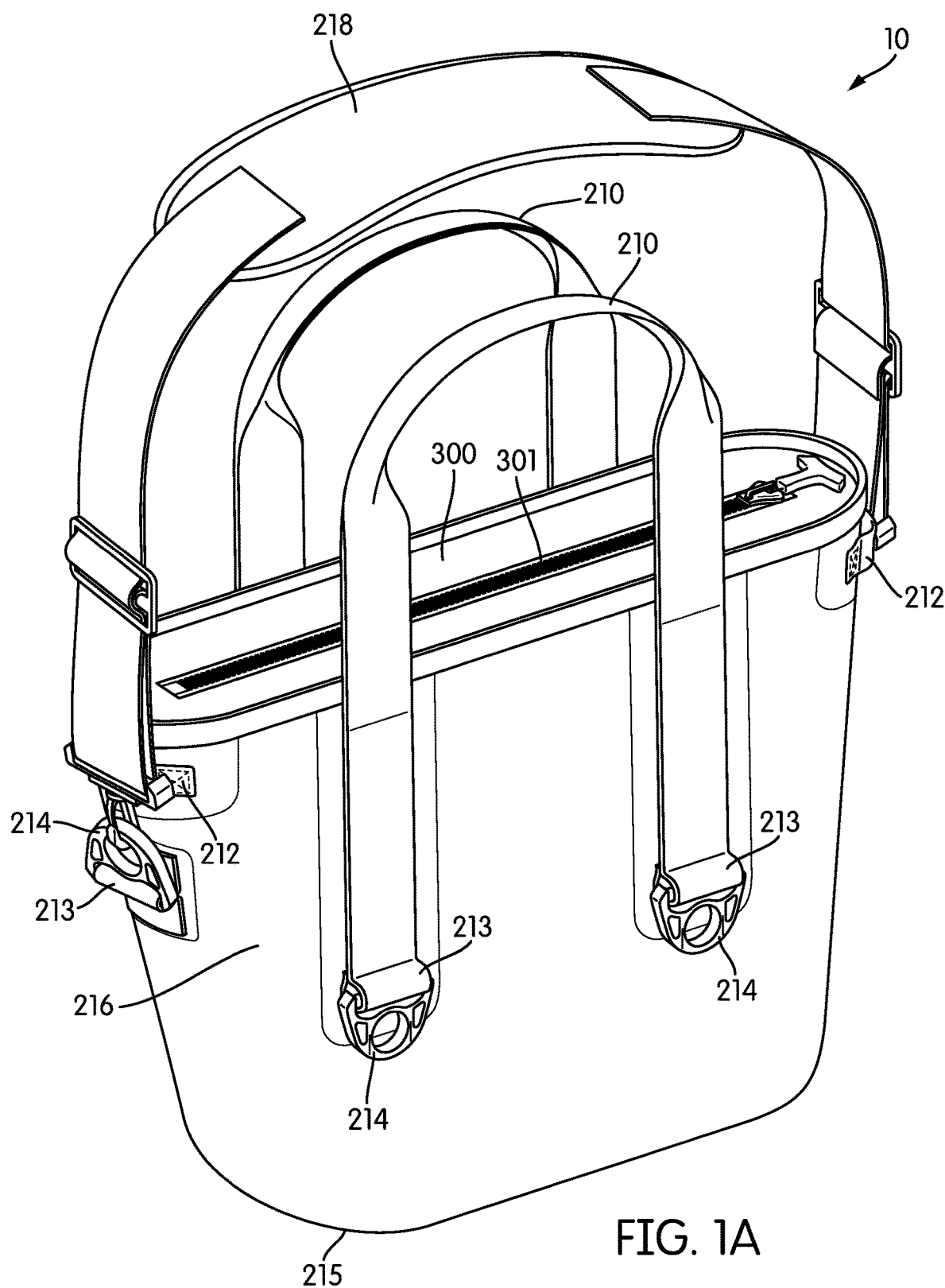
FIG. 1A shows a left front perspective view of an example insulating device in accordance with an aspect of the disclosure.
Figure 1B:
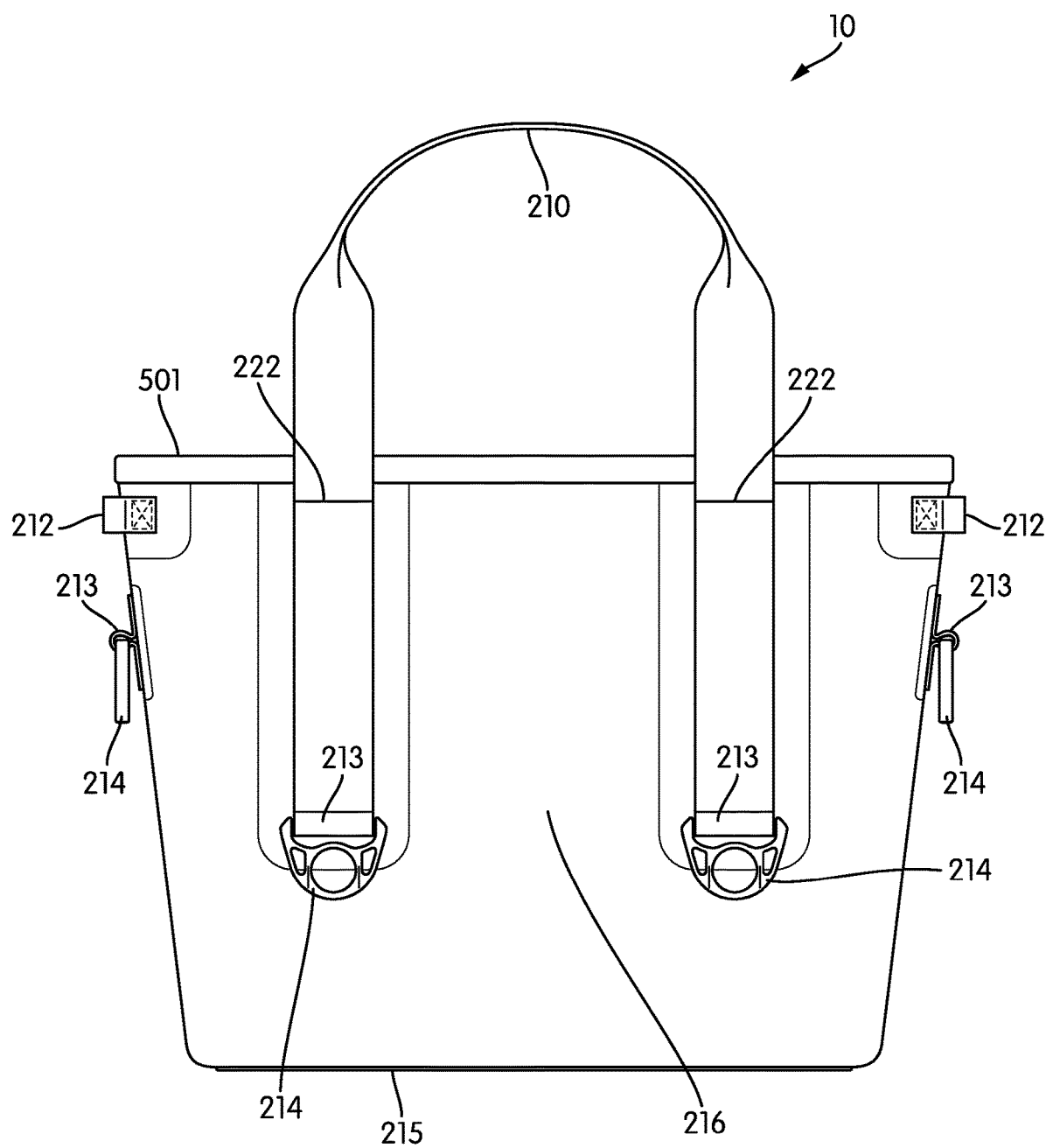
FIG. 1B shows a frontside perspective view of the example insulating device of FIG. 1A without the shoulder strap.

In the following description of the various examples and components of this disclosure, reference is made to the accompanying drawings, which form a part hereof, and in which are shown by way of illustration various example structures and environments in which aspects of the disclosure may be practiced. It is to be understood that other structures and environments may be utilized and that structural and functional modifications may be made from the specifically described structures and methods without departing from the scope of the present disclosure.

Also, while the terms "frontside," "backside," "top," "base," "bottom," "side," "forward," and "rearward" and the like may be used in this specification to describe various example features and elements, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of the claims.

FIGS. 1-4 depict an exemplary insulating device 10 that can be configured to keep desired contents stored cool or warm for an extended period of time. The insulating device can generally include an outer shell 501, a closure 301, an insulating layer 502, and an inner liner 500. As shown in FIG. 3C, the inner liner 500 forms a chamber or receptacle 504 for receiving the desired contents therein. As shown in FIG. 1A, various handles, straps, and webs (e.g. 210, 212, 218, 224) can also be included on the insulating device 10 for carrying, holding, or securing the insulating device 10.

The insulating device 10 can be configured to keep desired contents stored in the receptacle 504 cool or warm for an extended period of time. In one example, the insulating device 10 can also be designed to maintain water inside the inner chamber or receptacle 504, and the insulating device 10 can be configured to be water "resistant" from the outside in. In other words, the insulating device 10 can be formed "water tight" inside the inner liner 500, and water cannot leak into the inner liner 500 from the outside or out from the inside of the inner liner 500 when the closure 301 is in the closed position.

Figure 4:
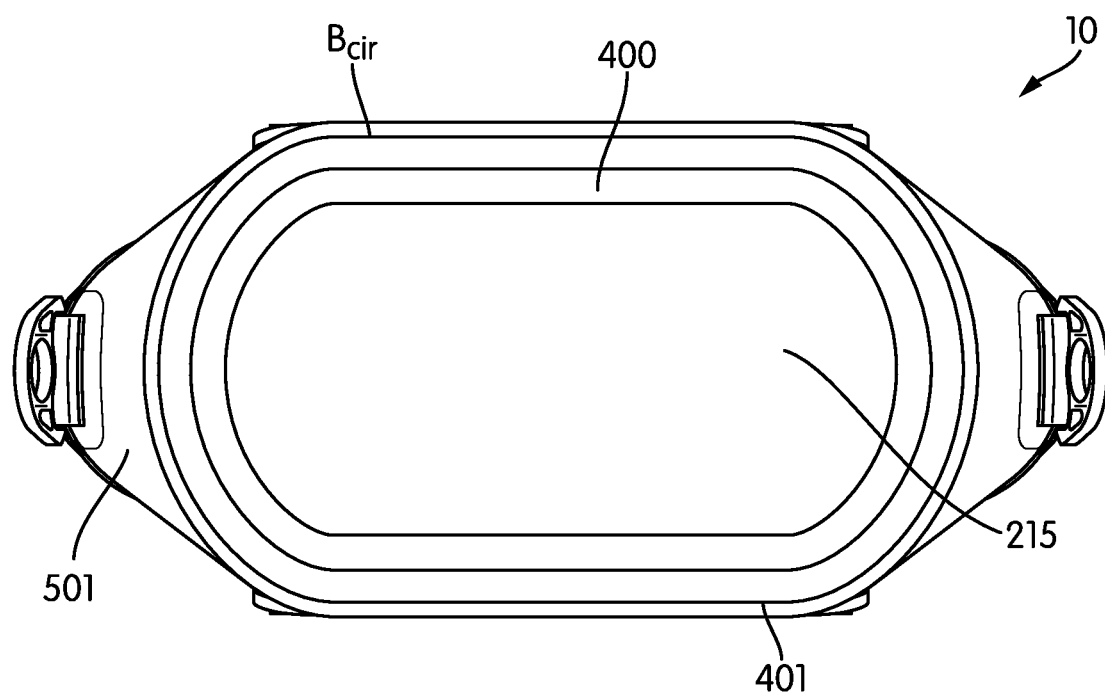
FIG. 4 shows a bottom perspective view of the example insulating device of FIG. 1A.

FIG. 4 depicts a bottom view of the insulating device 10. As shown in FIG. 4, the insulating device 10 may include a base 215 and a base support ridge 400. The base support ridge 400 can provide structural integrity and support to the insulating device 10 when the insulating device 10 is placed onto a surface.

Figure 3A:
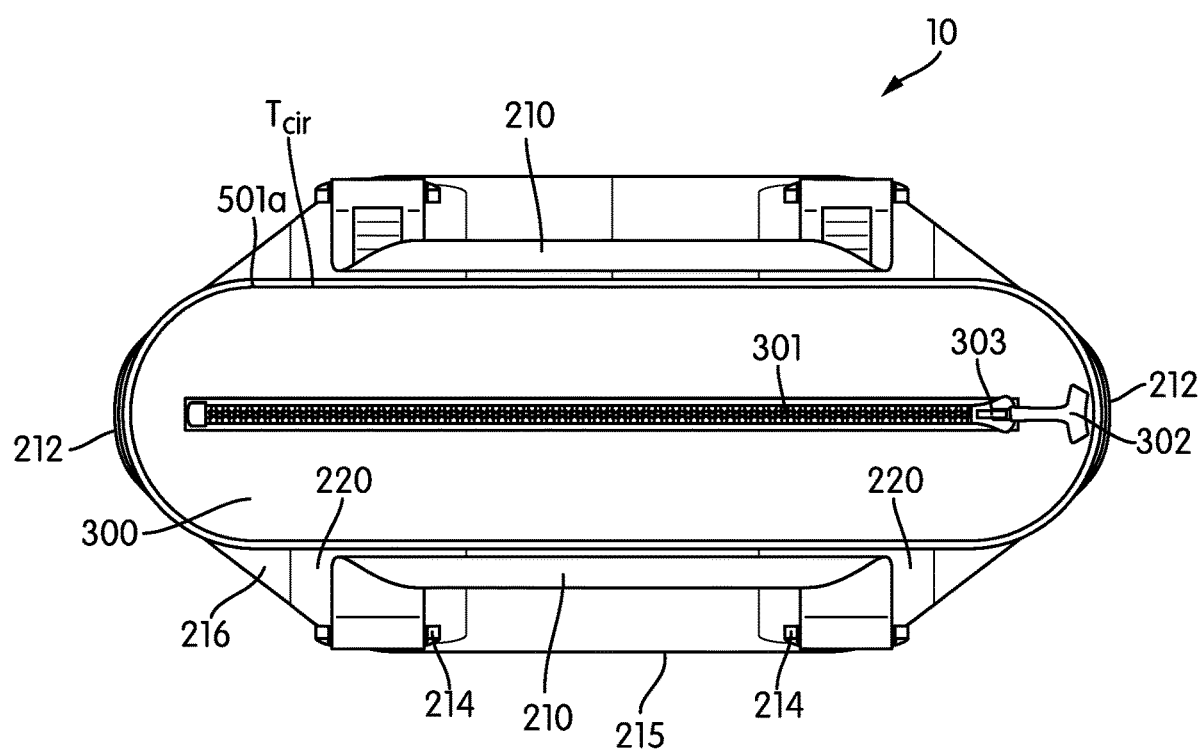
FIG. 3A shows a top perspective view of the example insulating device of FIG. 1A without the shoulder strap.

In one example, as shown in FIGS. 3A and 4, the top of the outer shell 501 has a first perimeter circumference ($T_{cir}$) and the bottom of the outer shell 501 has a second perimeter circumference or a base perimeter 401 ($B_{cir}$). The circumference of the top of the outer shell 501 can be equal to the circumference on the bottom when folded into a cylinder, and $B_{cir}$ can be equal to $T_{cir}$. In one example, the first circumference and the second circumference can both have an oval shape to form an elongated or elliptical cylinder. In one example, the top outer layer can have a length of 23.5 inches and a width of 5.5 inches. Therefore, the length to width ratio of the top outer layer 501a can be approximately 4.3. Additionally, the base 215 can have a length of 20.0 inches and a width of 12.25 inches. Therefore, the length to width ratio of the base 215 is approximately 1.6. In this example, the length to width ratio of the upper wall can be greater than the length to width ratio of the base.

Figure 5A:
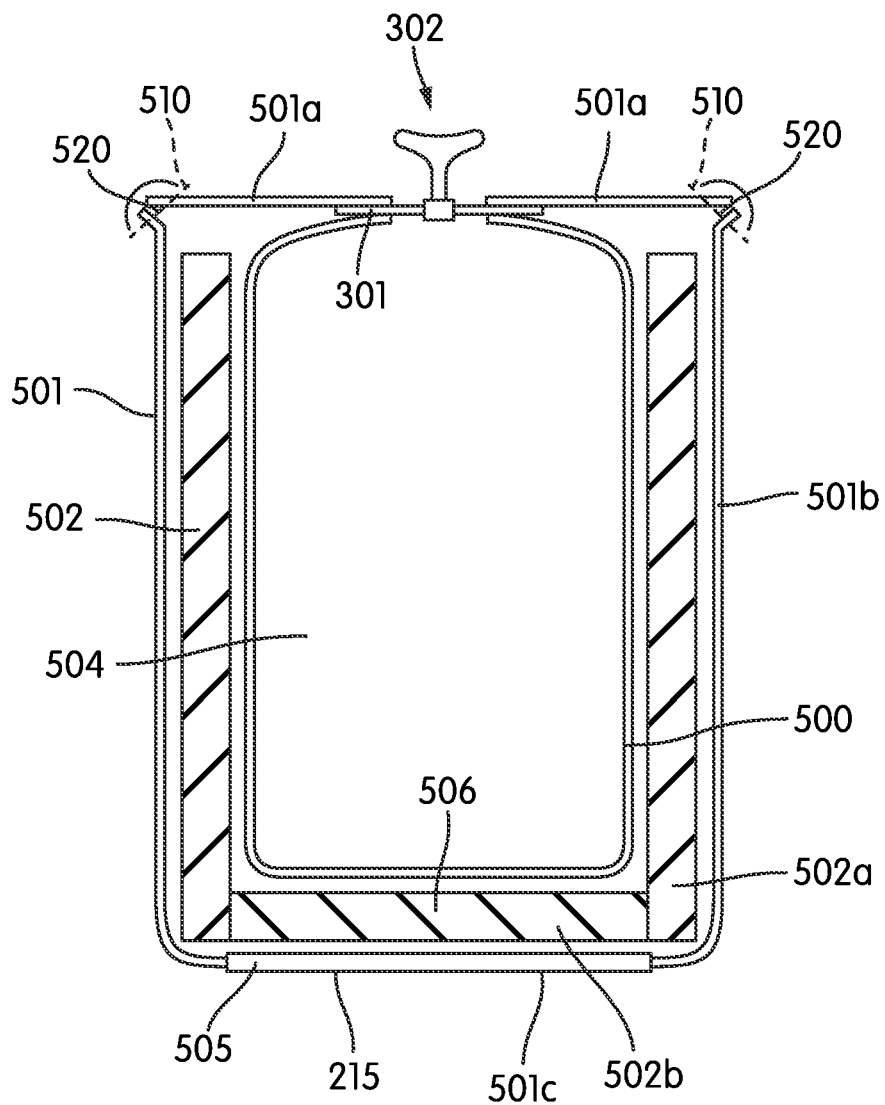
FIG. 5A illustrates a schematic of a cross-sectional view of the example insulating device of FIG. 1A.

In one example, as shown in FIG. 5A, the inner layer or inner liner 500 can be formed of a top inner liner portion or first inner liner portion 500a, an inner layer mid portion or second portion 500b, and an inner layer bottom portion 500c. The top inner liner portion 500a, the inner layer mid portion 500b, and the inner layer bottom portion 500c are secured together, by for example welding, to form the chamber 504. The chamber 504 can be a "dry bag," or vessel for storing contents. In one example, after the top inner liner portion 500a, the inner layer mid portion 500b, and the inner layer bottom portion 500c are secured or joined together, a tape, such as a TPU tape can be placed over the seams joining the sections of the chamber 504. The inner liner 500 can, thus, either maintain liquid in the chamber 504 of the insulating device 10 or prevent liquid contents from entering into the chamber 504 of the insulating device 10. In one example, as will be described in further detail below, the inner liner 500 can be suspended in the insulating device 10 by only the closure 301.

The insulating layer 502 can be located between the inner liner 500 and the outer shell 501, and can be formed as an insulator to assist in maintaining the internal temperature of the receptacle 504. In one example, the insulating layer 502 can be a free floating layer that is not attached directly to the outer shell 501 or the inner liner 500. The insulating layer 502 can be formed of a first portion 502a and a second portion or base portion 502b. The first portion 502a and the second portion 502b can be formed of an insulating foam material as will be described in further detail below.

The first portion 502a can have a rectangular shape that maintains its form when folded into a cylinder and placed in between the inner liner 500 and the outer shell 501 and when encased from above by the outer shell 501. The insulating layer 502 maintains its shape which results in the basic oval-cylindrical shape of the insulating device 10. Therefore, similar to the outer shell 501, the top of the insulating layer 502 has a first perimeter circumference, and the bottom of the insulating layer 502 has a second perimeter circumference. The first perimeter circumference of the insulating layer 502 can be equal to the second perimeter circumference of the insulating layer 502.

The base portion 502b can be included to provide additional insulation along the insulating device 10 at base 215. The base portion 502b can be formed as an oval shape to close off a lower opening 506 formed by the cylindrical shape of the insulating layer 502.

Additionally, the bottom portion of the insulating device 10 can include an additional base support layer 505, which adds to the insulation and the structural integrity of the insulating device 10. The base support layer 505 may also provide additional protection around the bottom of the insulating device 10. In one example, the base support layer 505 can be formed from EVA foam. The base support layer 505 may include a certain design such as a logo or name that can be molded or embossed directly into the material. The base support ridge 400, which provides structural integrity and support to the insulating device 10 can also be molded or embossed directly into the base support layer 505. In one example, the base support layer 505 and the base portion 502b can be detached for ease of assembly.

The outer shell 501 can be formed of a top outer layer portion or first shell portion 501a, an outer layer or second outer shell portion 501b, and a bottom or third shell portion 501c. The outer shell 501 provides a covering for the insulating device 10. In one example, the insulating layer 502 can be suspended freely within the outer shell 501. However, it is contemplated that any of the layers could be secured or formed as a one-piece integral structure. The outer shell 501 can be configured to support one or more optional handles or straps (e.g. 210, 212, 218). In this regard, the outer shell 501 can also include multiple reinforcement areas or patches 220 that are configured to assist in structurally supporting the optional handles or straps (e.g. 210, 212, 218). The handles or straps (e.g. 210, 212, 218) and other attachments can be stitched using threads 222, however these threads 222 do not, in one example, extend through the outer shell 501 into the insulating layer 502. Rather, the threads are sewn to the patches 220, and the patches 220 can be RF welded to the outer shell 501 or by any other method disclosed herein.

As shown in FIG. 5A, the first outer shell portion 501a may be attached to the second shell portion 501b by stitching 510. However, the first outer shell portion 501a can be attached to the second shell portion 501b using any known method, e.g., polymer welding, stitching, or other adhesive around the entire perimeter of the second shell portion 501b.

Additionally, in one example, the base support layer 505, which can be formed from EVA foam, can be secured to bottom or third shell portion 501c by lamination. The second shell portion 501b can be secured to the third shell portion 501c and the base support layer 505 by polymer welding (e.g. RF welding), stitching, or adhesives.

The insulating device 10 can include two carry handles 210 that are connected to the frontside 216 of the insulating device 10 and the backside 217 of the insulating device 10. In one particular example, a shoulder strap 218 can be attached via plastic or metal clip to the ring 214 attached to side handles 212 to facilitate carrying insulating device 10 over the shoulder. The insulating device 10 may also include side handles 212 on each end of the cooler. The side handles 212 provide the user with another option for grasping and carrying the insulating device.

Carry handles 210 may also form a slot for receiving rings 214 near the bottom of the attachment point of the carry handles to the insulating device 10. The rings 214 can be secured to the carry handles 210 and the attachment points 213 by stitching, adhesive, or polymer welding and can be used to help secure or tie down the insulating device 10 to another structure such as a vehicle, vessel, camping equipment, and the like or various objects such as keys, water bottle bottles, additional straps, bottle openers, tools, other personal items, and the like.

Figure 2:
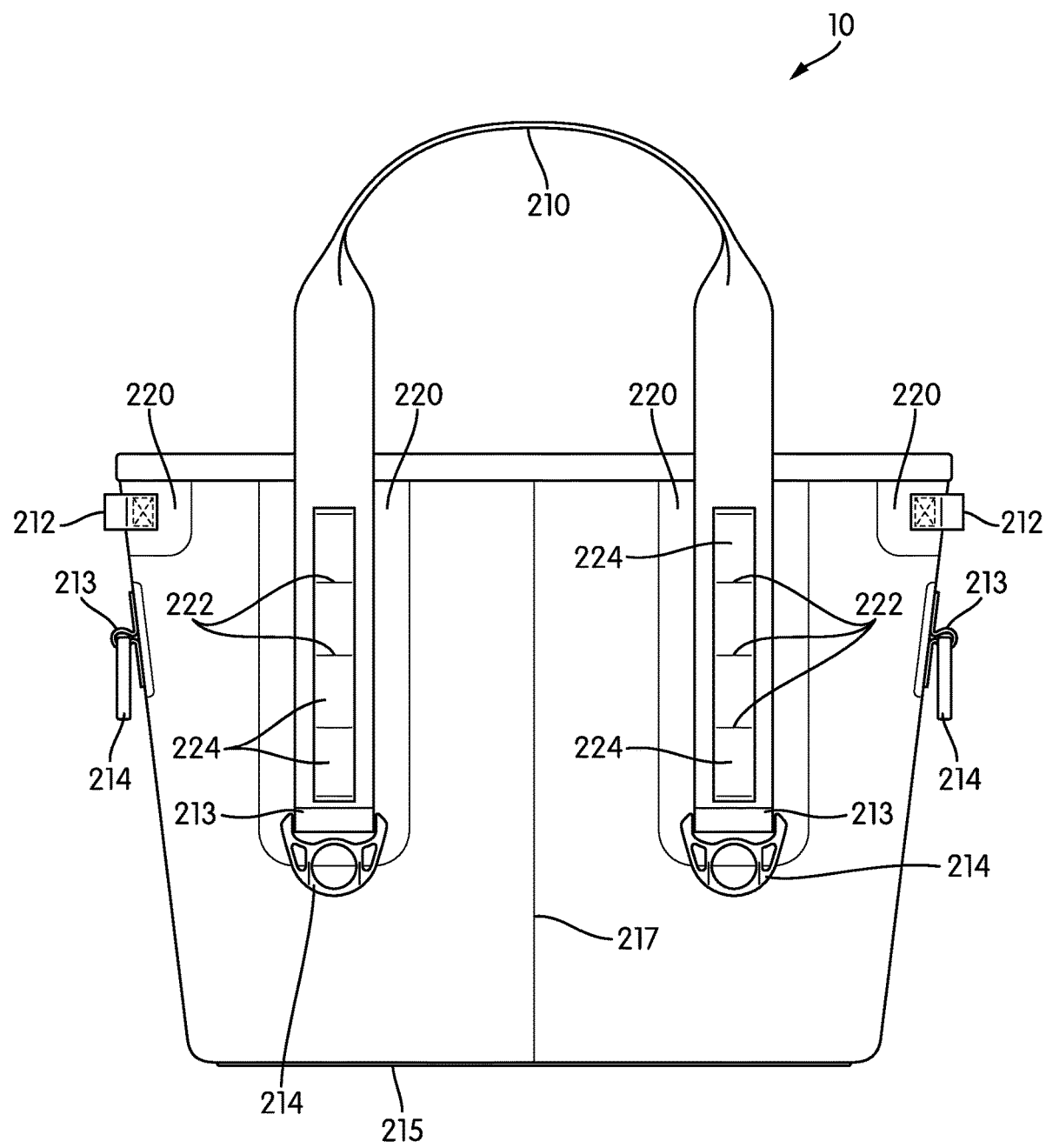
FIG. 2 shows a backside perspective view of the example insulating device of FIG. 1A without the shoulder strap.

Additionally, as shown in FIG. 2, webbing formed as loops 507 can be sewn onto the straps forming the handles 210 on the back of the insulating device 10. The loops 224 can be used to attach items (e.g., carabineers, dry bags) to the insulating device 10. The side handles 212 can also provide the user with another option for securing the insulating device 10 to a structure.

In one example, the carry handles 210, side handles 212, shoulder strap 218 and attachment points 213 can be constructed of nylon webbing. Other materials may include polypropylene, neoprene, polyester, Dyneema, Kevlar, cotton fabric, leather, plastics, rubber, or rope. The carry handles 210 and side handles 212 can be attached to the outer shell by stitching, adhesive, or polymer welding.

The shoulder strap 218 can be attached to the insulating device 10 at attachment points 213. The attachment points 213 can be straps that also form a slot for receiving rings 214. The rings 214 can provide for the attachment of the shoulder strap 218.

In one example, the rings 214 can be Acetal D-rings. Rings 214 in can be plastic, metal, ceramic, glass, alloy, polypropylene, neoprene, polyester, Dyneema, and Kevlar, cotton fabric, leather, plastics, rubber, or rope. Rings 214 can include other shapes, sizes, and configurations other than a "D" shape. Examples include round, square, rectangular, triangular, or rings with multiple attachment points. Additionally, pockets or other storage spaces can be attached to the outside of the insulating device 10 in addition to the carry handles 210 and side handles 212.

In one example, the closure 301 can be substantially waterproof or a barrier to prevent liquid contents from either entering or exiting the insulating device. Additionally, the closure 301 can be impervious to liquid such that insulating device 10 liquid penetration is prevented at any orientation of the insulating device 10. Also maintaining the closure 301 in flat plane can assist in providing a water tight seal.

Figure 3B:
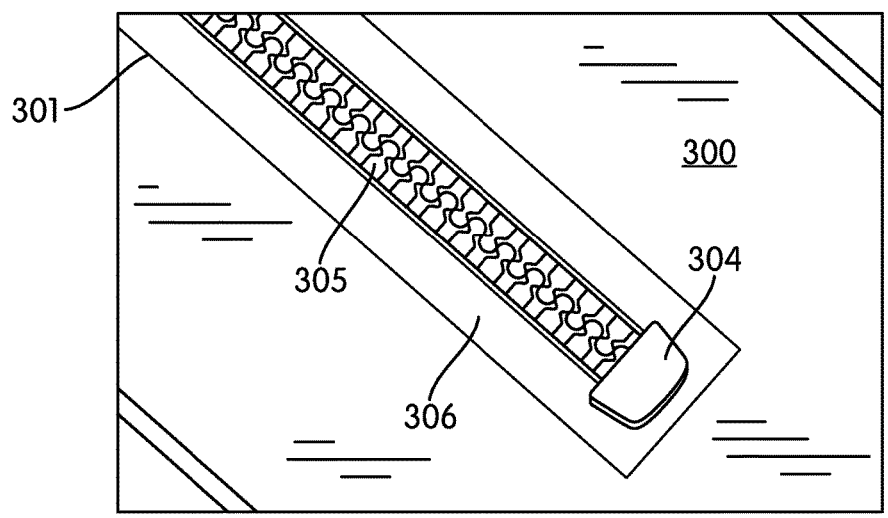
FIG. 3B shows a top view of a portion of the example insulating device of FIG. 1A.
Figure 3C:
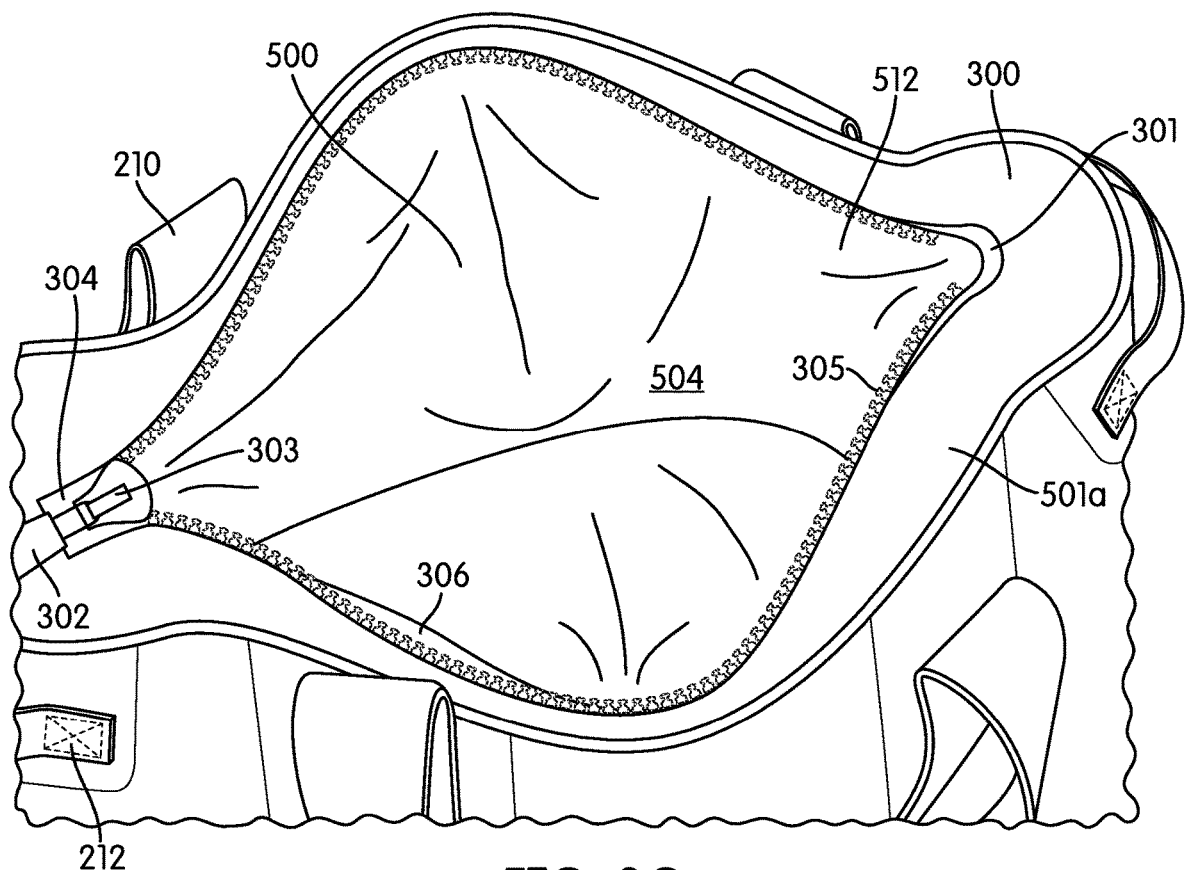
FIG. 3C shows a portion of an alternate top perspective view of the example insulating device of FIG. 1A.

FIGS. 3A-3C depicts top views of the insulating device 10, and depicts the top outer layer or the first outer shell portion 501a and the closure 301. The top outer layer 501a depicted in FIG. 3A can be secured to the closure 301. In one example, the closure 301 can be a waterproof zipper assembly and can be watertight up to 7 psi above atmospheric pressure during testing with compressed air. However, in other examples, the water tightness of the closure 301 can be from 5 psi to 9 psi above atmospheric pressure and in other examples, the water tightness of the closure 301 can be from 2 psi to 14 psi above atmospheric pressure. The waterproof zipper assembly can include a slider body 303 and pull-tab 302. FIG. 3B shows a magnified view of the closure 301 that includes bottom stop 304 and teeth or a chain 305. In one particular example, the waterproof zipper assembly can be constructed with plastic or other non-metallic teeth 305 to prevent injury when retrieving food or beverages from the inner chamber 504.

As shown in FIG. 3C, the closure 301 is open or unzipped and an aperture 512 formed in the outer shell 501 and the inner liner 500 is open and reveals the inner liner 500 and the inner chamber 504. It is contemplated that the closure or seal 301 can include various sealing devices in addition to the depicted waterproof zipper assembly in FIGS. 3A-3C. For example, Velcro, snaps, buckles, zippers, excess material that is folded multiple times to form a seal such as a roll-down seal, seals, metal or plastic clamps and combinations thereof could be used to seal the inner liner 500 and the outer shell 501.

Figure 8A:
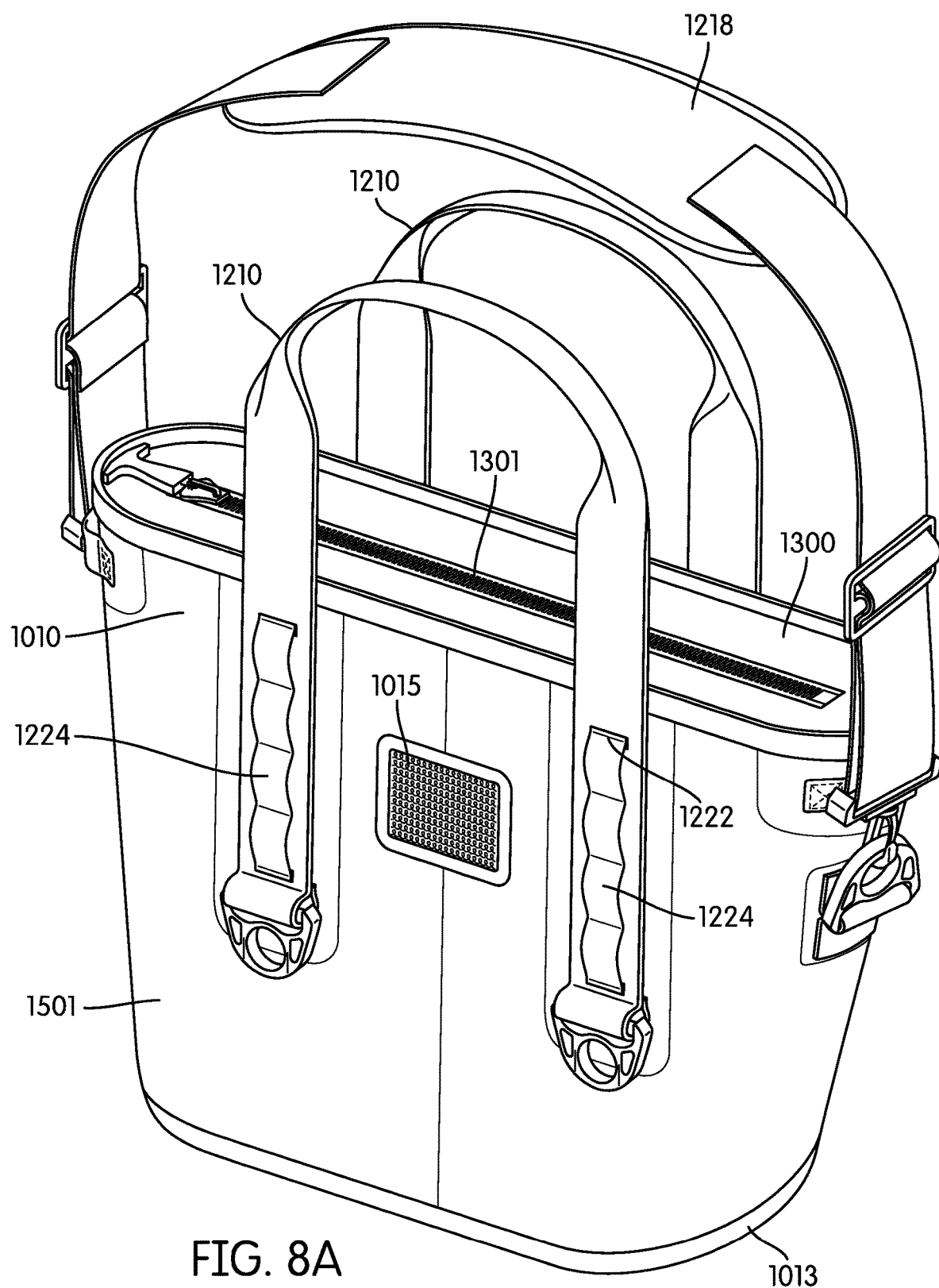
FIGS. 8A and 8B depict perspective views of an alternative example insulating device.
Figure 8B:
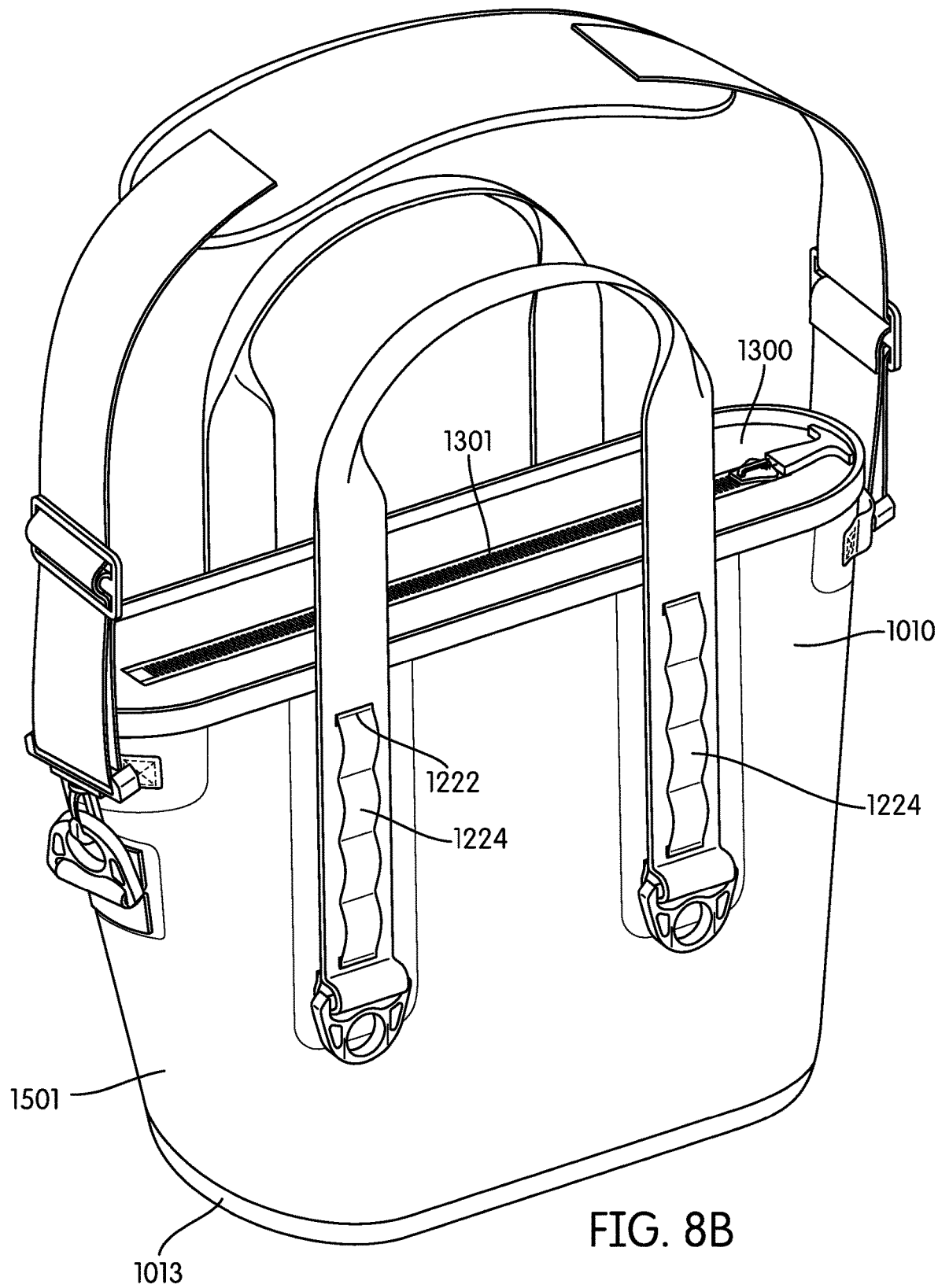

FIGS. 8A and 8B depict another exemplary insulating device 1010, which has similar features and functions as the example discussed above in relation to FIGS. 1A-5B in which like reference numerals refer to the same or similar elements. However, in this example, a loop patch 1015 can be provided on the front of the bag. The loop patch 1015 can be configured to receive many types of items or a corresponding group of hooks, which can be placed onto the surface anywhere on various items, such as fishing lures, keys, bottle openers, card holders, tools, other personal items, and the like. The loop patch 1015 can include a logo, company name, personalization, or other customization. The loop patch 1015 can be formed of by needle loops and can have a high cycle life of over 10,000 closures. In addition, the loop patch can be washable and UV resistant to prevent discoloration. The loop patch can be selected based on a desired sheer and peel strength depending on the types of materials that are to be secured to the insulating device 1010.

In the example shown in FIGS. 8A and 8B, additionally, a strip 1013 of material can be provided along the bottom of the bag, which can provide additional strength and reinforcement to the outer shell 1501, and may enhance the aesthesis of the insulating device 1010.

Figure 6:
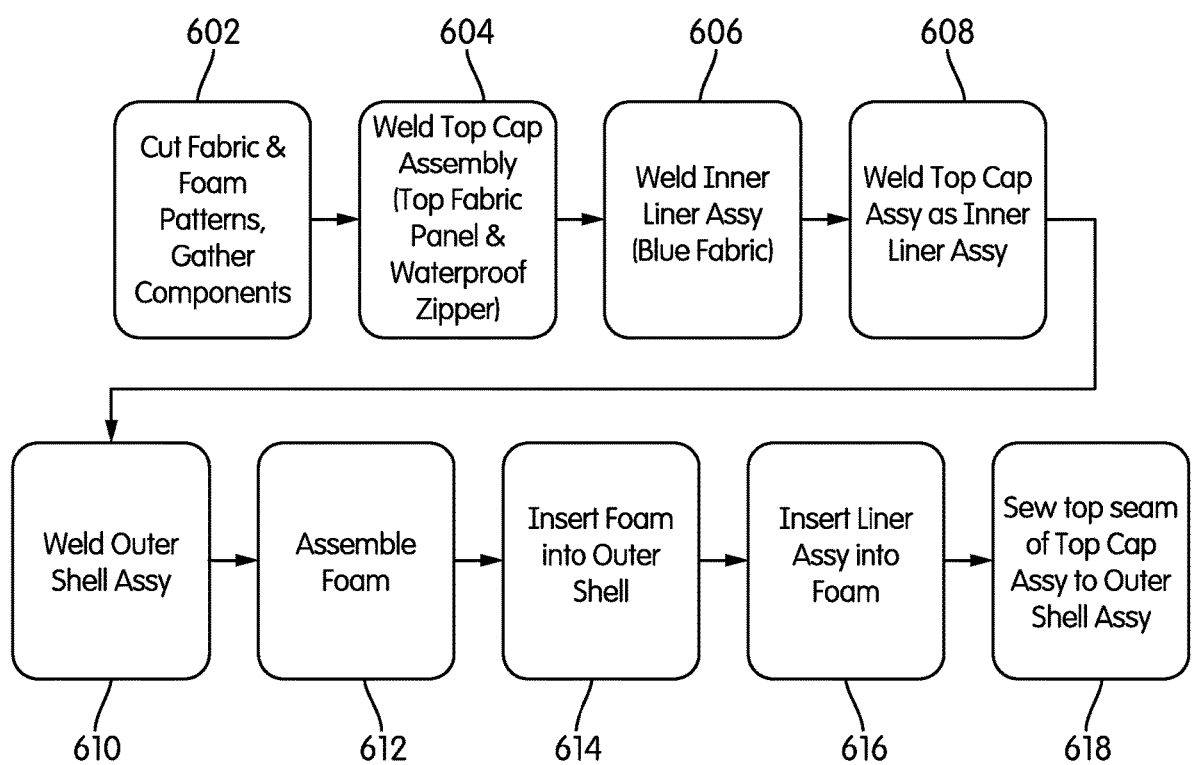
FIG. 6 illustrates an exemplary process flow diagram for forming an insulating device.

Example methods of forming the insulating device 10 will now be described. A general overview of an exemplary assembly process of the insulating device 10 is depicted schematically in FIG. 6. The various steps, however, need not necessarily be performed in the order described. As shown in step 602 first the portions used to form the inner liner 500, the outer shell 501, and the insulating layer 502 can be formed or cut to size. In step 604, a top cap assembly 300 can be assembled to the closure 301. In step 606, the inner liner 500 can be formed, and in step 608, the top cap assembly 300 can be welded to the inner liner 500. In step 610, the outer shell 501 can be formed. In step 612, the insulation layer 502 can be assembled, and in step 616, the insulation layer 502 can be placed into the inner liner. Finally, in step 618, the top cap assembly 300 can be secured to the outer shell 501.

Figure 7A:
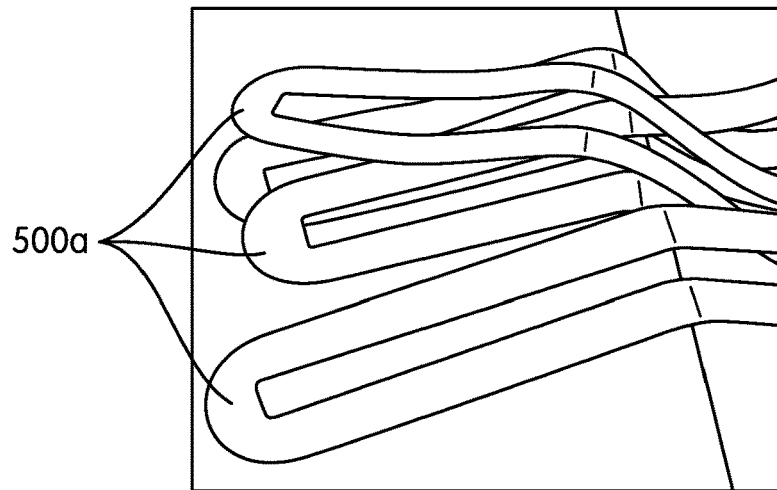
FIGS. 7A-7J illustrate exemplary methods of forming an insulating device.
Figure 7B:
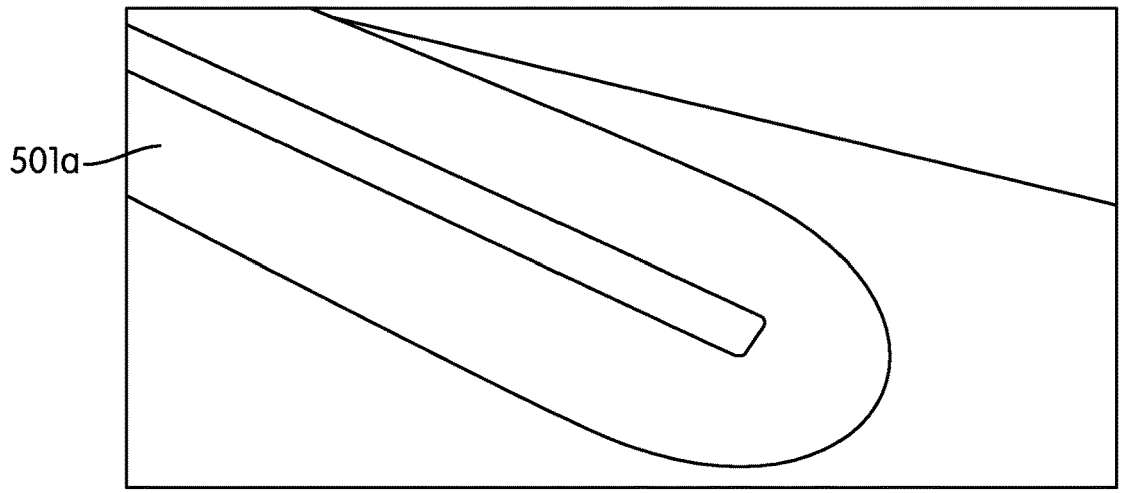
Figure 7C:
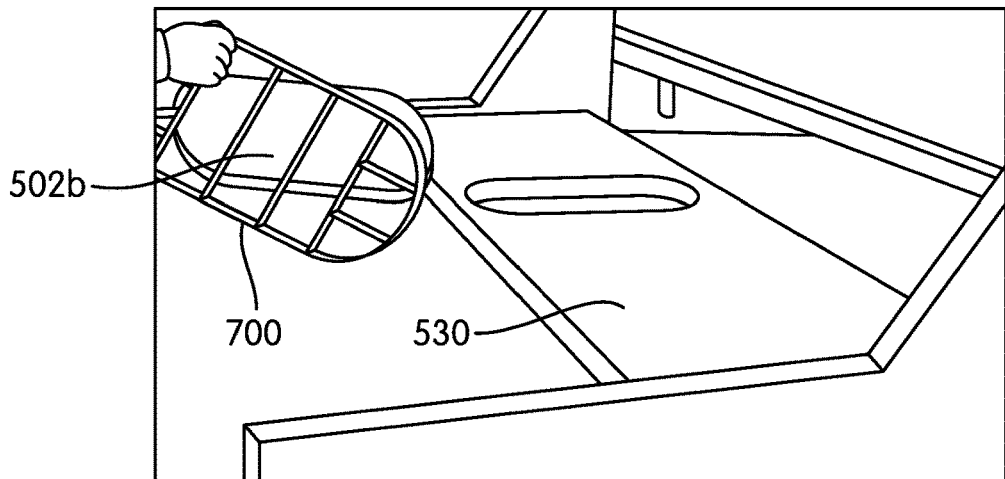

Referring to step 602, as shown in FIGS. 7A and 7B, inner liner top portions or first inner liner portions 500a and top outer layer 501a that form the top cap assembly 300 can be formed or cut to size. FIG. 7C shows a second portion or base portion 502b of the insulating layer 502 being cut or formed to size from stock foam. In this example, the base portion 502b is cut from the stock foam 530, by cutting tool 700. In one example, the cutting tool 700 can be formed in the shape of the base portion 502b.

Figure 5B:
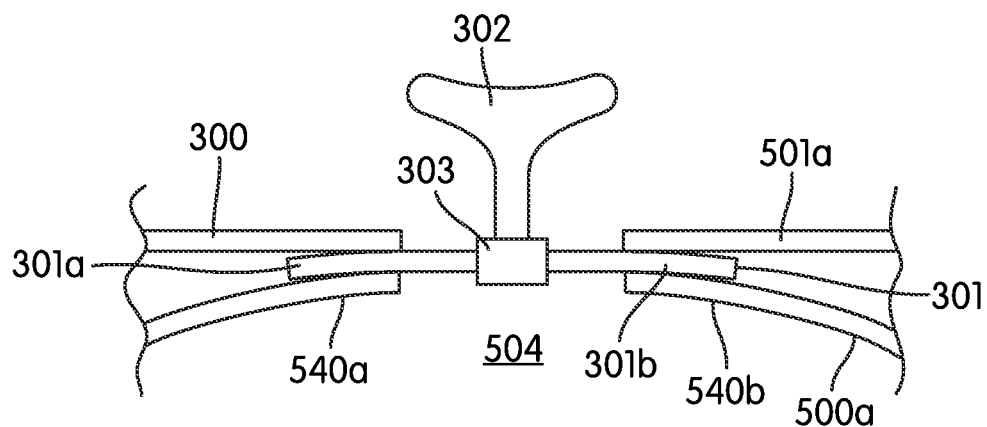
FIG. 5B illustrates another schematic of an enlarged portion of a cross-sectional view of the example insulating device of FIG. 1A.
Figure 7D:
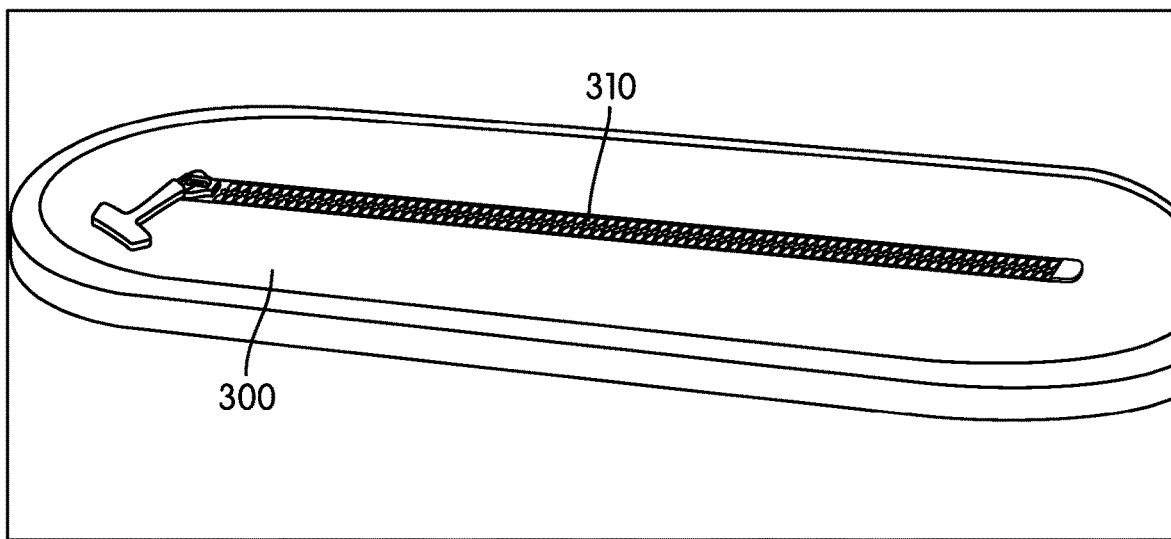
Figure 7E:
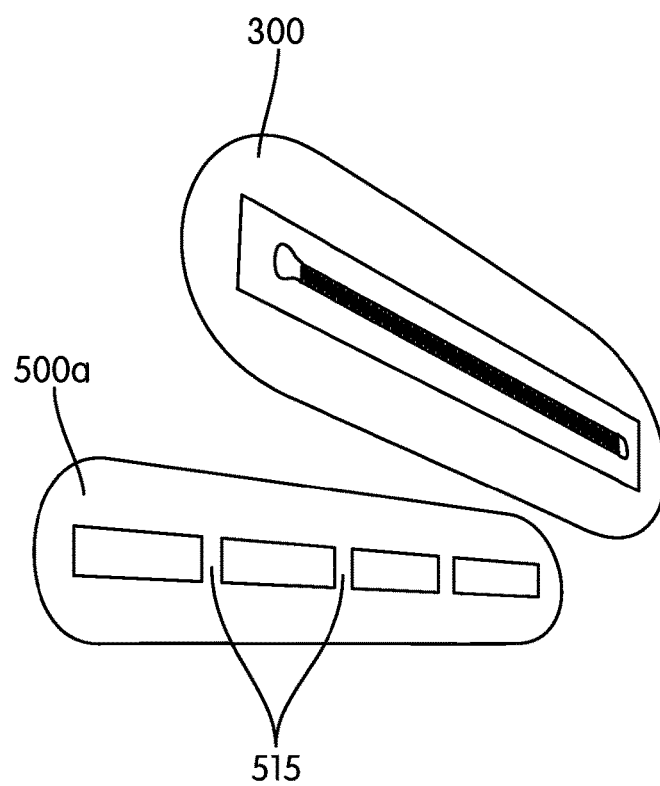

Referring now to step 604 and FIG. 7D, the top outer layer 501a and the top inner liner portion 500a can be secured to the closure 301 to form the top cap assembly 300, and the top outer layer 501a and the top inner liner portion 500a can be secured to the closure 301 in a flat, horizontal plane. Referring to FIGS. 5A-5B the top outer layer 501a can be attached by polymer welding or adhesive to closure 301. In particular as shown schematically in FIG. 5B, the closure 301 can be provided with a first flange 301a and a second flange 301b, which can form waterproof zipper tape 306. The top outer layer 501a can be attached directly to the top surfaces of the first flange 301a and the second flange 301b of the closure 301. In one example, the first flange 301a and the second flange 301b, can be RF welded to the underside of the top outer layer 501a. In another example, as shown in FIG. 7E, the top inner liner portion 500a can be provided with tabs 515. Tabs 515 can assist in the assembly process to keep the outer strips of the top inner liner portion 500a in place during assembly and can be removed after the top cap assembly 300 is formed.

In one example, the top inner liner portion 500a can be attached to the structure of the insulating device 10 as shown schematically in FIG. 5B. In particular, the top inner liner portion 500a can be attached to the bottom of the closure 301. For example, as shown in FIG. 5B, and a first end 540a and a second end 540b of the top inner liner portion 500a can be attached to undersides of the first flange 301a and the second flange 301b. The top inner liner portion 500a and the top outer layer 501a can be attached to the closure 301 by polymer welding or adhesive. Polymer welding includes both external and internal methods. External or thermal methods can include hot gas welding, hot wedge welding, hot plate welding, infrared welding and laser welding. Internal methods may include mechanical and electromagnetical welds. Mechanical methods may include spine welding, stir welding, vibration welding, and ultrasonic welding. Electromagnetical methods may include resistance, implant, electrofusion welding, induction welding, dielectric welding, RF (Radio Frequency) welding, and microwave welding. The welding can be conducted in a flat or horizontal plane to maximize the effectiveness of the polymer welding to the construction materials. As a result, a rugged watertight seam can be created that prevents water or fluids from escaping from or into the inner chamber 504.

In a particular example, the polymer welding technique to connect the top inner liner portion 500a to the bottom of the closure 301 can include RF welding. The RF welding technique provides a waterproof seam that prevents water or any other fluid from penetrating the seam at pressure up to 7 psi above atmospheric pressure. The insulating device 10, therefore, can be inverted or submerged in water and leakage is prevented both into and out of the internal chamber 504 formed by inner liner 500. In one example, the insulating device 10 can be submerged under water to a depth of about 16 feet before water leakage occurs. However, it is contemplated that this depth could range from about 11 feet to 21 feet or 5 feet to 32 feet before any leakage occurs.

Figure 7F:
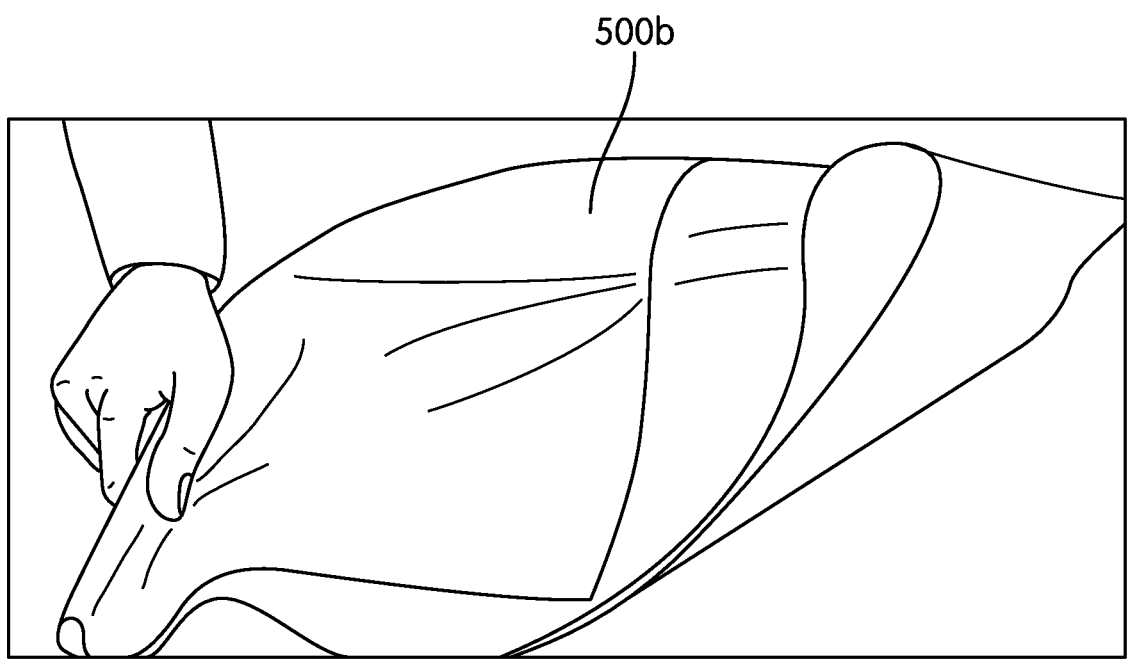

Next referring to step 606 and FIG. 7F, the inner layer mid-portion 500b can be formed by RF welding. As shown in FIG. 7F, the inner layer mid-portion 500b can be formed of a rectangular sheet of material. The inner layer mid-portion 500b can also be secured to the inner layer bottom portion 500c in a subsequent step not shown.

Figure 7G:
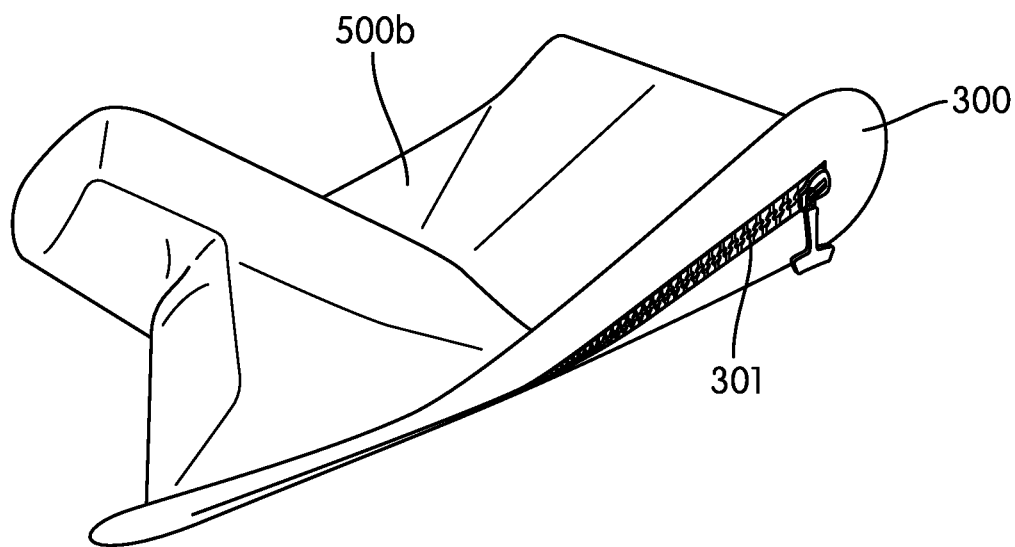
Figure 7H:
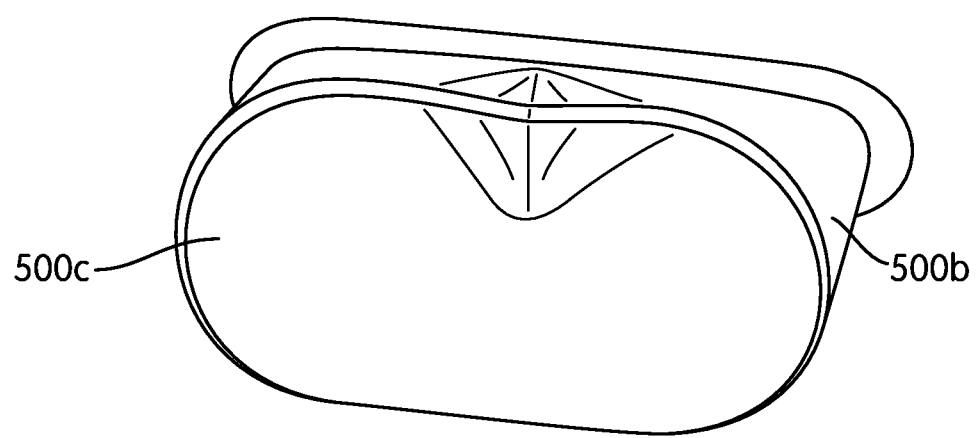

Referring to step 608 and FIGS. 7G and 7H, the inner layer mid portion 500b and the inner layer bottom portion 500c can be secured to the top cap assembly 300 using an RF welding operation.

Referring to step 610, the second shell portion 501b and the third shell portion 501c, which supports the base support layer 505, can be RF welded to construct the outer shell 501 for the insulating device 10. In one example, as shown schematically in FIG. 5A, the top outer layer 501a can be sewed to the perimeter of the second shell portion 501b to form the outer shell 501 of the insulating device. A fabric binding can be used to cover the stitched seam edges of the second shell portion 501b and the top outer layer 501a. This assists in closing or joining the outer shell 501 around the insulating layer 502.

Figure 7I:
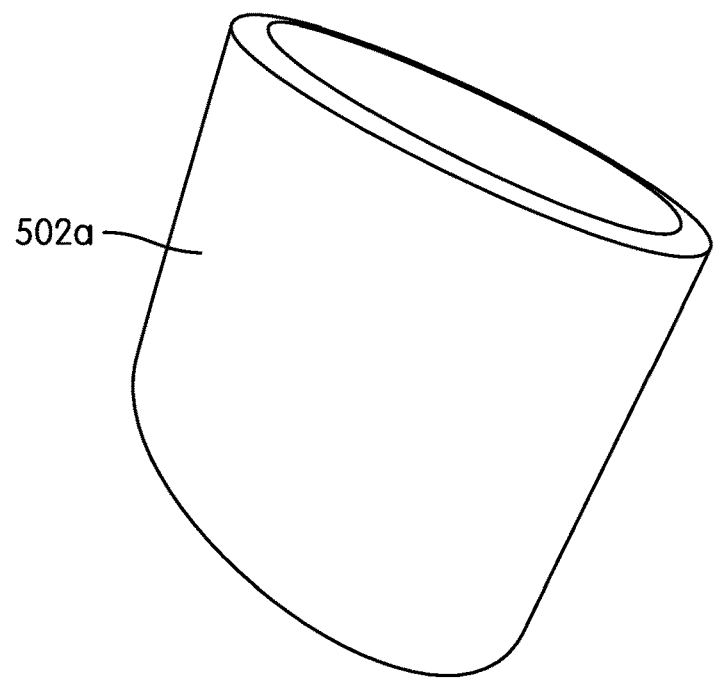
Figure 7J:
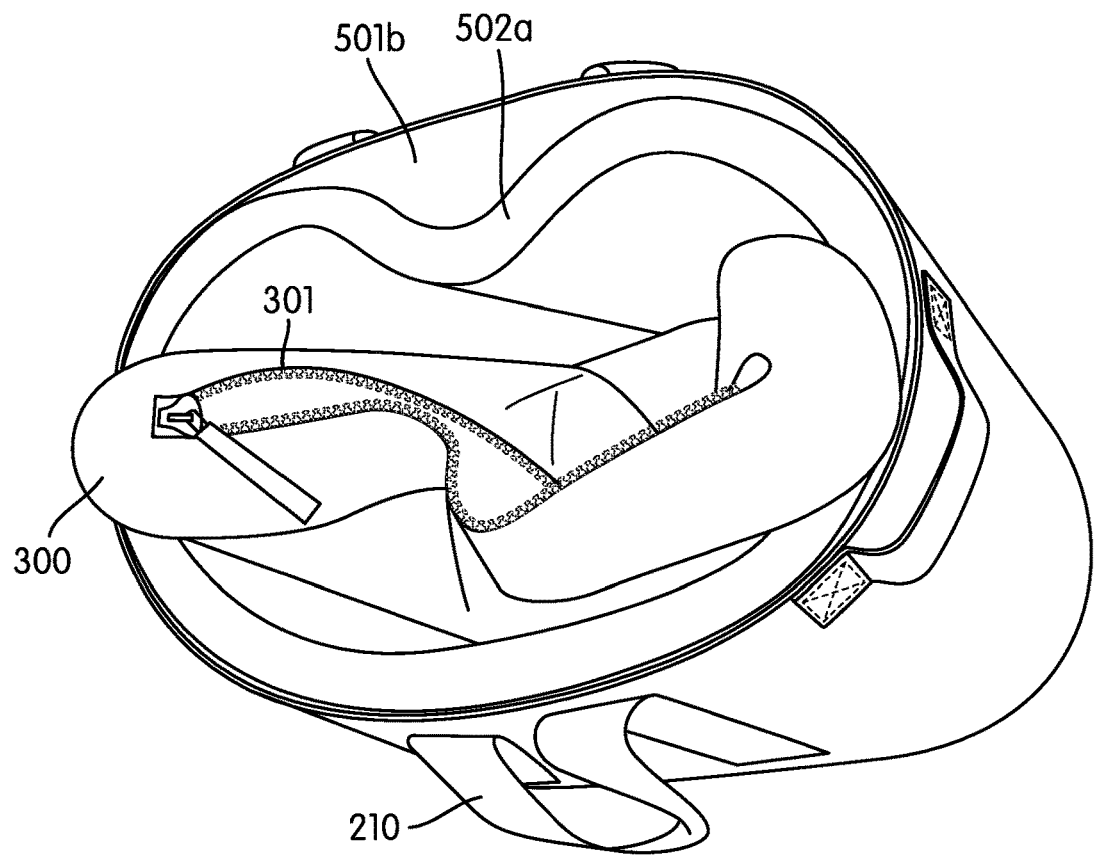

Referring to step 612 and FIG. 7I, the insulating layer 502 can be constructed. In one example the first portion 502a of the insulating layer 502 can be formed into a rectangular shape and can be secured at the smaller sides of the rectangular shape using double sided tape to form the cylindrical shape. The second portion or base portion 502b can be formed into an oval shape that can have a smaller circumference than the circumference of the cylindrical shape of the first portion 502a. The second portion 502b can be secured to the first portion 502a also using a double-sided tape to form the insulating layer 502. In one example, double sided tape can be placed either around the inner perimeter of the first portion 502a cylinder or around the outer perimeter of the base portion 502b, and the base portion 502b can be adhered to the first portion 502a. Other methods of securing the base portion 502b to the first portion 502a to form the insulating layer 502 are contemplated, such adhesives or polymer welding.

Referring to step 614, the assembled insulating layer 502 can be placed into the outer shell 501. In step 616, the formed inner liner 500 and top cap assembly 300 can be placed into the insulating layer 502.

Finally in step 618 the top cap assembly 300 can be sewed to the outer shell 501 to form seams 520 as depicted schematically in FIG. 5A. In this way, neither the inner liner 500 nor the outer shell 501 need to be bound to the insulating layer 502. Also the inner liner 500 is only connected to the closure 301 and the closure 301 holds the inner liner and the outer shell 501 together, which results in a simpler manufacturing process. After sewing the top cap assembly 300 to the outer shell 501, a fabric binding is added to cover the raw edges adjacent the seams 520. Thus, the top seams 520 can be the only primary seams on the insulating device 10 that are created by stitching.

In one particular example, the inner liner 500 and the outer shell 501 can be constructed from double laminated TPU nylon fabric. Nylon fabric can be used as a base material for the inner liner 500 and the outer shell 501 and can be coated with a TPU laminate on each side of the fabric. The TPU nylon fabric used in one particular example is 0.6 millimeters thick, is waterproof, and has an antimicrobial additive that meets all Food and Drug Administration requirements. However, it is contemplated that the fabrics used to construct the insulating device incorporate antimicrobial materials to create a mildew-free environment that is food contact surface safe. In one specific example, the nylon can be 840d nylon with TPU. Alternative materials used to manufacture the inner shell or chamber 504 and outer shell 501 include PVC, TPU coated nylon, coated fabrics, and other weldable and waterproof fabrics.

A closed cell foam can be used to form the insulating layer 502 that is situated in between the inner liner 500 and the outer shell 501. In one example, the insulating layer 502 is 1.0 inches thick. In one example, the insulating layer 502 can be formed of NBR/PVC blend or any other suitable blend. The thermal conductivity of an example insulating layer 502 can be in the range of 0.16-0.32 BTU·in/(hr·sqft·° F.), and the density of the insulating layer 502 can be in the range of 0.9 to 5 lbs/ft$^3$. In one example, the thermal conductivity of the insulating layer 502 can be in the range of 0.25 BTU·in/(hr·sqft·° F.), and the density of the insulating layer 502 can be 3.5 lbs/ft$^3$.

The foam base can be manufactured from an NBR/PVC blend or any other suitable blend. In addition to the base portion 502b of the insulating layer 502, the insulating device 10 may also include an outer base support layer 505 constructed of foam, plastic, metal or other material. In one example, the base portion 502b can be detached from the base support layer. In one example, the base portion 502b is 1.5 inches thick. Additionally as shown in FIG. 5A, the EVA foam base support layer 505 can be 0.2 inches thick. Although the base support layer 505 is laminated to the base outer layer or third shell portion 501c, in an alternative example, the base support layer 505 can be attached to the bottom of the base portion 502b by co-molding, polymer welding, adhesive, or any known methods.

A heat gain test was conducted on the exemplary insulating device 10. The purpose of a heat gain test is to determine how long the insulating device can keep temperature below 50° F. at an ambient of 106° F.±4 with the amount of ice based on its internal capacity.

The procedure is as follows:

1. Turn on the oven and set to 106° F.±4. Allow the oven to stabilize for at least one hour.

2. Turn on the chart recorder. The recorder shall have three J-thermocouples connected to it to chart the following temperatures: (1) Test unit, (2) Oven, and (3) Room ambient.

3. Stabilize the test unit by filling it to half its capacity with ice water, and allowing it to sit for 5 minutes at room temperature (72° F.±2).

4. After 5 minutes, pour out the contents, and immediately connect the J-thermocouple end to the inside bottom center of the unit. The thermocouple wire end must be flush to the inside bottom surface and secured with an adhesive masking tape.

5. Pour the correct amount of ice ensuring the thermocouple wire is not moved. Amount of ice is based on 4 lbs. per cubic feet of the internal capacity of the unit.

6. Close the lid and position the test unit inside the oven.

7. Close the oven making sure the thermocouple wires are functioning.

8. Mark the start of the chart recorder.

Apparatus: 1. Oven. 2. Ice. 3. Chart Recorder. 4. J-Thermocouples (3). Results: 1. Cold Retention Time: Elapsed time from <32° F. to 50° F. in decimal hours. 2. Heat Gain Rate (° F./Hr): (50° F.-32° F.)÷Elapsed Time=18° F.÷Elapsed Time In one test of the example insulating device, the heat gain rate equaled 1.4 deg F./hr assuming 26.5 quarts capacity and used 3.542 lbs. of ice for the test.

The ability of the insulating device 10 to withstand interior leaks can also be tested to see how well the insulating device maintains the contents stored in the storage compartment or receptacle 504. In one example test, the insulating device 10 can be filled with a liquid, such as water, and then can be inverted for a predetermined time period to test for any moisture leaks. In this example, the insulating device 10 is filled with a liquid until approximately half of a volume of the receptacle 504 is filled, e.g. 3 gallons of water, and the closure 301 is then closed fully to ensure that the slider body 303 is completely sealed into the horseshoe-shaped portion 308. The entire insulating device 10 is then inverted and held inverted for a time period of 30 minutes. The insulating device 10 is then reviewed for any leaks.

Figure 9:
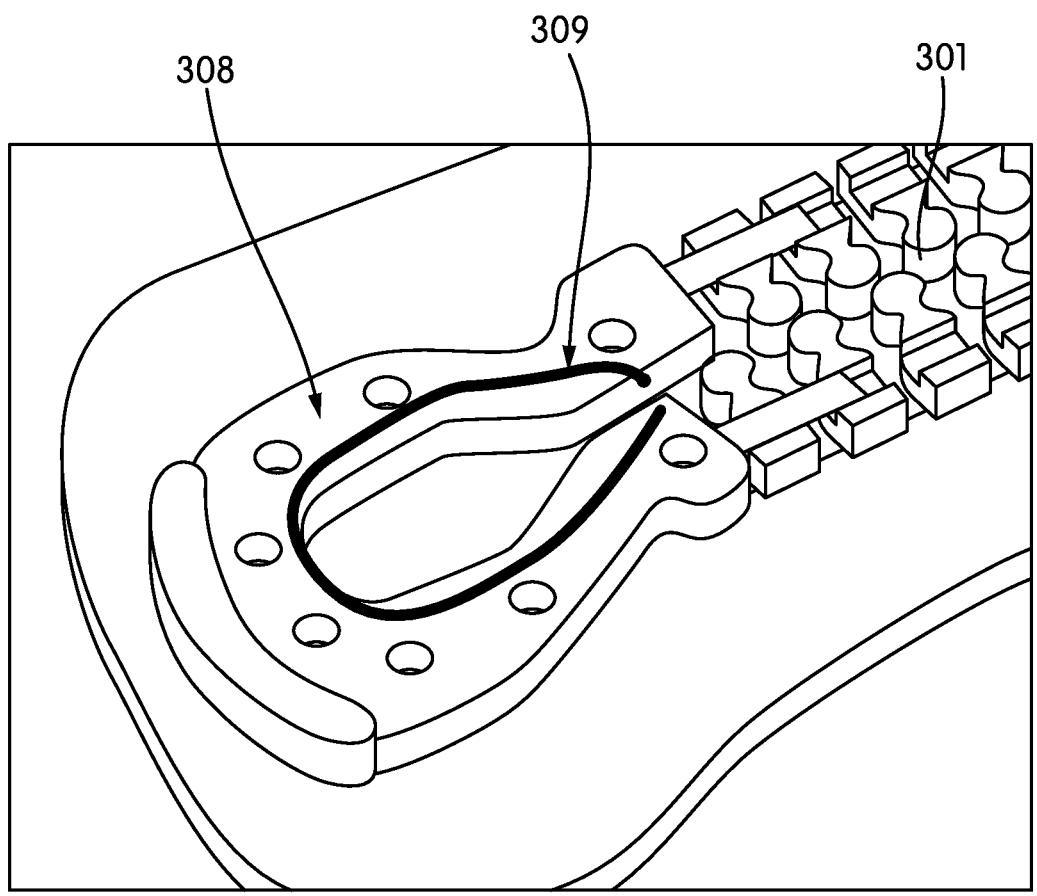
FIG. 9 depicts a portion of an exemplary closure and an example test method for determining if an insulating device maintains the contents therein.

The insulating device 10 can be configured to withstand being held inverted for 30 minutes without any water escaping or leaving the receptacle 504. In alternative examples, the insulating device can be configured to withstand being held inverted for 15 minutes to 120 minutes without any water escaping or leaving the receptacle 504. To perform this test, it may be helpful to lubricate the closure to ensure that the closure is adequately sealed. For example, as shown in FIG. 9, a horseshoe-shaped portion 308 of the closure 301 is provided with lubricant 309.

The strength and durability of the fabric forming the outer shell 501, inner liner 500 and the insulating layer 502 of the insulating device 10 may also be tested. In one example, the test can be devised as a puncture test. In particular, this test can be designed as an ASTM D751-06 Sec. 22-25 screwdriver puncture test. In one example, the insulating device 10 can withstand 35 lbs. to 100 lbs. of puncture force.

Figure 10:
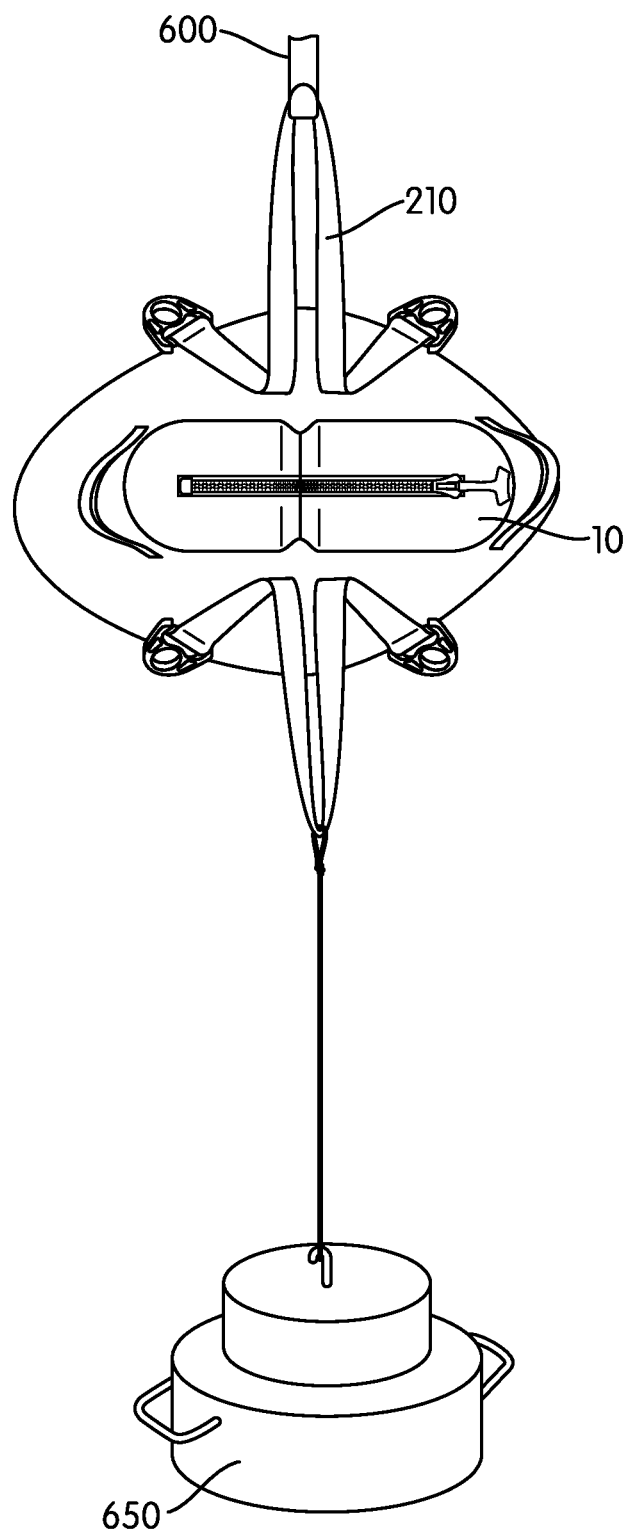
FIG. 10 depicts an example test for determining the strength of an insulating device.

The handle strength and durability of the insulating device 10 can also be tested. One such example test is depicted in FIG. 10. As depicted in FIG. 10, the closure 310 can be fully closed, one of the carry handles 210 can hooked to an overhead crane 600, and the opposite carry handle 210 is hooked to a platform 650, which can hold weight. In one example, the platform 650 can be configured to hold 200 lbs. of weight. During the test, the crane 600 is slowly raised, which suspends the insulating device 10 in a position where the bottom plane of the insulating device 10 is perpendicular with the floor. In one example, the insulating device 10 can be configured to hold 200 lbs. of weight for a minimum of 3 minutes without showing any signs of failure. In alternative examples, the insulating device can be configured to hold 100 lbs. to 300 lbs. of weight for 1 to 10 minutes without showing signs of failure.

Figure 11:
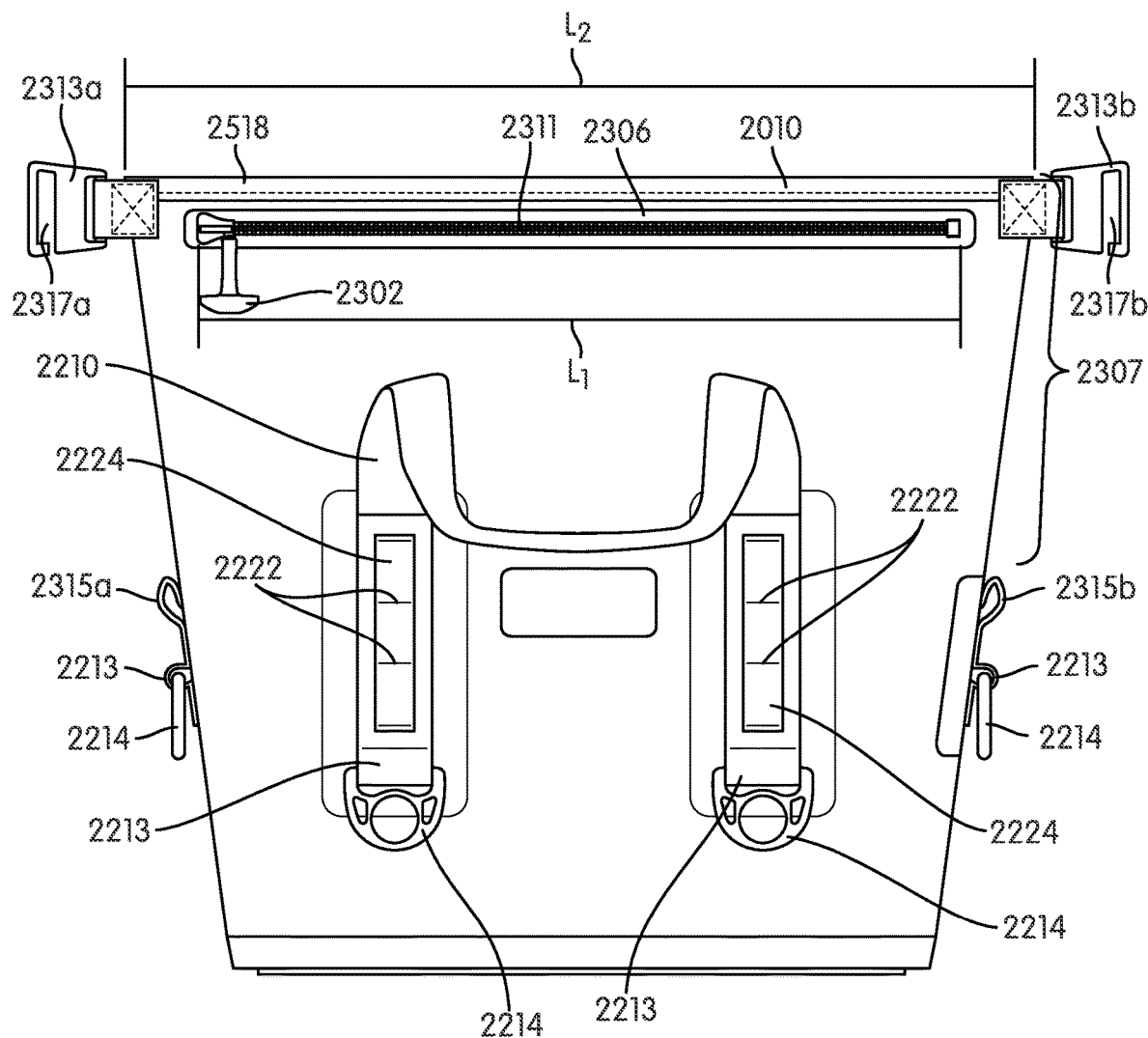
FIG. 11 shows a front view of another exemplary insulating device.

FIGS. 11-15 show another example insulating device 2010. The example insulating device 2010 can be of a similar construction to the above examples, where like reference numerals represent like features having similar functionality. However, the example insulating device 2010 can also include a fold-down flap or portion 2307 to assist in insulating the closure 2311 of the insulating device 2010. Specifically, the closure 2311, which can be a zipper in accordance with the other examples discussed herein, can be included on a fold-down flap or portion 2307 and can be front facing in that it is located on a front surface or wall of the insulating device 2010. The front facing closure 2311, can allow for additional user access to the insulating device 2010, and the fold-down flap or portion 2307 can help to provide additional insulation at the closure 2311. In this example, when the fold-down flap 2307 is in the extended position and the closure 2311 is open or unsealed, the contents in the insulating device 2010 maintain the closure 2311 in the open position for better access of the contents of the insulating device 2010. This may assist the user to be able to more easily access the contents of the insulating device 2010. Also as shown in FIG. 11, when the fold-down flap 2307 is in the extended position, the insulating device 2010 can approximate a trapezoidal shape for providing an elongated closure at the top of the insulating device 2010.

Figure 12:
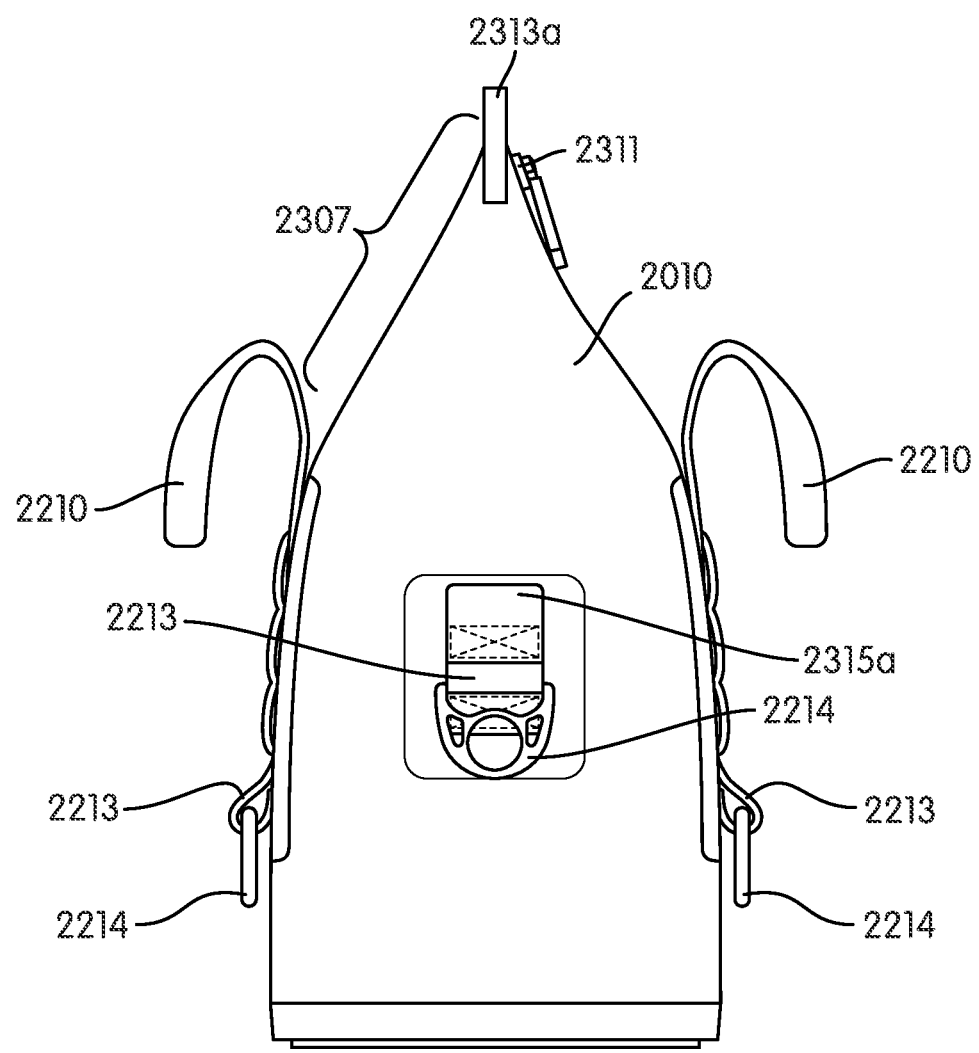
FIG. 12 shows a side view of the exemplary insulating device of FIG. 11.
Figure 13:
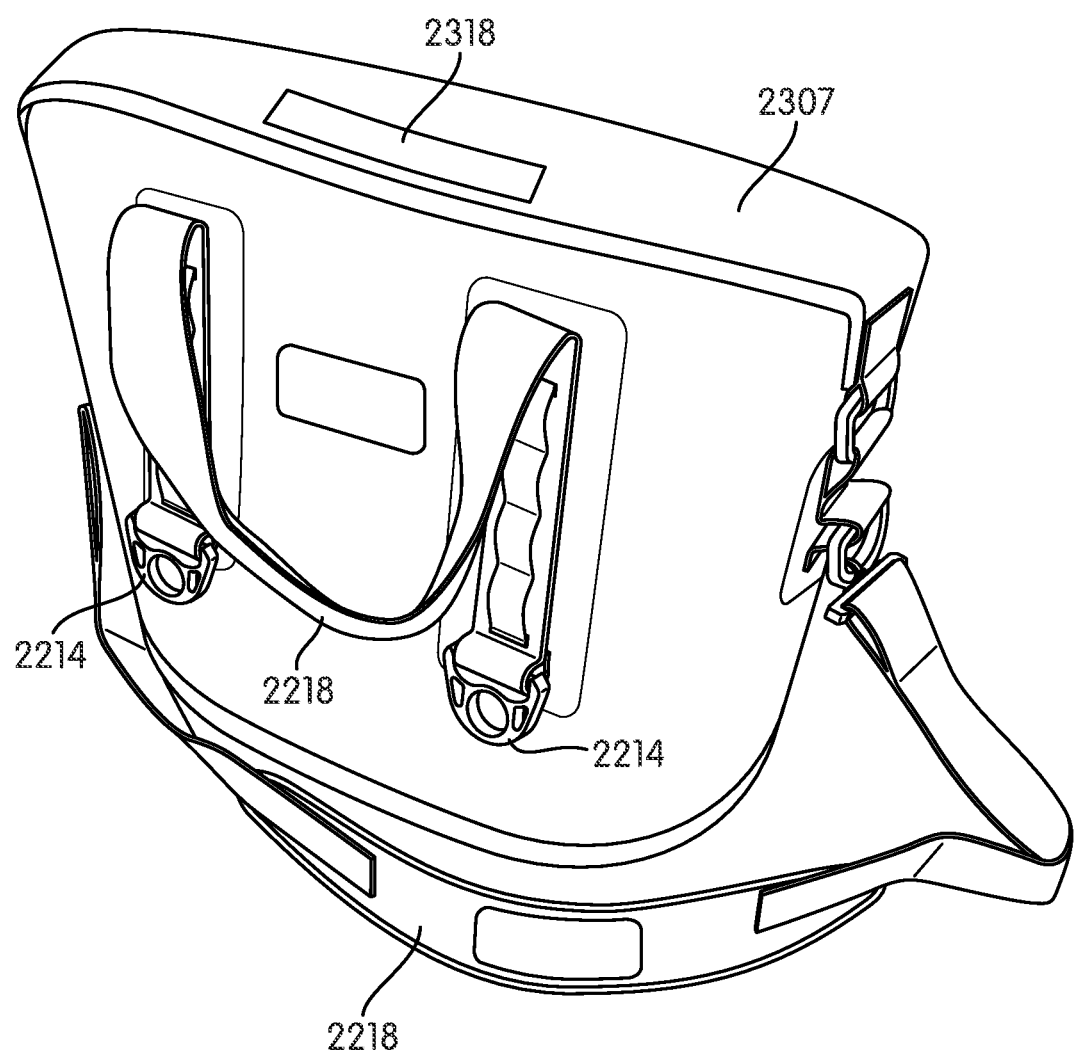
FIG. 13 shows a front perspective view of the exemplary insulating device in an alternate configuration.
Figure 14A:
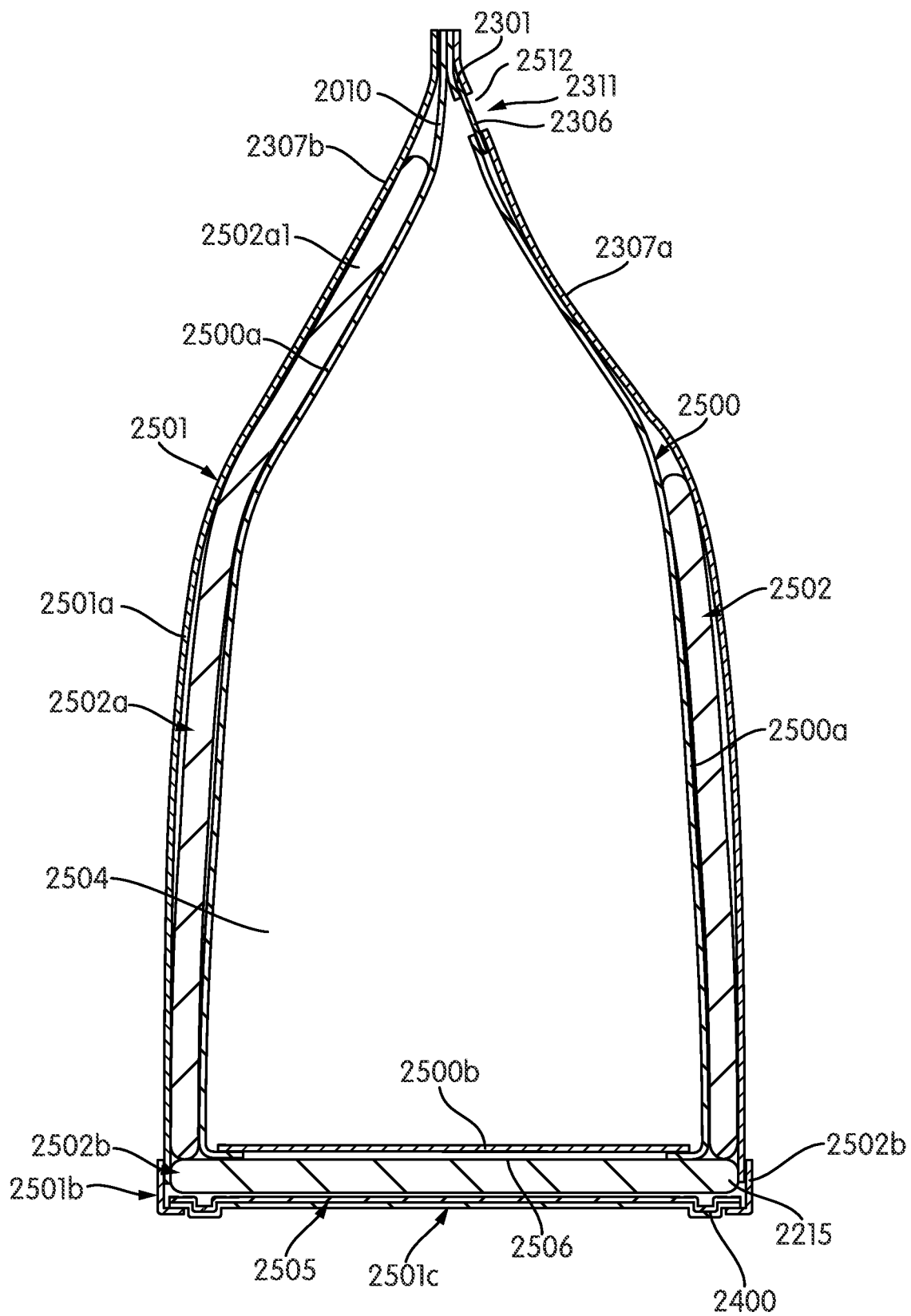
FIG. 14A shows a side and cross-sectional view of the exemplary insulating device of FIG. 11.

As shown in the side and cross-sectional views, i.e., FIGS. 12 and 14A, the insulating device 2010 can approximate a pentagon, when the fold-down flap 2307 of the insulating device 2010 is in an extended position. This general shape may provide for an insulating device 2010 that may be easily shipped in that several insulating devices can be fit into a shipping container. Nevertheless, other shapes and configurations are contemplated e.g., square, rectangular, triangular, conical, curved, and frusto-shapes which may provide an extended closure at the top of the insulating device 2010 and that can be easily packaged.

Like in the above examples, the insulating device 2010 may include an outer shell 2501, an inner liner 2500 forming a storage compartment, a receptacle, or inner chamber 2504 and an insulating layer 2502 positioned in between the outer shell 2501 and the inner liner 2500. The insulating layer 2502 provides insulation for the storage compartment 2504. The closure 2311 can be configured to substantially seal an opening 2512, which is located on an angled front facing surface and extends through the outer shell 2501 and the inner liner 2500 to provide access to the storage compartment 2504. Also, the closure 2311 can include similar features and functionality in accordance with the examples discussed above. In one example, the closure 2311 can be a zipper and can be substantially waterproof so as to resist liquid from exiting the opening when the insulating device 2010 is in any orientation. Also, similar to the above examples, the insulating device 2010 can be provided with one or more of carry handles 2210, shoulder straps 2218, webbing loops 2224 formed with threads 2222 by stitching for example, rings 2214, and attachment points 2213 which can have similar features and functionality as in the examples above.

As shown in FIGS. 11 and 12 and as noted above, the fold-down flap 2307 may include the front facing closure 2311 and can be folded over and secured to a sidewall of the insulating device 2010 to further insulate the front facing closure 2311. The fold-down flap 2307 of the fastening mechanism 2301 can include first and second end hooks or clips 2313*a*, 2313*b*. In one example, each of the end clips 2313a, 2313b can include a slot 2317a, 2317b for being received in corresponding loops 2315a, 2315b located on the sides or the sidewalls of the insulating device 2010. To close the insulating device 2010, the fold-down flap 2307 along with the front facing closure 2311 are folded over onto a front face or wall of the insulating device 2010. The fold-down flap 2307 folds over with and conceals or covers the front facing closure 2311. The fold-down flap 2307 is held into place by the first and second end clips 2313a, 2313b and maintains the fastening mechanism 2301 in the closed position. Additionally, when the fold-down portion 2307 is secured to the sidewalls of the insulating device 2010, the fold-down portion 2307 extends at least partly in a substantially horizontal direction, which orients a carrying handle 2318 in position for a user to grasp for holding and carrying the insulating device 2010. As in the other handles and straps, the carry handle 2318 can be secured to the outer shell with a reinforcement patch (not shown). The carry handle 2318 can be provided on the rear surface of the insulating device 2010 to oppose the closure 2311 on the front facing surface, which can be used by the user to grasp during opening and closing the insulating device 2010 to make it easier for the user to open and close the closure 2311. The carry handle 2318 may also be used for hanging the insulating device 2010, or for carrying the insulating device 2010; however, other uses are also contemplated.

FIG. 14A shows a cross-sectional side view of the insulating device 2010. The insulating device 2010 includes an inner liner 2500, an insulating layer 2502, and an outer shell 2501. As shown in FIG. 14A, like in the above examples, the insulating layer 2502 can be located between the inner liner 2500 and the outer shell 2501, and can be formed as a foam insulator to assist in maintaining the internal temperature of the receptacle 2504 for storing contents desired to be kept cool or warm. Also the insulating layer 2502 can be located in between the inner liner 2500 and the outer shell 2501, and can be unattached to either the inner liner 2500 or the outer shell 2501 such that it floats between the inner liner 2500 and the outer shell 2501. In one example, the inner liner 2500 and the outer shell 2501 can be connected at the top portion of the insulating device 2010 such that the insulating layer 2502 can float freely within a pocket formed by the inner liner 2500 and the outer shell 2501.

In this example, the inner layer or inner liner 2500 can be formed of a first inner liner sidewall portion 2500a and a bottom inner liner portion 2500b. The first inner liner sidewall portion 2500a and the bottom inner liner portion 2500b can be secured together, by for example welding, to form the chamber 2504. Like in the above example, the chamber 2504 can be a "dry bag," or vessel for storing contents. In one example, a tape, such as a TPU tape, can be placed over the seams joining the sections of the chamber 2504, after the first inner liner sidewall portion 2500a and the bottom inner liner portion 2500b are secured or joined together. The tape seals the seams formed between the first inner liner sidewall portion 2500a and the bottom inner liner portion 2500b to provide an additional barrier to liquid to prevent liquid from either entering or exiting the chamber 2504. The inner liner 2500 can, thus, either maintain liquid in the chamber 2504 of the insulating device 2010 or prevent liquid contents from entering into the chamber 2504 of the insulating device 2010. It is also contemplated, however, that the inner liner 2504 can be formed as an integral one-piece structure that may be secured within the outer shell.

Figure 15:
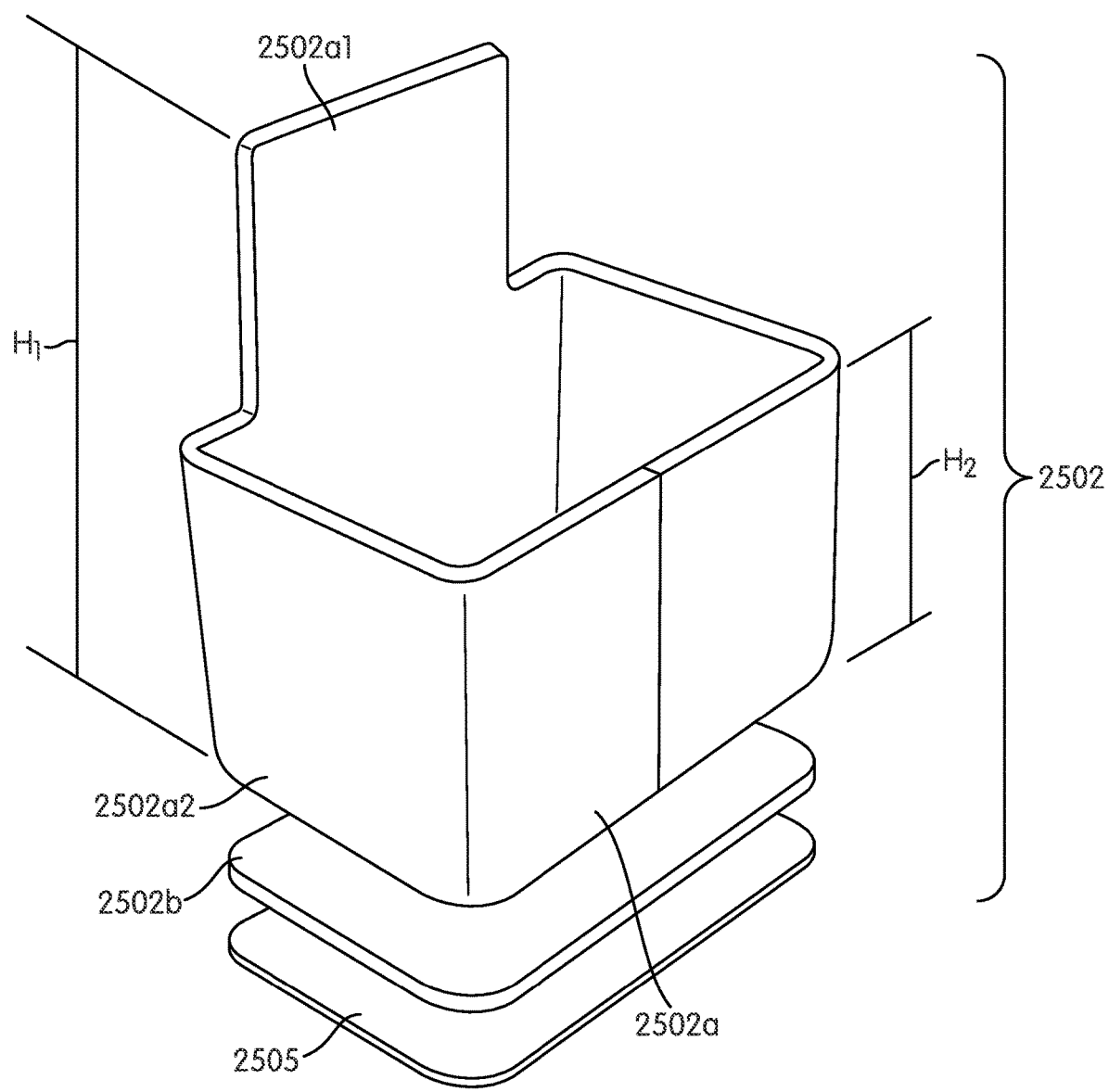
FIG. 15 shows a schematic exploded view of an exemplary insulation layer for the example insulating device of FIG. 11.

As shown in both FIGS. 14A and 15, the insulating layer 2502 can be formed of a first portion or an upper portion 2502a, a second portion or base portion 2502b, and a base support layer 2505. In addition, the first portion 2502a can include a top flap or smaller rectangular shape 2502a1. When the fold-down flap 2307 is folded onto the top portion of the insulating device 2010, the top flap 2502a1 of the insulating layer together with the remainder of the first portion 2502a and the base portion 2502b surrounds substantially all of the inner chamber 2504 with insulation to provide a maximum amount of insulation to the inner chamber 2504 of the insulating device 2010.

When the upper portion 2502a is rolled flat, the upper portion 2502a of the insulating layer 2502 generally resembles a "T" shape such that the insulating layer defines a first height $H_1$ and a second height $H_2$ where the first height $H_1$ is greater than the second height $H_2$. In this example, a majority of the insulating layer can extend to the second height $H_2$, which is less than the first height $H_1$. Also, the first portion 2502a can be formed of two inter-connected rectangular shapes, where the bottom of the first portion 2502a forms a first larger rectangular shape 2502a2 and an upper section of the first portion 2502a forms the top flap 2502a1 of the smaller rectangular shape. It is also contemplated that the first larger rectangular shape 2502a2 can be formed as a separate piece from the smaller rectangular shape 2502a1. The first rectangular shape 2502a2 can have a first rectangular width and the second rectangular shape 2502a1 can have a second rectangle perimeter and first rectangular shape 2502a2 width approximates the second rectangular shape 2502a1 perimeter. In one example, the smaller rectangular shape 2502a1 forms a top flap of the insulation layer of the upper portion 2502a, which extends into the fold-down portion 2307.

The first portion 2502a and the second portion 2502b can be formed of an insulating foam material as discussed herein. In one example, the second portion 2502b can be formed of a thicker foam material than the first portion 2502a. For example, the thickness of the second portion 2502b can be formed between 20 mm and 50 mm thick, and, in one particular example, can be formed of a 38 mm thick foam, and the first portion 2502a can be formed between 15 mm and 30 mm, and, in one particular example, can be formed of a 25 mm thick foam. In one example, the foam can be a NBR/PVC blended foam, a PVC free NBR foam, or other eco-friendly type foam.

Also as shown in FIG. 15, a base support layer 2505 adds to the insulation and the structural integrity of the insulating device 2010 at base 2215. The base support layer 2505 may also provide additional protection around the bottom of the insulating device 2010. In one example, the base support layer 2505 can be formed from EVA foam. The base support layer 2505 may include a certain design such as a logo or name that can be molded or embossed directly into the material. A base support ridge 2400, which provides structural integrity and support to the insulating device 2010 can also be molded or embossed directly into the base support layer 2505. In one example, the base support layer 2505 and the base portion 2502b can be detached or unsecured for ease of assembly in reducing the number of assembly steps. The base portion 2502b can be formed as an oval shape to close off a lower opening 2506 formed by the open shape of the upper portion 2502a.

The bottom of the first portion 2502a maintains its form when folded into an oval-cylindrical shape and placed in between the inner liner 2500 and the outer shell 2501. The insulating layer 2502 maintains its shape which results in the basic oval-cylindrical shape of the insulating device 2010.

The outer shell 2501 can be formed of an upper sidewall portion 2501a, a lower sidewall portion 2501b, and a base portion 2501c. Each of the upper sidewall portion 2501a, the lower sidewall portion 2501b, and the base portion 2501c can be secured by stitching. Other securing methods are also contemplated, such as, using welds or adhesives.

Additionally, the fold-down portion 2307 can be at least partly free of foam to make it easier to close the fastening mechanism 2301. In particular, the fold-down portion 2307 can include a first section 2307a and a second section 2307b. The first section 2307a can be free of the insulation layer 2502 and the second section can include the insulation layer 2502.

Figure 14B:
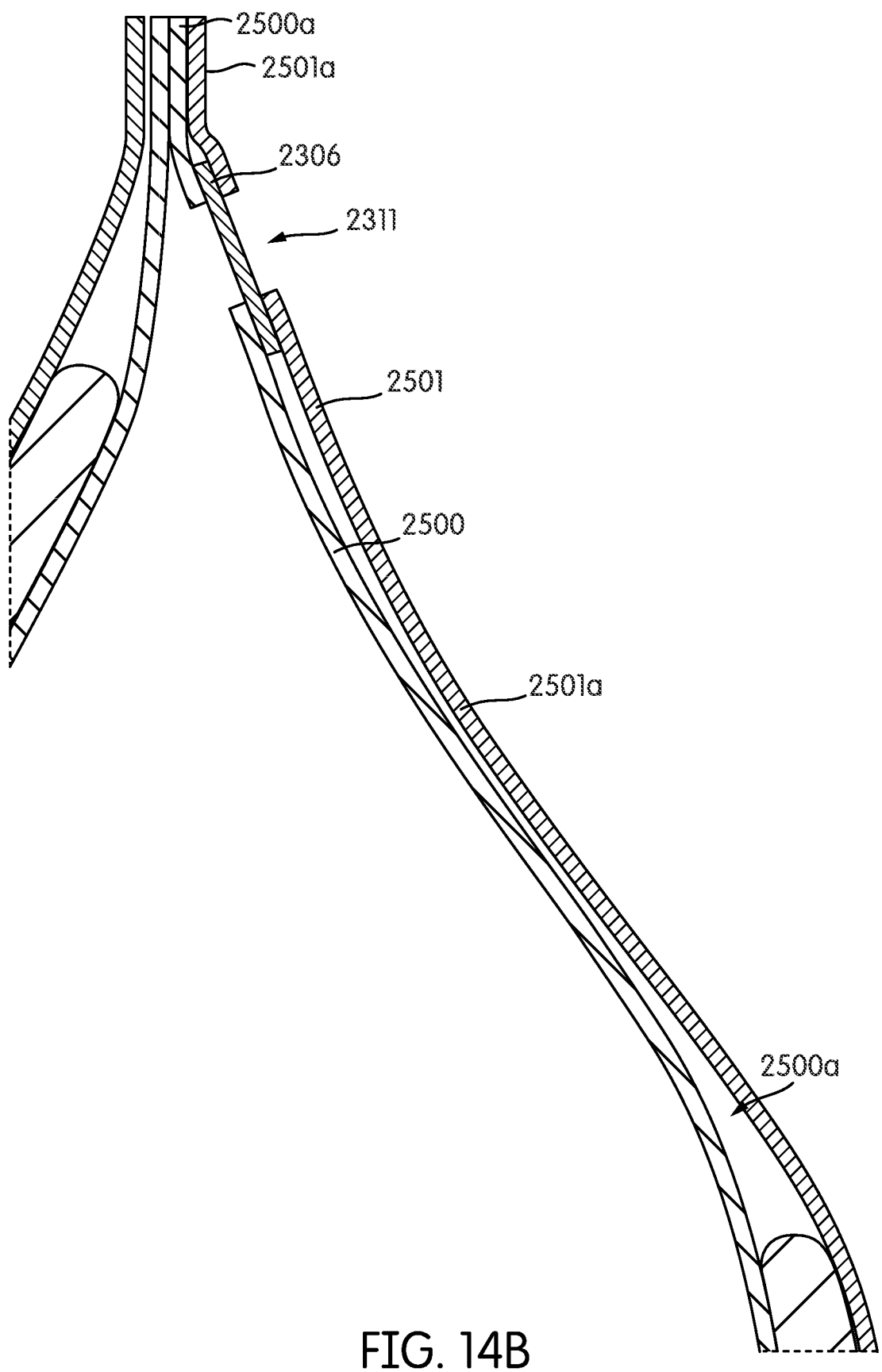
FIG. 14B shows an enlarged section of FIG. 14A.

Referring to FIG. 14B, like in the above examples, the closure 2311 can be mounted on a backing or fabric. In the case of a zipper this can be referred to as zipper tape 2306. Also, like in the above examples, the zipper tape 2306 can be attached between the inner liner 2500 and the outer shell 2501 and, in particular, the zipper tape 2306 can be secured to the upper sidewall portion 2501a of the outer shell and the first inner liner sidewall portion 2500a. As shown in FIG. 14B, the zipper tape 2306, the upper sidewall portion 2501a of the outer shell, and the first inner liner sidewall portion 2500a can form a stacked arrangement of a sandwich structure where the zipper tape 2306 is located between the upper sidewall portion 2501a of the outer shell and the first inner liner sidewall portion 2500a.

The insulating device 2010 can be formed using similar techniques in relation to the examples as discussed above. For example, the upper sidewall portion 2501a of the outer shell 2501 can be formed. Also the base 2215 can be formed separately with the base portion 2502b of the insulation layer 2502, the base support layer 2505, the lower sidewall portion 2501b, and a base portion 2501c of the outer shell 2501 according to the techniques discussed herein. The base 2215 can be secured to the bottom of the upper sidewall portion 2501a of the outer shell 2501 using the techniques discussed herein. The upper portion 2502a of the insulation layer 2502 can be placed within the upper sidewall portion 2501a of the outer shell 2501. The first inner liner sidewall portion 2500a and the bottom inner liner portion 2500b can then be secured to form the inner liner 2500 and chamber 2504. Tape, such as a TPU tape, can be placed over the seams joining the sections of the inner liner 2500 and chamber 2504. The inner liner 2500 can then be placed within the insulation layer 2502. The closure 2311 can then be attached between the inner liner sidewall portion 2500a and the upper sidewall portion 2501a. At this point in the process the insulating device 2010 assembly will have a cylindrical shape with an open top. To close the open top, the upper ends of the inner liner sidewall portion 2500a and the upper sidewall portion 2501a can then be secured together by welding or by using any of the techniques discussed herein to form the insulating device 2010. A binding 20 can be applied to the top portion of the insulating device 2010 to cover and conceal the seam between the outer shell 2501 and the inner liner 2500. The loop patch (not shown), carry handles 2210, shoulder strap 2218, webbing loops 2224, and rings 2214 can be added to the outer shell 2501 by the various techniques discussed herein, after the formation of the outer shell or once the insulating device 2010 is formed. It is contemplated that the inner liner and the outer liner can be formed by welding, gluing, or stitching and combinations thereof.

Figure 16A:
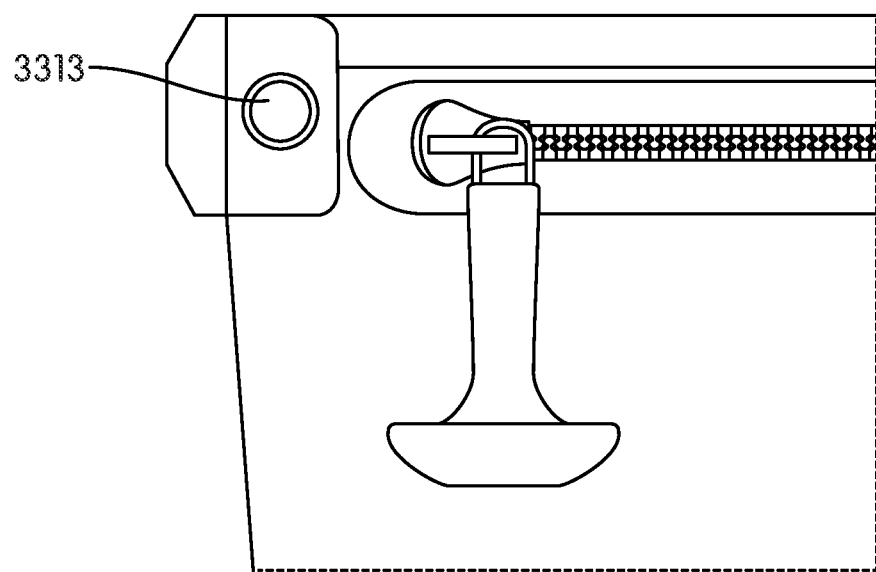
FIG. 16A shows a portion of another example insulating device.
Figure 16B:
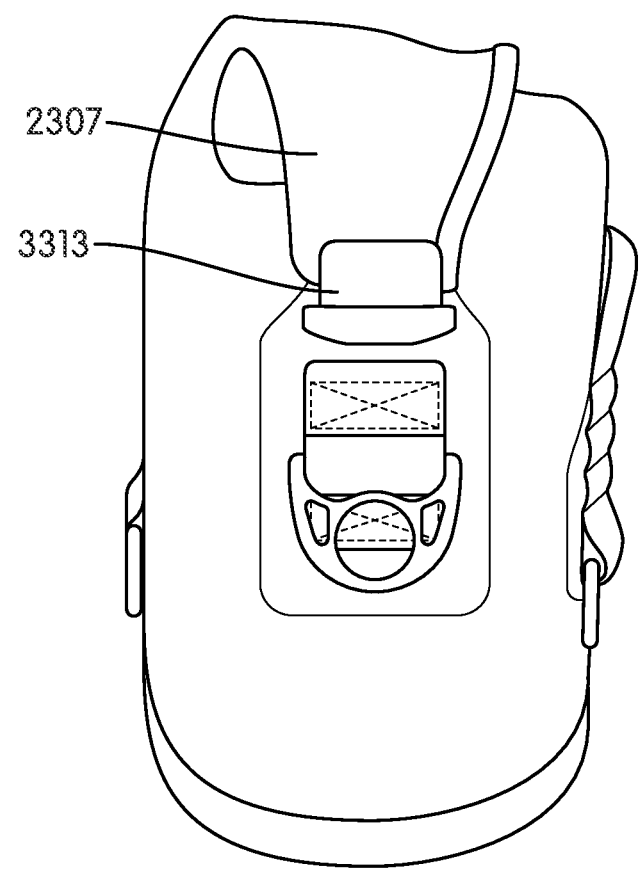
FIG. 16B shows a side view of the example insulating device of FIG. 16A.

In another example, a magnetic connection can be implemented for securing the fold-down portion 2307 to the body of the insulating device 2010. As shown in FIGS. 16A and 16B, the insulating device 2010 can be provided with a magnetic clip 3313, which can be received by a corresponding magnet (not shown) on the sidewall of the insulating device 2010. However, it is also contemplated that the clip and clip receiving portion on the insulating device 2010 could be one or more of permanent magnets, metal strips, or ferromagnetic materials. In addition, other methods of securing the fold-down flap 2307 over the front facing closure 2311 are also contemplated. For example, one or more of hook and loop, buckle, snap, zipper, detent, spring loaded detent, button, cams, or threads could be used to secure the fold-down flap 2307 to the sidewall of the insulating device 2010.

FIGS. 17-22 show another exemplary insulating device 4010. The example insulating device 4010 can be of a similar construction to the above examples and, in particular, the example discussed above in relation to FIGS. 11-16B, where like reference numerals represent like features having the same or similar functionality. In this example, the insulating device 4010 does not include a fold-down flap and can include a different overall shape than the example insulating device 2010. Additionally, the insulating layer 4502 can have a different configuration along with other variations that will be discussed below. Like in the above example, the closure 4311 can be placed on a front face or wall of the insulating device 4010.

Figure 18:
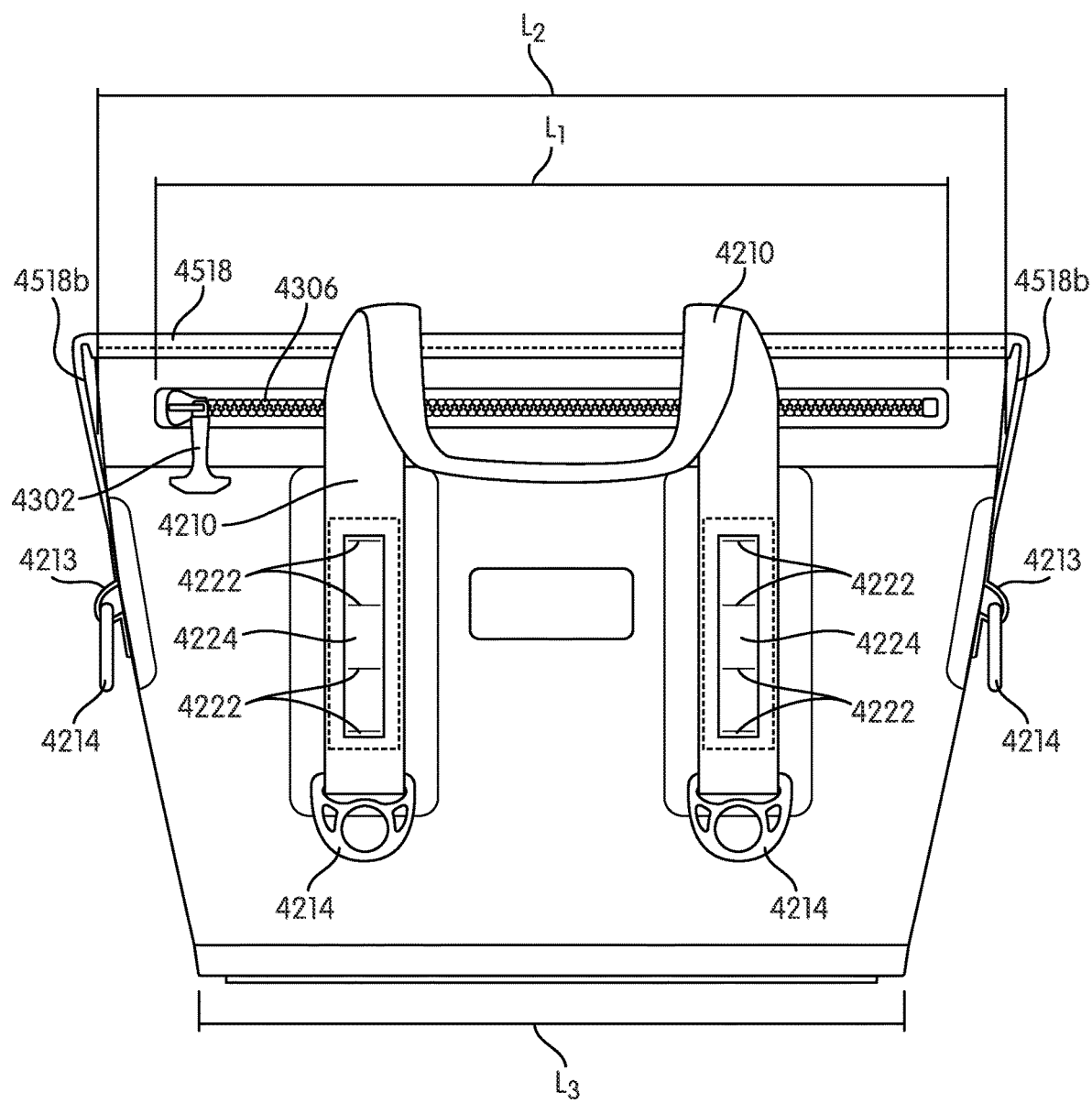
FIG. 18 shows a front view of the insulating device of FIG. 17.
Figure 19:
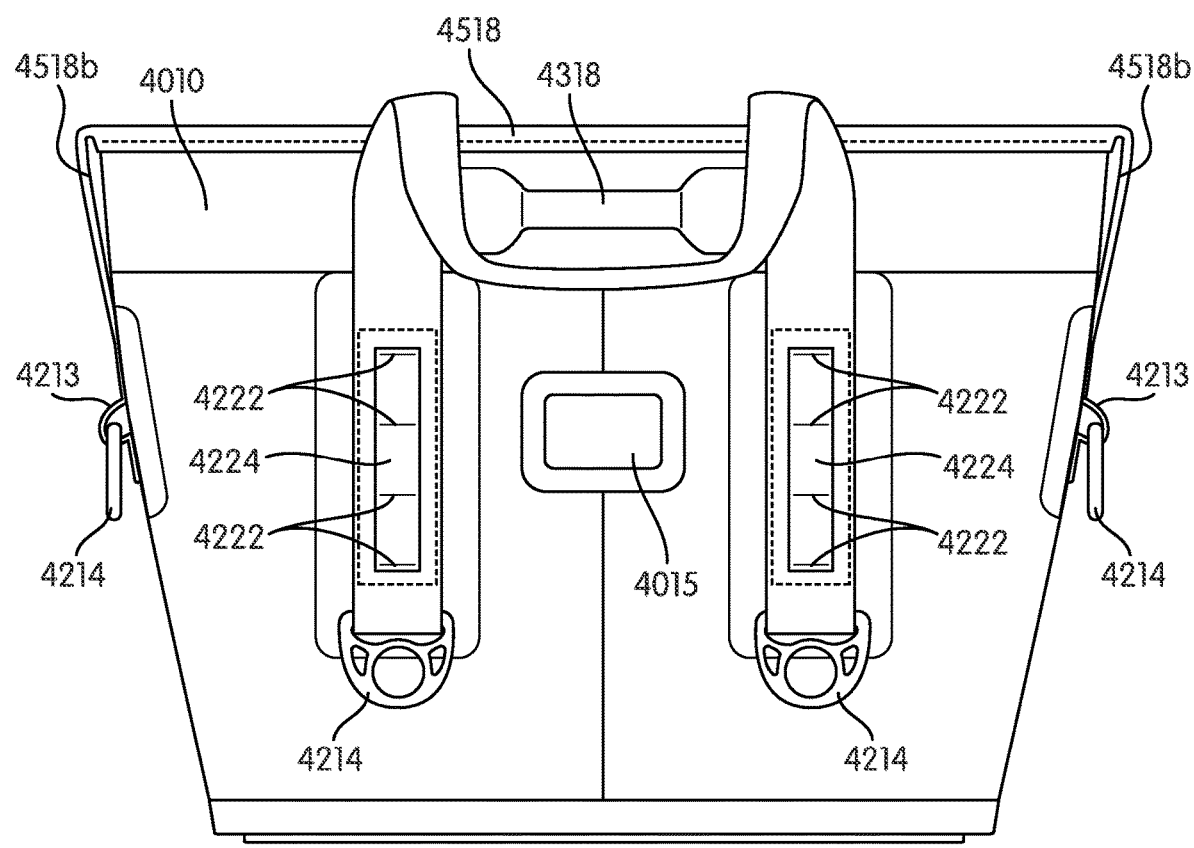
FIG. 19 shows a rear view of the insulating device of FIG. 17.

As shown in FIGS. 18 and 19, when viewed from the front and rear, the insulating device 4010 can generally form a trapezoidal shape, where the insulating device diverges or tapers upward toward the top of the insulating device 4010. The trapezoidal shape may provide certain insulation, user accessibility, and packaging benefits. For example, the trapezoidal shape can provide an extended period of ice coverage because of the additional foam that can be placed between the outer shell 4501 and the inner liner 4500 due to the trapezoidal shape.

Figure 20:
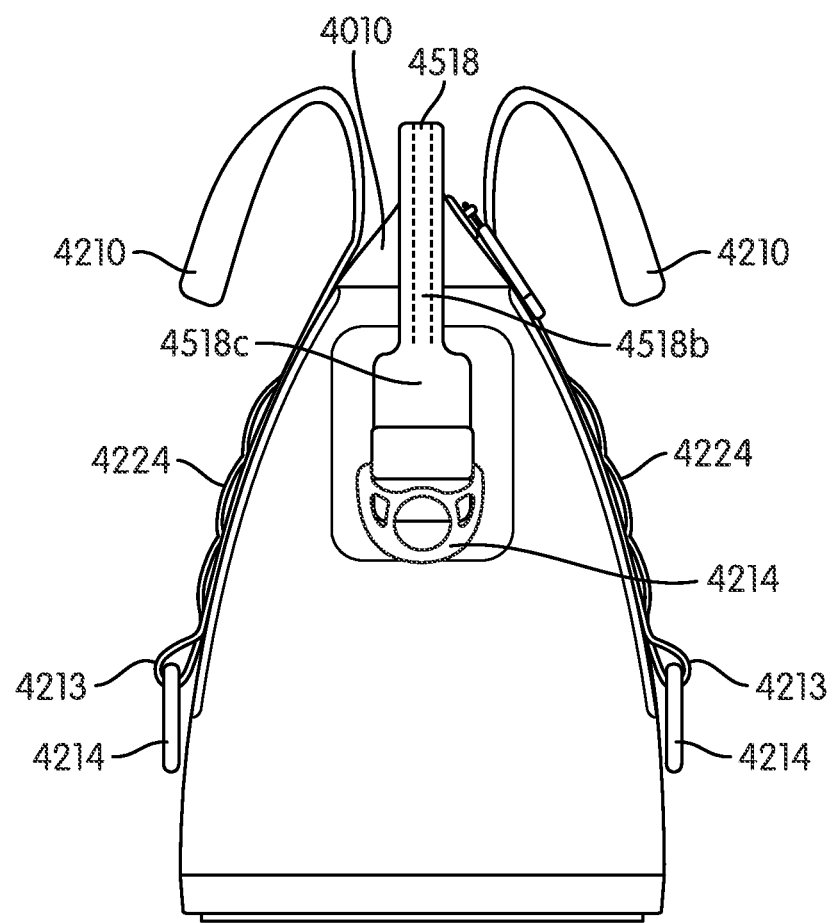
FIG. 20 shows a side view of the insulating device of FIG. 17.

Additionally, the overall shape of the insulating device 4010 can help to maintain the insulating device 4010 in the opened position when the closure 4311 is in the opened position and permits the user to be able to easily access the contents of the insulating device 4010. The trapezoidal shape as discussed herein also allows the closure 4311 to be formed longer relative to the insulating device 4010. Other shapes that allow for an extended opening at the upper portion of the insulating device 4010 are also contemplated. For example, the upper portion of the insulating device 4010 could be formed with an extended curvature either upward or downward to allow for a larger closure extending across the upper portion of the insulating device 4010. Also as shown in FIG. 20, when viewed from the side, the insulating device 4010 can be formed generally conical, tapered or funnel-shaped such that the sides converge to the top of the insulating device 4010. Also the sides can be formed substantially parabolic in shape in certain examples. Therefore, the insulating device 4010 converges to an apex along the top of the insulating device 4010 as opposed to an oval shape with the same perimeter as the bottom of the insulating device 4010.

In certain examples, a trapezoidal shape may also provide for an insulating device 4010 that may be easily shipped in that several insulating devices 4010 can be fit into a shipping container. For example, multiple insulating devices 4010 could be arranged in a shipping container in different orientations so as to utilize more space within a shipping container.

In alternative embodiments, when the closure 4311 is in the opened or unsealed position, the contents in the insulating device 4010 may maintain the closure 4311 in the open position for easier access to the contents of the insulating device 4010. In this example, the weight of the contents can force a lower half of the closure 4311 away from an upper half of the closure 4311 such that the user can better see the contents of the insulating device 4010 and more easily remove the contents or add contents to the insulating device 4010.

In this example, the outer shell construction, insulating layer, and the inner liner construction can be similar to that of the embodiment discussed above in relation to FIGS. 11-16B, the details of which are not repeated here. The outer shell 4010 may also include a top portion 4316, which is configured to receive the closure 4311 therein. The top portion 4316 can be formed of the same material as the remaining outer shell 4501, which in one specific example, can be nylon and specifically an 840d nylon with TPU.

Similar to the example discussed in relation to FIGS. 11-16B, the insulating device 4010 can be provided with one or more of carry handles 4210, a shoulder strap 4218, webbing loops 4224, which are formed by threads 4222, rings 4214, and attachment points 4213 which can have similar features and functionality as in the examples above. Additionally, a rear carry handle 4318 can be provided on the rear surface of the insulating device 4010 to oppose the closure 4311, which can be used by the user to grasp during opening and closing the insulating device 4010 to make it easier for the user to open and close the closure 4311. The rear carry handle 4318 may also be used for hanging the insulating device 4010 for drying the inner chamber 4504, or for carrying the insulating device 4010. Each of the carry handles 4210, shoulder strap 4218, webbing loops 4224, and attachment points 4213 can be reinforced by one or more of additional structures in the form of webbing or suitable polymeric materials. This reinforcement material may be applied to any of the examples discussed herein.

Figure 17:
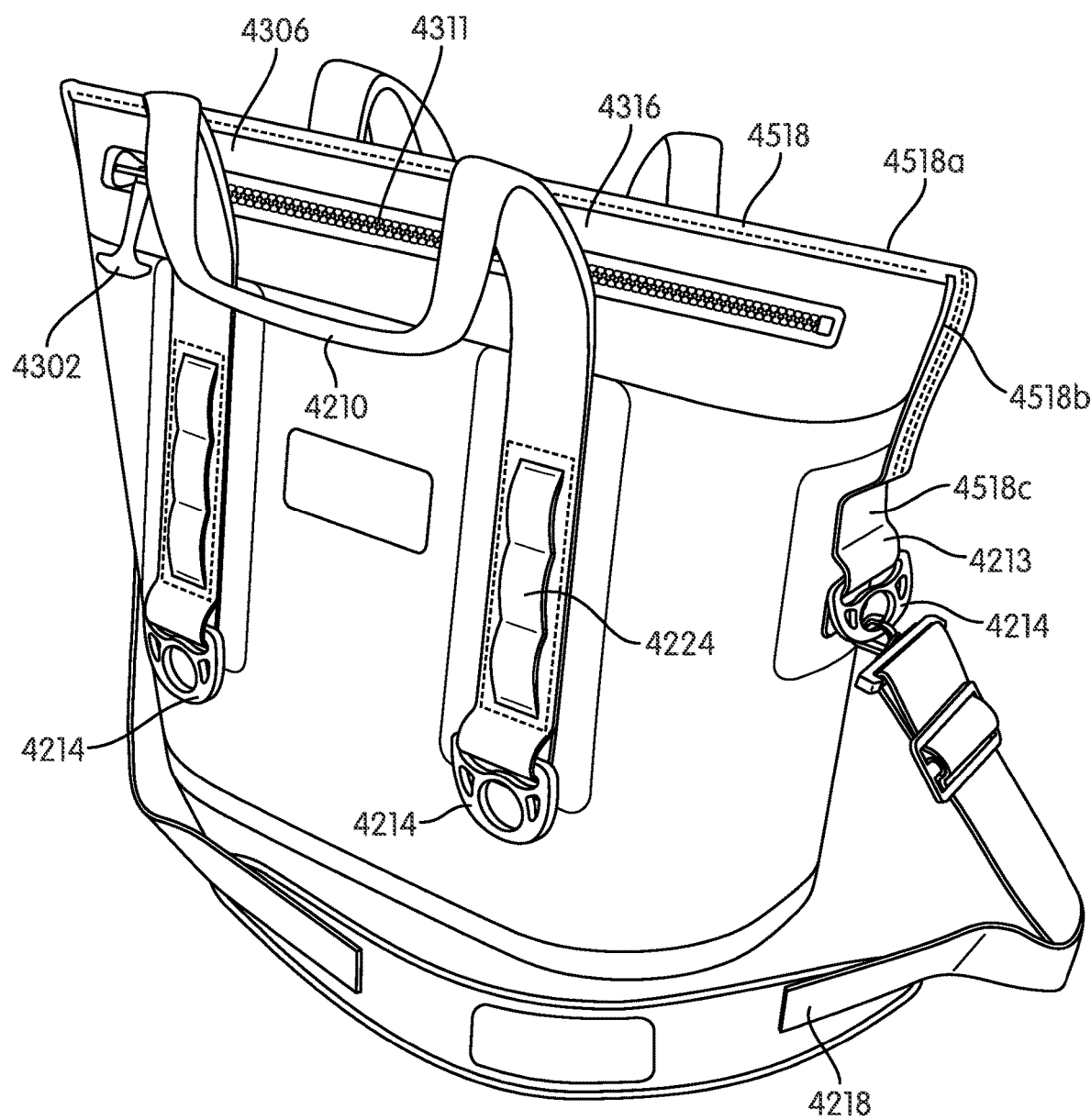
FIG. 17 shows a perspective view of another example insulating device.
Figure 21:
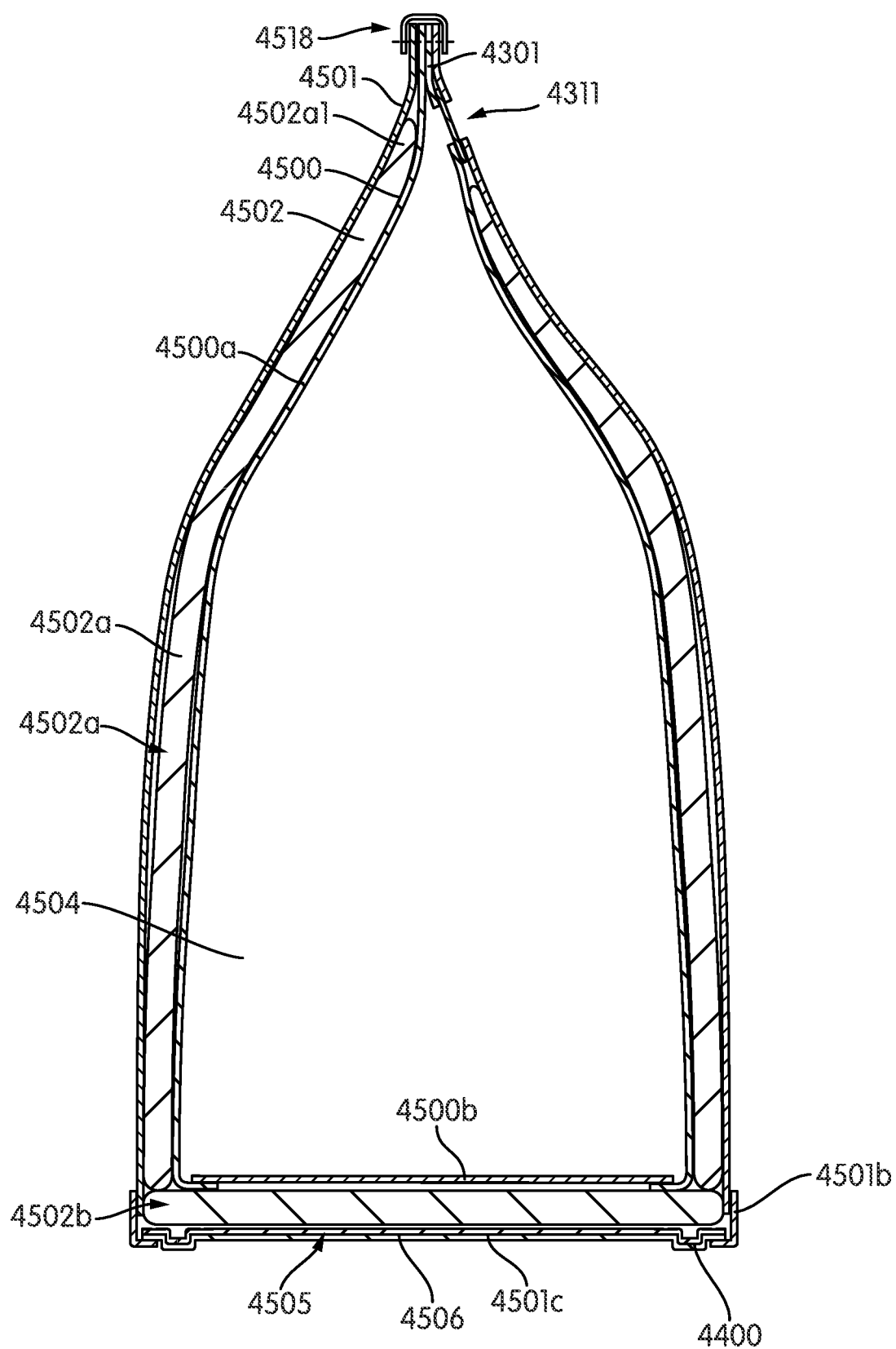
FIG. 21 shows a cross-sectional view of the insulating device of FIG. 17.

Also as shown in FIGS. 17 and 21 a binding 4518 can be included that extends over the top of the insulating device 4010 to secure the outer shell 4501 to the inner liner 4500. The binding 4518 can be folded over the top of the insulating device 4010 and then stitched over the over outer shell 4501 and the inner liner 4500 to form a cover to the joint or seam between the inner liner 4500 and the outer shell 4501. As shown in FIG. 18, the binding 4518 can be folded into thirds to form a first folded portion 4518a where the first third is attached to a first side of the insulating device 4010, the second third is extends over the top of the insulating device 4010, and the last third is attached to a second side of the insulating device 4010. The binding 4518 covers the seam between the outer shell 4501 and the inner liner 4500 along the top of the insulating device 4010. Also, as shown in FIG. 17, the binding 4518 extends from the top of the insulating device 4010 and forms a second folded portion 4518b where the binding 4518 is folded in half and a third unfolded portion 4518c, which forms and extends to attachment points 4213 that receive rings 4214. Each side of the insulating device 4010 can include a second folded portion 4518b and a third unfolded portion 4518c such that the insulating device 4010 can include two second folded portions 4518b and two third unfolded portions 4518c. The binding 4518 can unfold closer to the attachment points 4213 and may also be formed unfolded from the attachment points 4213 to the top of the insulated device 4010. In either of these configurations, a section of the binding 4518, e.g., the second folded portion 4518b, can be unattached to the insulating device 4010 and forms a strap between the folded portion 4518a and the attachment points 4213. In this example, two straps can be formed by the two second unfolded portions 4518b and can be grasped by the user for handling the insulating device, can be used for hanging the insulating device 4010 for drying, and the like. Also, the attachment points 4213 formed by the binding 4518 can be a loop or slot for receiving the rings 4214.

Figure 22:
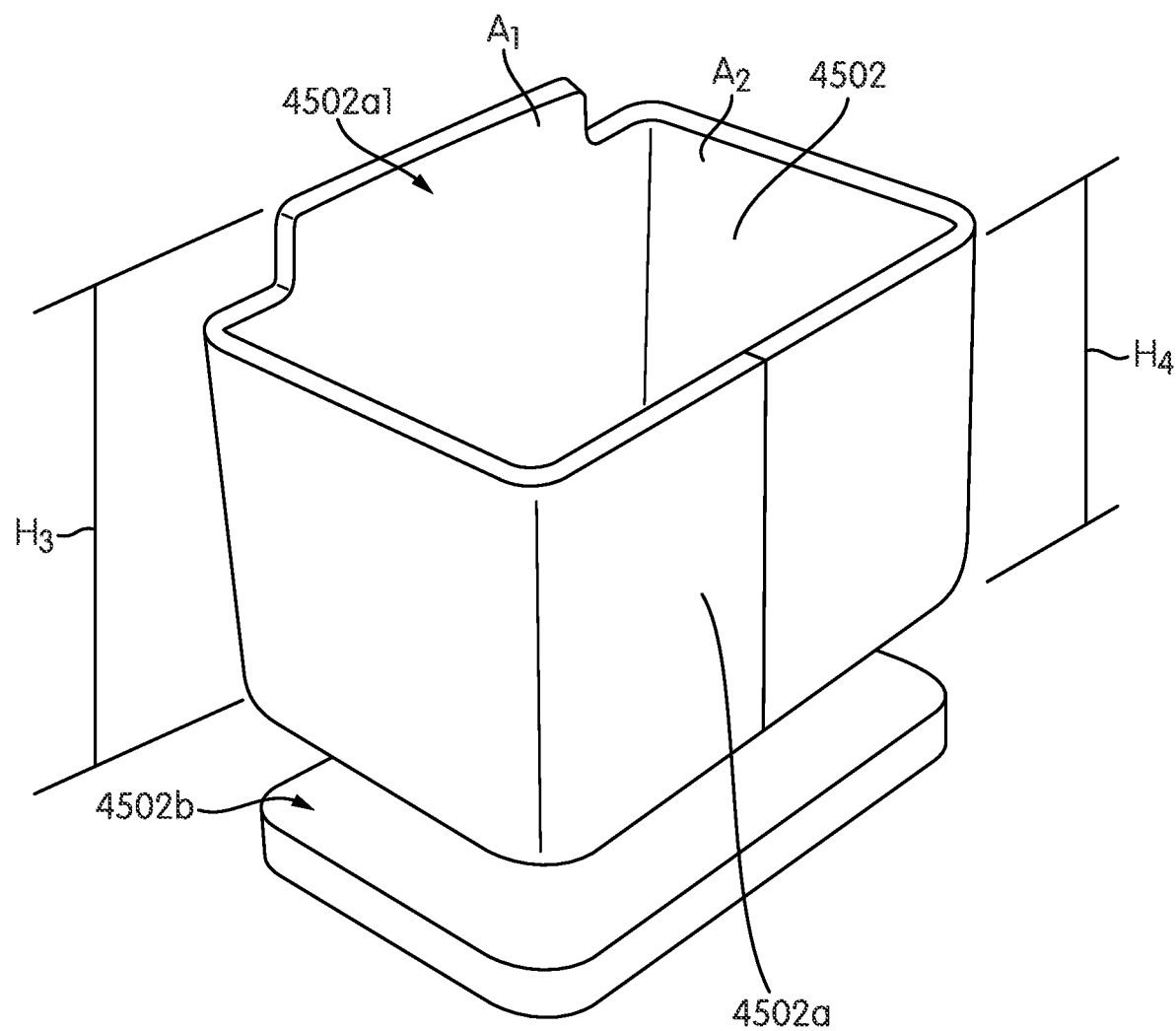
FIG. 22 shows a schematic exploded view of an exemplary insulation layer for the example insulating device of FIG. 17.
Figure 22A:
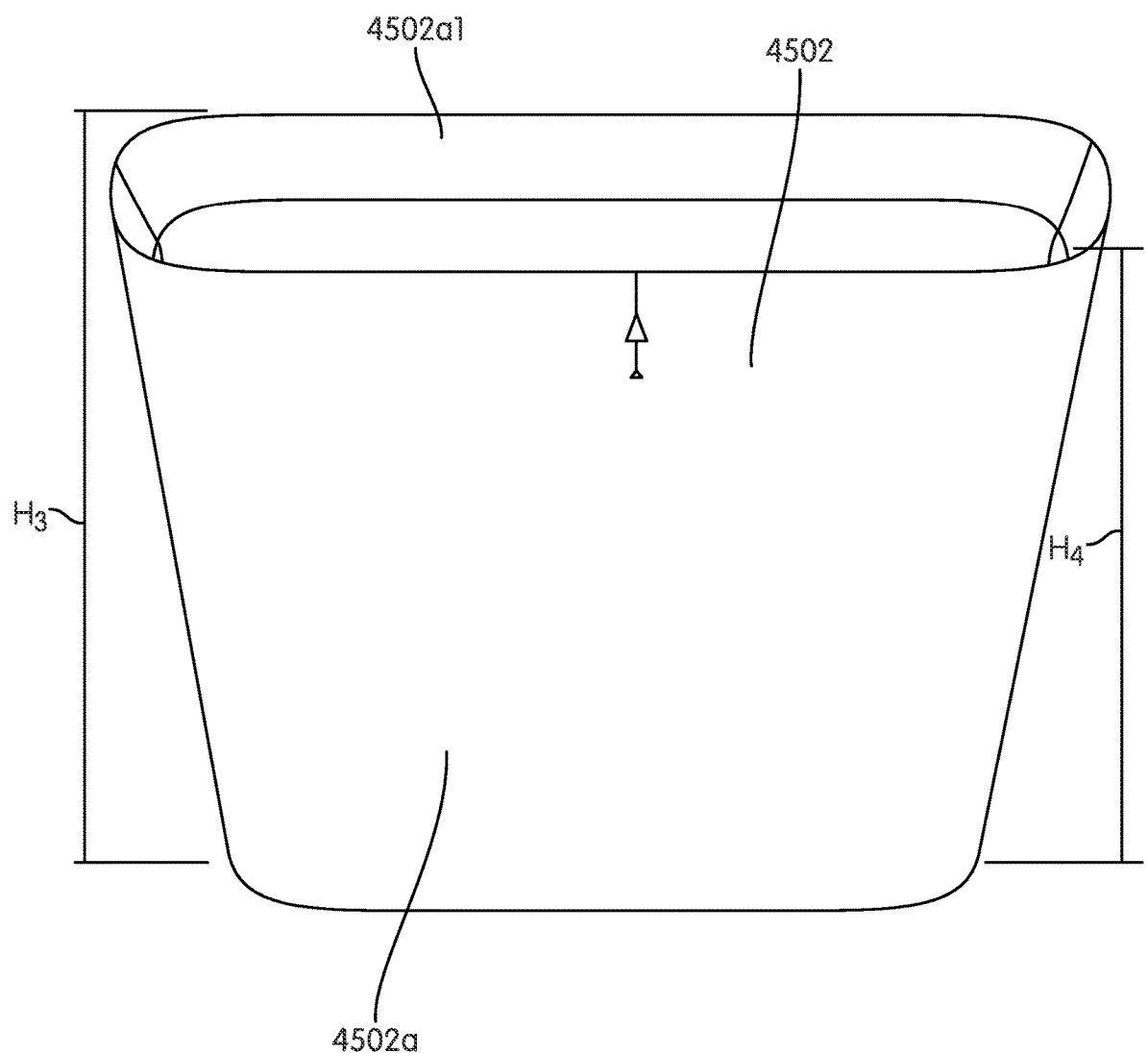
FIG. 22A shows a front view of an exemplary insulation layer for the example insulating device of FIG. 17.

FIGS. 22 and 22A show the insulating layer 4502 in additional detail, which is similar to the example insulating device 4010 discussed above where like reference numerals represent like components with the same or similar functionality. The insulating layer 4502 can be formed of the materials as discussed herein and, in certain examples, can be PVC free and/or can have non-thermoset properties such that the foam is fully resilient. Like the above examples, the upper portion 4502a of the insulating layer 4502 can be formed of a single sheet of material which is rolled into the shape defined by the opening between the inner liner 4500 and the outer shell 4501. As shown in FIG. 22, the insulating layer 4502, like in the above examples, can be formed of a first portion or an upper portion 4502a and a second portion or base portion 4502b. The rear top flap 4502a1 can be formed in smaller rectangular shape. The rear top flap 4502a1 extends higher than the front side of the first portion 4502a of the insulating layer 4502a to accommodate for the front facing closure 4311. Specifically, the rear top flap 4502a1 can extend to a first height $H_3$, and the first portion 4502a can extend to a second height $H_4$, and the first height $H_3$ can be greater than the second height $H_4$. Additionally, as shown in FIG. 22, a majority of the insulating layer 4502 can extend to the second height $H_4$. Alternatively, as shown in FIG. 22A, the rear half of the insulating layer 4502 can extend to the first height $H_3$ and the front half of the insulating layer 4502 can extend to the second height $H_4$. Additionally, as shown in FIG. 22A, the insulating layer 4502 can taper from the first height $H_3$ to the second height $H_4$. Also, this provides the areas of the insulating layer 4502 near the top with tapered or chamfered portions along the sides of the insulating device 4010 to provide a smaller profile on each side of the insulating device 4010.

In one example, the first portion 4502a can define a first area $A_1$, and the rear top flap 4502a1 can define a second area $A_2$, which is smaller than the first area $A_1$. When installed between the inner liner 4500 and the outer shell 4501, the insulating layer 4502 generally follows the conical and trapezoidal shape of the profile of the insulating device 4010. Additionally, the upward tapered profile of the outer shell 4501 and the inner liner 4500 can help to position the insulating layer 4502 such that the insulating layer covers a majority of the inner liner 4500.

In particular, as shown in FIG. 21, the insulating layer 4502 occupies a majority of the space formed between the inner liner 4500 and the outer shell 4501. The insulating layer 4502 extends substantially to the top of the insulating device 4010 in both the front and the rear portions of the insulating device 4010 to insulate a majority of the compartment 4504. As a result, the insulating layer 4502 surrounds substantially the entire inner chamber 4502 to provide a maximum amount of insulation to the inner chamber 4504 of the insulating device 2010. In one example, the insulating layer 4502 covers 80% or more of the inner liner 4500 covering the inner chamber 4504, and in particular examples the insulating layer 4502 covers 85%, 90%, or 95% or more of the inner liner 4500 covering the inner chamber 4504.

In the examples discussed in relation to FIGS. 11-22, the front facing closures 2311, 4311 can be formed such that they extend a majority of the way along the front facing surface of the insulating devices 2010, 4010. As discussed above, the front-facing closures 2311, 4311 can be formed as zipper closures in accordance with the examples discussed herein. In one example, the closures 2311, 4311 can be substantially waterproof or highly water resistant and can be water tight and air tight. The front facing closures 2311, 4311 can be formed as long as possible in the front facing surface of the insulating devices 2010, 4010 to provide for extended user accessibility and visibility of the contents stored in the insulating devices 2010, 4010. In one example, the closures 2311, 4311 can define a first length $L_1$, and the top portion of the insulating device 4010 can define a second length $L_2$.

In one example, $L_2$ can be 3 cm to 10 cm longer than $L_1$, the length of the front facing closures 2311, 4311 and in one specific example can be 5 cm longer than the front-facing closures 2311, 4311. The closures 2311, 4311 first length $L_1$ can extend at least 80% of the second length $L_2$ and up to 98% of the second length $L_2$. In one particular example, the length of the closures 2311, 4311, $L_1$ can extend across 87% of the second length $L_2$.

Additionally, the length $L_1$ of the front-facing closures 2311, 4311 can be formed longer than the length $L_3$ of the bases of the insulating devices 2010, 4010. In certain examples, the front facing closures 2311, 4311 can be formed approximately 1% to 25% longer than the length $L_3$ of the bases of the insulating devices 4010. In one specific example the length $L_1$ of the front facing closures 2311, 4311 can be 10% longer than the length $L_3$ of the bases. For example, the front-facing closures length $L_1$ can be formed 3 cm to 12 cm longer than the length $L_3$ of the bases of the insulating devices, and, in one particular example, the length $L_1$ of the front facing closures 2311, 4311 can be 5 cm longer than the length $L_3$ of the base.

In still other embodiments, the insulating device can include a closure that extends around the entire perimeter or a majority of the perimeter of the insulating device and a front facing closure 2311, 4311 as discussed above. In this particular example, the contents of the insulating device can be easily accessed by the user once the entire or a majority of the top portion is removed or through the closure 2311, 4311.

In another example, the insulating device can be formed modular such that the top and/or the bottom can be removed and multiple structures can be interconnected to form larger or smaller insulating devices. For example, the insulating device can be formed of different sections by way of removable fasteners, such as snaps, zippers, threads, seals, hook and loop, and the like.

In relation to the examples discussed herein, a series of vents can be provided along the outer shells of the insulating devices. The vents allow for any gases that are trapped between the inner liner and the outer shell to escape. Without the vents, the gases trapped between the inner liner and the outer shell can cause the insulating device to expand, which in certain instances, may not be desired. In certain examples, the one or more joints or seams that connect the various portions of the outer shell provide vents for gases. Vents can be provided in areas of the outer shell where the outer shell fabric is pierced. For example, tiny openings can be provided at any of the stitching locations where the various components are located on the insulating devices. Specifically, the vents can be provided in the areas where the handles, molle loops, straps, reinforcement patches, bindings, D-rings, loop patches, etc. are attached to the outer shell of the insulating device. For example, stitching that may be used to secure these components to the outer shell provides openings into the outer shell, which creates venting between the insulation layer and the outer shell. In one specific example, the insulating device may vent through binding 4518.

The example insulating device 4010 was tested to determine ice retention. As such, the ice retention testing may be utilized to determine insulative properties of example insulating device 4010. In an exemplary test, the duration of the increase from 0° F. to 50° F. when the insulating device 4010 was filled with ice was determined according to the test parameters below. In certain examples, the temperature of the insulating device increases from 10° F. to 32° F. in a duration of 24 hours to 48 hours, the temperature of the insulating device increases from 32° F. to 50° F. in a duration of 36 hours to 68 hours, and the temperature of the insulating device increases from 0° F. to 50° F. in a duration of 70 hours to 90 hours.

Figure 23:
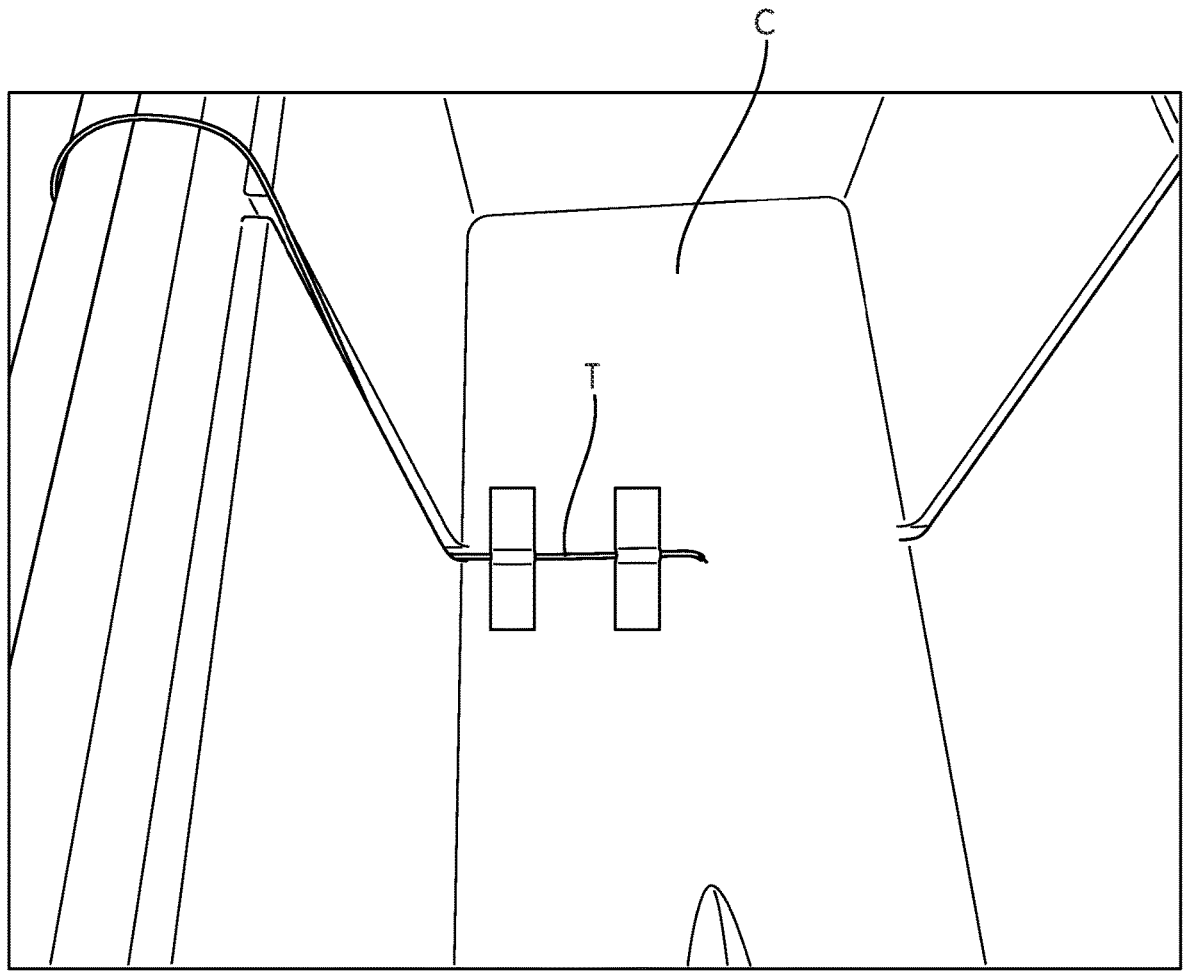
FIG. 23 illustrates an exemplary testing method.

The ice retention was tested using the following test. More than 24 hours before the test, the following steps are performed:

Ensure test coolers are clean inside and out.
Mark test coolers with unique identifier and record identifier and description in test log or notes.
Using duct tape, place a thermocouple (T) in the approximate center of the test cooler (C).
The thermocouple tip should be approximately 1 inch above the cooler floor. (See FIG. 23 for an example of proper thermocouple set-up.)
Condition test coolers by keeping test coolers inside (ambient temperature 65-75° F.) with lids open for a minimum of 24 hours.
Calculate the amount of ice required for testing (to nearest 0.1 lbs.) using the equation below.

Ice per cooler=0.52 lbs.×Quart capacity of cooler

Ice required=Ice per cooler×number of coolers

Condition the ice by placing the ice in a freezer (−15 to −5° F.) for a minimum of 24 hours prior to use.
The day of the test, the following steps are performed:
Gather Test Equipment
Allow thermal chamber to reach a temperature of 100° F.
Scale—place scale near freezer with test ice
Data Logger—ensure Data Logger has charged battery
The test procedure is as follows:
Bring test coolers to freezer with test ice.
Place test cooler on scale and tare the scale.
Break test ice with hammer.
Using the scale as reference, quickly fill the test cooler with the required amount of ice.
Ensure that the ice is evenly distributed throughout the test cooler.
Ensure that the connector end of the thermocouple is outside of the test cooler and close and secure the cooler lid.
Repeat steps for the remaining test coolers.
Arrange the coolers in the test area such that they all have even amounts of direct sunlight and airflow (one cooler does not block the other).
Connect all thermocouples to the data logger.
Check all thermocouple readings to ensure that all connections are complete and the channels are recording properly. (Note: The starting temperature inside each test cooler should be <10° F.).
Power up the data logger and configure to record with temperatures recorded at less than 10 minute intervals.
Begin recording and note time in test log.

Allow the test to continue until the inside temperature of each test cooler is >50° F.
Stop recording.
Disconnect thermocouples from data logger.
Receive data from data logger.
Remove test coolers from test area.
Empty test coolers and allow them to dry.
Remove thermocouples from test coolers The heat gain rate of the insulating devices 2010, 4010 can be approximately 0.5 to 1.5 deg F./hr, and, in one particular example, the heat gain rate can be approximately 1.0 deg F./hr.

Like in the above examples, the ability of the insulating devices 2010 and 4010 are also configured to withstand interior leaks and were also tested to see how well the insulating devices 2010, 4010 maintain the contents stored in the storage compartment or receptacles 2504, 4504. In one example test, the insulating devices 2010, 4010 can be filled with a liquid, such as water, and then can be inverted for a predetermined time period to test for any moisture leaks. In this example, the insulating devices 2010, 4010 are filled with a liquid until approximately half of a volume of the receptacle 4504 is filled, e.g. 3 gallons of water, and the closures 2301, 4301 are then closed fully. The entire insulating devices 2010, 4010 are then inverted and held inverted for a time period of 30 minutes. The insulating devices 2010, 4010 are then reviewed for any leaks.

The insulating devices 2010, 4010 can be configured to withstand being held inverted for 30 minutes without any water escaping or leaving the receptacles 2504, 4504. In alternative examples, the insulating devices 2010, 4010 can be configured to withstand being held inverted for 15 minutes to 120 minutes without any water escaping or leaving the receptacles 2504, 4504.

Figure 31:
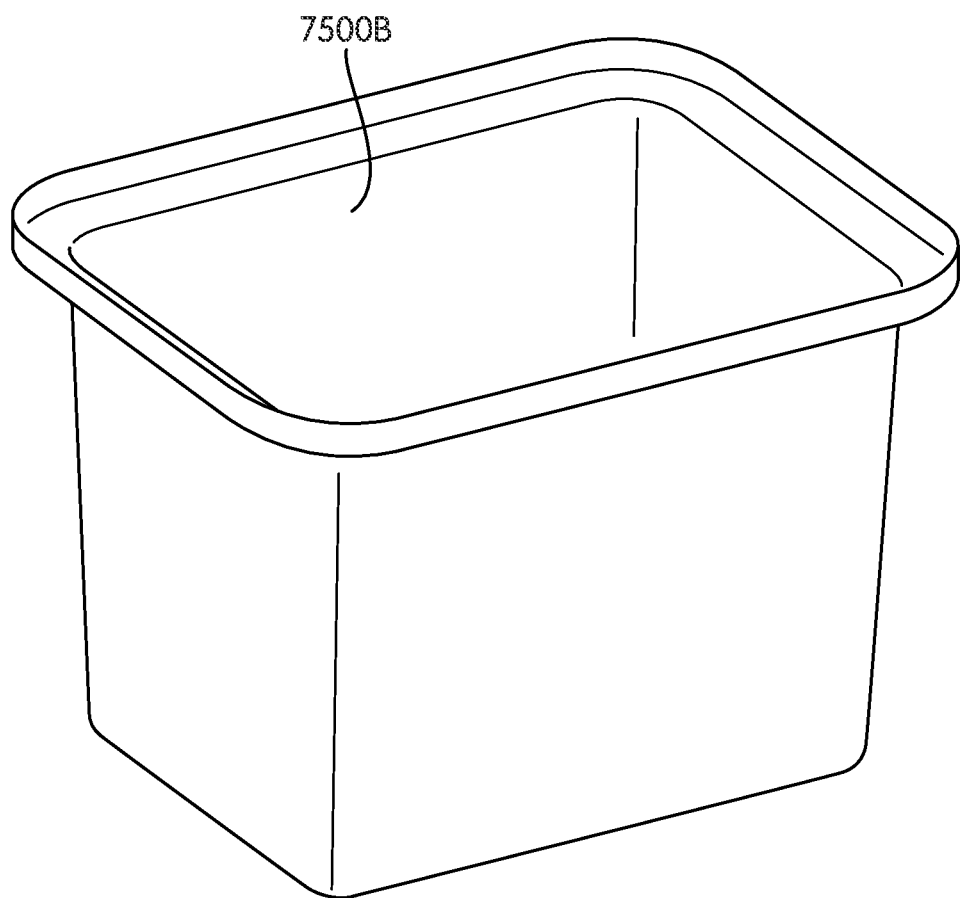
FIG. 31 shows an alternative embodiment for an inner liner of an insulating device.
Figure 32:
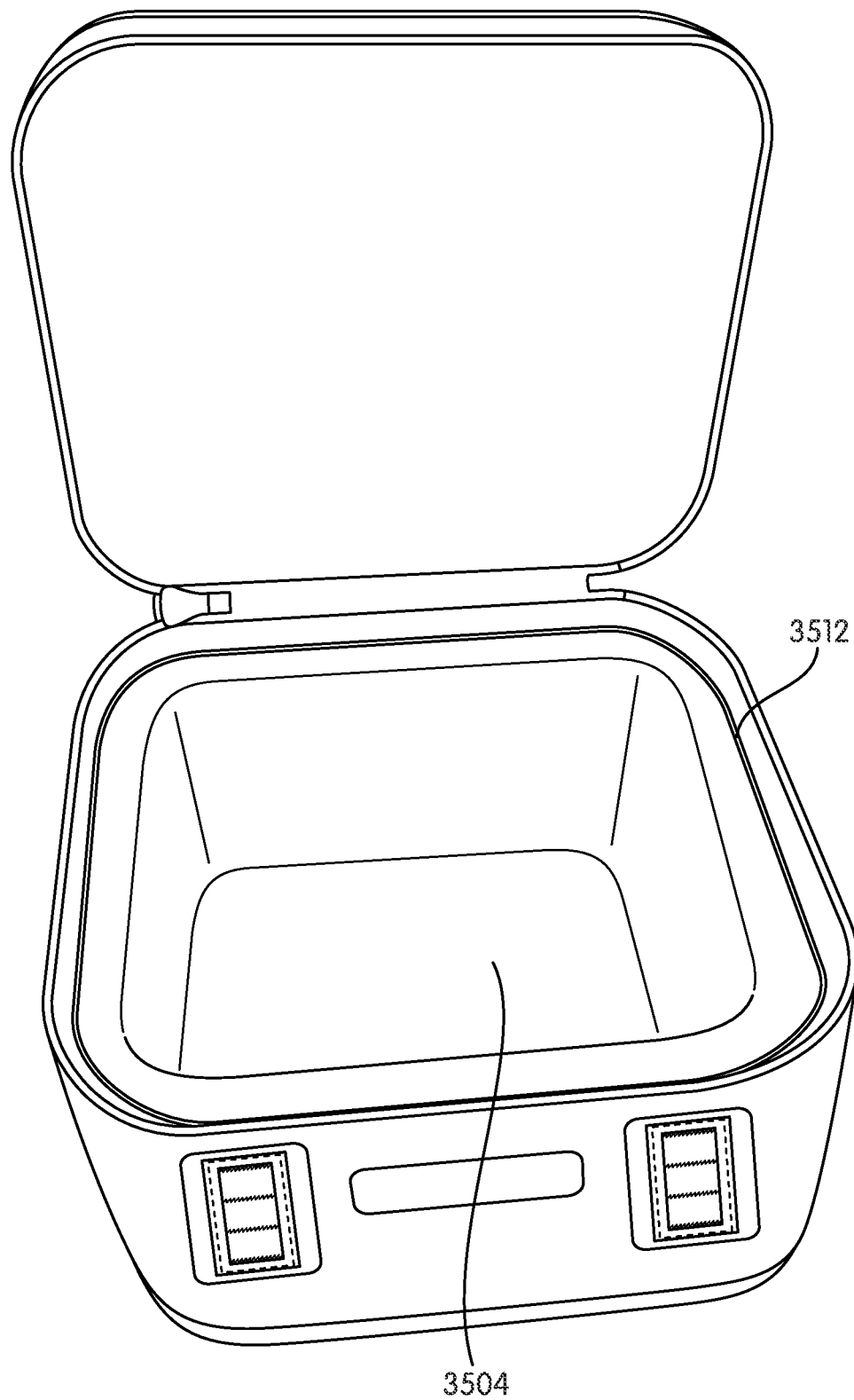
FIG. 32 shows the insulating device of FIG. 24 in the opened position.
Figure 32A:
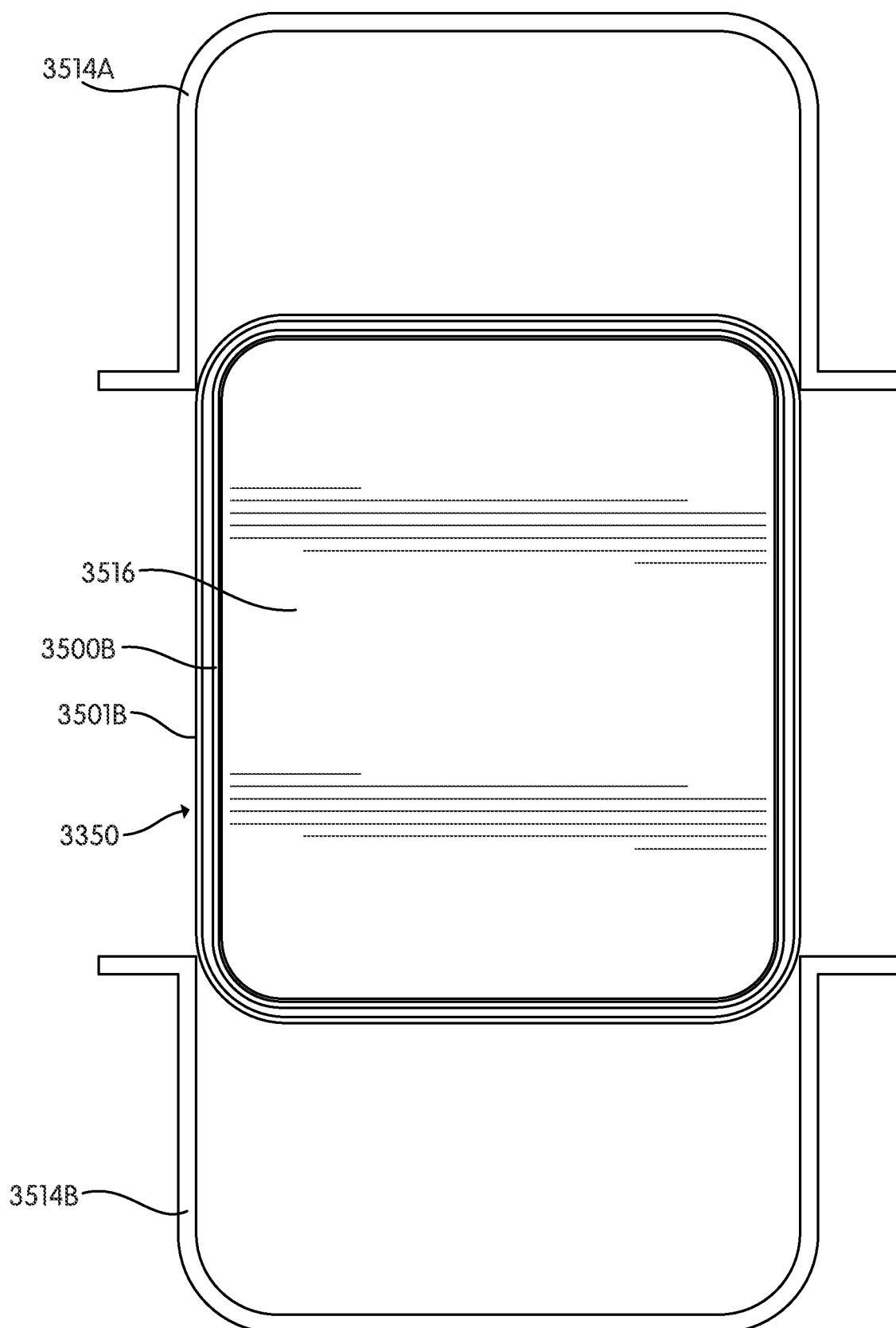
FIG. 32A shows an example manufacturing method for forming an insulating device.

FIGS. 24-32 show another example insulating device 3010. The example insulating device 3010 can be of a similar construction to the above examples, where like reference numerals represent like features having similar functionality. In this example, as can be seen in FIGS. 24-26 and 32, the closure 3311 and opening 3512 is formed through a first sidewall 3507A, a second sidewall 3705B, and a third sidewall 3507C and partially through a fourth sidewall 3507D of the insulating device 3010. Moreover, the opening 3512 is configured to provide access to the inner chamber 3504 as is shown in FIGS. 29A and 32. Like in the above examples, the closure 3311 can be substantially waterproof so as to resist liquid from exiting the opening 3512 when the insulating device 3010 is in any orientation.

Figure 29A:
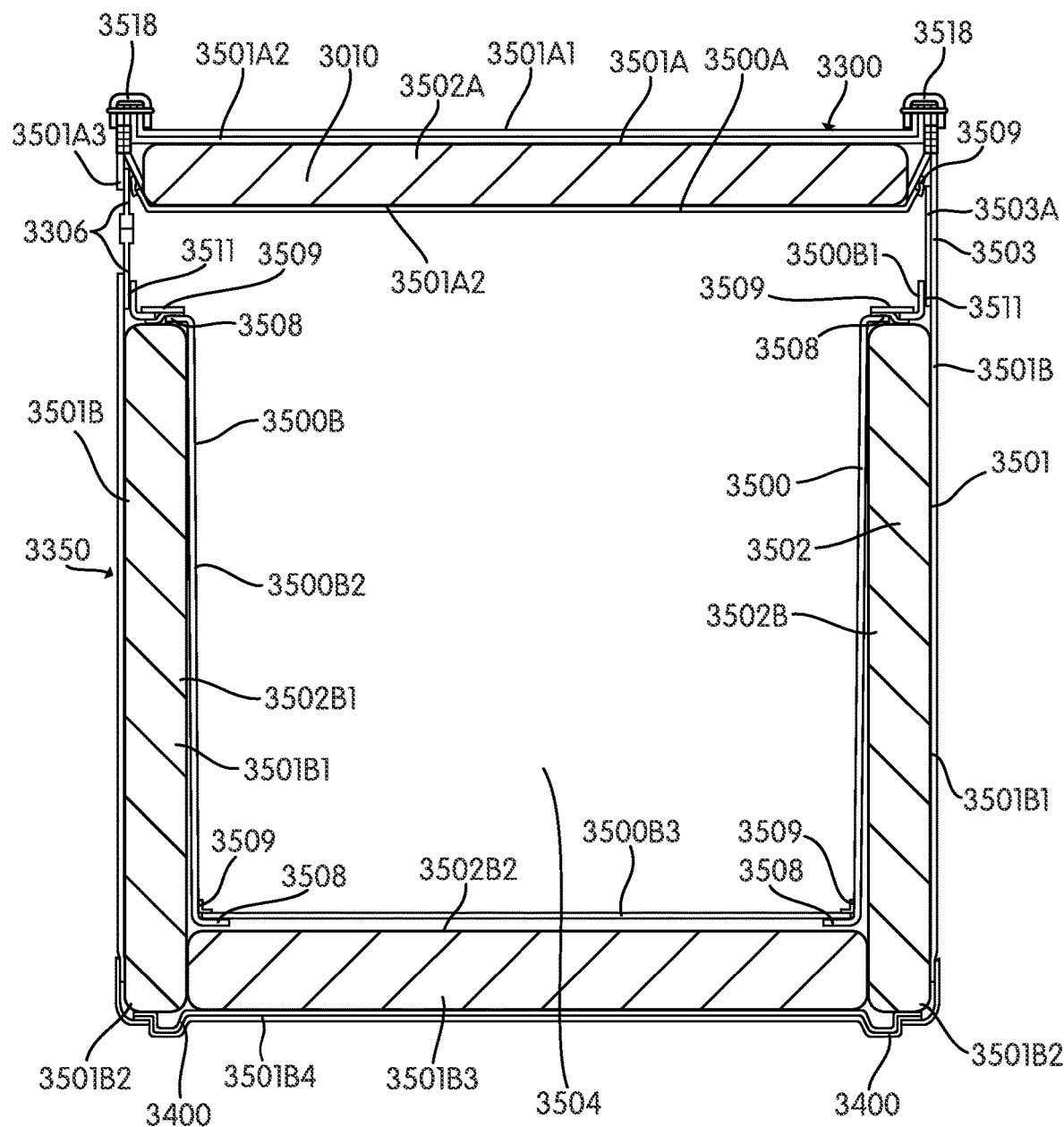
FIG. 29A shows a cross-sectional view of the example insulating device of FIG. 24.

As shown in the cross-sectional view of FIG. 29A, the example insulating device 3010 generally includes a body assembly 3350 and a lid assembly 3300, which together form the three main components of the insulating device 3010: the inner liner 3500, the insulating layer 3502, and the outer shell 3501. The inner liner 3500 can, in one example, be formed of double laminated TPU nylon fabric, the insulating layer 3502 can, in one example, be formed of can be formed of NBR/PVC foam blend or any other suitable blend or foam, and the outer shell 3501 can, in one example, be formed of TPU nylon fabric. It is also contemplated that the inner liner and the outer shell 3501 can be formed of one or more of PVC, TPU coated nylon, coated fabrics, and other weldable and/or waterproof fabrics.

Figure 24:
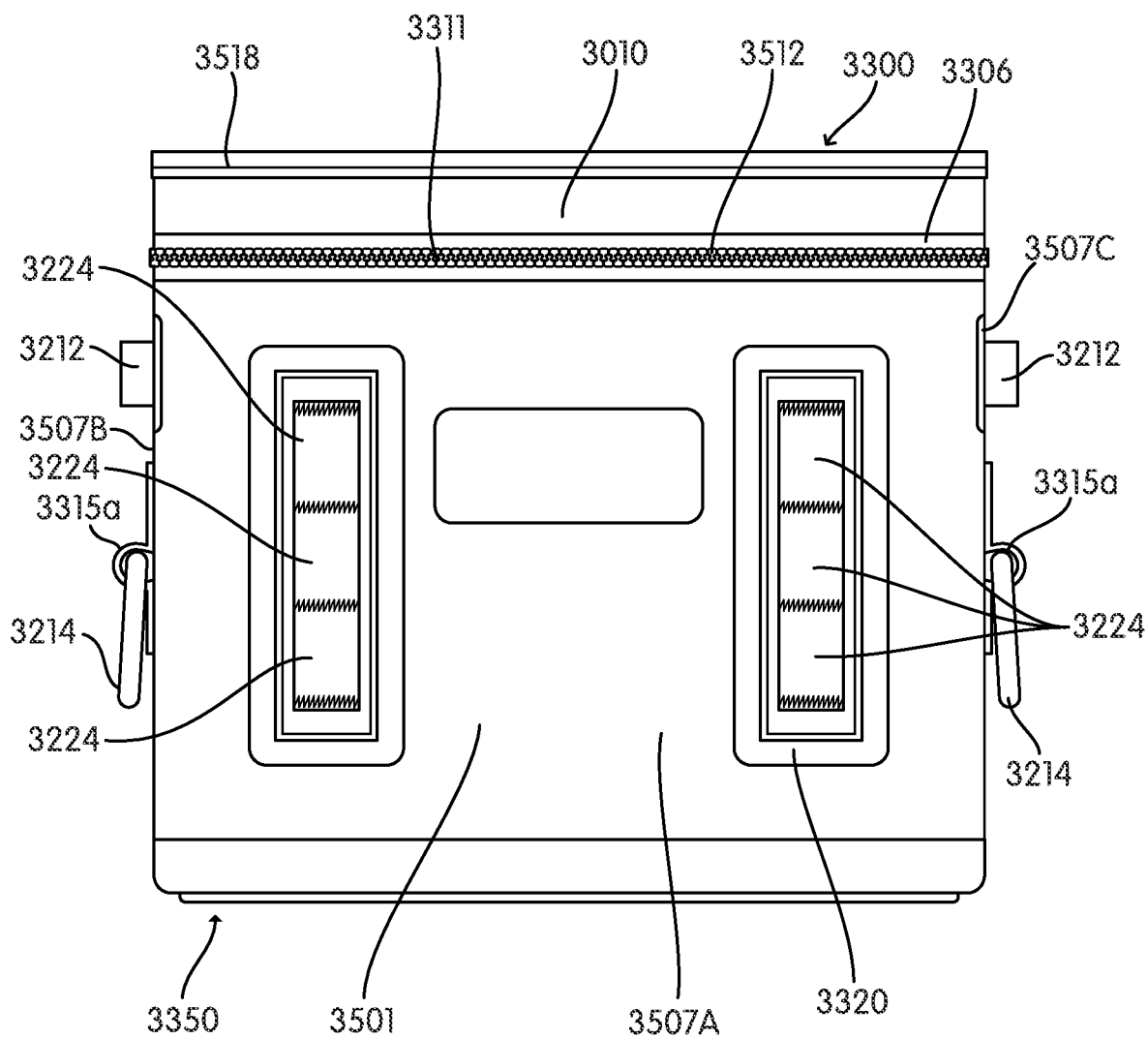
FIG. 24 shows a front view of an example insulating device in accordance with an aspect of the disclosure.
Figure 25:
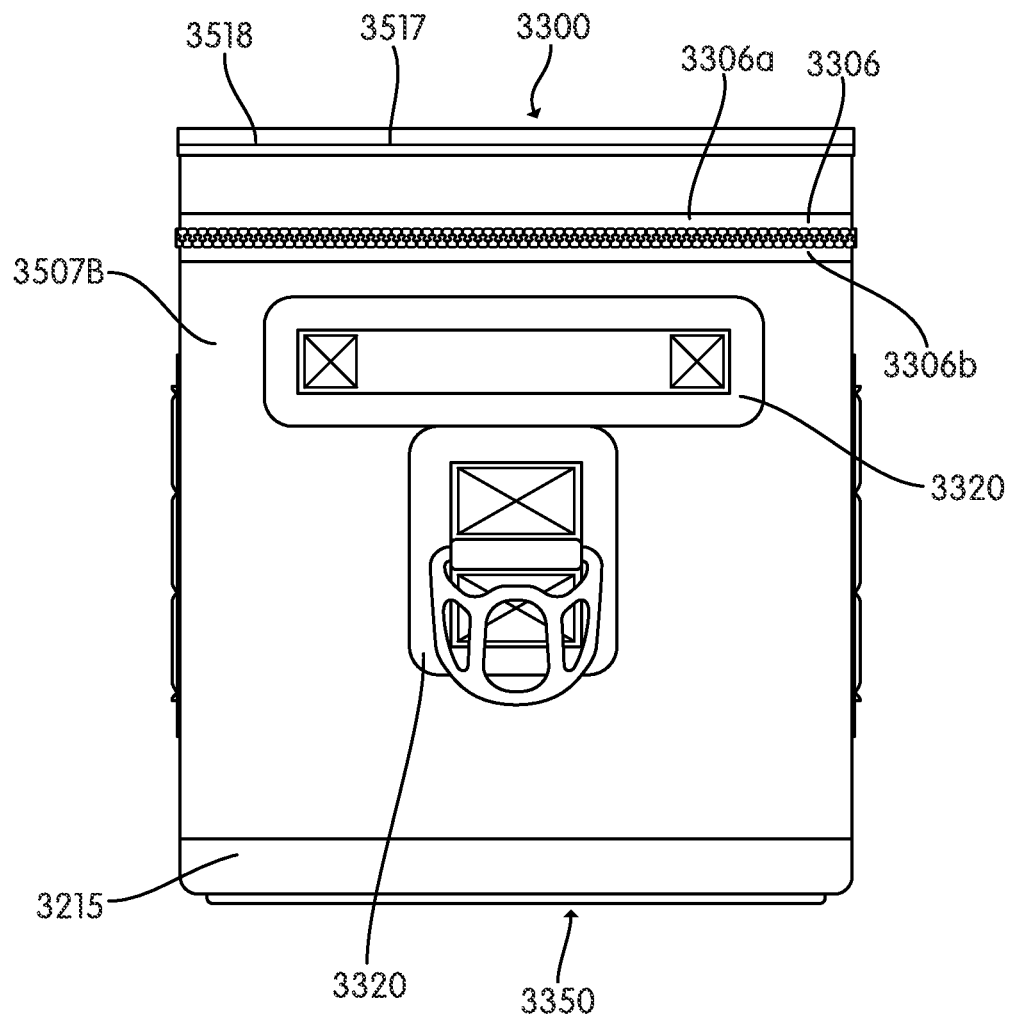
FIG. 25 shows a side view of the example insulating device of FIG. 24.
Figure 26:
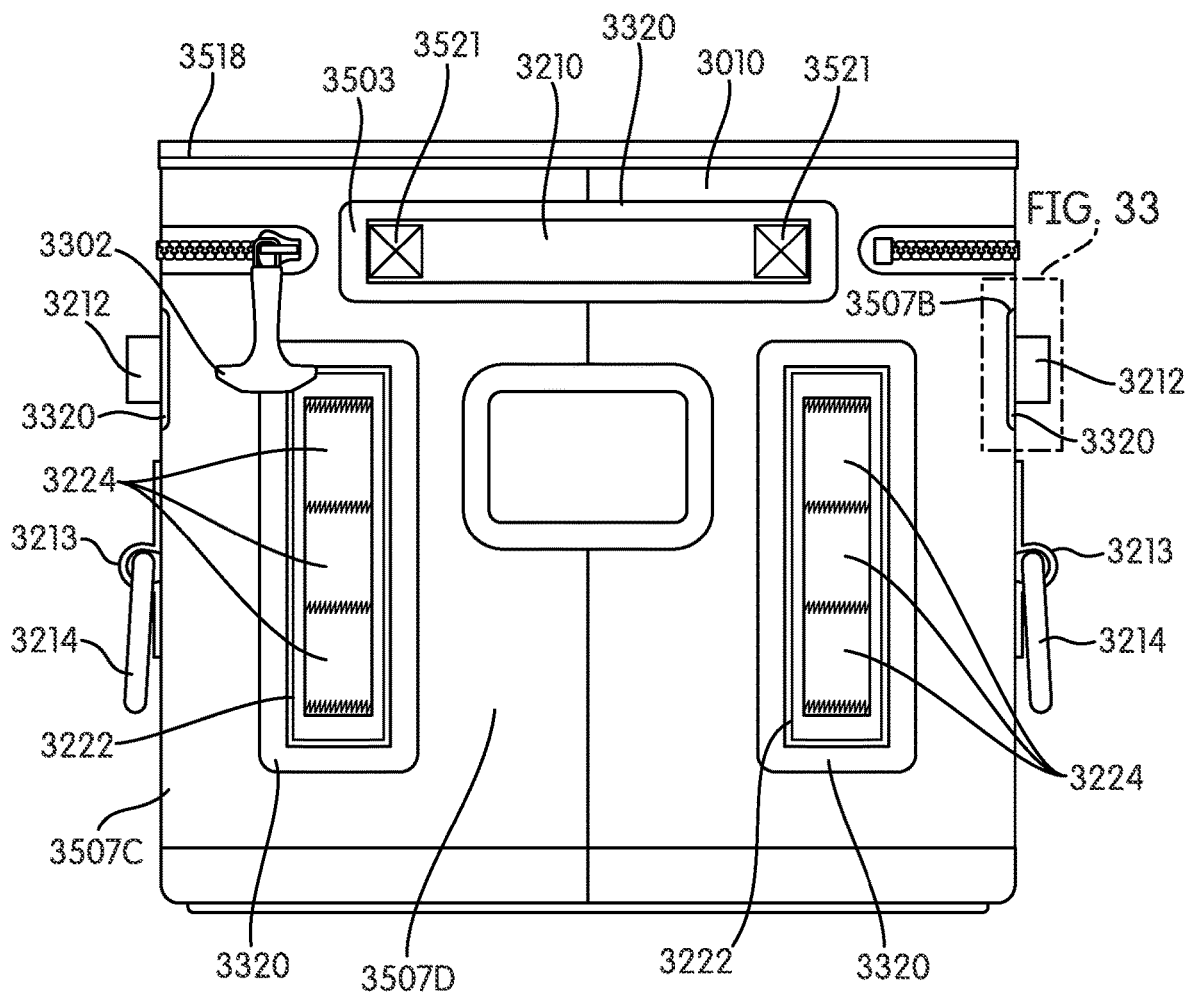
FIG. 26 shows a rear view of the example insulating device of FIG. 24.
Figure 27:
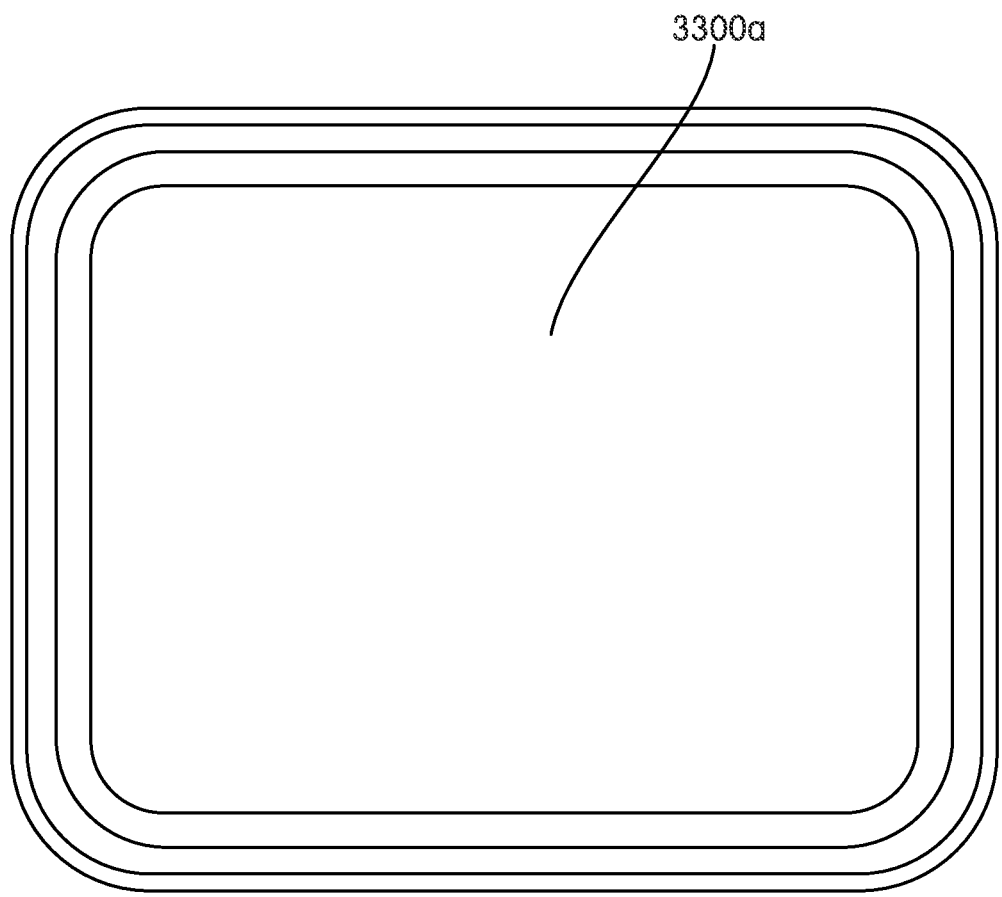
FIG. 27 shows a top view of the example insulating device of FIG. 24.
Figure 28:
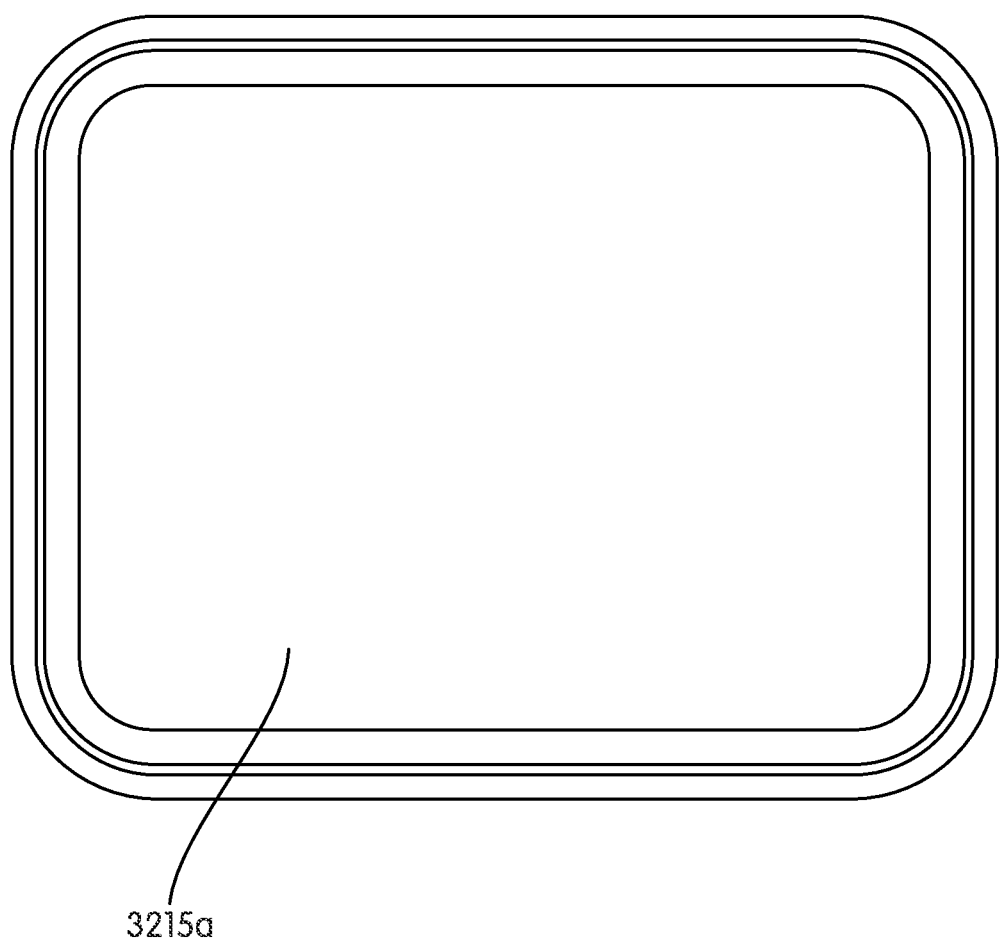
FIG. 28 shows a bottom view of the example insulating device of FIG. 24.

As shown in FIGS. 24-26, the closure 3311 extends between the body assembly 3350 and the lid assembly 3300 to substantially seal the body assembly 3350 and the lid assembly 3300 from water. Additionally, as shown in FIG. 29A, the lid assembly 3300 can be connected to the body assembly 3350 by the outer shell 3501, which forms a living hinge 3503. In one example, the living hinge 3503 can be formed as a portion of the outer shell 3501 and/or the inner liner 3500 and specifically from the flexible nature of the material of the outer shell 3501 and/or the inner liner 3500 to provide a larger opening in the insulating device 3010. The living hinge 3503 can also be reinforced by an inner piece of fabric 3503A, which can be formed of the inner liner material or other waterproof materials. In this way, the chamber 3504 and contents of the insulating device 3010 can be accessed by opening the closure 3311 and folding back or opening the lid assembly 3300.

In this example, the insulating device 3010 can be in the shape of a cuboid or prism. For example, the outer shell 3501, the insulating layer 3502, and the inner liner 3500 define the first sidewall, 3507A, the second sidewall 3507B, the third sidewall 3507C, and the fourth sidewall 3507D of the cuboid. Also the lid assembly 3300 forms a top wall 3300a and the base 3215 forms a bottom wall 3215a to enclose the cuboid. However, the contents of the insulating device 3010 are accessed through the opening 3512 formed at the top of the insulating device and again can extend through each of the first sidewall, 3507A, the second sidewall 3507B, the third sidewall 3507C and can extend partly through the fourth sidewall 3507D. Other shapes are also contemplated for the insulating device 3010, for example, cylindrical, spherical, conical, pyramidal, frusto-conical, frusto-spherical, frusto-pyramidal, etc. The height of the insulating device 3010 can, in one example, be in the range of 15 cm to 50 cm and in one particular example can be 29 cm. The length of the insulating device 3010 can be in the range of 15 cm to 50 cm and in one particular example can be 32 cm. Also the width of the insulating device can, in one example, be in the range of 15 cm to 50 cm and in one specific example be 25.5 cm. The storage capacity of the insulating device 3010 can be 10 to 15 quarts and in one particular example can be 12.7 quarts. However, it is contemplated that the insulating device 3010 may comprise any height, length, width and volume dimensions, without departing from the scope of these disclosures.

Like in the above examples, the insulating device 3010 can include one or more handles 3210, 3212, rings 3214, and webbing loops 3224 for attaching various items, e.g. straps (shoulder), carabineers, dry bags, keys, storage cases, etc. The rings 3214 can be D-rings, and a shoulder strap (not shown) can be connected to the D-rings for easy carrying of the insulating device. Also the rings 3214 can be attached to the insulating device 3010 at attachment points 3213, which can form loops or straps 3315a that also form a slot for receiving the rings 3214. The insulating device may also include side, front and/or rear carry handles, pockets, tie downs, and D-rings anywhere on the external surface of the outer shell. The pockets can be sized for receiving keys, phones, wallets, etc. and can be formed waterproof. The pockets may also include a waterproof zipper to prevent the contents therein from getting wet.

Likewise, similar to the above examples, the outer shell 3501 can also include multiple reinforcement areas or patches 0
that are configured to assist in structurally supporting the optional handles, straps, and webbing loops (e.g. 3210, 3212, 3213, 3214, and 3224). The handles or straps (e.g. 3210, 3212, 3213, 3214, and 3224) and other attachments can be stitched to the patches using threads 3222. In certain examples, these threads 3222 do not extend through the outer shell 3501 into the insulating layer 3502. The optional handles or straps can be sewn to the patches 3320, and the patches 3320 can be RF welded to the outer shell 3501. Also, in other examples, the patches 3320 can be sewn or adhered to the outer shell 3501. Apertures from the stitching operation can provide venting to the interior defined by the outer shell 3501 and the inner liner 3500 of the insulating device 3010. In addition, other techniques are contemplated for securing the handles or straps to the insulating device 3010.

The internal components of the insulating device 3010, the body assembly 3350, and the lid assembly 3300 can be seen in the cross-sectional view of FIG. 29A. In addition, FIG. 29B shows a magnified cross-sectional view of the lid assembly 3300.

The lid assembly 3300 includes an upper inner liner portion 3500A, an upper insulating layer portion 3502A and an upper outer shell portion 3501A. The upper insulating layer portion 3502A can be formed of a single layer of foam, which corresponds to the overall shape of the lid assembly 3300. The foam can, in one example, be an insulating foam, as discussed herein, which can be the same foam as is used in the body assembly 3350, and can be unattached to and floating between the upper inner liner portion 3500A and the upper outer shell portion 3501A. As shown in FIG. 29B, the upper inner liner portion 3500A can be formed of a sheet of material 3500A1 and a strip of material 3500A2 that is attached to the binder 3518. In other embodiments the sheet of material 3500A1 can connect directly to the binder 3518 thus eliminating the need for the strip of material 3500A2. The strip of material 3500A2 can overlap and be welded to the sheet of material 3500A1. Seam tape 3509 can be placed over the connection between the sheet of material 3500A1 and the strip of material 3500A2. It is also contemplated that the upper inner liner portion 3500A can be formed as a unitary structure by injection molding, for example.

The upper inner liner portion 3500A can be connected to the upper outer shell portion 3501A by joining the upper inner liner strip of material 3500A2 to an upper outer shell strip of material 3501A3 at a RF weld joint 3522. However, it is contemplated that other types of securing methods could be used such as other forms of welding, stitching, adhesives, rivets, etc. Additionally, as will be discussed in further detail, a binding material 3518, in the form of a strip or band can be sewn over the ends of the upper inner liner strip of material 3500A2 and the upper outer shell strip of material 3501A3. It is also contemplated that the binding material 3518 can be coupled over the ends of the upper inner liner strip of material 3500A2 and the upper outer shell strip of material 3501A3 by a plurality of rivets, or by using one or more adhesives.

Figure 29B:
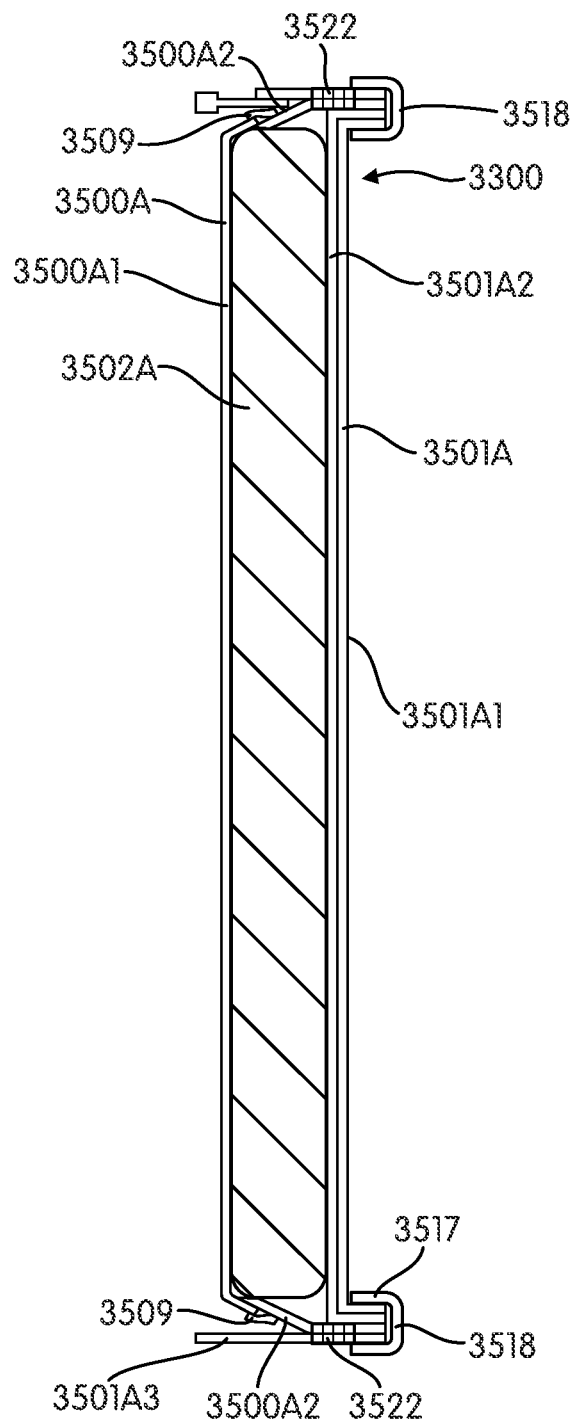
FIG. 29B shows a portion of a cross-sectional view of the example insulating device of FIG. 24.
Figure 30:
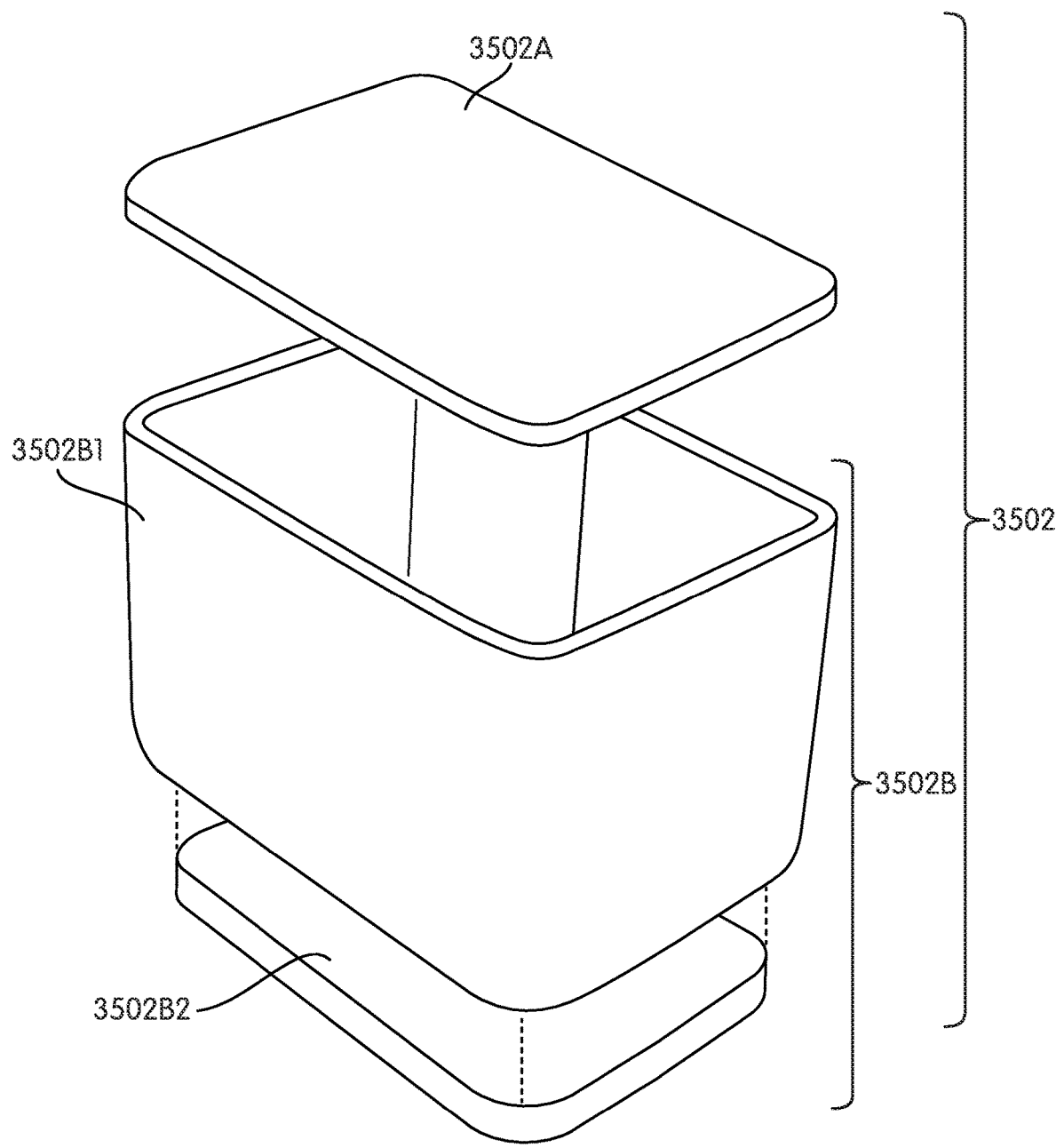
FIG. 30 shows an isometric view of an exemplary insulation layer of the example insulating device of FIG. 24.

As shown in FIGS. 29A and 29B, the upper outer shell portion 3501A of the lid assembly 3300 may include two separate layers 3501A1, 3501A2 and an upper outer shell strip of material 3501A3 extending perpendicular to the two separate layers 3501A1, 3501A2. The upper outer shell strip of material 3501A3 can be integral and attached to a first outer shell section 3501B1 as discussed in further detail below. For example, the upper outer shell strip of material 3501A3 and the first outer shell section 3501B1 can be formed or cut from the same material. However, it is also contemplated that outer shell strip of material 3501A3 and the first outer shell section 3501B1 are formed of separate structures or different materials. In one example, the top layer 3501A1 can be formed of a TPU coated nylon laminate, and the bottom layer 3501A2 can be formed of a compression molded EVA material. The upper outer shell portion 3501A may also be formed of a unitary piece of material in an injection molding process, for example.

As shown in FIGS. 29A and 29B, the binding material 3518 can both secure the lid assembly 3300 together and secure the lid assembly 3300 to the body assembly 3350. The binding material 3518, in certain examples, can be formed of a strip, band or ribbon and can be made of nylon. It is contemplated that the binding material 3518 can be formed from additional or alternative polymers, without departing from the scope of these disclosures. Specifically, the first outer shell section 3501B1 can be secured together with the upper inner liner 3500A, the separate layers 3501A1, 3501A2, and the upper outer shell strip of material 3501A3 of the upper outer shell portion 3501A by stitching the binding material 3518 around the perimeter of the lid assembly 3300. The stitching, therefore, extends through the binding material 3518, the lower outer shell portion 3501B, the upper inner liner portion 3500A, the top layer 3501A1, the bottom layer 3501A2 and the strip of material 3500A2 to form a seam 3517.

The weld joint 3522 can also both secure the lid assembly 3300 together and secure the lid assembly 3300 to the body assembly 3350. As alluded to above, the weld joint 3522, which can be an RF weld joint, also secures the lid assembly 3300 together by connecting the upper inner liner portion 3500A and the upper outer shell portion 3501A by joining the upper inner liner strip of material 3500A2 to an upper outer shell strip of material 3501A3. It is also contemplated, however, that the joint 3522 could be formed by stitching or by an adhesive. Again once the lid assembly 307a and the body assembly 3350 are secured together, the living hinge 3503 is formed between the lid assembly 3300 and the body assembly 3350.

The lid assembly 3300 and the body assembly 3350 are also connected by the closure, which as discussed below, in one example, can be a zipper. Specifically, zipper tape 3306 can be attached between the upper outer shell strip of material 3501A3 and the first outer shell section 3501B1 of the lower outer shell portion 3501B by stitching, welding, adhesives, etc. In this way, an upper portion 3306a and a lower portion 3306b of the zipper tape 3306 secures the lid assembly 3300 and the body assembly 3350 together.

Referring again to FIG. 29A, the body assembly 3350 includes lower inner liner portion 3500B, lower insulating layer portion 3502B, and lower outer shell portion 3501B. The lower inner liner portion 3500B can be formed of a top strip 3500B1, a middle portion 3500B2, and a bottom portion 3500B3. The top strip 3500B1, the middle portion 3500B2, and the bottom portion 3500B3 can be welded or stitched together at seams 3508. The seams 3508 can be covered with a seam tape 3509, which can be formed of a waterproof or water resistant material, such as PU (polyurethane). However, the seam tape 3509 can be formed of a breathable material that is impervious to water but allows gases to escape from the in the inner chamber 3504.

In an alternative example, the lower inner liner portion 3500B can be formed of a single integral piece by, for example, injection molding. FIG. 31 shows an example inner liner portion 7500B that is formed by an injection molding process. In this example, the lower inner liner portion 7500B can be formed of one or more of urethane, PVC, TPU, or other weld-able material. The lower inner liner portion 7500B can be welded into place onto the outer shell, after the lower insulating layer is placed within the outer shell.

Referring again to FIGS. 29A and 30, the lower insulating layer portion 3502B can include a first sheet of insulating material 3502B1 and a second sheet of insulating material 3502B2. Similar to the above examples, the first sheet of insulating material 3502B1 and the second sheet of insulating material 3502B2 can be free floating layers of insulating material that are not attached to either the lower inner liner portion 3500B or the lower outer shell portion 3501B. However, it is also contemplated that the first sheet of insulating material 3502B1 and the second sheet of insulating material 3502B2 can be attached to either the lower inner liner portion 3500B or the lower outer shell portion 3501B. Moreover, it is also contemplated that the lower insulating layer portion 3502B be formed of a single unitary piece.

The lower outer shell portion 3501B can be formed of several sections. In this example, the lower outer shell portion 3501B can include a first outer shell section 3501B1, a lower outer wall section 3501B2, a first base layer 3501B3, and a second base layer 3501B4. Similar to the lid assembly, the first base layer 3501B3 can be formed of a TPU coated nylon laminate, and the second base layer 3501B4 can be formed of a compression molded EVA material. Each of the lower outer wall section 3501B2, the first base layer 3501B3, and the second base layer 3501B4 can be joined together by stitching, welding or adhesives. Also like in the above examples, a base support ridge 3400 can be formed into the first base layer 3501B3 and the second base layer 3501B4 to provide for structural integrity and support to the insulating device 3010 when the insulating device 3010 is placed onto a surface. In alternative examples, the lower outer shell portion 3501B can be formed as a singular component and may, in certain examples, be formed by an injection molding process.

Like in the above examples, the closure 3311 can be a zipper and can be substantially waterproof. Moreover, the zipper may comprise a pull tab or handle 3302, which in this example can formed of a hard plastic. It is also contemplated that the pull tab 3302 can be formed of a metal or alloy, a flexible polymer, cloth, string, or rope, among others. Forming the pull tab 3302 of a cloth, string, or rope may prevent the wear of the connection between the pull tab 3302 and the zipper. Specifically, when the zipper is closed about the circumference of the outer shell 3501, the pull tab 3302 can be rotated or twisted by the user. The cloth, string, or rope can withstand the twisting action by the user. Other pull tabs are also contemplated. For example, the pull tab could be provided with a bearing connection that allows the pull tap to be rotated 360° in all directions.

A series of vents can be provided along the outer shell 3501 of the insulating device 3010. The vents allow for any gases that are trapped between the inner liner 3500 and the outer shell 3501 to escape. Without the vents, the gases trapped between the inner liner 3500 and the outer shell 3501 will cause the insulating device 3010 to expand, which in certain instances, may not be desired. In certain examples, the joint or seams that connect the inner liner and the outer shell provides a vent to gases.

The venting can be provided in the lid assembly 3300. Specifically in the lid assembly 3300, the seam 3517 may provide a series of small openings in the lid assembly 3300 where the stitching on the binder material 3518 occurs. These openings act as vents for gases to escape the inner volume of the lid assembly 3300.

Figure 33:
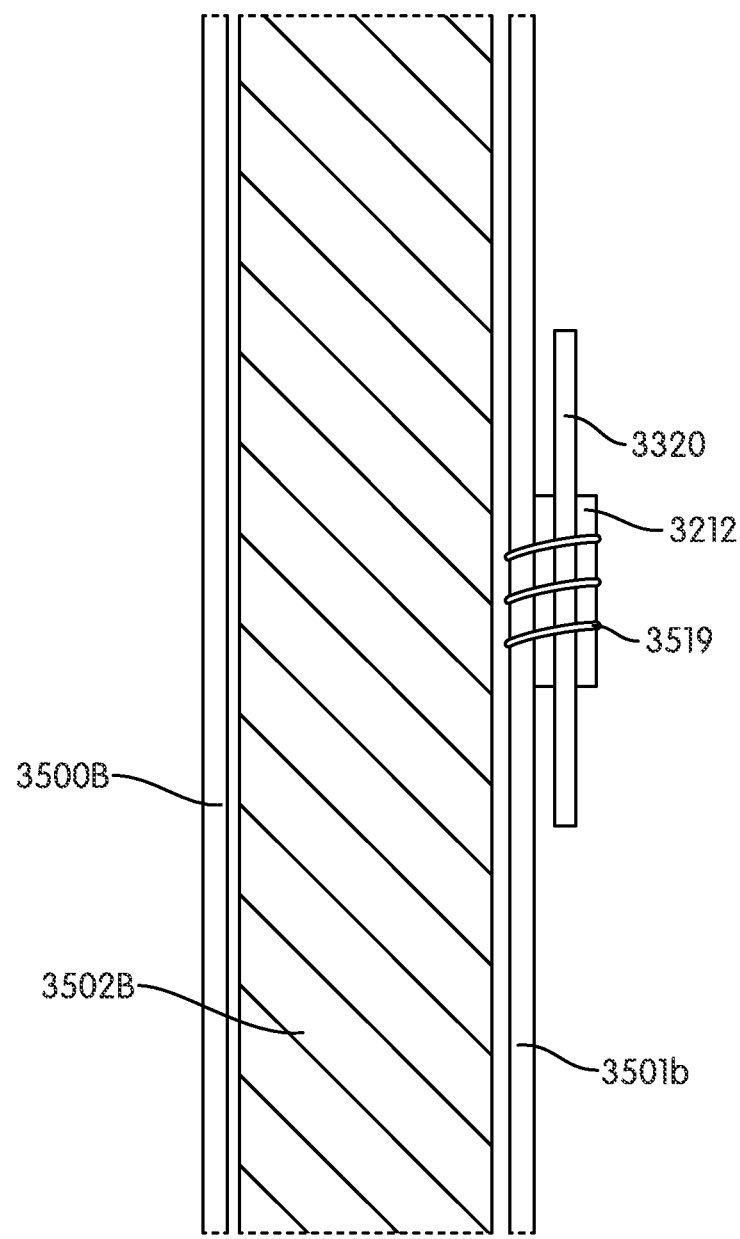
FIG. 33 shows an example method of securing a handle to an insulating device.
Figure 34:
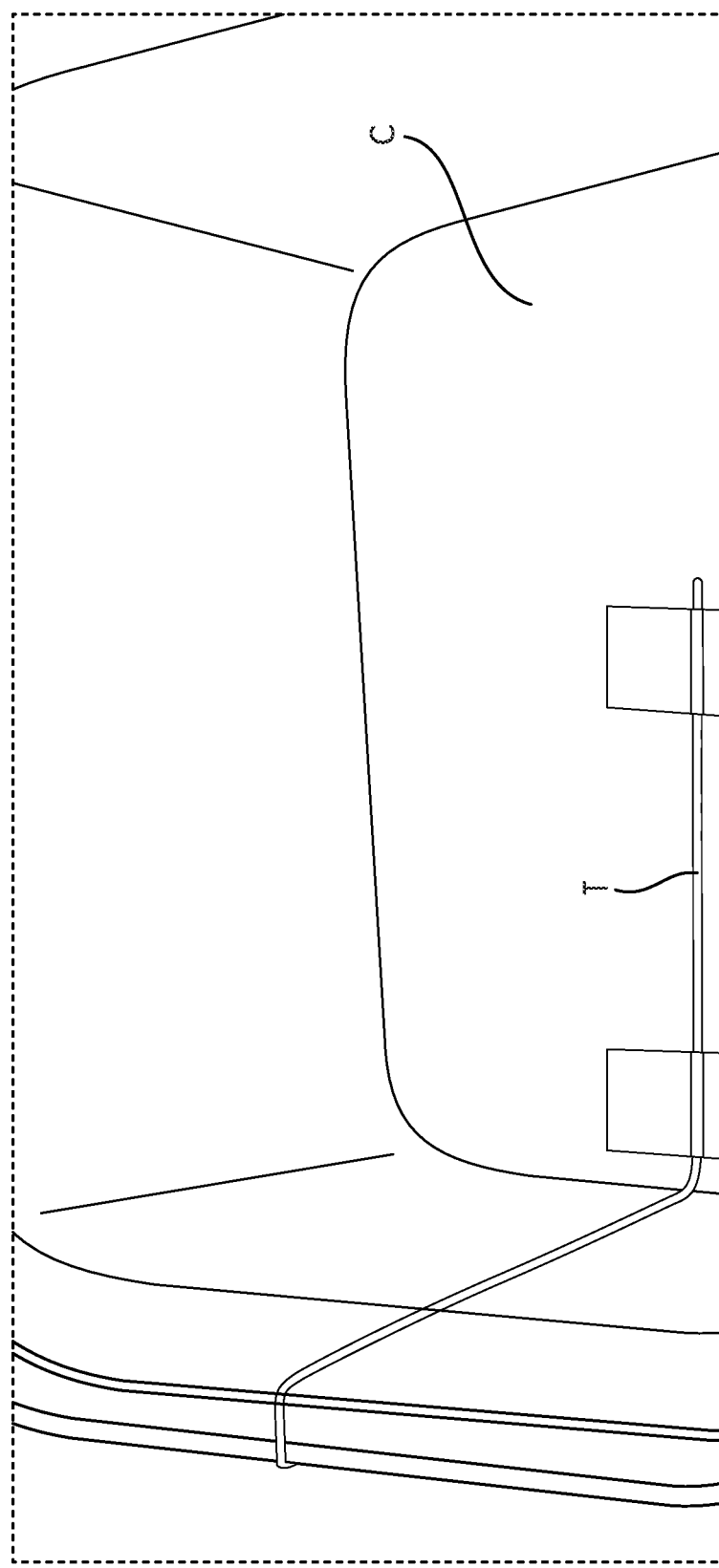
FIG. 34 illustrates an exemplary testing method.

Moreover, venting can be provided in the body assembly 3350. In the body assembly, the vents can be provided in areas of the lower outer shell portion 3501B where the lower outer shell portion 3501B fabric is pierced. For example, as shown in FIG. 26, tiny openings can be provided at the box and cross-shaped stitching 3521 where the rear carry handle 3210 is attached to the insulating device 3010. The vents can also be provided in the areas or locations where the handles 3212, 3210, molle loops 3224, and D-rings 3214 are attached to the outer shell 3501 of the insulating device 3010. For example, the stitching that secures the handles, webbing or molle loops 3224, and D-rings 3214 to the outer shell provides openings into the outer shell 3501 to create venting to the storage compartment or inner chamber 3504 of the insulating device 3010. FIG. 33 shows an example schematic where stitching 3519 extends through the outer shell 3501, a handle 3212 a reinforcement areas or patches 3320.

To form the insulating device 3010, the body assembly 3350 can be formed and then the lid assembly 3300 can be formed by joining the lid assembly 3300 to the body assembly 3350. To form the body assembly 3350 of the insulating device 3010, the lower outer shell portion 3501B and the lower inner liner portion 3500B can be formed independently. Once the lower outer shell portion 3501B is formed, the insulating layer 3502 can then be placed within the lower outer shell portion 3501B. The lower inner liner portion 3500B can be attached to the lower outer shell portion 3501B to secure the insulating layer 3502 within the lower outer shell portion 3501B and the lower inner liner portion 3500B. However, the insulating layer 3502 can freely float between the lower outer shell portion 3501B and the lower inner liner portion 3500B. The lid assembly 3300 can be secured together and the lid assembly 3300 can be secured to the body assembly 3350 by welding the upper inner liner portion 3500A to the upper outer shell portion 3501A and the lower outer shell portion 3501B at the weld joint 3522. Finally, the lid assembly 3300 can be further attached to the lower outer shell portion 3501B by way of stitching the top portion of the lower outer shell portion 3501B together with the top layer 3501A1, the bottom layer 3501A2, the upper inner liner portion 3500A, the strip of material 3501A3, and the binding material 3518.

Specifically, the lower outer shell portion 3501B can be formed by attaching each of the first outer shell section 3501B1, the lower outer wall section 3501B2, the first base layer 3501B3, and the second base layer 3501B4 together. Next, each of the first sheet of insulating material 3502B1 and the second sheet of insulating material 3502B2 can be placed within the lower outer shell portion 3501B. The lower inner liner portion 3500B can then be formed by welding each of the top strip 3500B1, the middle portion 3500B2, and the bottom portion 3500B3 together and then by adding the seam tape 3509 over each of the welds. Alternatively, as discussed above, the lower inner liner portion 3500B can be formed by injection molding the material. Once the lower inner liner portion 3500B is formed, the inner liner portion 3500B can be placed within the lower insulating layer portion 3502B, and the inner liner portion 3500B can be welded to the lower outer shell portion 3501B at seam 3511 all along the inner perimeter of the body assembly 3350 of the insulating device 3010. The seam 3511 can be formed in this example by either welding or stitching.

FIG. 9 shows an exemplary welding technique that can be used to weld the lower inner liner portion 3500B to the lower outer shell portion 3501B. Once the lower inner liner portion 3500B is placed within the lower insulating layer portion 3502B, the lower inner liner portion 3500B can then be joined to the lower outer shell portion 3501B on its side using a three-piece tool, which can include a top U-shaped portion 3514A, a plate portion 3516, and a bottom U-shaped portion 3514B. The curvature of the top U-shaped portion 3514A, the plate portion 3516, and the bottom U-shaped portion 3514B, can correspond to the shape of the perimeter of the body assembly 3350 of the insulating device 3010.

To form the seam 3511 as a weld, the lower inner liner portion 3500B is placed into contact with the lower outer shell portion 3501B and the plate portion 3516 is placed within the lower inner liner portion 3500B and the top U-shaped portion 3514A, and the bottom U-shaped portion 3514B can be placed into contact with lower outer shell portion 3501B. The top U-shaped portion 3514A and the bottom U-shaped portion 3514B can be connected to two lead wires such that current can pass through the top U-shaped portion 3514A, the lower outer shell portion 3501B and the lower inner liner portion 3500B. Current can then be applied first to the top U-shaped portion 3514A to form a weld along the top U-shaped portion 3514A including the curves and the straight portions. After the top section is welded, the polarity of the lead wires can then be reversed to then weld the bottom section along the bottom U-shaped portion 3514B.

After the bottom section is welded by the bottom U-shaped portion the remaining two sides can then be welded by using the plate portion 3516 and a pair of straight side bars or another clamping mechanism or vice. Similar to the curved portions of the body assembly 3350, current can be applied to the pair of straight side bars by lead wires. Again, the sides can be welded separately by applying the current in a first direction to weld a first side and by then switching polarity of the leads and running the current in the opposite direction to weld a second side. In one example, each of the sections can be welded for approximately 10 seconds. Once the weld is complete around the entire perimeter of the body assembly 3350, the body assembly 3350 can be assembled to the lid assembly 3300.

In one example, the closure 3311 can be substantially waterproof so as to resist liquid from exiting the opening when the insulating device is dropped from a distance of six feet. In this test, the insulating device can be filled completely with water and then dropped from six feet onto a concrete surface on each of the faces of the insulating device 3010, which in this case is six.

The example insulating device 3010 was tested to determine ice retention. As such, the ice retention testing may be utilized to determine insulative properties of example insulating device 3010. In an exemplary test, the duration of the increase from 0° F. to 50° F. when the insulating device 3010 was filled with ice was determined according to the test parameters below. In certain examples, the temperature of the insulating device increases from 0° F. to 10° F. in a duration of 0.5 hours to 1.5 hours, the temperature of the insulating device increases from 10° F. to 50° F. in a duration of 22 hours to 28 hours, and the temperature of the insulating device increases from 0° F. to 50° F. in a duration of 24 hours to 30 hours.

The ice retention was tested using the following test. More than 24 hours before the test, the following steps are performed:

Ensure test coolers are clean inside and out.

Mark test coolers with unique identifier and record identifier and description in test log or notes.

Using duct tape, place a thermocouple (T) in the approximate center of the test cooler (C).

The thermocouple tip should be approximately 1 inch above the cooler floor. (See FIG. 11 for an example of proper thermocouple set-up.)

Condition test coolers by keeping test coolers inside (ambient temperature 65-75° F.) with lids open for a minimum of 24 hours.

Calculate the amount of ice required for testing (to nearest 0.1 lbs.) using the equation below.

Ice per cooler=0.52 lbs.×Quart capacity of cooler

Ice required=Ice per cooler×number of coolers

Condition the ice by placing the ice in a freezer (−15 to −5° F.) for a minimum of 24 hours prior to use.

The day of the test, the following steps are performed:

Gather Test Equipment

Allow thermal chamber to reach a temperature of 100° F.

Scale—place scale near freezer with test ice

Data Logger—ensure Data Logger has charged battery

The test procedure is as follows:

Bring test coolers to freezer with test ice.

Place test cooler on scale and tare the scale.

Break test ice with hammer.

Using the scale as reference, quickly fill the test cooler with the required amount of ice.

Ensure that the ice is evenly distributed throughout the test cooler.

Ensure that the connector end of the thermocouple is outside of the test cooler and close and secure the cooler lid.

Repeat steps for the remaining test coolers.

Arrange the coolers in the test area such that they all have even amounts of direct sunlight and airflow (one cooler does not block the other).

Connect all thermocouples to the data logger.

Check all thermocouple readings to ensure that all connections are complete and the channels are recording properly. (Note: The starting temperature inside each test cooler should be <10° F.).

Power up the data logger and configure to record with temperatures recorded at less than 10 minute intervals.

Begin recording and note time in test log.

Allow the test to continue until the inside temperature of each test cooler is >50° F.

Stop recording.

Disconnect thermocouples from data logger.

Receive data from data logger.

Remove test coolers from test area.

Empty test coolers and allow them to dry.

Remove thermocouples from test coolers

Two samples were tested according to the above procedure. The results of which are reflected below.

| | Time from 0° F. to 10° F. | Time from 0° F. to 50° F. | | | Time from 10° F. to 50° F. | | |
|---|---|---|---|---|---|---|---|
| | Time (mins.) | Days | Hrs | Min | Days | Hrs | Min |
| Test #1 | 53 | 1 | 3 | 53 | 1 | 3 | 0 |
| Test #2 | 49 | 1 | 3 | 37 | 1 | 2 | 48 |

FIGS. 35A-36B show various views of another exemplary insulating device 5010. The example insulating device 5010 is similar to the example discussed above in relation to FIGS. 24-30. Like reference numerals refer to the same or similar elements of similar functionality in all of the various views; and, therefore, these elements are not described in detail. However, in this example the exemplary insulating device 5010 can be formed of a smaller size, can include a top handle 5216, and may include an optional reinforcement sheet or panel. Nevertheless, it is contemplated that the insulating device examples discussed herein could include a similar top handle and reinforcement sheet or panel.

Figure 35A:
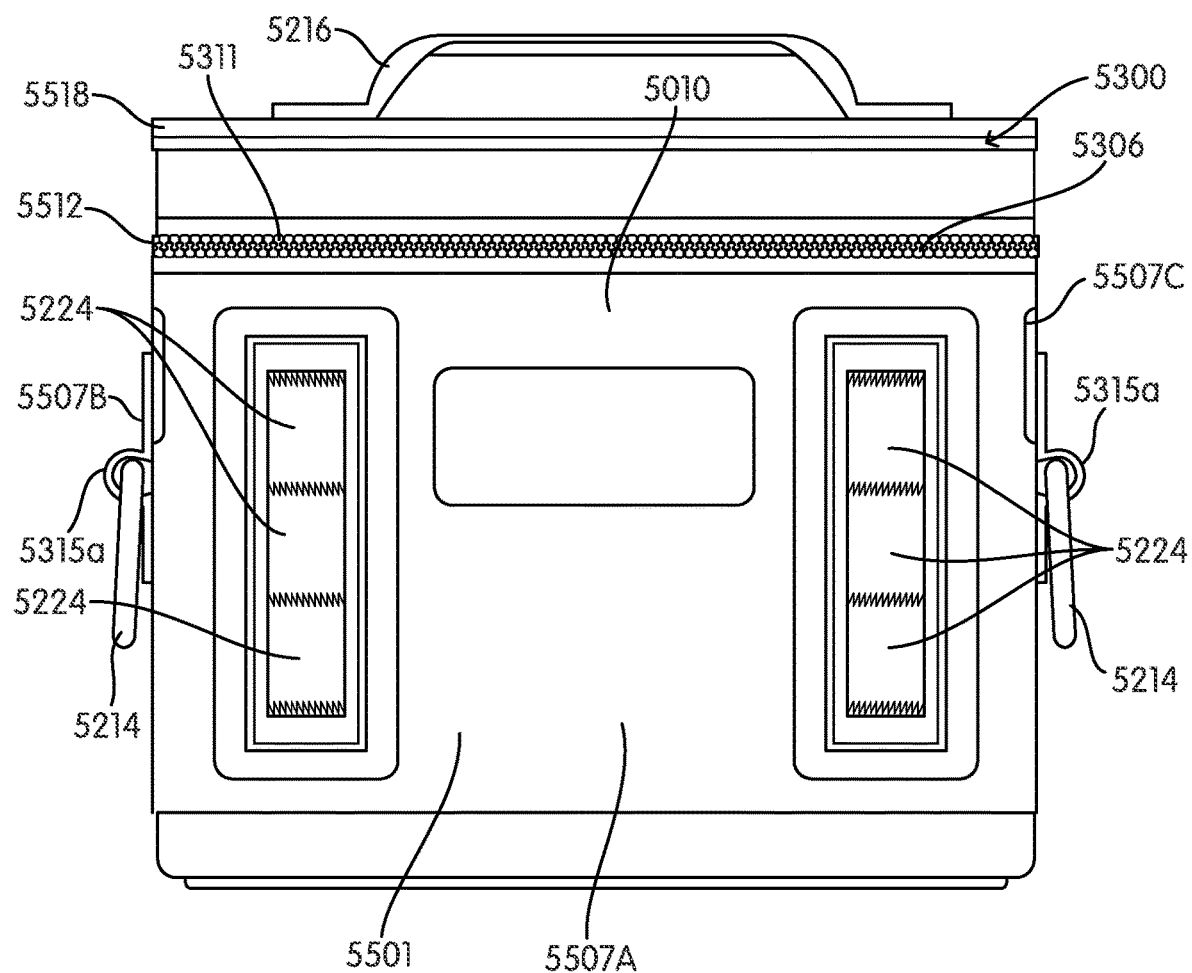
FIG. 35A shows a front view of another exemplary insulating device.
Figure 35B:
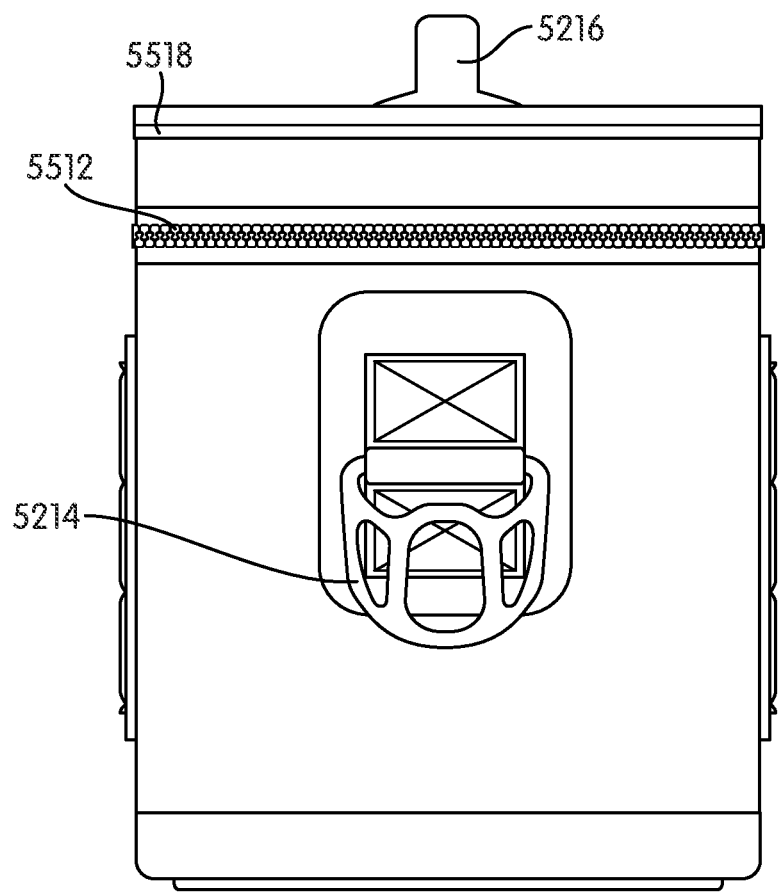
FIG. 35B shows a side view of the exemplary insulating device of FIG. 35A.
Figure 35C:
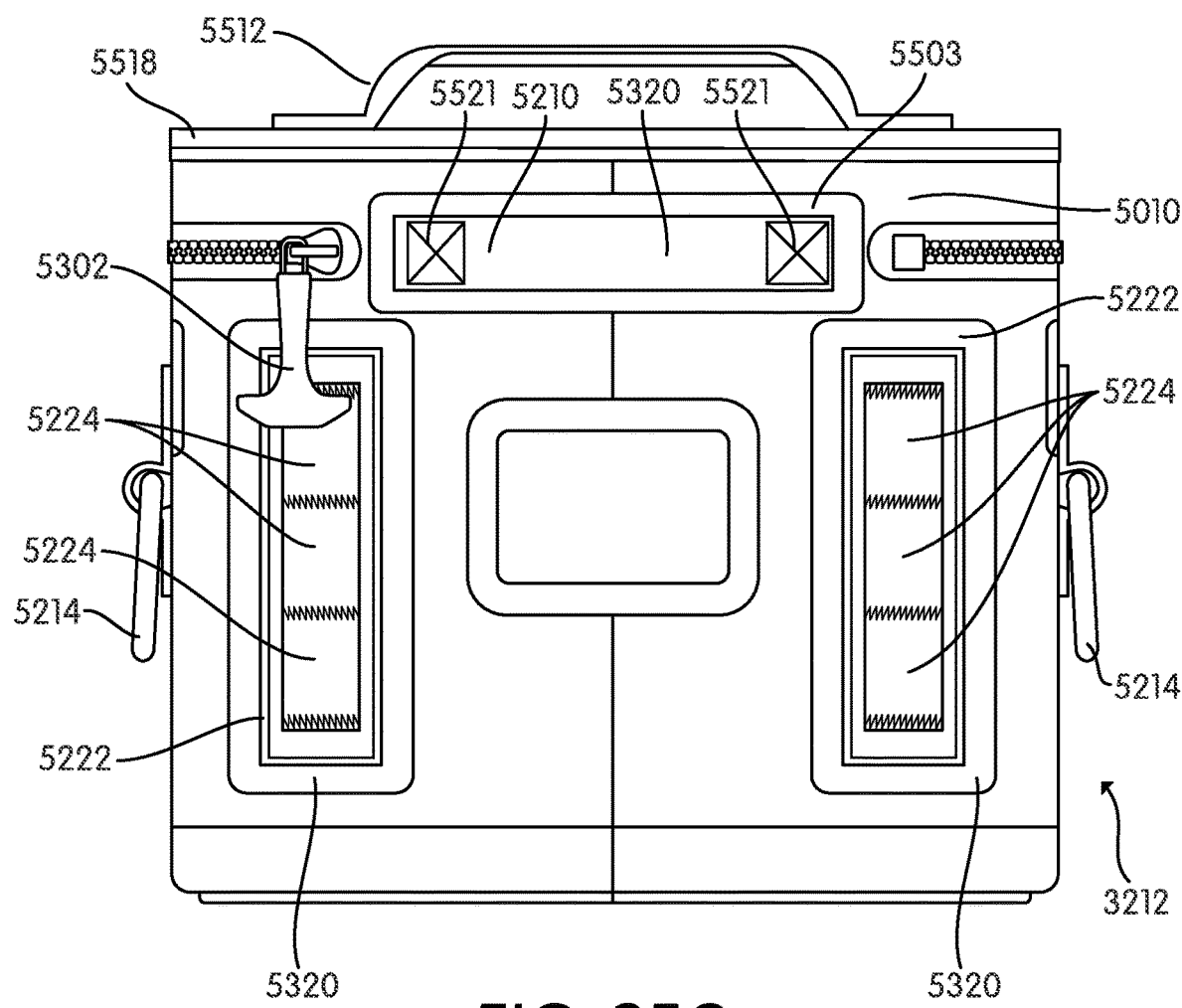
FIG. 35C shows a rear view of the exemplary insulating device of FIG. 35A.
Figure 35D:
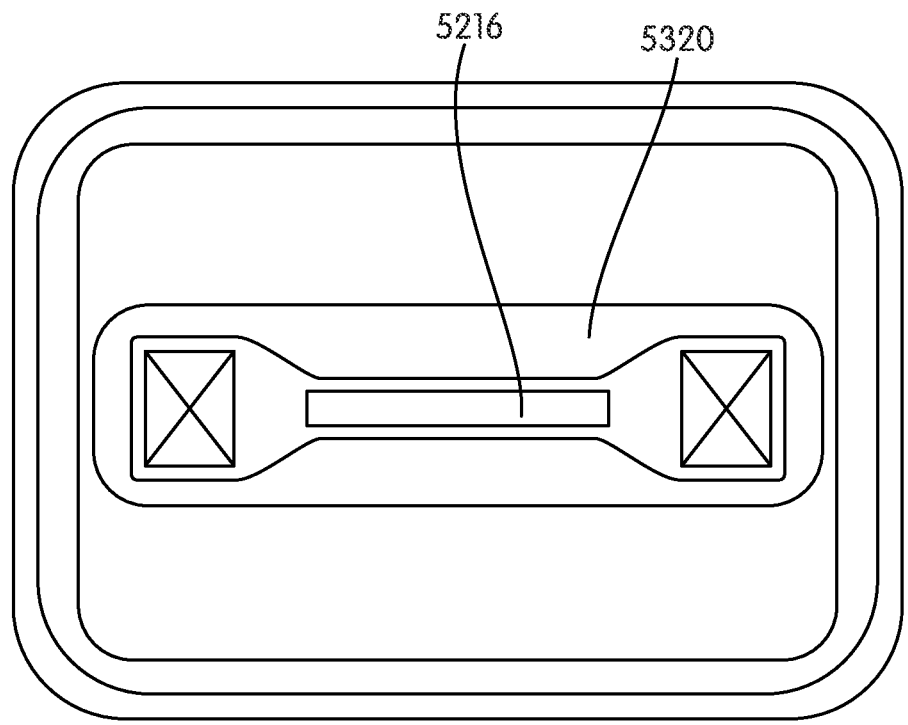
FIG. 35D shows a top view of the exemplary insulating device of FIG. 35A.
Figure 35E:
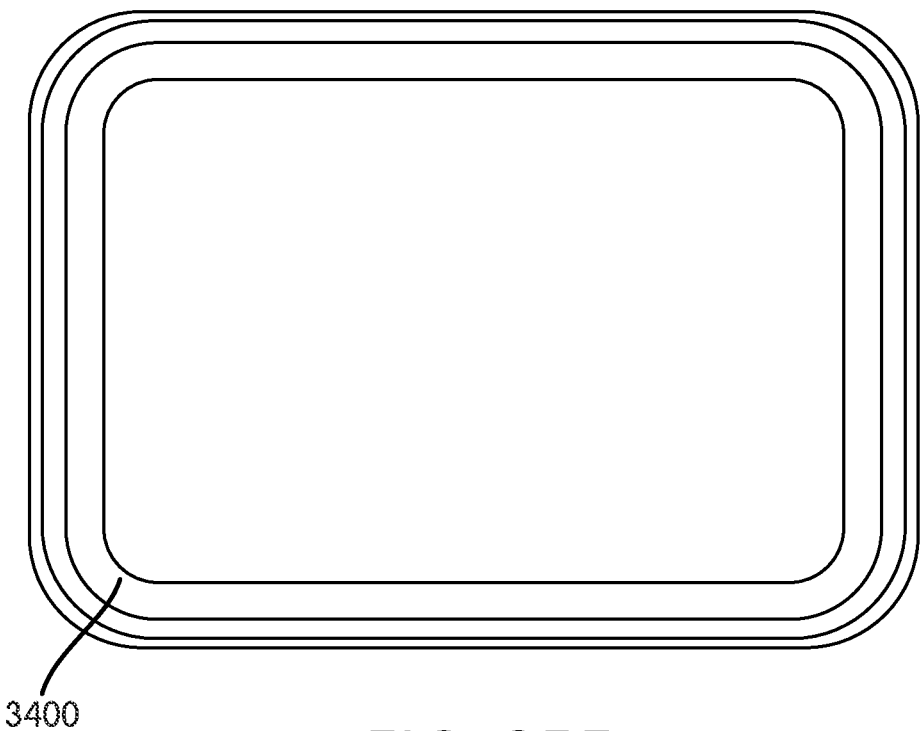
FIG. 35E shows a bottom view of the exemplary insulating device of FIG. 35A.
Figure 36A:
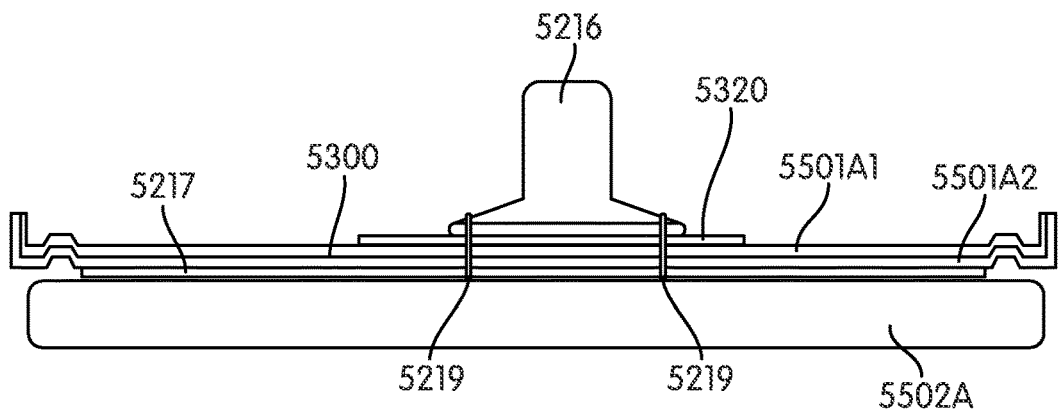
FIG. 36A shows a partial cross-sectional view of an exemplary lid.
Figure 36B:
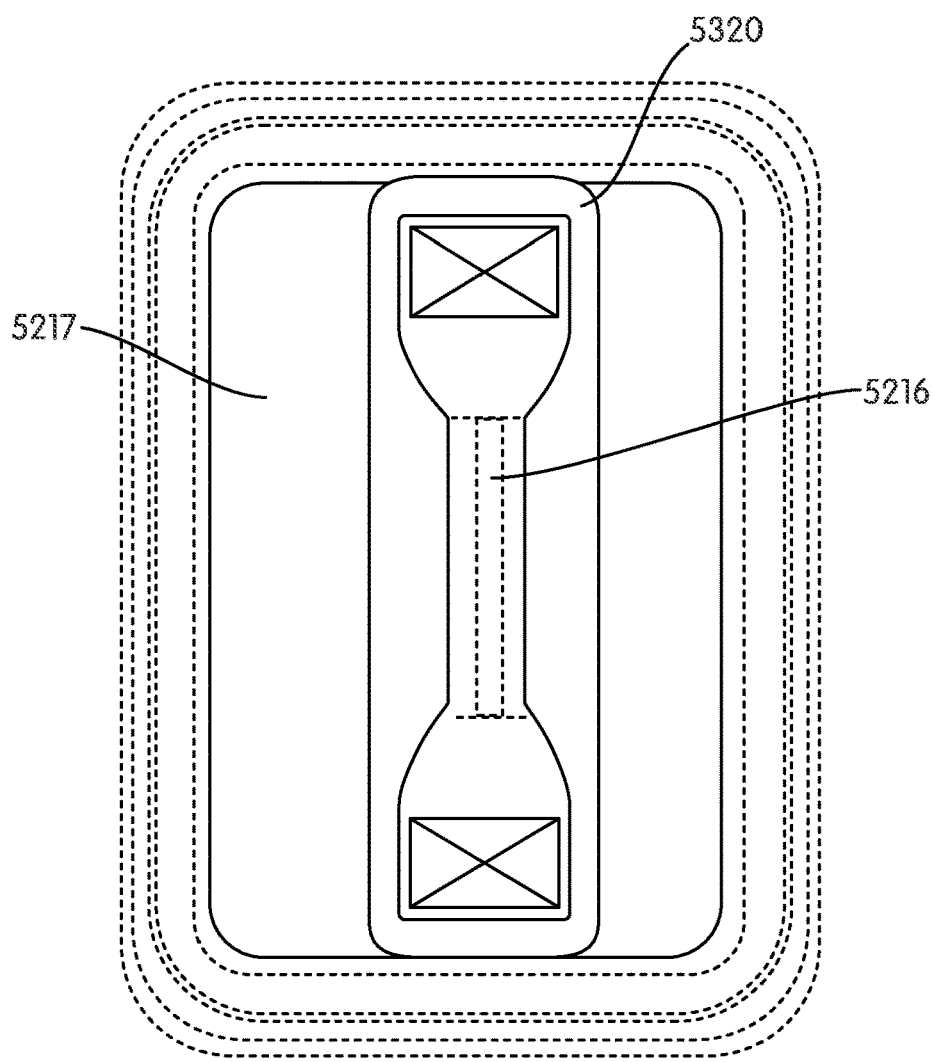
FIG. 36B shows a transparent top view of the exemplary lid of FIG. 36A.

FIGS. 36A and 36B show a partial view of an example lid assembly 5300. FIG. 35A shows a partial cross-section view of the example lid assembly 5300. The example lid assembly 5300 is similar to the examples above, however, can additionally include a reinforcement sheet or panel 5217 in the lid assembly 5300. FIG. 36B shows a partial top view of the example lid assembly to illustrate the reinforcement sheet 5217. The reinforcement sheet or panel 5217 is configured to assist in preventing bowing of the handle 5216 and the lid assembly 5300. The reinforcement sheet or panel 5217 can be a relatively rigid sheet of material in comparison to the outer liner 5501, insulating layer 5502, and the inner layer 5500. In one particular example, the reinforcement sheet or panel 5217 can be formed of a suitable polymer or plastic, such as polyethylene. However, any stiffener material that is flexible could be used and other examples, may include a thermoformed PE, a TPU injection molded custom component.

In certain examples, the reinforcement sheet or panel 5217 can be flat, corrugated or may have a honey comb configuration. The panel 5217, however, can include other patterns so as to assist in preventing bowing of the handle 5216. In certain examples, the reinforcement sheet or panel can be 1 to 3 mm thick. The reinforcement sheet may include a cover, which can in certain examples, can be configured to prevent water from penetrating the cover. In other examples, additional fabric may be included to reinforce the handle.

A reinforcement area or patch 5320 can be included on the lid assembly 5300 for supporting the handle 5216. In certain examples, the patch 5320 can be welded to the lid assembly 5300. However, the patch 5320 may also be omitted entirely. The handle 5216 may be sewn to the lid assembly 5300 and the reinforcement panel 5217 by way of thread 5219. The handle 5216 may also extend through the lid assembly and be directed connected to the reinforcement panel 5217. In addition, instead of using a thread, the handle 5216 can be connected to the reinforcement sheet or panel 5217 by one or more welds, bolts or other threaded-like connection, bayonet, ball and socket, and the like. Other connection methods may include providing either layers 5501A1 or 5501A2 with one or more slots and the reinforcement sheet or panel 5217 with one or more corresponding projections that can be located within the one or more slots, which allow for a more advanced connection of the sheet or panel 5217 to the lid assembly 5300 of the insulating device 5010. Also a wireframe or steel wire can be placed within the handle 5216 and extend through the handle 5216. The wireframe or steel wire can be threaded through the sheet or panel 5217 to secure the handle to the lid assembly 5300. It is also contemplated that all or portions of the lid assembly and/or handle can be injection molded to provide a more rigid structure to prevent bowing of the handle.

The connection between the handle 5216 and the reinforcement panel 5217 also helps prevent separation issues between the separate layers 5501A1, 5501A2, which can be a TPU coated nylon laminate, and a compression molded EVA material respectively. In this example, the connection between the handle and the reinforcement panel may allow water into the lid. However, at the same time, the connection can allow for any liquid therein to escape by evaporating through the opening formed by the connection. However, it is also contemplated that the connection between the handle and the reinforcement panel may also be waterproof or water resistant to limit the amount of moisture into the lid assembly.

Also the handle 5216 can be formed of a 1000D Nylon or other suitable polymer and may include 50 mm webbing. Additionally, the handle 5216 may include padding on the gripping portion of the handle. In one example, the padding may be a suitable foam, such as a 5 mm polyethylene sponge foam. It is contemplated that the seal between the lid assembly 5300 and the body assembly 5350 can be configured to withstand shock loading by the handle when the insulating device 5010 is sealed and filled with contents. Nevertheless, a side bridge linking the lid assembly 5300 to the body assembly 5350 is also contemplated for transporting heavy items in the insulating device 5010.

Figure 37:
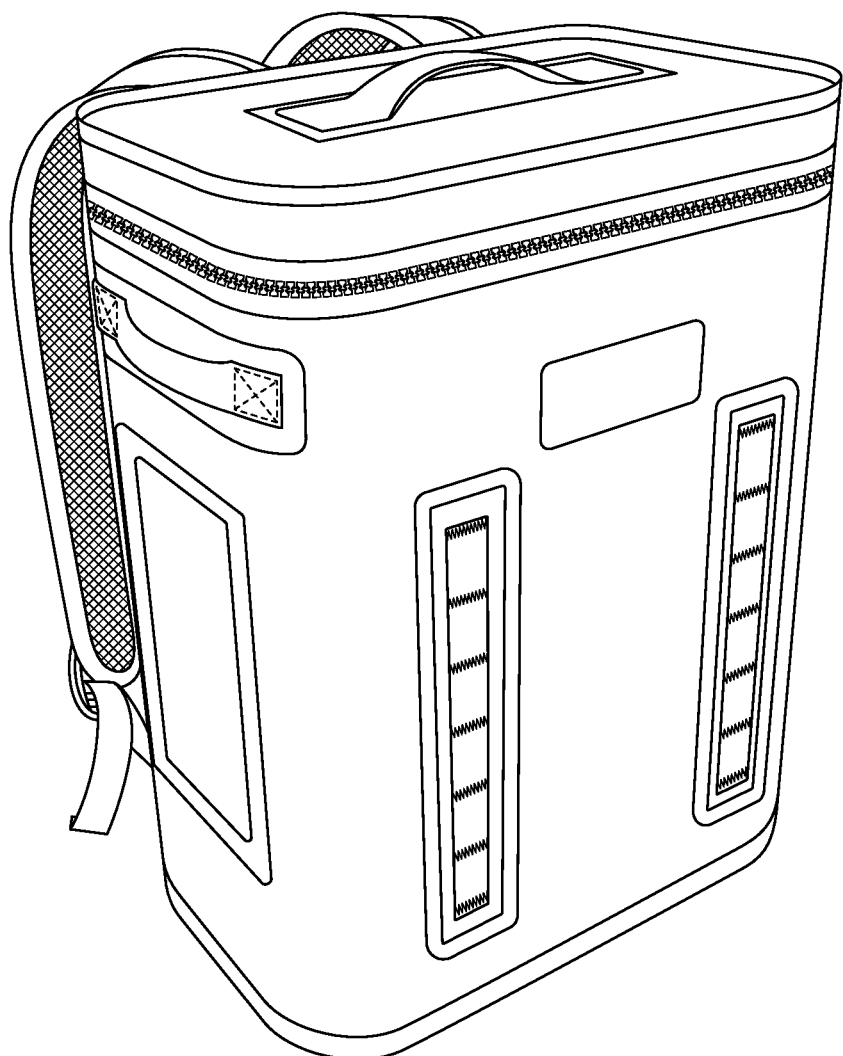
FIG. 37 depicts an isometric view of a front portion of an insulating device, according to one or more aspects described herein.
Figure 38:
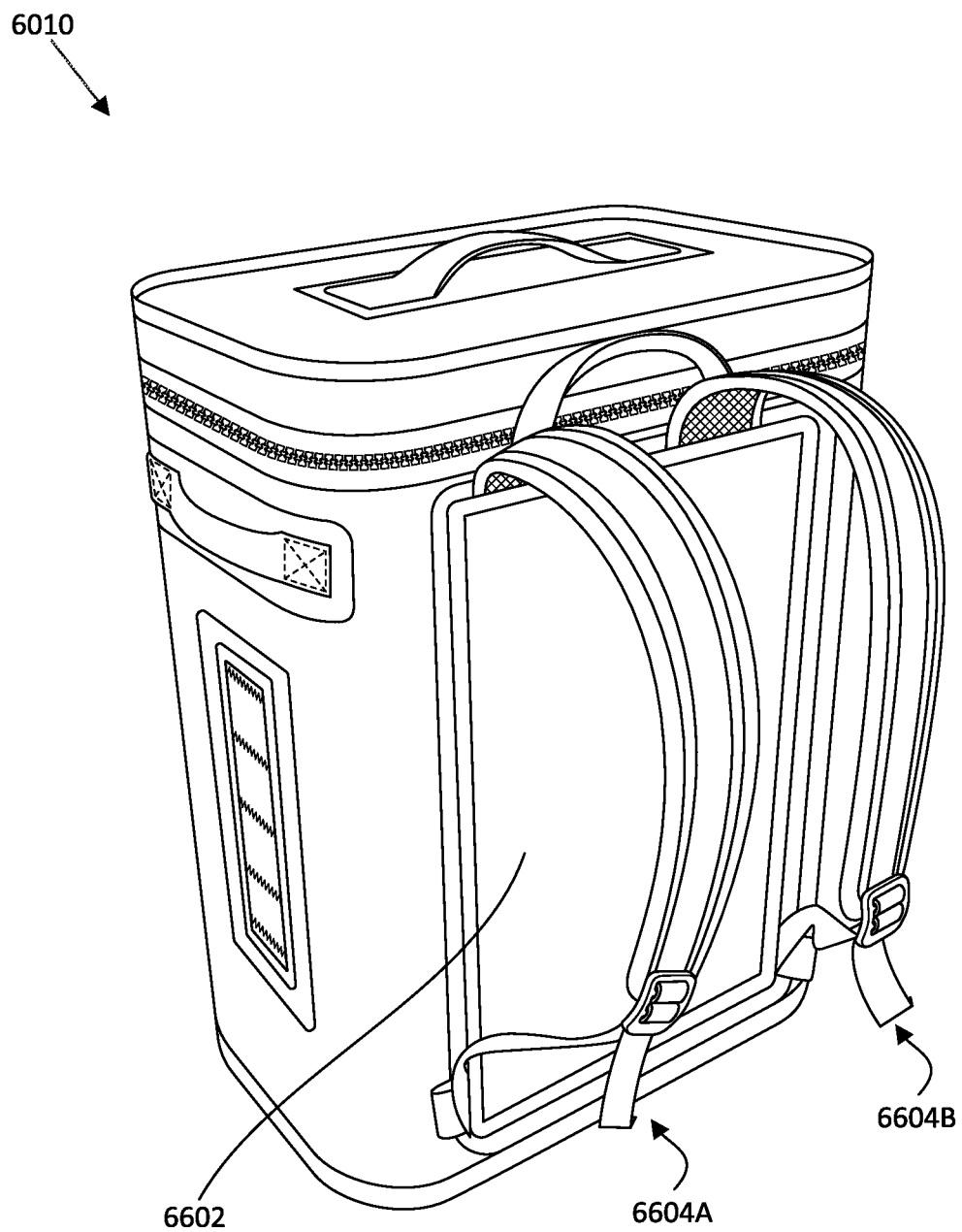
FIG. 38 depicts an isometric view of a back portion of the same insulating device of FIG. 37, according to one or more aspects described herein.

FIG. 37 depicts an isometric view of a front portion of an insulating device 6010, according to one or more aspects described herein. Additionally, FIG. 38 depicts an isometric view of a back portion of the same insulating device 6010. As depicted in FIG. 38, the insulating device 6010 includes a back support panel 6602 and shoulder straps 6604A and 6604B that allow the insulating device 6010 to be carried as a backpack. The insulating device 6010 can be of a similar construction to the examples previously described in these disclosures, where like reference numerals represent like features having similar functionality. In one example, features denoted by the same last three digits, and optionally the same letter, or alphanumeric suffix, may be considered to include similar features and construction materials and/or methodologies. It is contemplated that the structures of insulating device 6010 may be coupled to one another by any methods and/or fastener elements, such as those previously described throughout these disclosures, and including, among others, adhesives, stitching, laser welding, and/or rivets.

Figure 39:
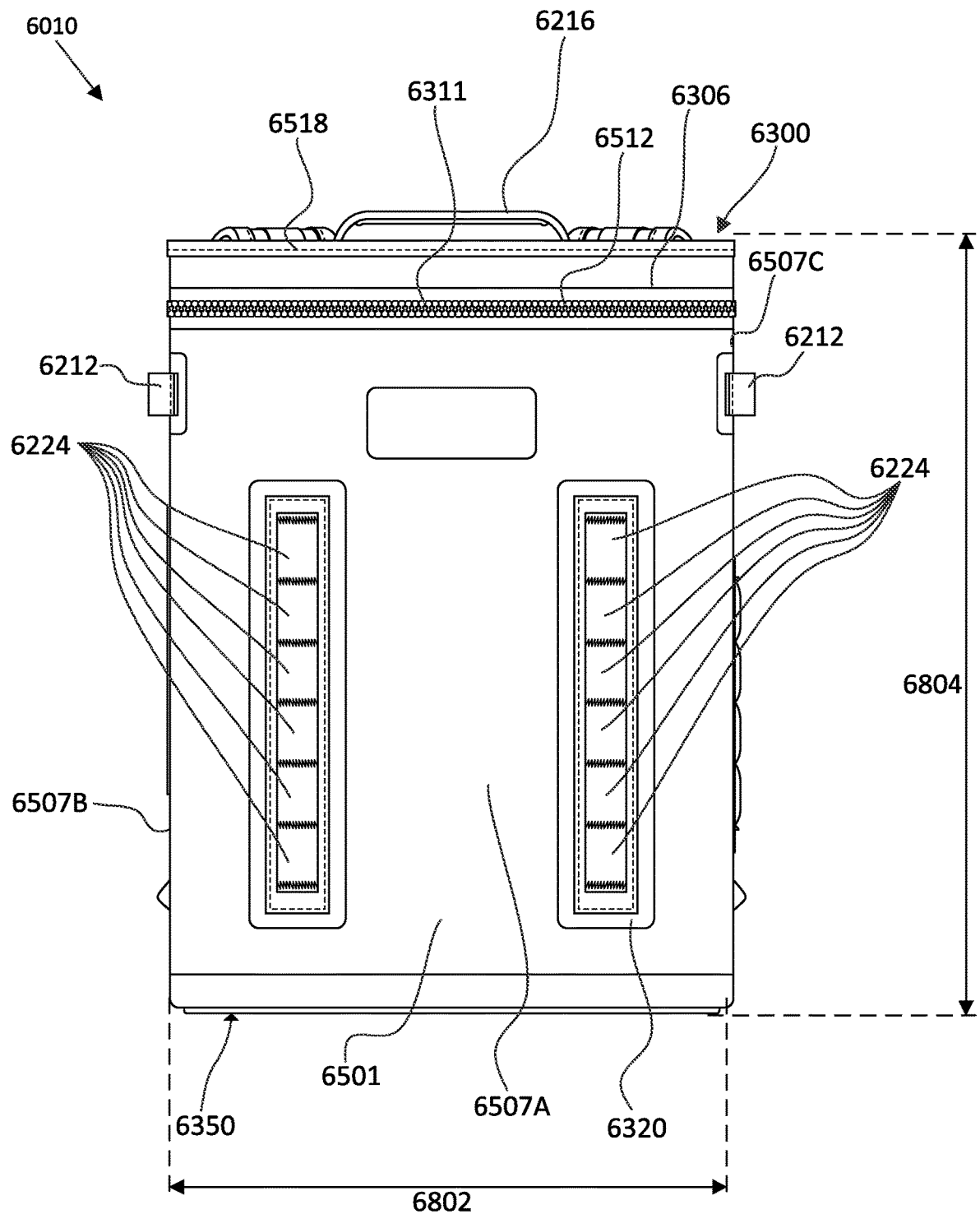
FIG. 39 depicts a front elevation view of the insulating device, according to one or more aspects described herein.

FIG. 39 depicts a front elevation view of the insulating device 6010, according to one or more aspects described herein. It is contemplated that the insulating device 6010 may have any dimensions for height, width and depth, without departing from the scope of these disclosures. Further, it is contemplated that the various components, or sub-components of the insulating device 6010 may have any dimensions, without departing from the scope of these disclosures. FIG. 39 schematically depicts a width 6802 and a height 6804 of the insulating device 6010. FIG. 40 schematically depicts a depth 6806 of the insulating device 6010. In one specific example, the width 6802 may measure approximately 28 cm. In another example, the width 6802 may range between approximately 24 and 32 cm. Further, the height 6804 may measure approximately 48 cm. In another example, the height 6804 may range between approximately 44 and 52 cm. Additionally, the depth 6806 may measure approximately 22 cm. In another example, the depth 6806 may range between approximately 16 and 28 cm. However, it is contemplated that the insulating device 6010 may have any dimensions. In one example, the insulating device 6010 may have a substantially cuboidal geometry. Additionally or alternatively, the geometry of the insulating device 6010 may be a cuboid with one or more rounded, or filleted edges. However, it is contemplated that the insulating device 6010 may have different geometries, such as a substantially cylindrical geometry, without departing from the scope of these disclosures.

As depicted in FIG. 39, the insulating device 6010 includes multiple fabric loops 6224, similar to loops 224 as previously described. In particular, two columns of six loops 6224 each are depicted in FIG. 39 as being coupled to the first sidewall 6507A. However, it is contemplated that any number of loops 6224 may be used, and in a single column or three of more columns, without departing from the scope of these disclosures.

Figure 40A:
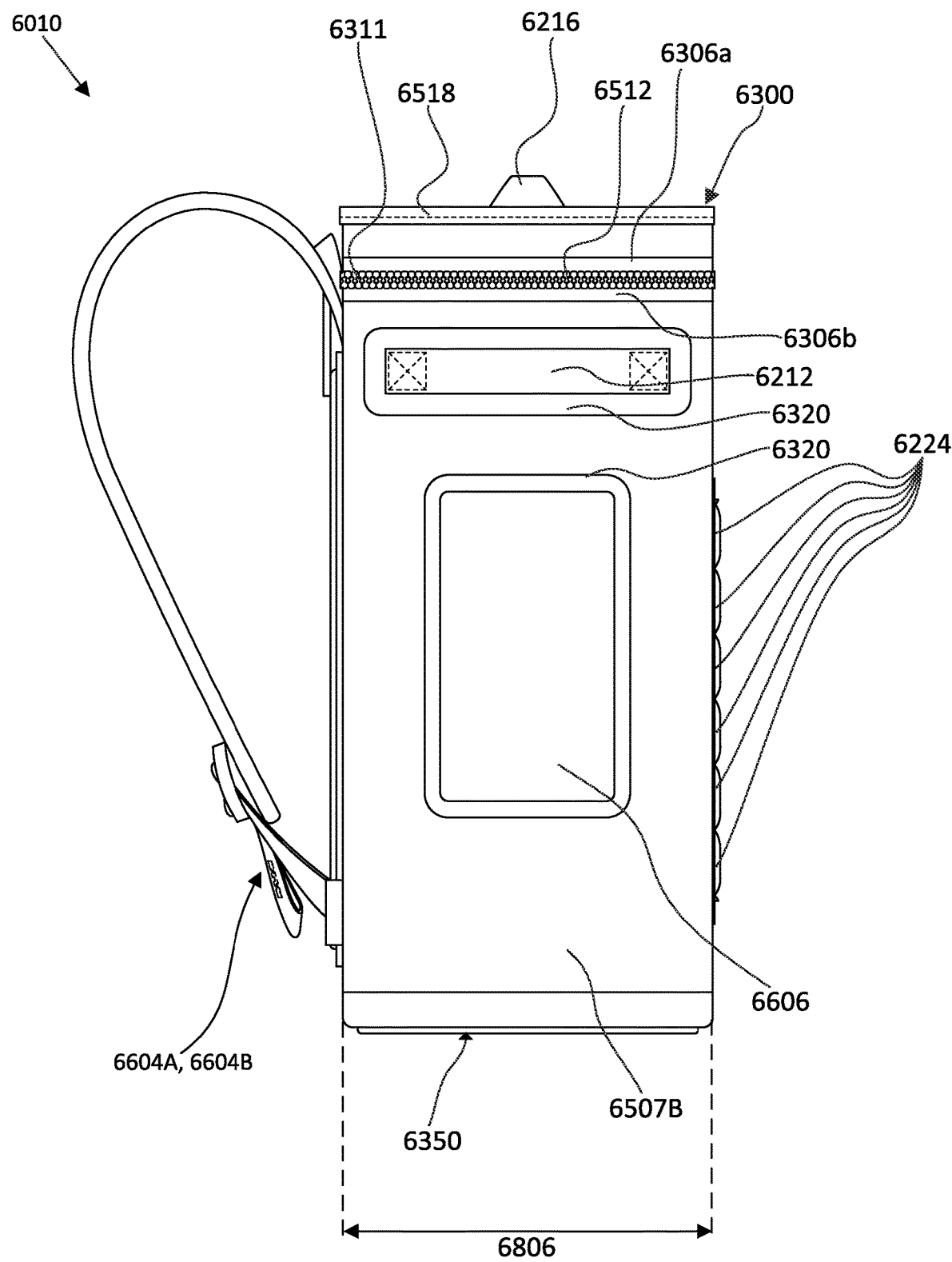
FIG. 40A depicts a side elevation view of the insulating device, according to one or more aspects described herein.

FIG. 40A depicts a side elevation view of a first, or right side of the insulating device 6010, according to one or more aspects described herein. In one example, the insulating device 6010 includes an attachment panel 6606. The attachment panel 6606 may include a surface configured to be removably coupled to hook and loop fasteners of external elements (external elements not depicted, but may include one or more storage brackets, straps, pockets, or pouches among others that include hook and loop attachment elements). It is contemplated that the attachment panel 6606 may include one or both of hook and loop elements of a hook and loop fastener structure. Additionally or alternatively, the attachment panel 6606 may include and/or encapsulate one or more metallic and/or magnetic elements that are configured to be removably coupled to one or more external magnetic elements (not depicted).

Figure 40B:
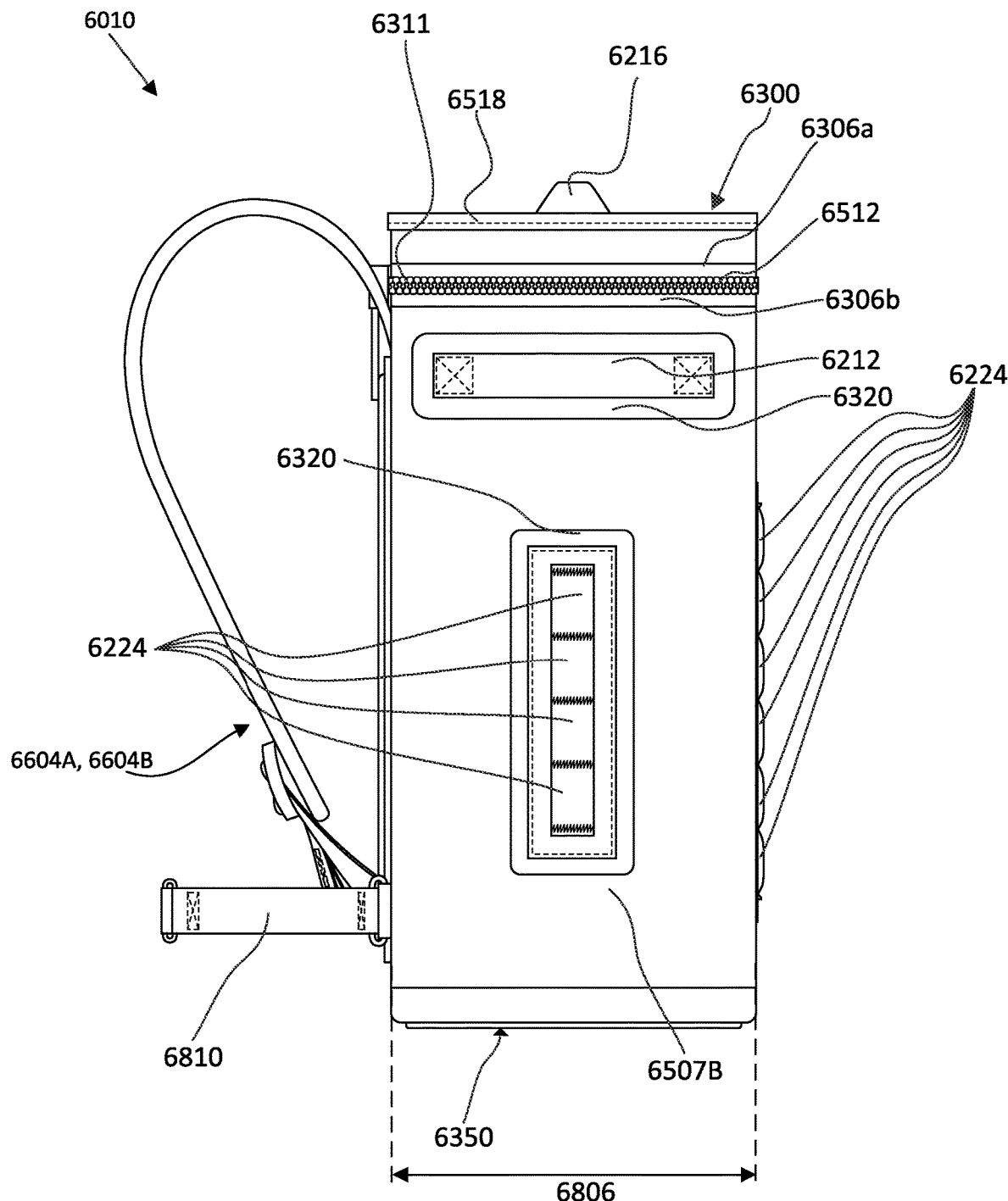
FIG. 40B depicts another implementation of a right side elevation view of the insulating device, according to one or more aspects described herein.

FIG. 40B depicts an alternative implementation of the right side of the insulating device 6010. As such, the insulating device 6010 may include a series of attachment loops 6224 in place of the attachment panel 6606. Additionally, the insulating device 6010 may include a waist strap 6810, which is described in further detail in relation to FIG. 44. It is contemplated that the waist strap 6810 may be used in combination with any implementation of an insulating device described throughout these disclosures, including the implementation of FIG. 40A.

Figure 41:
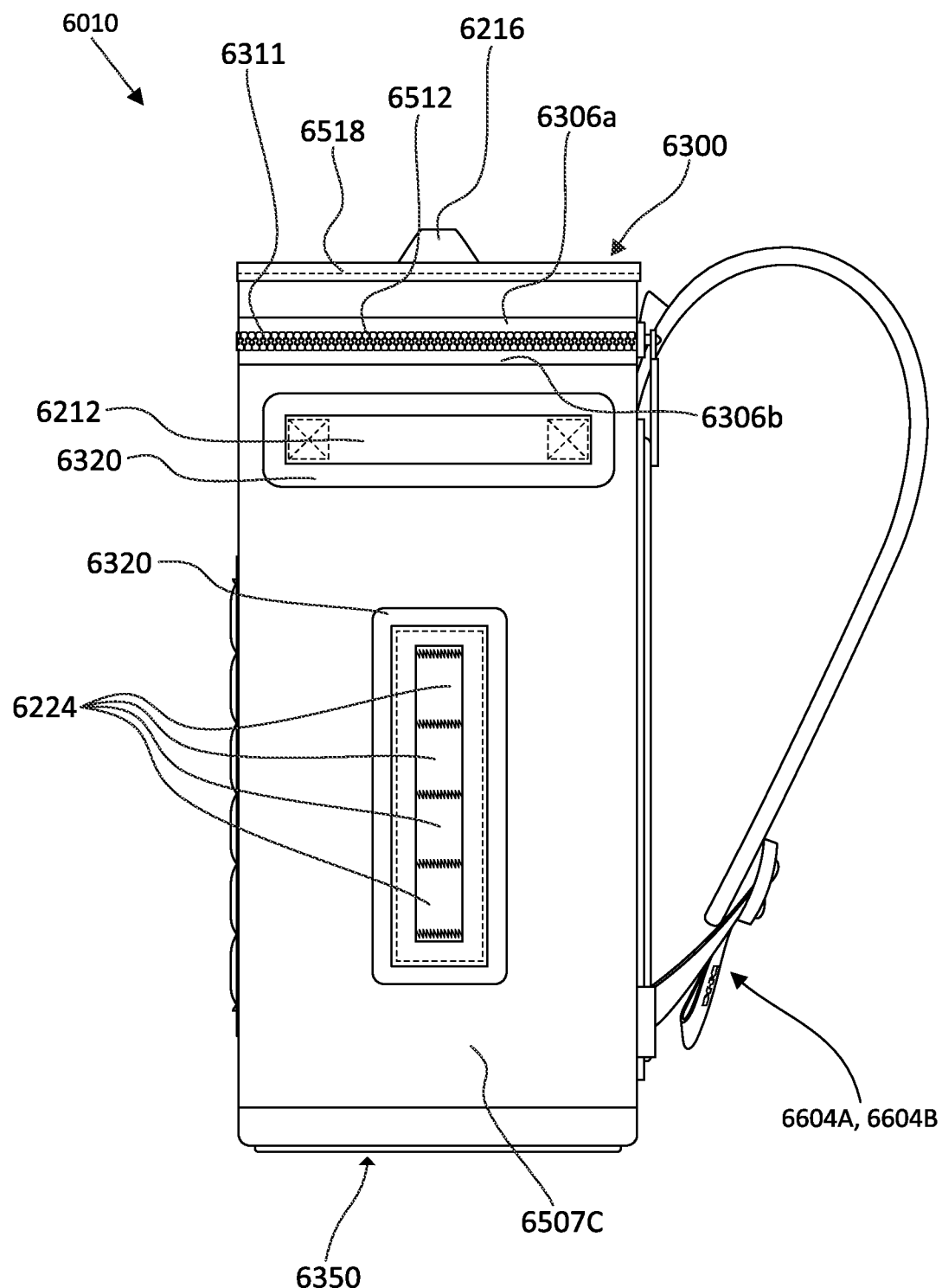
FIG. 41 depicts a left side elevation view of a second side of the insulating device, according to one or more aspects described herein.

FIG. 41 depicts a side elevation view of a second side, or left side, of the insulating device 6010, according to one or more aspects described herein. As depicted in FIG. 41, the insulating device 6010 includes multiple fabric loops 6224, similar to loops 224 as previously described. While four loops 6224 are depicted in FIG. 41, it is contemplated that any number of loops 6224 may be used, without departing from the scope of these disclosures. Additionally, it is contemplated that the second side of the insulating device 6010 depicted in FIG. 41 may include an attachment panel similar to attachment panel 6606. Additionally or alternatively, it is contemplated that the first side of the insulating device 6010 depicted in FIG. 40 may include attachment loops similar to those loops 6224 depicted in FIG. 41.

Figure 42:
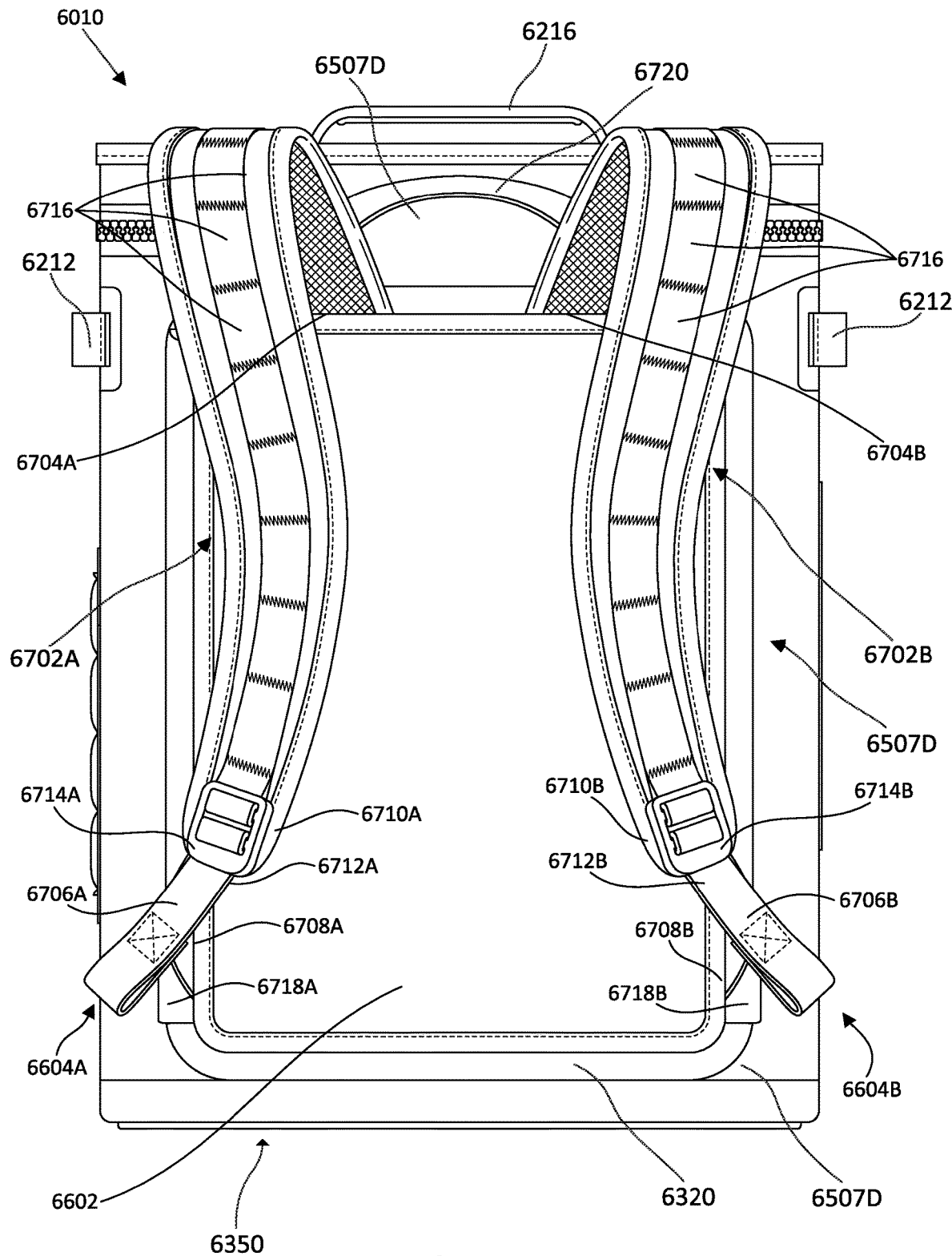
FIG. 42 depicts an elevation view of a back side of the insulating device, according to one or more aspects described herein.

FIG. 42 depicts an elevation view of a back side of the insulating device 6010, according to one or more aspects described herein. In one example, the back support panel 6602 is coupled to the depicted reinforcement patch 6320 and to the fourth sidewall 6507D of the insulating device 6010. The shoulder straps 6604A and 6604B may include padded upper strap portions 6702A and 6702B, which may constructed using similar materials and processes to straps 218. In one example, the padded upper strap portions 6702A and 6702B may include multiple layers of material, including a foam core surrounded by an abrasion resistant outer polymeric shell. As such, the foam core may include one or more of ethylene-vinyl acetate, low-density polyethylene, nitrile rubber, polychloroprene foam, polyimide foam, polypropylene foam, polyurethane foam, polyvinyl chloride foam, silicone foam, and microcellular foam, or combinations thereof. Additionally, the padded upper strap portions 6702A and 6702B may include outer webbing that is sewn onto the padded upper strap portions 6702A and 6702B to form multiple loops 6716. A portion of the loops 6716 are labelled on each of the padded upper strap portions 6702A and 6702B in FIG. 42.

It is contemplated that the padded upper strap portions 6702A and 6702B may include any number of loops 6716, which may have any physical dimensions. These loops may be similar to loops 224, and may be constructed of nylon webbing. Additionally, or alternatively, the loops 6716 may be constructed from other materials, such as polypropylene, neoprene, polyester, Dyneema, Kevlar, cotton fabric, leather, plastics, rubber, or rope. In one implementation, the loops 6716 are configured to be used to attach items (e.g., carabineers, dry bags, among others) to the insulating device 6010. Additionally or alternatively, the loops 6716 are configured to limit the extent to which the padded upper strap portions 6702A and 6702B can be expanded. As such, the padded upper strap portions 6702A and 6702B may be constructed from materials configured to deform and expand to provide shock absorption when the insulating device 6010 is worn on a user's back. When the insulating device 6010 is not loaded or worn by a user, the padded upper strap portions 6702A and 6702B may be in a contracted position and the loops 6716 may have an amount of slack that loops outward from the padded upper strap portions 6702A and 6702B. When worn by a user, the weight of the insulating device 6010 may intermittently or continuously cause the padded upper strap portions 6702A and 6702B to expand, and the loops 6716 may be repositioned as taut and proximate the outer surfaces of the padded upper strap portions 6702A and 6702B. As such, the loops 6716 may be configured to limit the extent to which the padded upper strap portions 6702A and 6702B may expand, and thereby prevent overexpansion and damage to the padded upper strap portions 6702A and 6702B, while also providing shock absorption functionality.

In one example, the padded upper strap portions 6702A and 6702B may be coupled to a top portion of the back support panel 6602 at proximal ends 6704A and 6704B. It is contemplated that the padded upper strap portions 6702A and 6702B may be coupled to the back support panel 6602 at the proximal ends 6704A and 6704B by sewing, gluing, or one or more fastener elements, among others. The shoulder straps 6604A and 6604B may additionally include lower adjustment straps 6706A and 6706B. The lower adjustment straps 6706A and 6706B may be coupled to a bottom portion back of the support panel 6602 at proximal ends 6708A and 6708B. The lower adjustment straps 6706A and 6706B may be constructed from a material similar to loops 6716 and webbing 212. As such, in one example, the lower adjustment straps 6706A and 6706B may be formed of a nylon webbing.

Distal ends 6710A and 6710B of the padded upper strap portions 6702A and 6702B may be adjustably coupled to distal ends 6712A and 6712B of the lower adjustment straps 6706A and 6706B by adjustment buckles 6714A and 6714B. In one example, the adjustment buckles 6714A and 6714B may be constructed from one or more of a polymer, a metal, an alloy, a ceramic, or a fiber reinforced material, among others. Additionally, the distal ends 6712A and 6712B of the lower adjustment straps 6706A and 6706B may include sewn loops that provide a finger loop to allow the lower adjustment straps 6706A and 6706B to be gripped and pulled through the adjustment buckles 6714A and 6714B, and to increase the thickness of the lower adjustment straps 6706A and 6706B such that the likelihood that the adjustment straps 6706A and 6706B will inadvertently slip through and disengage from the adjustment buckles 6714A and 6714B is reduced.

The insulating device 6010 may additionally include lower attachment loops 6718A and 6718B. The lower attachment loops 6718A and 6718B may be sewn into the sides of the back support panel 6602, and may be constructed from a material similar to the lower adjustment straps 6706A and 6706B. It is contemplated that the lower attachment loops 6718A and 6718B may be constructed from a nylon webbing material. However, additional or alternative materials may be used, without departing from the scope of these disclosures. In one example, the lower attachment loops 6718A and 6718B may be used as anchor points for attachment of a waist strap (not depicted) to the insulating device 6010.

In one implementation, the insulating device 6010 may include a loop handle 6720, otherwise referred to as haul handle 6720. The loop handle 6720 may be sewn into the insulating device 6010 at a top portion of the back support panel 6602, and may be constructed from a nylon webbing, similar to the lower attachment loops 6718A and 6718B. It is contemplated, however, that the loop handle 6720 may be constructed from additional or alternative polymeric, metallic, alloy or ceramic materials, without departing from the scope of these disclosures. In one example, the loop handle 6720 may additionally include a padding material encapsulated within the nylon webbing. This padding material may include a foam, or one or more layers of nylon webbing. In another implementation, the loop handle 6720 may be sewn into the back portion or fourth sidewall 6507D of the insulating device 6010 above the back support panel 6602.

Figure 35F:
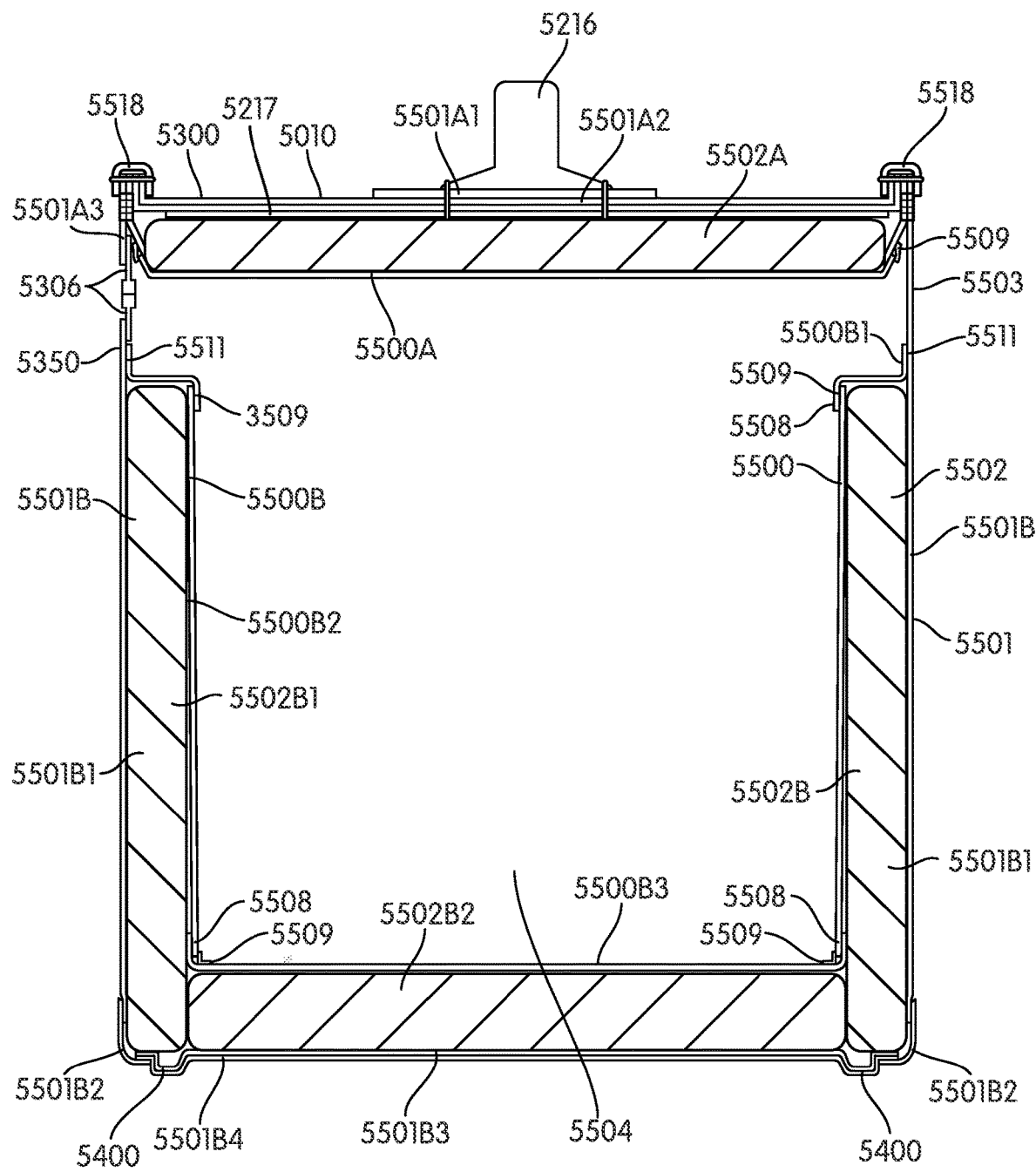
FIG. 35F shows a cross-sectional view of the exemplary insulating device of 35A.
Figure 43:
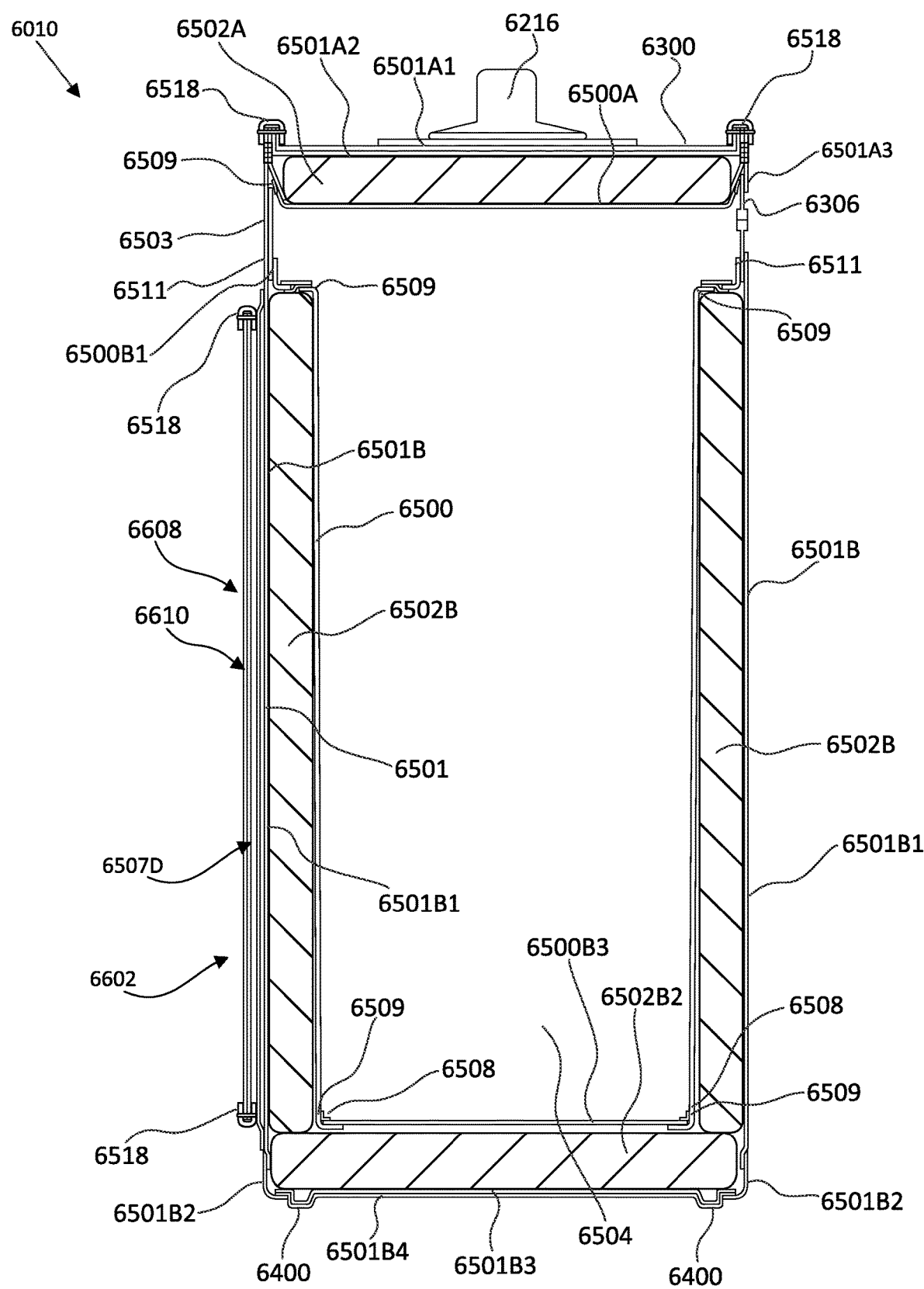
FIG. 43 schematically depicts a cross-sectional view of the insulating device, according to one or more aspects described herein.

FIG. 43 schematically depicts a cross-sectional view of the insulating device 6010, according to one or more aspects described herein. In one example, the insulating device 6010 may include elements similar to insulating device 5010, as schematically depicted in FIG. 35F. In addition, insulating device 6010 includes the back support panel 6602. In one example, the back support panel 6602 includes an outer layer 6608 and an inner layer 6610 bound to one another by one more fasteners, including by sewing, and/or by binding 6518, similar to binding 518, as previously described. In one example, the back support panel 6602 may be coupled to the outer shell section 6501. Further, the outer shell section 6501 may have two or more layers 6501B1 at the back portion or fourth sidewall 6507D, at which the back support panel 6602 is coupled to the insulating device 6010. In one implementation, the inner layer 6610 of the back support panel 6602 may include a compression molded ethylene-vinyl acetate (EVA). In another example, the inner layer 6610 may additionally or alternatively include another polymer foam material, such as, among others, low-density polyethylene, nitrile rubber, polychloroprene foam, polyimide foam, polypropylene foam, polyurethane foam, polyvinyl chloride foam, silicone foam, and microcellular foam, or combinations thereof. In one implementation, the outer layer 6608 may include a nylon material and a poly synthetic leather. However, it is contemplated that the outer layer 6608 may include additional or alternative materials. In one implementation, the materials and thicknesses of the back support panel 6602 may be configured to provide resistance to deformation/added rigidity when the back support panel 6602 is positioned proximate a user's back when the insulating device 6010 is worn as a backpack, or to provide added rigidity to hold the insulating device 6010 in an upright position (not depicted) when not being worn as a backpack. It is contemplated that any material thicknesses and material types in addition to our or as alternatives to those previously described may be used in the construction of the back support panel 6602, including polymers, metals, alloys, fiber-reinforced materials, or combinations thereof.

The insulating device 6010 includes an inner chamber 6504, similar to inner chambers 504, 2504, 3504, and 4504, and configured to store one or more items and reduce a rate of heat transfer therefrom or thereto. It is contemplated that the volume of this inner chamber 6504 may have any value, without departing from the scope of these disclosures.

It is contemplated that the insulating layers 6502A, 6502B, 6502B2 may include any of the insulating materials previously described throughout these disclosures. Additionally or alternatively, the insulating layers depicted in FIG. 43 may include one or more vacuum insulated panels. These vacuum insulated panels are further described in PCT/US2016/063658, filed 23 Nov. 2016, the contents of which are incorporated herein by reference.

In another example, the insulating device 6010 may include additional reinforcement structures. In one example, these additional reinforcement structures may include one or more of an internal, an external or a partially internal frame constructed from one or more plates, tubes and/or beams, and from one or more of a metal, alloy, ceramic, or fiber-reinforced material, or combinations thereof. In another implementation, the inner chamber 6504 of the insulating device 6010 may include one or more storage compartments, pockets, dividers or other structures, without departing from the scope of these disclosures.

Figure 44:
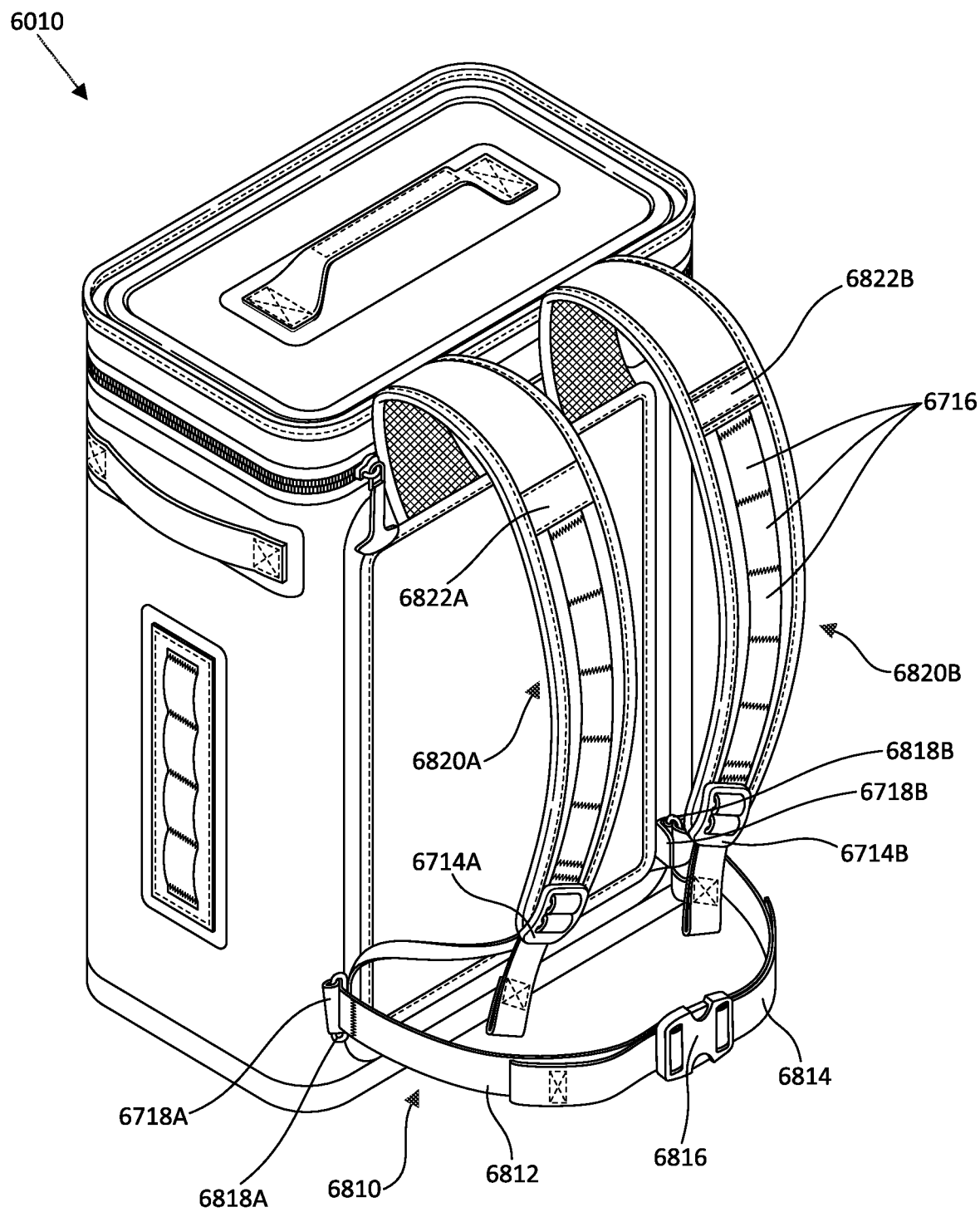
FIG. 44 depicts another isometric view of the insulating device of FIG. 37, according to one or more aspects described herein.

FIG. 44 depicts another isometric view of the insulating device 6010. As depicted, a waist strap 6810 is removably attached to the lower attachment loops 6718A and 6718B. In one example, the waist strap 6810 includes a first strap portion 6812 that is removably coupled to a second strap portion 6814 by a buckle 6816. It is contemplated that the first and second strap portions 6812 and 6814 may be constructed from a nylon webbing, similar to lower adjustment straps 6706A and 6706B. However, additional or alternative polymeric, metallic, alloy or ceramic materials, or combinations thereof, may be used in the first and second strap portion 6812 and 6814, without departing from the scope of these disclosures. It is further contemplated that the buckle 6816 may include any removable coupling implementation, without departing from the scope of these disclosures.

The waist strap 6810 may be removably attached to the lower attachment loops 6718A and 6718B by two split-ring fasteners 6818A and 6818B. In one example, the split-ring fasteners 6818A and 6818B may be constructed from aluminum, and may include an elongated loop element with a gap configured to allow the lower attachment loops 6718A and 6718B to be inserted through. In other implementations, the split-ring fasteners 6818A and 6818B may be constructed from another metal, alloy, polymer, fiber-reinforced material, or ceramic, or combinations thereof.

FIG. 44 further depicts an alternative implementation of shoulder straps 6820A and 6820B. The shoulder straps 6820A and 6820B may be similar to shoulder straps 6702A and 6702B, and include one or more layers of padding and/or outer webbing materials provided for structural load-bearing properties and abrasion resistance. Additionally, the shoulder straps 6702A and 6702B may include a series multiple loops (a portion of the loops are labelled as loops 6716 in FIG. 44). It is contemplated that the shoulder straps 6820A and 6820B may include any number of loops 6716, without departing from the scope of these disclosures. In one example, the series of loops 6716 extends from the adjustment buckles 6714A and 6714B to reinforcement patches 6822A and 6822B that extend across a width of the shoulder straps 6820A and 6820B.

Figure 45:
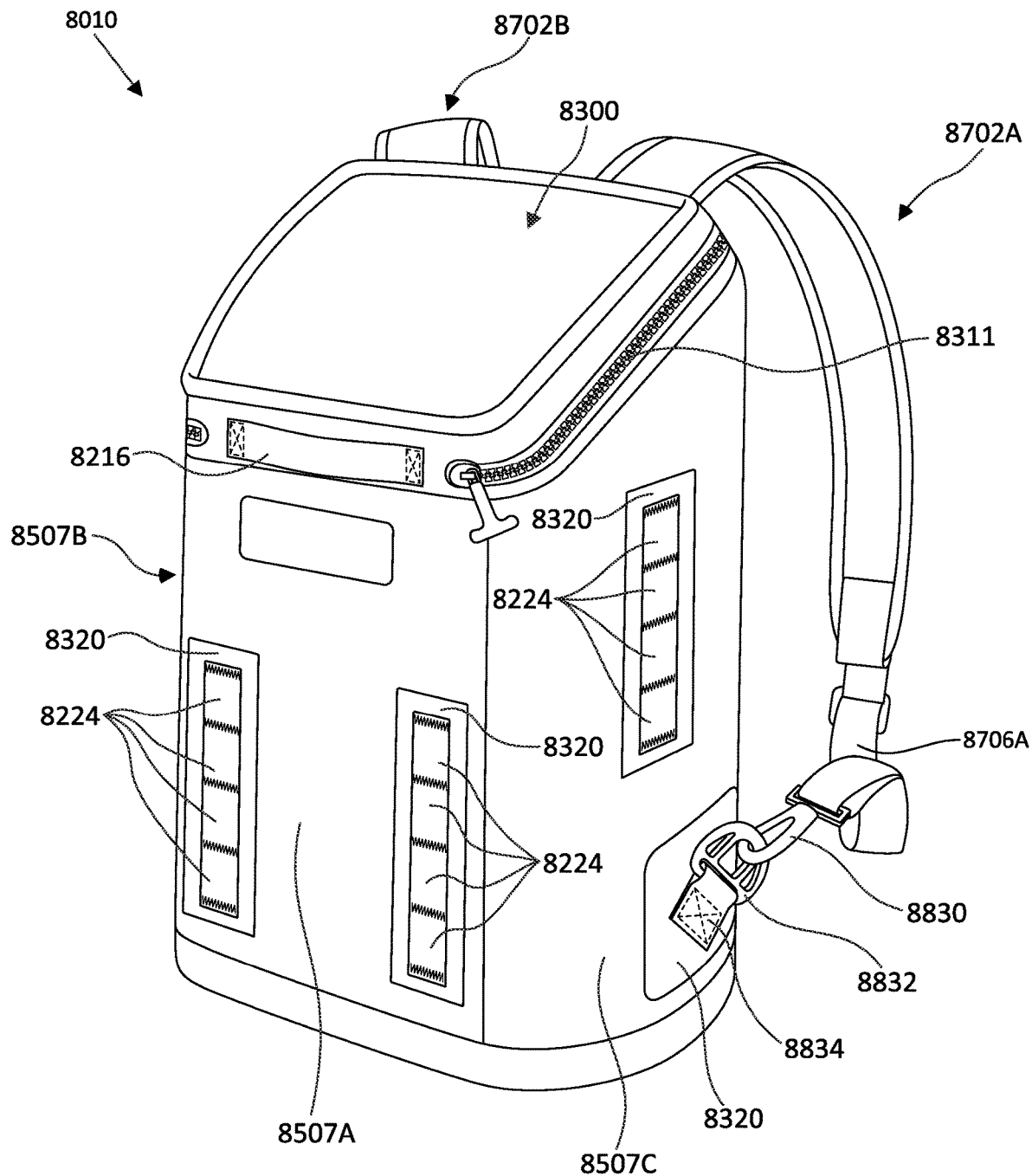
FIG. 45 depicts an isometric view of another implementation of an insulating device, according to one or more aspects described herein.

FIG. 45 depicts an isometric view of another implementation of an insulating device 8010. In one example, the insulating device 8010 may be similar to the insulating device 6010, and include shoulder straps 8702A and 8702B. As depicted, the insulating device 8010 may have a substantially cuboidal geometry with a slanted lid assembly 8300 and closure 8311. The insulating device 8010 can be of a similar construction to the examples previously described in these disclosures, where like reference numerals represent like features having similar functionality. In one example, features denoted by the same last three digits, and optionally the same letter, or alphanumeric suffix, may be considered to include similar features and construction materials and/or methodologies. It is contemplated that the structures of insulating device 8010 may be coupled to one another by any methods and/or fastener elements, such as those previously described throughout these disclosures, and including, among others, adhesives, stitching, laser welding, and/or rivets.

In one example, the lower adjustment straps (e.g., 8706A) of the shoulder straps 8702A and 8702B may be removably coupled to the second sidewall 8507B and third sidewall 8507C. The lower adjustment straps (e.g., 8706A) may include a clasp 8830 configured to be removably coupled to a D-loop 8832 that is attached to the sidewall (e.g., third sidewall 8507C) of the insulating device 8010 by webbing loop 8834. Is contemplated that the depicted clasp eight 8830 and D-loop 8832 may additionally or alternatively include any removable attachment mechanism, such as a buckle (similar to one or more of buckles 6714A and 6816), or hook and loop fasteners. Additionally or alternatively, the clasp 8830 may be configured to be removably coupled directly to the webbing loop 8834, without using the D-loop 8832. In one example, the clasp 8830 and the D-loop 8832 may be constructed from a polymer, a metal, an alloy, a fiber-reinforced material, or a ceramic, among others.

Figure 46:
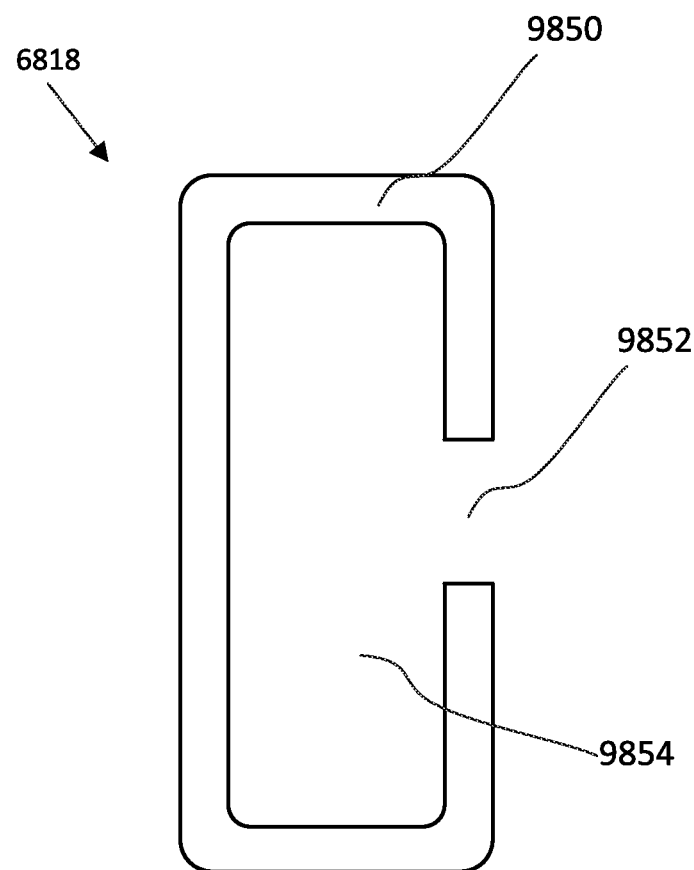
FIG. 46 schematically depicts an implementation of a split-ring fastener, according to one or more aspects described herein.

FIG. 46 schematically depicts one implementation of a split-ring fastener 6818, as described in relation to FIG. 44. In one example, one or more split-ring fasteners 6818 may be used to attach the waist strap 6810 to the lower attachment loops 6718A and 6718B. As depicted, the split-ring fastener may include an elongated loop element 9850 that has a gap 9852. The gap 9852 may be used to removably couple the split-ring fastener 6818 to a lower attached loop 6718 (not depicted in FIG. 46) by temporary deforming a portion of the lower attached loop, inserting the deformed portion through the gap 9852, and expanding the portion once within the hole 9854 of the split-ring fastener 6818. In one example, the split-ring fastener 6818 may be constructed from aluminum. In other implementations, the split-ring fastener 6818 may be constructed from another metal, alloy, polymer, fiber-reinforced material, or ceramic, or combinations thereof.

In one example, the insulating devices described throughout this disclosure, such as devices 1010, 2010, 3010, 4010, 5010, 6010, and 8010 may include one or more zipper assemblies, similar to closure 6311. These alternative implementations of zipper assemblies may include curved geometries. For example, the zipper, rather than being coupled to a planar surface, may be implemented such that it may be coupled to a complex geometries with multiple areas of curvature. Additionally or alternatively, the closures used with any of the insulating devices described throughout these disclosures may include zippers with water reactive resistors configured to be positioned along a length of a zipper track. As such, a plurality of water reactive resistors may be configured to swell when exposed to water and provide resistance to a slider body of the zipper mechanism as it is being used to open or close the zipper closure. In one example, the water reactive resistors may run continuously along an entire length of a zipper track. The resistance provided the water reactive resistors may prevent a closure from being opened when exposed to water, and as such, prevent accidental spilling of fluids, ice, and/or materials positioned within an insulating device.

In another example, a plurality of polymeric resistors may be provided along a length of a zipper track, such as a track of closure 6311. The plastic resistors may be configured to resist the movement of a slider body along the zipper track (with or without the presence of water). As such, the plurality of polymeric resistors may slow the movement of the slider body along the zipper track. In doing so, the polymeric resistors may have functionality similar to water reactive resistors, and may prevent accidental spilling of fluids, ice, and/or materials stored within an insulating device.

It is further contemplated that a frame may be incorporated into any of the insulating devices described throughout this disclosure. The frame may with used to provide for a symmetric and/or balanced distribution of mass and center of gravity of a portable insulating device. As such, the frame may be formed of one or more of a polymer, a fiber-reinforced composite, or a metal or alloy, such as aluminum and titanium.

The insulating devices described throughout these disclosures may be further configured to include one or more storage baffles. It is contemplated that the storage baffles may be constructed using one or more of a foam, a vacuum-insulated panel, a metal, an alloy, a polymer, a fiber reinforced material, and a ceramic, or combinations thereof. The baffles may be individually sealable and waterproof containers, or may be divided and/or partitioned areas within an internal compartment the various insulating devices described herein. In one example, baffles within an insulated storage compartment may be configured to store specifically-sized items.

In one example multiple storage baffles may be used within an insulating device. For example, two baffles may be used, such that one baffle is a sealable and waterproof baffle and the other baffle is a divided area different than the sealed and waterproof baffle within an insulated storage compartment. In one example, the baffles may be removable. Any of the insulating devices described to read these disclosures may be configured to receive and store ice, such as dry ice, conventional ice made from water, one or more ice packs, and/or a removable bladder configured to be filled with a fluid such as water. A bottom baffle within an insulated storage compartment of the various insulating devices may be specifically designed to receive and store ice and/or a removable bladder. This bottom baffle may be lined and/or fabricated with a conductive material, and configured to provide cooling to one or more upper baffles within the insulated storage compartment. In some instances, the upper baffles may also be lined and/or fabricated with a conductive material and, as such, may be configured to further distribute the cooling provided by the bottom baffle. Additionally or alternatively, each of the baffles within an insulated storage compartment of an insulating device may be configured to receive and store ice, ice packs, and/or a removable bladder.

For insulating device is configured to store ice made from drinking water, baffles within an insulated storage compartment may be configured to partition water from the ice as the ice melts. The water may be configured to flow into a reservoir at a bottommost portion of an interior portion of a portable insulating device (such as such as devices 1010, 2010, 3010, 4010, 5010, 6010, and 8010). The reservoir may include a hose or tube attached thereto, which may be routed through the interior portion of the portable insulating device to an upper end of the portable insulating device. From there, the hose or tube may extend out from the interior of the insulating device and may include a one-way nozzle at a terminal end portion. The one-way nozzle may be a drinking nozzle and may be configured to release water from the internal reservoir when actuated by a user of the insulating device. The reservoir may further include an air pump or bladder which may be manually or electrically pumped to increase the pressure within the reservoir. When pressurized, the reservoir may assist in urging water through the hose or tube and out through the one-way nozzle when actuated. It is further contemplated that the water may be filtered before it is dispensed through the drinking nozzle.

In certain implementations, a peripheral cooling vessel may be positioned adjacent to an insulated storage compartment of the insulating devices described throughout this disclosure, and may be configured to provide cooling to the insulated storage compartment. In such embodiments, the peripheral cooling vessel may be configured to receive and store conventional ice made from water, dry ice, one or more ice packs, and/or a removable bladder. The peripheral cooling vessel may be lined and/or fabricated with a conductive material to enable cooling distribution to the insulated storage compartment. The peripheral cooling vessel may further be a sealable and waterproof vessel.

The peripheral cooling vessel may be affixed to a front, bottom, side, and/or rear portion of an insulated storage compartment, and may be configured to be detachably attached to the insulated storage compartment. In some examples, the peripheral cooling vessel may be rigidly attached to the insulated storage compartment. In the detachably attachable configuration, the peripheral cooling vessel may be removable from a portable insulating device.

In some embodiments, the baffles within the insulated and uninsulated storage compartments may be angled to extend from a backmost and/or rearmost portion of the particular storage compartment upwardly and outwardly towards a frontmost and/or frontward portion of the particular storage compartment. Such an orientation of the baffles may establish a center of gravity of the portable insulating device 100 close to the backmost and/or rearmost portion of the device which, as stated above, may be configured to contact the back and shoulders of a carrier during carrying. Accordingly, the angled baffles may provide for symmetric weight distribution and a center of gravity of the portable insulating An exemplary insulating device may include an outer shell, an inner liner, an insulating layer floating freely in between the outer shell and the inner liner, and a waterproof closure. The top of the shell has first perimeter circumference, and the bottom of the shell has a second perimeter circumference. The first perimeter circumference can be equal to the second perimeter circumference. The closure can be a zipper assembly comprising a plurality of zipper teeth, and the zipper teeth can be formed of plastic or metal. The outer shell can be made of a double laminated TPU nylon fabric. The inner liner can be made of a double laminated TPU nylon fabric. The insulating layer can be formed of a closed cell foam. The insulating layer can be made of a NBR and a PVC blend, and at least a portion of the insulating layer can be constructed with an EVA foam layer. The outer shell further can include at least one of a strap or handle. The outer shell further can include at least one ring for securing the insulating device.

An exemplary insulating device can include an outer shell, an inner liner, a closure adapted to seal at least one of the outer shell or the inner liner, and an insulating layer between the outer shell and the inner liner. The closure can have a first flange and a second flange, and the outer liner can be secured to top surfaces of the first flange and the second flange and the inner liner can be secured to bottom surfaces of the first flange and the second flange. The outer liner and the inner liner can be connected to the closure by a polymer weld. The outer shell can have a first circumference and a second circumference, the first circumference and the second circumference both having an oval shape. The closure can be adapted to be a barrier against fluid. The closure can be a zipper apparatus that is watertight up to 7 psi above atmospheric pressure.

An exemplary method of assembling a insulating device may include forming an inner liner having an inner vessel, forming an outer shell, forming an insulating layer between the inner liner and the outer shell, and securing a closure configured to be a barrier against fluid penetration in and out of the inner vessel wherein the closure is secured in a flat plane and is secured to the outer shell and the inner shell. The outer shell and inner shell may only be connected to the closure and not to the insulating layer between the outer shell and inner liner.

A waterproof polymer weld can be formed between the closure and the inner shell and the closure and the outer shell when the closure, the outer shell, and the inner liner are lying in a horizontal plane. The outer shell and the inner layer can be formed of a TPU nylon material. The closure can have a first flange and a second flange. The outer liner can be secured to top surfaces of the first flange and the second flange and the inner liner can be secured to bottom surfaces of the first flange and the second flange.

The method can also include forming the insulating layer from a rectangular shape, and rolling the rectangular shape into a cylindrical shape. The top of the insulating layer has a first perimeter circumference and the bottom of the insulating layer has a second perimeter circumference. The first perimeter circumference can be equal to the second perimeter circumference.

Another example insulating device can include an outer shell, an inner liner forming a storage compartment, a foam layer floating freely in between the outer and inner liner, the foam layer providing insulation, an opening extending through the outer layer and the inner layer, and a closure adapted to substantially seal the opening. The closure can be substantially waterproof so as to resist liquid from exiting the opening.

The insulating device can also include an upper wall and a base, the upper wall defining an upper wall circumference, an upper wall length and an upper wall width, and the base defining a base circumference, a base length and a base width. The upper wall circumference can be equal to the base circumference and the ratio of the upper wall length to the upper wall width can be greater than the ratio of the base length to the base width. In one example, a heat gain rate of the insulating device can be approximately 1.0-1.5 deg F./hr.

Another example method of forming an insulating device may include forming an inner liner first portion and an outer shell first portion, securing the inner liner first portion and the outer shell first portion to a sealable closure to form a cap assembly, forming an inner liner second portion and securing the inner liner second portion to the inner liner first portion to form an inner liner, forming an outer shell second portion, rolling a rectangular foam portion to form a first cylindrical foam portion and securing a foam base portion to the first cylindrical portion to form a foam assembly, inserting the foam assembly into the outer shell second portion, inserting the inner liner into the foam assembly, and stitching the outer shell first portion to the outer shell second portion. The inner liner first portion and the outer shell first portion can be welded to the closure. The closure can be provided with at least one flange and the flange can be secured to a bottom surface of the outer shell first portion and a top surface of the inner liner first portion. The foam can float between the outer shell second portion and the inner liner second portion.

An example portable insulating device may include an outer liner, an inner liner forming a storage compartment, a foam layer in between the outer and inner liner. The foam layer can be adapted to provide insulation. The example portable insulating device may also include an opening extending through one of the outer layer and the inner layer and a closing means for substantially sealing the opening. The closure can be substantially waterproof.

In one example, a portable cooler may include an aperture on the top of the cooler that is opened and closed by a zipper apparatus which allows access to a chamber within the cooler. The aperture prevents any fluid leakage out of the cooler if the cooler is overturned or in any configuration other than upright. The zipper assembly also prevents any fluid from permeating into the cooler chamber if the cooler is exposed to precipitation, other fluid, or submersed under water.

An example method of assembling a zipper apparatus and aperture configured to be impervious to water or other liquids and fluids can include attachment of a waterproof zipper via material welding to both an outer shell and an inner liner. This method may result in a chamber impervious to water and other liquids when the zipper apparatus on the aperture is sealed.

In one example, an insulating device may include an outer shell, an inner liner forming a storage compartment, a foam layer floating formed in between the outer and inner liner, the foam layer providing insulation, an opening extending through the outer layer and the inner layer, a closure adapted to substantially seal the opening, the closure being substantially waterproof so as to resist liquid from exiting the opening when the insulating device is in any orientation. In one example, the top portion of the outer shell can have a first perimeter circumference in a first configuration. The outer shell may include a bottom portion, the bottom portion of the outer shell can have a second perimeter circumference in a second configuration that is different from the first configuration, and the first perimeter circumference can be equal to the second perimeter circumference. The first configuration and the second configuration can be both oval shaped. In one example, the insulating device may include an upper wall and a base, the upper wall can define an upper wall circumference, an upper wall length and an upper wall width, and the base can define a base circumference, a base length and a base width. The upper wall circumference can be equal to the base circumference and the ratio of the upper wall length to the upper wall width can be greater than the ratio of the base length to the base width. The cold retention time of the insulating device can be approximately 11 to 20 hours. However, in one example the cold retention time can be 11 to 15 hours. In another example the cold retention time can be approximately 12.24 hours. The heat gain rate of the insulating device can be approximately 1 to 1.5 deg F./hr, and, in one particular example, the heat gain rate can be approximately 1.4 deg F./hr. The storage compartment can be configured to maintain a liquid therein while inverted for greater than 15 minutes. In one particular example, the storage compartment can be configured to maintain the liquid for a period of greater than 30 minutes therein when inverted and a half of a volume of the storage compartment is filled with the liquid.

In one example, the insulating layer can be floating freely in between the outer shell and the inner liner. The insulating layer can be formed of closed cell foam, and the insulating layer can be made of a NBR and a PVC blend. In one example least a portion of the insulating layer can be constructed with an EVA foam layer. The closure can be a zipper assembly comprising a plurality of zipper teeth, and the zipper teeth can be formed of plastic.

In one example, the outer shell and the inner liner can be made of a double laminated TPU nylon fabric. The outer shell further can include at least one of a strap or handle. The outer shell can include at least one ring for securing the insulating device. The insulating layer can be configured to maintain an internal temperature of the insulating device below 50 degrees Fahrenheit for 65 to 85 hours. The closure can be formed with a first flange and a second flange and the outer liner can be secured to top surfaces of the first flange and the second flange. The inner liner can be secured to bottom surfaces of the first flange and the second flange. The outer liner and the inner liner can be connected to the closure by a polymer weld. In one example, the closure can be watertight up to 2 to 14 psi above atmospheric pressure. A loop patch may also be provided on the insulating device.

In another example, an insulating device may include an outer shell, an inner liner forming a storage compartment, a foam layer floating in between the outer and inner liner, which provides insulation, an opening extending through the outer layer and the inner layer, a closure adapted to substantially seal the opening. The closure can be substantially waterproof so as to prevent liquid from exiting the opening when the insulating device is inverted for a period of greater than 15 minutes. The heat gain rate of the insulating device can be approximately 1.0 to 1.5 deg F./hr. The insulting device can include at least one handle. The at least one handle can be configured to support 100 lbs. to 300 lbs. of weight for 1 to 10 minutes without showing signs of failure. In one example, the insulating device can be configured to withstand 35 lbs. to 100 lbs. of puncture force.

An example method of forming an insulating device can include forming an inner liner first portion and an outer shell first portion, securing the inner liner first portion and the outer shell first portion to a sealable closure to form a cap assembly, forming an inner liner second portion and securing the inner liner second portion to the inner liner first portion to form an inner liner, forming an outer shell second portion, rolling a rectangular foam portion to form a first cylindrical foam portion and securing a foam base portion to the first cylindrical foam portion to form a foam assembly, inserting the foam assembly into the outer shell second portion, inserting the inner liner into the foam assembly, and securing the outer shell first portion to the outer shell second portion to form the outer shell. The method may also include securing a closure configured to be a barrier against fluid penetration in and out of the inner vessel and forming a waterproof polymer weld between the closure and the inner shell and the closure and the outer shell when the closure, the outer shell, and the inner liner are lying in a flat plane.

In an example, the inner liner first portion and the outer shell first portion can be secured to the closure. The closure can be provided with at least one flange, and the flange can be secured to a bottom surface of the outer shell first portion and a top surface of the inner liner first portion. The foam can freely float between the outer shell second portion and the inner liner second portion. The outer shell and inner shell are only connected to the closure and not to the insulating layer between the outer shell and inner liner. The outer shell can be formed of a TPU nylon material, and the inner liner can be formed from a TPU nylon material. The closure can include a first flange and a second flange. The outer liner can be secured to top surfaces of the first flange and the second flange, and the inner liner can be secured to bottom surfaces of the first flange and the second flange. The top of the insulating layer can have a first perimeter circumference. The bottom of the insulating layer can have a second perimeter circumference. The first perimeter circumference can be equal to the second perimeter circumference.

In one example, an insulating device can include an outer shell defining a sidewall, an inner liner forming a storage compartment, an insulating layer positioned in between the outer shell and the inner liner, the insulating layer providing insulation for the storage compartment, an opening extending through the outer shell and the inner liner, and a closure adapted to substantially seal the opening, the closure being substantially waterproof so as to resist liquid from exiting the opening when the insulating device is in any orientation. The insulating device may include a vertically extending front facing surface and the closure can be located on the front facing surface. A cross section of the insulating device can approximate a pentagon in an extended position, and a cross section of the insulating device can approximate a trapezoid in an extended position. The insulating device may also include a base, and the insulating layer can insulate the base. The base may also include an additional insulating layer.

The insulating device may also include a fold-down portion configured to cover the closure. The fold-down portion comprising a first section and a second section and wherein the first section is free of the insulation layer and the second section includes the insulation layer. The fold-down portion can be at least partially free of foam. The fold-down portion can be configured to be secured to the sidewall. The fold-down portion can include at least one hook and the sidewall can include at least one loop. The hook can be configured to engage the loop to secure the fold-down portion to the sidewall. The fold-down portion can be secured to the sidewall, and the fold-down portion may extend at least partly in a substantially horizontal direction. The fold-down portion may define a first width, and the closure extends across at least 95% of the first width. The fold-down portion may also include a handle configured to be grasped by a user when the fold-down portion is secured to the sidewall.

The insulating layer may include a foam material. The insulating layer may include a first portion and a second portion, and the second portion can be formed thicker than the first portion. The insulating layer can be at least partly formed in a shape of a T. The insulating layer can be at least partly formed of a first rectangle and a second rectangle and the first rectangle can have a larger area than the second rectangle. The first rectangle can have a first rectangle width and the second rectangle can have a second rectangle perimeter. The first rectangle width can approximates the second rectangle perimeter. The second rectangle can extend into the fold-down portion. The insulating layer can have a first height and a second height and the first height can be greater than the second height. A majority of the insulating layer can extend to the second height.

A method of forming an insulating device may include forming an inner liner defining a storage compartment, forming an outer shell defining a sidewall, placing an insulating layer in between the outer shell and the inner liner, the insulating layer providing insulation for the storage compartment, placing an opening in the inner liner and the outer shell, and placing a closure between the inner liner and the outer shell. The closure can be adapted to substantially seal the opening, and the closure can be substantially waterproof so as to resist liquid from exiting the opening when the insulating device is in any orientation. The method may also include forming a fold-down portion configured to cover the closure, providing the fold-down portion with a first section and a second section. The first section can be free of the insulation layer and the second section can include the insulation layer. The fold-down portion can be at least partially free of foam. The fold-down portion can be configured to secure to the sidewall. The method may also include forming the insulating layer at least partly in the shape of a T, forming the insulating layer at least partly of a first rectangle and a second rectangle, and forming the first rectangle of a larger area than the second rectangle. The method may also include extending the second rectangle into the fold-down portion and providing the insulating layer on a base and providing an additional insulating layer along the base.

In another example, an insulating device can include an outer shell defining a sidewall, an inner liner forming a storage compartment, and an insulating layer positioned in between the outer shell and the inner liner. The insulating layer can provide insulation for the storage compartment. The insulating device can include an opening configured to allow access to the storage compartment and a closure adapted to substantially seal the opening. The insulating device can include a binding material, and the binding material can be placed over a joint between the inner liner and the outer shell. The binding material can be stitched onto the insulating device, and the stitching can create openings into the outer shell for venting air trapped between the insulating layer and the outer shell. The binding material can create at least one strap for holding the insulating device. The binding material can include a first folded portion attached to the outer shell and a second folded portion, and the second folded portion can form a strap.

The insulation device can approximate a trapezoid from a front view and can approximate a conical shape from a side view. In one example, the insulating device increases from 0° F. to 50° F. in a duration of 70 hours or greater when filled with 0.52 lbs. of ice per each quart in capacity of the insulating device.

The closure can be substantially waterproof so as to resist liquid from exiting the opening when the insulating device is in any orientation. In one example, the insulating device can be configured to withstand being held inverted for 15 minutes without any water escaping or leaving the storage compartment. The closure can be configured to stay in the opened position when the closure is not sealed. The closure can be a zipper. In one example, the closure extends at least 80% of the length of the insulating device when measured along the closure. The length of the closure can be longer than the length of the bottom of the insulating device, and the length of the closure is at least 5% longer than the length of the bottom of the insulating device. The insulating device can include a vertically extending front facing surface, and the closure can be located on the front facing surface. A handle can be located on a rear facing surface opposing the front facing surface.

In the example insulating device, the insulating layer can comprise a foam material. The insulating layer can comprise a first portion and a second portion, and the second portion can be formed thicker than the first portion. The insulating layer can be at least partly formed of a first rectangle and a second rectangle, and the first rectangle can have a larger area than the second rectangle. The insulating layer can have a first height and a second height, and the first height can be greater than the second height. In one example, a majority of the insulating layer can extend to the second height. In addition or alternatively, the front of the insulating layer can extend to the second height and the rear of the insulating layer extends to the first height. The insulating device can include a base, and the insulating layer can insulate the base.

Also the base can include an additional or separate insulating layer. In one example, the insulating layer can cover 80% or more of the inner liner covering the storage compartment or the insulating layer can cover 90% or more of the inner liner covering the storage compartment.

In another example, a method of forming an insulating device may include forming an inner liner the inner liner defining a storage compartment, forming an outer shell defining a sidewall, placing an insulating layer in between the outer shell and the inner liner, the insulating layer providing insulation for the storage compartment, placing an opening in the inner liner and the outer shell, placing a closure between the inner liner and the outer shell, the closure adapted to substantially seal the opening, the closure being substantially waterproof so as to resist liquid from exiting the opening when the insulating device is in any orientation. The method can also include forming the insulating layer at least partly of a first rectangle and a second rectangle and forming the first rectangle of a larger area than the second rectangle. The method can also include providing the insulating layer on a base and providing an additional insulating layer along the base.

An example insulating device can include an outer shell defining a first sidewall; an inner liner forming a storage compartment; an insulating layer positioned in between the outer shell and the inner liner, the insulating layer providing insulation for the storage compartment. The outer shell and the inner liner can define an opening, and the opening can be configured to allow access to the storage compartment. A closure can be adapted to substantially seal the opening, and the closure can be substantially waterproof so as to resist liquid from exiting the opening when the insulating device is in any orientation. The outer shell may include a second sidewall and a third sidewall, and the opening may extend through the first sidewall, the second sidewall, and the third sidewall. The insulating device can be in the shape of a cuboid. The inner liner and the outer shell can form a joint, and the joint can include a vent to gases that become trapped between the inner liner and the outer shell. The outer shell may include one or more handles, and a vent can be formed adjacent to a location of the one or more handles. The closure can be substantially waterproof so as to resist liquid from exiting the opening when the insulating device is dropped from a distance of six feet.

The insulating device can also include a lid assembly and a body assembly. The lid assembly and the body assembly can together form the inner liner, the insulating layer, and the outer shell. The lid assembly can include at least a portion of the insulation layer. The lid assembly may also include a handle and a reinforcement layer that is more rigid than the inner liner, the insulating layer, and the outer shell.

The outer shell may define a bottom wall extending in a first plane, and the inner liner can be secured to the outer shell in a second plane extending perpendicular to the first plane. The liner may be formed of a first piece and a second piece and the first piece is joined to the second piece by way of a weld to define a seam and the seam may be covered with a seam tape. In one alternative example, the inner liner can be formed by way of injection molding. The closure can be a zipper and can be substantially waterproof. The zipper can include a pull, and the pull can be formed of a cloth, string, or rope. In certain examples, the temperature of the insulating device increases from 0° F. to 10° F. in a duration of 0.5 hours to 1.5 hours, the temperature of the insulating device increases from 10° F. to 50° F. in a duration of 22 hours to 28 hours, and the temperature of the insulating device increases from 0° F. to 50° F. in a duration of 24 hours to 30 hours.

An example method may include forming a body assembly by forming a lower outer shell, placing a lower insulating layer into the lower outer shell, and securing a lower inner liner portion to the lower outer shell; forming a lid assembly of an upper outer shell, an upper inner liner portion and an upper insulating layer therebetween; and joining the lid assembly to the body assembly by securing a closure between the lid assembly and the body assembly and by securing a binding material to the body assembly and the lid assembly. The insulating layer can float between the lower outer shell and the lower inner liner portion. The binding material can be formed of nylon, and the binding material can be stitched to the body assembly and the lid assembly. The lid assembly may also be welded to the body assembly. Additionally, the lid assembly may be formed with a handle and a reinforcement layer that is more rigid than the inner liner, the insulating layer, and the outer shell. The lower inner liner portion in certain examples can be formed by injection molding.

The lower inner liner portion can be secured to the lower outer shell by a weld. The weld can be formed by clamping the lower outer shell to the lower inner liner portion with a top U-shaped portion, a plate portion, and a bottom U-shaped portion and applying a current through the top U-shaped portion, the plate portion, and the bottom U-shaped portion. The current can be applied through the top U-shaped portion, the plate portion, and the bottom U-shaped portion in a first direction to weld a first side and the current can be applied in a second direction to weld a second side.

An example insulating device can include an outer shell defining a first sidewall; an inner liner forming a storage compartment; an insulating layer positioned in between the outer shell and the inner liner, the insulating layer providing insulation for the storage compartment. The example insulating device can also include a back panel support structure externally coupled to the outer shell. The outer shell and the inner liner can define an opening, and the opening can be configured to allow access to the storage compartment. A closure can be adapted to substantially seal the opening, and the closure can be substantially waterproof so as to resist liquid from exiting the opening when the insulating device is in any orientation. The outer shell may include a second sidewall and a third sidewall defining side portions of the insulating device, and a fourth sidewall defining a back portion of the insulating device. The back panel support structure may be externally coupled to the fourth sidewall. The opening may extend through the first sidewall, the second sidewall, the third sidewall, and at least a portion of the fourth sidewall. The insulating device may also include a shoulder strap attached to the back panel support structure. The insulating device can be in the shape of a cuboid. The inner liner and the outer shell can form a joint, and the joint can include a vent to gases that become trapped between the inner liner and the outer shell. The outer shell may include one or more handles, and a vent can be formed adjacent to a location of the one or more handles. The closure can be substantially waterproof so as to resist liquid from exiting the opening when the insulating device is dropped from a distance of six feet.

The insulating device can also include a lid assembly and a body assembly. The lid assembly and the body assembly can together form the inner liner, the insulating layer, and the outer shell. The lid assembly can include at least a portion of the insulation layer. The lid assembly may also include a handle and a reinforcement layer that is more rigid than the inner liner, the insulating layer, and the outer shell.

The outer shell may define a bottom wall extending in a first plane, and the inner liner can be secured to the outer shell in a second plane extending perpendicular to the first plane. The liner may be formed of a first piece and a second piece and the first piece is joined to the second piece by way of a weld to define a seam and the seam may be covered with a seam tape. In one alternative example, the inner liner can be formed by way of injection molding. The closure can be a zipper and can be substantially waterproof. The zipper can include a pull, and the pull can be formed of a cloth, string, or rope. In certain examples, the temperature of the insulating device increases from 0° F. to 10° F. in a duration of 0.5 hours to 1.5 hours, the temperature of the insulating device increases from 10° F. to 50° F. in a duration of 22 hours to 28 hours, and the temperature of the insulating device increases from 0° F. to 50° F. in a duration of 24 hours to 30 hours.

An example method may include forming a body assembly by forming a lower outer shell, placing a lower insulating layer into the lower outer shell, and securing a lower inner liner portion to the lower outer shell; forming a lid assembly of an upper outer shell, an upper inner liner portion and an upper insulating layer therebetween. The method may also include forming a back panel support structure, joining the back panel support structure to a back portion of the body assembly, and joining the lid assembly to the body assembly by securing a closure between the lid assembly and the body assembly and by securing a binding material to the body assembly and the lid assembly. The method may also include forming a shoulder strap and joining the shoulder strap to the back panel support structure. The insulating layer can float between the lower outer shell and the lower inner liner portion. The binding material can be formed of nylon, and the binding material can be stitched to the body assembly and the lid assembly. The lid assembly may also be welded to the body assembly. Additionally, the lid assembly may be formed with a handle and a reinforcement layer that is more rigid than the inner liner, the insulating layer, and the outer shell. The lower inner liner portion in certain examples can be formed by injection molding.

The lower inner liner portion can be secured to the lower outer shell by a weld. The weld can be formed by clamping the lower outer shell to the lower inner liner portion with a top U-shaped portion, a plate portion, and a bottom U-shaped portion and applying a current through the top U-shaped portion, the plate portion, and the bottom U-shaped portion. The current can be applied through the top U-shaped portion, the plate portion, and the bottom U-shaped portion in a first direction to weld a first side and the current can be applied in a second direction to weld a second side.

An example insulating device backpack can include an outer shell having a cuboidal shape, and defining a first sidewall defining a front portion of the insulating device backpack. A second sidewall and a third sidewall may define side portions of the insulating device backpack, and a fourth sidewall may define a back portion of the insulating device backpack. The insulating device backpack may additionally include an inner liner forming a storage compartment; an insulating layer positioned in between the outer shell and the inner liner, the insulating layer providing insulation for the storage compartment. The example insulating device backpack can also include a back panel support structure externally attached to the outer shell. The example insulating device backpack may additionally include a shoulder strap coupled to the back panel support structure. The outer shell and the inner liner can define an opening, and the opening can be configured to allow access to the storage compartment. A closure can be adapted to substantially seal the opening, and the closure can be substantially waterproof so as to resist liquid from exiting the opening when the insulating device is in any orientation. The back panel support structure may be externally coupled to the fourth sidewall. The opening may extend through the first sidewall, the second sidewall, the third sidewall, and at least a portion of the fourth sidewall. The inner liner and the outer shell can form a joint, and the joint can include a vent to gases that become trapped between the inner liner and the outer shell. The outer shell may include one or more handles, and a vent can be formed adjacent to a location of the one or more handles. The closure can be substantially waterproof so as to resist liquid from exiting the opening when the insulating device is dropped from a distance of six feet.

The present invention is disclosed above and in the accompanying drawings with reference to a variety of examples. The purpose served by the disclosure, however, is to provide examples of the various features and concepts related to the invention, not to limit the scope of the invention. One skilled in the relevant art will recognize that numerous variations and modifications may be made to the examples described above without departing from the scope of the present invention.

The invention claimed is:

1. An insulating device backpack, comprising:
 an outer shell comprising:
  a first sidewall defining a front portion of the insulating device backpack; and
  a second sidewall and a third sidewall defining side portions of the insulating device backpack, and a fourth sidewall defining a back portion of the insulating device backpack;
 an inner liner forming a storage compartment;
 an insulating layer positioned in between the outer shell and the inner liner, the insulating layer providing insulation for the storage compartment;
 a back panel support structure coupled to the fourth sidewall of the outer shell and a binding extending around the back panel support structure, wherein the back panel support structure covers a portion, less than a total surface of the fourth sidewall;
 a pair of shoulder straps coupled to a top edge and a lower side edge of the binding that extends around the back panel support structure;
 an opening configured to allow access to the storage compartment; and
 a closure adapted to seal the opening.

2. The insulating device backpack of claim 1, wherein the back panel support structure comprises an inner layer, and wherein the inner layer of the back panel support structure is compression molded.

3. The insulating device backpack of claim 1, wherein the pair of shoulder straps each comprise a buckle configured to adjust a length of the pair of shoulder straps.

4. The insulating device backpack of claim 1, wherein the closure is substantially waterproof.

5. The insulating device backpack of claim 4, wherein the closure comprises a zipper.

6. The insulating device backpack of claim 1, further comprising a plurality of fabric loops coupled to the outer shell.

7. The insulating device backpack of claim 1, wherein the inner liner is formed of a nylon fabric.

8. The insulating device backpack of claim 7, wherein the inner liner is formed of a double laminated TPU.

9. The insulating device backpack of claim 1, further comprising an attachment panel affixed to the outer shell and configured to secure external elements to the outer shell.

10. An insulating device comprising:
   an outer shell defining a first sidewall, a second sidewall, a third sidewall, and a fourth sidewall, the second sidewall and the third sidewall defining side portions of the insulating device, and the fourth sidewall defining a back portion of the insulating device;
   an inner liner forming a storage compartment;
   a back panel support structure coupled to the fourth sidewall of the outer shell and a binding extending around the back panel support structure;
   a pair of shoulder straps coupled to a top edge and a lower edge of the binding that extends around the back panel support structure;
   an opening configured to allow access to the storage compartment; and
   a closure adapted to substantially seal the opening, the closure being substantially waterproof so as to resist liquid from exiting the opening when the insulating device is in any orientation.

11. The insulating device of claim 10, wherein the outer shell comprises a waterproof material.

12. The insulating device of claim 10, wherein the inner liner comprises a waterproof material.

13. The insulating device of claim 10, further comprising a lid assembly and a body assembly.

14. The insulating device of claim 13, wherein the lid assembly and the body assembly are hingedly coupled to one another.

15. The insulating device of claim 14, wherein a top handle is coupled to a top surface of the lid assembly.

16. The insulating device of claim 10, further comprising a waist strap.

17. The insulating device of claim 10, further comprising a plurality of fabric loops coupled to the outer shell.

18. The insulating device of claim 17, wherein the plurality of fabric loops are coupled to the second sidewall or the third sidewall.

19. The insulating device of claim 17, wherein the plurality of fabric loops are coupled to the first sidewall.

20. An insulating device backpack, comprising:
   an outer shell comprising:
      a first sidewall defining a front portion of the insulating device backpack; and
      a second sidewall and a third sidewall defining side portions of the insulating device backpack, and a fourth sidewall defining a back portion of the insulating device backpack;
   an inner liner forming a storage compartment;
   an insulating layer positioned in between the outer shell and the inner liner, the insulating layer providing insulation for the storage compartment;
   a back panel support structure coupled to the fourth sidewall of the outer shell and a binding extending around the back panel support structure, wherein the back panel support structure covers a portion, less than a total surface of the fourth sidewall;
   a pair of shoulder straps, coupled to a top edge and a lower side edge of the binding that extends around the back panel support structure;
   an opening configured to allow access to the storage compartment;
   a closure adapted to seal the opening, the closure comprising a zipper, and wherein the zipper is substantially waterproof; and
   a waist strap.

\* \* \* \* \*

UNITED STATES PATENT AND TRADEMARK OFFICE
CERTIFICATE OF CORRECTION

PATENT NO. : 11,685,589 B2
APPLICATION NO. : 17/818639
DATED : June 27, 2023
INVENTOR(S) : Munie et al.

It is certified that error appears in the above-identified patent and that said Letters Patent is hereby corrected as shown below:

On the Title Page

Item (60), Column 1, Related U.S. Application Data, Line 1:
Delete "(60)" and insert --(63)-- therefor Item (56), Column 2, Other Publications, Line 1:
Delete "Sep. 22," and insert --Sep. 20,-- therefor Page 9, Column 1, Foreign Patent Documents, Line 29:
Delete "3043425//" and insert --304342577-- therefor Page 10, Column 1, Other Publications, Line 11:
Delete "njunctive" and insert --injunctive-- therefor In the Specification Column 6, Detailed Description, Line 55:
Delete "507" and insert --224-- therefor Column 11, Detailed Description, Line 56:
Delete "310" and insert --301-- therefor Column 13, Detailed Description, Line 63:
Delete "2504" and insert --2500-- therefor Column 17, Detailed Description, Line 13:
Delete "4010" and insert --4501-- therefor Column 18, Detailed Description, Line 24:
Delete "4502a" and insert --4502-- therefor Signed and Sealed this
Twenty-second Day of October, 2024

Katherine Kelly Vidal
*Director of the United States Patent and Trademark Office*

CERTIFICATE OF CORRECTION (continued)
U.S. Pat. No. 11,685,589 B2

Column 18, Detailed Description, Line 57:
Delete "4502" and insert --4504-- therefor Column 21, Detailed Description, Line 24:
Delete "2301, 4301" and insert --2311, 4311-- therefor Column 22, Detailed Description, Line 16:
Delete "sidewall," and insert --sidewall-- therefor Column 22, Detailed Description, Line 16:
Delete "sidewall," and insert --sidewall-- therefor Column 22, Detailed Description, Line 23:
Delete "sidewall," and insert --sidewall-- therefor Column 22, Detailed Description, Line 59:
Delete "0¶" and insert --3320-- therefor Column 24, Detailed Description, Line 28:
Delete "307a" and insert --3300-- therefor Column 37, Detailed Description, Line 31:
Delete "100" and insert --10-- therefor